United States Patent
Raleigh et al.

(10) Patent No.: US 10,798,252 B2
(45) Date of Patent: Oct. 6, 2020

(54) SYSTEM AND METHOD FOR PROVIDING USER NOTIFICATIONS

(71) Applicant: Headwater Research LLC, Tyler, TX (US)

(72) Inventors: Gregory G. Raleigh, Woodside, CA (US); James Lavine, Corte Madera, CA (US); Jeffrey Green, Sunnyvale, CA (US); Alireza Raissinia, Monte Sereno, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 0 days.

(21) Appl. No.: 16/213,800

(22) Filed: Dec. 7, 2018

(65) Prior Publication Data

US 2019/0260879 A1 Aug. 22, 2019

Related U.S. Application Data

(60) Continuation of application No. 15/162,469, filed on May 23, 2016, now Pat. No. 10,200,541, which is a
(Continued)

(51) Int. Cl.
*H04M 15/00* (2006.01)
*H04W 4/24* (2018.01)
*H04L 12/14* (2006.01)

(52) U.S. Cl.
CPC ............ *H04M 15/61* (2013.01); *H04L 12/14* (2013.01); *H04L 12/1407* (2013.01);
(Continued)

(58) Field of Classification Search
CPC .... H04L 12/14; H04L 12/1407; H04M 15/61; H04M 15/66; H04M 15/8214;
(Continued)

(56) References Cited

U.S. PATENT DOCUMENTS

| | | |
|---|---|---|
| 5,131,020 A | 7/1992 | Liebesny et al. |
| 5,283,904 A | 2/1994 | Carson et al. |

(Continued)

FOREIGN PATENT DOCUMENTS

| | | |
|---|---|---|
| CA | 2688553 A1 | 12/2008 |
| CN | 1310401 A | 8/2001 |

(Continued)

OTHER PUBLICATIONS

"Ads and movies on the run," the Gold Coast Bulletin, Southport, Qld, Jan. 29, 2008.
(Continued)

*Primary Examiner* — Andrew Joseph Rudy
(74) *Attorney, Agent, or Firm* — James E. Harris

(57) ABSTRACT

A method performed by an end user device associated with a service plan having a limit on usage of a network service, the method comprising storing one or more notification actions corresponding to one or more notification requests; performing a device action that reflects a past or intended use of the network service; receiving one of the one or more notification requests from a network element in response to the device action; performing one of the one or more notification actions in response to the notification request, the notification action causing the end user device to retrieve at least a portion of a notification message associated with a status of the use, the at least a portion of the notification message being separate from the one of the one or more notification requests; and presenting the notification message on a user interface of the end user device.

14 Claims, 52 Drawing Sheets

Related U.S. Application Data continuation of application No. 14/292,282, filed on May 30, 2014, now Pat. No. 9,386,165, which is a division of application No. 13/253,013, filed on Oct. 4, 2011, now Pat. No. 8,745,191, which is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,020, filed on Jan. 27, 2010, now Pat. No. 8,406,748, and a continuation-in-part of application No. 13/134,028, filed on May 25, 2011, now Pat. No. 8,589,541.

(60) Provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/275,208, filed on Aug. 25, 2009, provisional application No. 61/237,753, filed on Aug. 28, 2009, provisional application No. 61/348,022, filed on May 25, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/385,020, filed on Sep. 21, 2010, provisional application No. 61/387,243, filed on Sep. 28, 2010, provisional application No. 61/387,247, filed on Sep. 28, 2010.

(52) U.S. Cl.
CPC ....... *H04M 15/66* (2013.01); *H04M 15/8214* (2013.01); *H04M 15/83* (2013.01); *H04M 15/846* (2013.01); *H04M 15/852* (2013.01); *H04W 4/24* (2013.01)

(58) Field of Classification Search
CPC .. H04M 15/83; H04M 15/846; H04M 15/852; H04W 4/24
USPC ............... 455/403–408, 414.1, 432.1, 456.1; 705/28, 30; 707/706; 709/203, 217–223
See application file for complete search history.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,751,719 A | 5/1998 | Chen et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,526,066 B1 | 2/2003 | Weaver |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,465 B1 | 4/2003 | Wang |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |

(56) References Cited

U.S. PATENT DOCUMENTS

| | | |
|---|---|---|
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gumani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,020,781 B1 | 3/2006 | Saw et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,209,664 B1 | 4/2007 | McNicol et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |

(56) References Cited

U.S. PATENT DOCUMENTS

| | | |
|---|---|---|
| 7,320,029 B2 | 1/2008 | Rinne et al. |
| 7,320,781 B2 | 1/2008 | Lambert et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,489,918 B2 | 2/2009 | Zhou et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,794 B2 | 3/2009 | Feather et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,533,158 B2 | 5/2009 | Grannan et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,565,328 B1 | 7/2009 | Donner |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 * | 9/2009 | Lutnick .......... G07F 17/32 463/16 |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,603,710 B2 | 10/2009 | Harvey et al. |
| 7,606,357 B2 | 10/2009 | Daigle |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,612,712 B2 | 11/2009 | LaMance et al. |
| 7,613,444 B2 * | 11/2009 | Lindqvist .......... H04W 48/12 455/403 |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,253 B2 | 12/2009 | Plestid et al. |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |

(56) References Cited

U.S. PATENT DOCUMENTS

| | | | |
|---|---|---|---|
| 7,684,370 B2 | 3/2010 | Kezys | |
| 7,685,131 B2 | 3/2010 | Batra et al. | |
| 7,685,254 B2 | 3/2010 | Pandya | |
| 7,685,530 B2 | 3/2010 | Sherrard et al. | |
| 7,688,792 B2 | 3/2010 | Babbar et al. | |
| 7,693,107 B2 | 4/2010 | De Froment | |
| 7,693,720 B2 | 4/2010 | Kennewick et al. | |
| 7,697,540 B2 | 4/2010 | Haddad et al. | |
| 7,707,320 B2 | 4/2010 | Singhai et al. | |
| 7,710,932 B2 | 5/2010 | Muthuswamy et al. | |
| 7,711,848 B2 | 5/2010 | Maes | |
| 7,719,966 B2 | 5/2010 | Luft et al. | |
| 7,720,206 B2 | 5/2010 | Devolites et al. | |
| 7,720,464 B2 | 5/2010 | Batta | |
| 7,720,505 B2 | 5/2010 | Gopi et al. | |
| 7,720,960 B2 | 5/2010 | Pruss et al. | |
| 7,721,296 B2 | 5/2010 | Ricagni | |
| 7,724,716 B2 | 5/2010 | Fadell | |
| 7,725,570 B1 | 5/2010 | Lewis | |
| 7,729,326 B2 | 6/2010 | Sekhar | |
| 7,730,123 B1 | 6/2010 | Erickson et al. | |
| 7,734,784 B1 | 6/2010 | Araujo et al. | |
| 7,742,406 B1 | 6/2010 | Muppala | |
| 7,742,961 B2 * | 6/2010 | Aaron | G06Q 40/02 705/35 |
| 7,743,119 B2 | 6/2010 | Friend et al. | |
| 7,746,854 B2 | 6/2010 | Ambe et al. | |
| 7,747,240 B1 | 6/2010 | Briscoe et al. | |
| 7,747,699 B2 | 6/2010 | Prueitt et al. | |
| 7,747,730 B1 | 6/2010 | Harlow | |
| 7,752,330 B2 | 7/2010 | Olsen et al. | |
| 7,756,056 B2 | 7/2010 | Kim et al. | |
| 7,756,509 B2 | 7/2010 | Rajagopalan et al. | |
| 7,756,534 B2 | 7/2010 | Anupam et al. | |
| 7,756,757 B1 | 7/2010 | Oakes, III | |
| 7,760,137 B2 | 7/2010 | Martucci et al. | |
| 7,760,711 B1 | 7/2010 | Kung et al. | |
| 7,760,861 B1 | 7/2010 | Croak et al. | |
| 7,765,294 B2 | 7/2010 | Edwards et al. | |
| 7,769,397 B2 | 8/2010 | Funato et al. | |
| 7,770,785 B2 | 8/2010 | Jha et al. | |
| 7,774,323 B2 | 8/2010 | Helfman | |
| 7,774,412 B1 | 8/2010 | Schnepel | |
| 7,774,456 B1 | 8/2010 | Lownsbrough et al. | |
| 7,778,176 B2 | 8/2010 | Morford | |
| 7,778,643 B2 | 8/2010 | Laroia et al. | |
| 7,788,700 B1 | 8/2010 | Feezel et al. | |
| 7,792,257 B1 | 9/2010 | Vanier et al. | |
| 7,792,538 B2 | 9/2010 | Kozisek | |
| 7,792,708 B2 | 9/2010 | Alva | |
| 7,797,019 B2 | 9/2010 | Friedmann | |
| 7,797,060 B2 | 9/2010 | Grgic et al. | |
| 7,797,204 B2 | 9/2010 | Balent | |
| 7,797,401 B2 | 9/2010 | Stewart et al. | |
| 7,801,523 B1 | 9/2010 | Kenderov | |
| 7,801,783 B2 | 9/2010 | Kende et al. | |
| 7,801,985 B1 | 9/2010 | Pitkow et al. | |
| 7,802,724 B1 | 9/2010 | Nohr | |
| 7,805,140 B2 | 9/2010 | Friday et al. | |
| 7,805,522 B2 | 9/2010 | Schlüter et al. | |
| 7,805,606 B2 | 9/2010 | Birger et al. | |
| 7,809,351 B1 | 10/2010 | Panda et al. | |
| 7,809,372 B2 | 10/2010 | Rajaniemi | |
| 7,813,746 B2 | 10/2010 | Rajkotia | |
| 7,817,615 B1 | 10/2010 | Breau et al. | |
| 7,817,983 B2 | 10/2010 | Cassett et al. | |
| 7,822,837 B1 | 10/2010 | Urban et al. | |
| 7,822,849 B2 | 10/2010 | Titus | |
| 7,826,427 B2 | 11/2010 | Sood et al. | |
| 7,826,607 B1 | 11/2010 | De Carvalho Resende et al. | |
| 7,835,275 B1 | 11/2010 | Swan et al. | |
| 7,843,831 B2 | 11/2010 | Morrill et al. | |
| 7,843,843 B1 | 11/2010 | Papp, III et al. | |
| 7,844,034 B1 | 11/2010 | Oh et al. | |
| 7,844,728 B2 | 11/2010 | Anderson et al. | |
| 7,848,768 B2 | 12/2010 | Omori et al. | |
| 7,849,161 B2 | 12/2010 | Koch et al. | |
| 7,849,170 B1 | 12/2010 | Hargens et al. | |
| 7,849,477 B2 | 12/2010 | Cristofalo et al. | |
| 7,853,250 B2 | 12/2010 | Harvey et al. | |
| 7,853,255 B2 | 12/2010 | Karaoguz et al. | |
| 7,853,656 B2 | 12/2010 | Yach et al. | |
| 7,856,226 B2 | 12/2010 | Wong et al. | |
| 7,860,088 B2 | 12/2010 | Lioy | |
| 7,865,182 B2 | 1/2011 | Macaluso | |
| 7,865,187 B2 | 1/2011 | Ramer et al. | |
| 7,868,778 B2 | 1/2011 | Kenwright | |
| 7,868,814 B1 | 1/2011 | Bergman | |
| 7,873,001 B2 | 1/2011 | Silver | |
| 7,873,344 B2 | 1/2011 | Bowser et al. | |
| 7,873,346 B2 | 1/2011 | Petersson et al. | |
| 7,873,540 B2 | 1/2011 | Arumugam | |
| 7,873,705 B2 | 1/2011 | Kalish | |
| 7,873,985 B2 | 1/2011 | Baum | |
| 7,877,090 B2 | 1/2011 | Maes | |
| 7,881,199 B2 | 2/2011 | Krstulich | |
| 7,881,697 B2 | 2/2011 | Baker et al. | |
| 7,882,029 B2 | 2/2011 | White | |
| 7,882,247 B2 | 2/2011 | Sturniolo et al. | |
| 7,882,560 B2 | 2/2011 | Kraemer et al. | |
| 7,885,644 B2 | 2/2011 | Gallagher et al. | |
| 7,886,047 B1 | 2/2011 | Potluri | |
| 7,889,384 B2 | 2/2011 | Armentrout et al. | |
| 7,890,084 B1 | 2/2011 | Dudziak et al. | |
| 7,890,111 B2 | 2/2011 | Bugenhagen | |
| 7,890,581 B2 | 2/2011 | Rao et al. | |
| 7,894,431 B2 | 2/2011 | Goring et al. | |
| 7,899,039 B2 | 3/2011 | Andreasen et al. | |
| 7,899,438 B2 | 3/2011 | Baker et al. | |
| 7,903,553 B2 | 3/2011 | Liu | |
| 7,907,970 B2 | 3/2011 | Park et al. | |
| 7,908,358 B1 | 3/2011 | Prasad et al. | |
| 7,911,975 B2 | 3/2011 | Droz et al. | |
| 7,912,025 B2 | 3/2011 | Pattenden et al. | |
| 7,912,056 B1 | 3/2011 | Brassem | |
| 7,917,130 B1 | 3/2011 | Christensen et al. | |
| 7,920,529 B1 | 4/2011 | Mahler et al. | |
| 7,921,463 B2 | 4/2011 | Sood et al. | |
| 7,925,740 B2 | 4/2011 | Nath et al. | |
| 7,925,778 B1 | 4/2011 | Wijnands et al. | |
| 7,929,446 B2 | 4/2011 | Bozarth et al. | |
| 7,929,959 B2 | 4/2011 | DeAtley et al. | |
| 7,929,960 B2 | 4/2011 | Martin et al. | |
| 7,929,973 B2 | 4/2011 | Zavalkovsky et al. | |
| 7,930,327 B2 | 4/2011 | Craft et al. | |
| 7,930,446 B2 | 4/2011 | Kesselman et al. | |
| 7,930,553 B2 | 4/2011 | Satarasinghe et al. | |
| 7,933,274 B2 | 4/2011 | Verma et al. | |
| 7,936,736 B2 | 5/2011 | Proctor, Jr. et al. | |
| 7,937,069 B2 | 5/2011 | Rassam | |
| 7,937,450 B2 | 5/2011 | Janik | |
| 7,937,470 B2 * | 5/2011 | Curley | H04L 41/12 370/241 |
| 7,940,685 B1 | 5/2011 | Breslau et al. | |
| 7,940,751 B2 | 5/2011 | Hansen | |
| 7,941,184 B2 | 5/2011 | Prendergast et al. | |
| 7,944,948 B2 | 5/2011 | Chow et al. | |
| 7,945,238 B2 | 5/2011 | Baker et al. | |
| 7,945,240 B1 | 5/2011 | Klock et al. | |
| 7,945,470 B1 * | 5/2011 | Cohen | G06Q 10/06 705/7.13 |
| 7,945,945 B2 | 5/2011 | Graham et al. | |
| 7,948,952 B2 | 5/2011 | Hurtta et al. | |
| 7,948,953 B2 | 5/2011 | Melkote et al. | |
| 7,948,968 B2 | 5/2011 | Voit et al. | |
| 7,949,529 B2 | 5/2011 | Weider et al. | |
| 7,953,808 B2 | 5/2011 | Sharp et al. | |
| 7,953,877 B2 | 5/2011 | Vemula et al. | |
| 7,957,020 B2 | 6/2011 | Mine et al. | |
| 7,957,381 B2 | 6/2011 | Clermidy et al. | |
| 7,957,511 B2 | 6/2011 | Drudis et al. | |
| 7,958,029 B1 | 6/2011 | Bobich et al. | |
| 7,962,622 B2 | 6/2011 | Friend et al. | |
| 7,965,983 B1 | 6/2011 | Swan et al. | |

(56) References Cited

U.S. PATENT DOCUMENTS

| | | |
|---|---|---|
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,054,778 B2 | 11/2011 | Polson |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,175 B2 | 1/2012 | Todd et al. |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,121,117 B1 | 2/2012 | Amdahl et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,301 B1 | 3/2012 | Ahmed et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,144,853 B1 | 3/2012 | Aboujaoude et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,771 B2 | 4/2012 | Khivesara et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,152,246 B2 | 4/2012 | Miller et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,554 B2 | 4/2012 | Gosselin et al. |
| 8,160,555 B2 | 4/2012 | Gosselin et al. |
| 8,160,556 B2 | 4/2012 | Gosselin et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,175,966 B2* | 5/2012 | Steinberg ............... G06Q 20/10 455/406 |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |

(56) References Cited

U.S. PATENT DOCUMENTS

| | | |
|---|---|---|
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B1 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,269 B2 | 9/2012 | Short et al. |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,505 B2 | 11/2012 | Bennett |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,644 B2 * | 12/2012 | Sigmund ................ H04M 3/02 455/413 |
| 8,340,678 B1 | 12/2012 | Pandey |
| 8,340,718 B2 | 12/2012 | Colonna et al. |
| 8,346,023 B2 | 1/2013 | Lin |
| 8,346,210 B2 | 1/2013 | Balsan et al. |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,102 B2 | 2/2013 | Luft et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,380,804 B2 | 2/2013 | Jain et al. |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |

(56) References Cited

U.S. PATENT DOCUMENTS

| | | |
|---|---|---|
| 8,401,906 B2 | 3/2013 | Ruckart |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,406,756 B1 | 3/2013 | Reeves et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,442,507 B2 | 5/2013 | Duggal et al. |
| 8,443,390 B2 | 5/2013 | Lo et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 * | 7/2013 | Shahbazi .......... H04W 12/0027 726/1 |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,510,743 B2 | 8/2013 | Hackborn et al. |
| 8,510,804 B1 | 8/2013 | Bonn et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 * | 9/2013 | Guba .......... H04W 4/027 455/569.2 |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,341 B2 | 9/2013 | Aguirre et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,584,226 B2 | 11/2013 | Kudla et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,626 B1 * | 11/2013 | Woodson .......... H04M 15/8228 379/112.04 |
| 8,594,665 B2 | 11/2013 | Anschutz |
| 8,595,186 B1 | 11/2013 | Mandyam et al. |
| 8,600,850 B2 | 12/2013 | Zabawskyj et al. |
| 8,600,895 B2 | 12/2013 | Felsher |
| 8,601,125 B2 | 12/2013 | Huang et al. |
| 8,605,691 B2 | 12/2013 | Soomro et al. |
| 8,611,919 B2 | 12/2013 | Barnes, Jr. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,620,281 B2 | 12/2013 | Gosselin et al. |
| 8,621,056 B2 | 12/2013 | Coussemaeker et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,635,335 B2 | 1/2014 | Raleigh et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,654,952 B2 | 2/2014 | Wang et al. |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,507 B2 | 3/2014 | Raleigh |
| 8,675,852 B2 | 3/2014 | Maes |
| 8,676,682 B2 | 3/2014 | Kalliola |
| 8,676,925 B1 | 3/2014 | Liu et al. |
| 8,688,671 B2 * | 4/2014 | Ramer .......... G06Q 30/02 707/706 |
| 8,688,784 B2 * | 4/2014 | Zabawskyj .......... H04L 12/14 709/205 |
| 8,693,323 B1 | 4/2014 | McDysan |
| 8,694,772 B2 | 4/2014 | Kao et al. |

(56) References Cited

U.S. PATENT DOCUMENTS

| | | | |
|---|---|---|---|
| 8,699,355 B2 | 4/2014 | Macias | |
| 8,700,729 B2 | 4/2014 | Dua | |
| 8,701,015 B2 | 4/2014 | Bonnat | |
| 8,701,080 B2 | 4/2014 | Tripathi | |
| 8,705,361 B2 | 4/2014 | Venkataraman et al. | |
| 8,706,863 B2 | 4/2014 | Fadell | |
| 8,713,535 B2 | 4/2014 | Malhotra et al. | |
| 8,713,641 B1 | 4/2014 | Pagan et al. | |
| 8,719,397 B2 | 5/2014 | Levi et al. | |
| 8,719,423 B2 | 5/2014 | Wyld | |
| 8,724,486 B2 | 5/2014 | Seto et al. | |
| 8,725,700 B2 | 5/2014 | Rappaport | |
| 8,725,899 B2 | 5/2014 | Short et al. | |
| 8,730,842 B2 | 5/2014 | Collins et al. | |
| 8,731,519 B2 | 5/2014 | Flynn et al. | |
| 8,732,808 B2 | 5/2014 | Sewall et al. | |
| 8,738,860 B1 | 5/2014 | Griffin et al. | |
| 8,739,035 B2 | 5/2014 | Trethewey | |
| 8,742,694 B2 | 6/2014 | Bora et al. | |
| 8,744,339 B2 | 6/2014 | Halfmann et al. | |
| 8,761,711 B2 | 6/2014 | Grignani et al. | |
| 8,761,809 B2 | 6/2014 | Faith et al. | |
| 8,775,233 B1 * | 7/2014 | Lybrook | G06Q 10/06375 705/7.39 |
| 8,780,857 B2 | 7/2014 | Balasubramanian et al. | |
| 8,787,249 B2 | 7/2014 | Giaretta et al. | |
| 8,793,304 B2 | 7/2014 | Lu et al. | |
| 8,793,758 B2 | 7/2014 | Raleigh et al. | |
| 8,804,517 B2 | 8/2014 | Oerton | |
| 8,804,695 B2 | 8/2014 | Branam | |
| 8,811,338 B2 | 8/2014 | Jin et al. | |
| 8,811,991 B2 | 8/2014 | Jain et al. | |
| 8,812,525 B1 | 8/2014 | Taylor, III | |
| 8,818,394 B2 | 8/2014 | Bienas et al. | |
| 8,819,253 B2 | 8/2014 | Simeloff et al. | |
| 8,825,109 B2 | 9/2014 | Montemurro et al. | |
| 8,826,411 B2 | 9/2014 | Moen et al. | |
| 8,831,561 B2 | 9/2014 | Sutaria et al. | |
| 8,837,322 B2 | 9/2014 | Venkataramanan et al. | |
| 8,838,686 B2 | 9/2014 | Getchius | |
| 8,838,752 B2 | 9/2014 | Lor et al. | |
| 8,843,849 B2 | 9/2014 | Neil et al. | |
| 8,845,415 B2 | 9/2014 | Lutnick et al. | |
| 8,849,262 B2 * | 9/2014 | Desai | H04W 4/24 379/114.03 |
| 8,849,297 B2 | 9/2014 | Balasubramanian | |
| 8,855,620 B2 | 10/2014 | Sievers et al. | |
| 8,856,015 B2 | 10/2014 | Mesaros | |
| 8,862,751 B2 | 10/2014 | Faccin et al. | |
| 8,863,111 B2 | 10/2014 | Selitser et al. | |
| 8,868,725 B2 | 10/2014 | Samba | |
| 8,868,727 B2 | 10/2014 | Yumerefendi et al. | |
| 8,875,042 B2 | 10/2014 | LeJeune et al. | |
| 8,880,047 B2 | 11/2014 | Konicek et al. | |
| 8,891,483 B2 | 11/2014 | Connelly et al. | |
| 8,898,748 B2 | 11/2014 | Burks et al. | |
| 8,908,516 B2 | 12/2014 | Tzamaloukas et al. | |
| 8,929,374 B2 | 1/2015 | Tönsing et al. | |
| 8,930,238 B2 | 1/2015 | Coffman et al. | |
| 8,943,551 B2 | 1/2015 | Ganapathy et al. | |
| 8,948,198 B2 * | 2/2015 | van Nee | H04W 72/0406 370/328 |
| 8,948,726 B2 | 2/2015 | Smith et al. | |
| 8,949,382 B2 | 2/2015 | Cornett et al. | |
| 8,949,597 B1 | 2/2015 | Reeves et al. | |
| 8,955,038 B2 | 2/2015 | Nicodemus et al. | |
| 8,966,018 B2 | 2/2015 | Bugwadia et al. | |
| 8,971,841 B2 | 3/2015 | Menezes et al. | |
| 8,971,912 B2 | 3/2015 | Chou et al. | |
| 8,977,284 B2 | 3/2015 | Reed | |
| 8,995,952 B1 | 3/2015 | Baker et al. | |
| 9,002,342 B2 | 4/2015 | Tenhunen et al. | |
| 9,008,653 B2 | 4/2015 | Sparks et al. | |
| 9,014,059 B2 | 4/2015 | Richardson et al. | |
| 9,014,973 B2 | 4/2015 | Ruckart | |
| 9,015,331 B2 | 4/2015 | Lai et al. | |
| 9,030,934 B2 | 5/2015 | Shah et al. | |
| 9,032,427 B2 | 5/2015 | Gallant et al. | |
| 9,049,010 B2 | 6/2015 | Jueneman et al. | |
| 9,064,275 B1 | 6/2015 | Lu et al. | |
| 9,105,031 B2 | 8/2015 | Shen et al. | |
| 9,107,053 B2 | 8/2015 | Davis et al. | |
| 9,111,088 B2 | 8/2015 | Ghai et al. | |
| 9,135,037 B1 | 9/2015 | Petrescu-Prahova et al. | |
| 9,137,286 B1 | 9/2015 | Yuan | |
| 9,143,933 B2 | 9/2015 | Ikeda et al. | |
| 9,172,553 B2 | 10/2015 | Dawes et al. | |
| 9,173,090 B2 | 10/2015 | Tuchman et al. | |
| 9,177,455 B2 | 11/2015 | Remer | |
| 9,183,524 B2 | 11/2015 | Carter | |
| 9,225,847 B2 | 12/2015 | Daymond et al. | |
| 9,262,370 B2 | 2/2016 | Hofstaedter et al. | |
| 9,277,433 B2 | 3/2016 | Raleigh et al. | |
| 9,282,460 B2 | 3/2016 | Souissi | |
| 9,286,469 B2 | 3/2016 | Kraemer et al. | |
| 9,286,604 B2 | 3/2016 | Aabye et al. | |
| 9,288,276 B2 | 3/2016 | Adamczyk et al. | |
| 9,313,708 B2 | 4/2016 | Nam et al. | |
| 9,325,737 B2 | 4/2016 | Gutowski et al. | |
| 9,326,173 B2 | 4/2016 | Luft | |
| 9,344,557 B2 | 5/2016 | Gruchala et al. | |
| 9,350,842 B2 * | 5/2016 | Swanburg | H04L 29/12047 |
| 9,363,285 B2 | 6/2016 | Kitamura | |
| 9,367,680 B2 | 6/2016 | Mahaffey et al. | |
| 9,402,254 B2 | 7/2016 | Kneckt et al. | |
| 9,413,546 B2 | 8/2016 | Meier et al. | |
| 9,418,381 B2 | 8/2016 | Ahuja et al. | |
| 9,436,805 B1 | 9/2016 | Kravets | |
| 9,479,917 B1 | 10/2016 | Gota et al. | |
| 9,501,803 B2 | 11/2016 | Bilac et al. | |
| 9,525,992 B2 | 12/2016 | Rao et al. | |
| 9,534,861 B1 | 1/2017 | Kellgren | |
| 9,544,397 B2 | 1/2017 | Raleigh et al. | |
| 9,557,889 B2 | 1/2017 | Raleigh et al. | |
| 9,589,117 B2 | 3/2017 | Ali et al. | |
| 9,609,459 B2 | 3/2017 | Raleigh | |
| 9,609,510 B2 | 3/2017 | Raleigh et al. | |
| 9,609,544 B2 | 3/2017 | Raleigh et al. | |
| 9,615,192 B2 | 4/2017 | Raleigh | |
| 9,634,850 B2 | 4/2017 | Taft et al. | |
| 9,642,004 B2 | 5/2017 | Wang et al. | |
| 9,648,022 B2 | 5/2017 | Peterka et al. | |
| 9,680,658 B2 | 6/2017 | Goel et al. | |
| 9,681,003 B1 | 6/2017 | Kim et al. | |
| 9,691,082 B1 * | 6/2017 | Burnett | G06Q 30/0255 |
| 9,749,899 B2 | 8/2017 | Raleigh et al. | |
| 9,755,842 B2 | 9/2017 | Raleigh et al. | |
| 9,923,790 B2 | 3/2018 | Patel et al. | |
| 9,954,975 B2 | 4/2018 | Raleigh et al. | |
| 9,986,413 B2 | 5/2018 | Raleigh | |
| 10,002,332 B2 | 6/2018 | Spong | |
| 10,024,948 B2 | 7/2018 | Ganick et al. | |
| 10,057,775 B2 | 8/2018 | Raleigh et al. | |
| 10,064,033 B2 | 8/2018 | Raleigh | |
| 10,171,681 B2 | 1/2019 | Raleigh et al. | |
| 10,171,988 B2 | 1/2019 | Raleigh et al. | |
| 10,171,990 B2 | 1/2019 | Raleigh et al. | |
| 10,237,773 B2 | 3/2019 | Raleigh et al. | |
| 10,248,996 B2 | 4/2019 | Raleigh | |
| 10,264,138 B2 | 4/2019 | Raleigh et al. | |
| 10,285,025 B1 * | 5/2019 | Baker | H04W 4/24 |
| 10,321,515 B2 | 6/2019 | Shen et al. | |
| 10,462,627 B2 | 10/2019 | Raleigh et al. | |
| 10,492,102 B2 * | 11/2019 | Raleigh | H04W 28/10 |
| 10,523,726 B2 | 12/2019 | Pantos et al. | |
| 10,582,375 B2 * | 3/2020 | Raleigh | H04W 4/24 |
| 2001/0048738 A1 | 12/2001 | Baniak et al. | |
| 2001/0053694 A1 | 12/2001 | Igarashi et al. | |
| 2002/0013844 A1 | 1/2002 | Garrett et al. | |
| 2002/0022472 A1 | 2/2002 | Watler et al. | |
| 2002/0022483 A1 | 2/2002 | Thompson et al. | |
| 2002/0049074 A1 | 4/2002 | Eisinger et al. | |
| 2002/0099848 A1 | 7/2002 | Lee | |
| 2002/0116338 A1 | 8/2002 | Gonthier et al. | |

(56) References Cited

U.S. PATENT DOCUMENTS

| | | |
|---|---|---|
| 2002/0120370 A1 | 8/2002 | Parupudi et al. |
| 2002/0120540 A1 | 8/2002 | Kende et al. |
| 2002/0131397 A1 | 9/2002 | Patel et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0060189 A1 | 3/2003 | Minear et al. |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0191646 A1 | 10/2003 | D'Avello et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0114553 A1 | 6/2004 | Jiang et al. |
| 2004/0116140 A1 | 6/2004 | Babbar et al. |
| 2004/0123153 A1 | 6/2004 | Wright et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0226178 A1 | 10/2005 | Forand et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |

(56) References Cited

U.S. PATENT DOCUMENTS

| | | |
|---|---|---|
| 2006/0178918 A1 | 8/2006 | Mikurak |
| 2006/0178943 A1 | 8/2006 | Rollinson et al. |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0221829 A1 | 10/2006 | Holmstrom et al. |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0111740 A1 | 5/2007 | Wandel |
| 2007/0124077 A1 | 5/2007 | Hedlund |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0242619 A1 | 10/2007 | Murakami et al. |
| 2007/0242659 A1 | 10/2007 | Cantu et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0256128 A1 | 11/2007 | Jung et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0265003 A1 | 11/2007 | Kezys et al. |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0057894 A1 | 3/2008 | Aleksic et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0101291 A1 | 5/2008 | Jiang et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0148402 A1 | 6/2008 | Bogineni et al. |
| 2008/0160958 A1 | 7/2008 | Abichandani et al. |
| 2008/0161042 A1 | 7/2008 | Pernu |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |

(56) References Cited

U.S. PATENT DOCUMENTS

| | | |
|---|---|---|
| 2008/0178300 A1 | 7/2008 | Brown et al. |
| 2008/0183811 A1 | 7/2008 | Kotras et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0242290 A1 | 10/2008 | Bhatia et al. |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0316983 A1 | 12/2008 | Daigle |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0054061 A1 | 2/2009 | Dawson et al. |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0109898 A1 | 4/2009 | Adams et al. |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0170554 A1 | 7/2009 | Want et al. |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0261783 A1 | 10/2009 | Gonzales et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0010873 A1 | 1/2010 | Moreau |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027525 A1 | 2/2010 | Zhu |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |
| 2010/0046373 A1 | 2/2010 | Smith et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0254387 A1 | 10/2010 | Trinh et al. |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0322071 A1 | 12/2010 | Avdanin et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0071854 A1 | 3/2011 | Medeiros et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |

(56) References Cited

U.S. PATENT DOCUMENTS

| | | |
|---|---|---|
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0108225 A1 | 5/2012 | Luna et al. |
| 2012/0144025 A1 | 6/2012 | Melander et al. |
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0195200 A1 | 8/2012 | Regan |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |
| 2013/0176908 A1 | 7/2013 | Baniel et al. |
| 2013/0326356 A9 | 12/2013 | Zheng et al. |
| 2014/0073291 A1 | 3/2014 | Hildner et al. |
| 2014/0198687 A1 | 7/2014 | Raleigh |
| 2014/0241342 A1 | 8/2014 | Constantinof |
| 2015/0039763 A1 | 2/2015 | Chaudhary et al. |
| 2015/0181628 A1 | 6/2015 | Haverinen et al. |
| 2017/0063695 A1 | 3/2017 | Ferrell |

FOREIGN PATENT DOCUMENTS

| | | | |
|---|---|---|---|
| CN | 1345154 A | | 4/2002 |
| CN | 1508734 A | | 6/2004 |
| CN | 1538730 A | | 10/2004 |
| CN | 1567818 A | | 1/2005 |
| CN | 101035308 A | | 3/2006 |
| CN | 1801829 A | | 7/2006 |
| CN | 1802839 A | | 7/2006 |
| CN | 1889777 A | | 7/2006 |
| CN | 101155343 B | | 9/2006 |
| CN | 1867024 A | | 11/2006 |
| CN | 1878160 A | | 12/2006 |
| CN | 1937511 A | | 3/2007 |
| CN | 101123553 A | | 9/2007 |
| CN | 101080055 A | | 11/2007 |
| CN | 101115248 A | | 1/2008 |
| CN | 101127988 A | | 2/2008 |
| CN | 101183958 A | | 5/2008 |
| CN | 101335666 A | | 12/2008 |
| CN | 101341764 A | | 1/2009 |
| CN | 101815275 A | | 8/2010 |
| EP | 1098490 A2 | | 5/2001 |
| EP | 1289326 A1 | | 3/2003 |
| EP | 1463238 | | 9/2004 |
| EP | 1503548 A1 | | 2/2005 |
| EP | 1545114 A1 | | 6/2005 |
| EP | 1739518 | | 1/2007 |
| EP | 1772988 | | 4/2007 |
| EP | 1850575 A1 | | 10/2007 |
| EP | 1887732 A1 | | 2/2008 |
| EP | 1942698 A1 | | 7/2008 |
| EP | 1978772 | | 10/2008 |
| EP | 2007065 A1 | | 12/2008 |
| EP | 2026514 A1 | | 2/2009 |
| EP | 2466831 A1 | | 6/2012 |
| JP | 3148713 B2 | | 3/2001 |
| JP | 2005339247 A | | 12/2005 |
| JP | 2006041989 | | 2/2006 |
| JP | 2006155263 A | | 6/2006 |
| JP | 2006197137 | | 7/2006 |
| JP | 2006344007 A | | 12/2006 |
| JP | 2007318354 A | | 12/2007 |
| JP | 2008301121 A | | 12/2008 |
| JP | 2009111919 | | 5/2009 |
| JP | 2009212707 A | | 9/2009 |
| JP | 2009218773 | | 9/2009 |
| JP | 2009232107 A | | 10/2009 |
| KR | 20040053858 A | | 6/2004 |
| WO | 1998058505 | | 12/1998 |
| WO | 1999027723 | | 6/1999 |
| WO | 1999065185 | | 12/1999 |
| WO | 0208863 | | 1/2002 |
| WO | 2002045315 A2 | | 6/2002 |
| WO | 2002067616 A1 | | 8/2002 |
| WO | 2002093877 A1 | | 11/2002 |
| WO | 2003014891 | | 2/2003 |
| WO | 2003017063 A2 | | 2/2003 |
| WO | 2003017065 A2 | | 2/2003 |
| WO | 2003058880 | | 7/2003 |
| WO | 2004028070 | | 4/2004 |
| WO | 2004064306 A2 | | 7/2004 |
| WO | 2004077797 | | 9/2004 |
| WO | 2004095753 | | 11/2004 |
| WO | 2005008995 | | 1/2005 |
| WO | 2005053335 A1 | | 6/2005 |
| WO | 2005083934 A1 | | 9/2005 |
| WO | 2006004467 | | 1/2006 |
| WO | 2006004784 A1 | | 1/2006 |
| WO | 2006012610 A2 | | 2/2006 |
| WO | 2006050758 | | 5/2006 |
| WO | 2006073837 | | 7/2006 |
| WO | 2006077481 | | 7/2006 |
| WO | 2006093961 A1 | | 9/2006 |
| WO | 2006120558 | | 11/2006 |
| WO | 2006130960 | | 12/2006 |
| WO | 2007001833 | | 1/2007 |
| WO | 2007014630 | | 2/2007 |
| WO | 2007018363 | | 2/2007 |
| WO | 2007053848 | | 5/2007 |
| WO | 2007068288 | | 6/2007 |
| WO | 2007069245 | | 6/2007 |
| WO | 2007097786 A | | 8/2007 |
| WO | 2007107701 | | 9/2007 |
| WO | 2007120310 | | 10/2007 |
| WO | 2007124279 | | 11/2007 |
| WO | 2007126352 | | 11/2007 |
| WO | 2007129180 A2 | | 11/2007 |
| WO | 2007133844 A | | 11/2007 |
| WO | 2008017837 | | 2/2008 |
| WO | 2008051379 | | 5/2008 |
| WO | 2008066419 | | 6/2008 |
| WO | 2008080139 | | 7/2008 |
| WO | 2008080430 A1 | | 7/2008 |
| WO | 2008099802 | | 8/2008 |
| WO | 2009008817 A1 | | 1/2009 |
| WO | 2009091295 A1 | | 7/2009 |
| WO | 2010088413 | | 8/2010 |
| WO | 2010128391 A2 | | 11/2010 |
| WO | 2011002450 A1 | | 1/2011 |
| WO | 2011149532 A1 | | 12/2011 |

OTHER PUBLICATIONS

"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.

(56) References Cited

OTHER PUBLICATIONS

"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Ehnert, "Small application to monitor IP trafic on a Blackberry—1.01.03", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer—Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Steglich, Stephan, "I-Centric User Interaction," Nov. 21, 2003.

(56) References Cited

OTHER PUBLICATIONS

Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.

* cited by examiner

2000

2100

SYSTEM AND METHOD FOR PROVIDING USER NOTIFICATIONS

TECHNICAL FIELD

This invention relates generally to mobile devices, and some embodiments relate to use, management and generation of device-assisted services.

BACKGROUND

With the advent of mass market digital communications and content distribution, many access networks such as wireless networks, cable networks and DSL (Digital Subscriber Line) networks are becoming increasingly more challenged to provide sufficient capacity to handle growing user demands. With the introduction and implementation of high data rate solutions such as, for example, EVDO (Evolution-Data Optimized), HSPA (High Speed Packet Access), LTE (Long Term Evolution), WiMax (Worldwide Interoperability for Microwave Access), and Wi-Fi (Wireless Fidelity), wireless networks are increasingly becoming user capacity constrained. Although wireless network capacity has and continues to increase, such increases have generally not been commensurate with user demand.

The introduction of more efficient technologies, such as MIMO (Multiple-Input Multiple-Output), and the deployment of more frequency spectrum, likely will not be sufficient to meet growing digital networking demand. As a result, communication network capacity gains are being outpaced by growing digital networking demand. For example, some industry experts project average wireless device usage of four devices per subscriber, with a mixture of general purpose devices like smart phones and computers along with special purpose devices like music players, electronic readers, connected (e.g., networked) cameras and connected gaming devices. In addition, wire line user service consumption habits are trending toward very high bandwidth applications that can quickly consume the available capacity and degrade overall network service experience if not efficiently managed. Because some components of service provider costs go up with increasing bandwidth, this trend will also negatively impact service provider profits.

Similarly, although wire line access networks, such as cable and DSL, can have higher average capacity per user, wire line user service consumption habits are trending toward very high bandwidth applications that can quickly consume the available capacity and degrade the overall network service experience. Because some components of service provider costs go up with increasing bandwidth, this trend will also negatively impact service provider profits.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

SUMMARY

Figure 1:
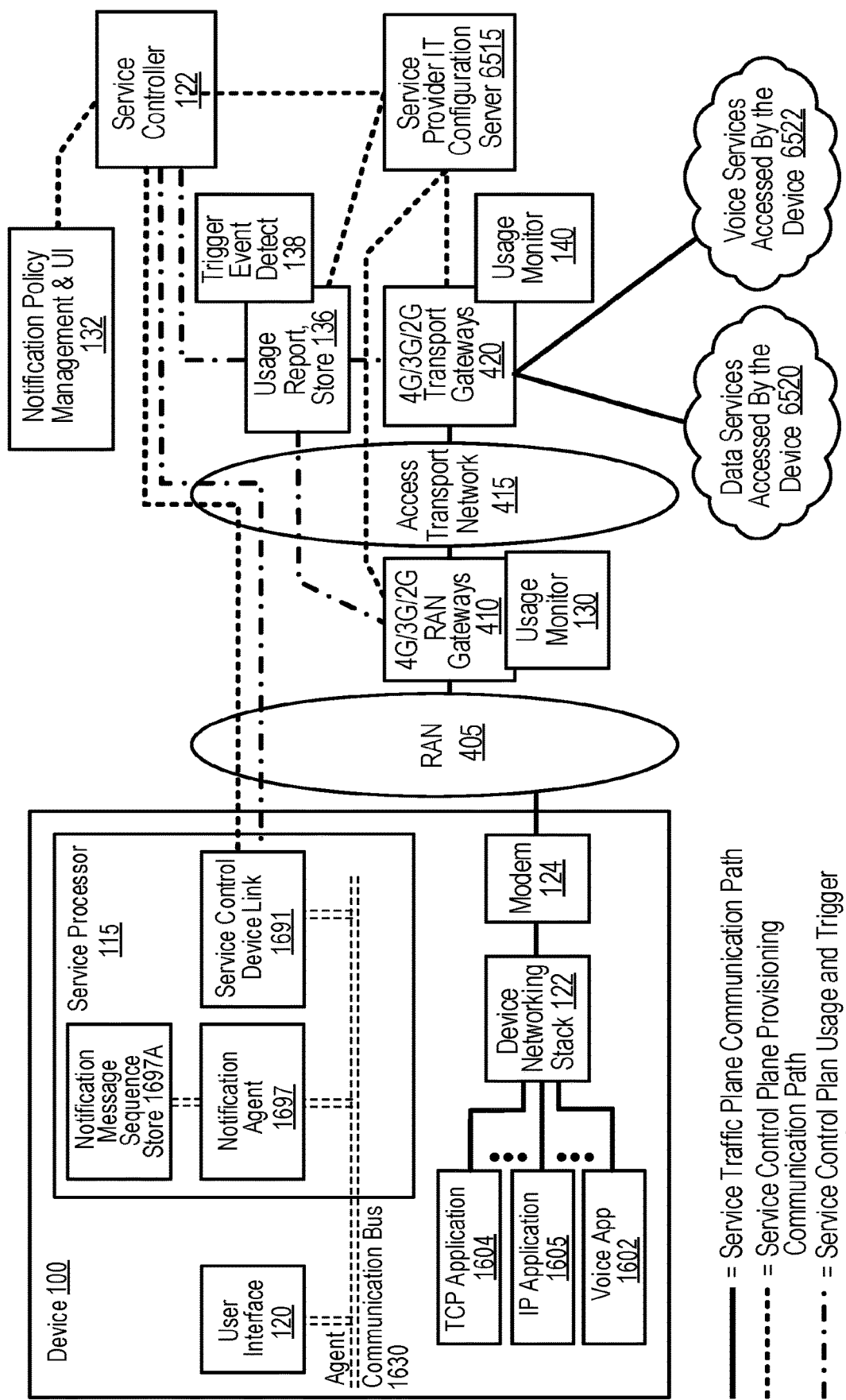
FIG. 1 is a functional diagram illustrating a network architecture for user notifications for device assisted services (DAS) in accordance with various embodiments of the systems and methods described herein.

According to various embodiments, systems and methods are provided for allowing monitoring, detection, notification and updating of services and service activities for a communication system. In various embodiments, service activities of one or more users operating under their respective service plans are monitored. At various trigger points, notifications are triggered to the user to inform the user of the specific usage events. For example, embodiments can be configured to monitor service consumption, consumption rate, service activity levels and the like. When a predetermined threshold of service activity is reached, a notification can be triggered to the user informing the user that she or he has reached this threshold level. The system can further be configured to allow the user to respond to the notification such as, for example, by ceasing the service activity, purchasing an additional service allocation, changing the allocation parameters, change the service plan, and so on.

In some embodiments, usage monitors are provided at one or more points in a network and at the user device to monitor service activity levels or allocation consumption. For example, usage monitors can be located at the end-user device, and gateways in the network, at network agents, or at other locations suitable for monitoring service activity levels of one or more users.

Activity-level parameters monitored can include a number of different parameters including, for example, amount of data transferred for services or classes of services, an amount of time the end-user device is accessed for particular services or classes of services, data rates at which services or classes of services are accessed, the number of times particular services or classes of services are accessed, the time periods at which such services or classes of services are accessed, billing or charging rates for accessed services, and so on. Preferably, the activity levels monitored correspond to service plan allocation limits for the given services or classes of services being monitored. Accordingly, the monitored information can be used to determine whether or not a user has exceeded, is going to exceed, or is likely to exceed his or her service allocation. Service plan allocation limits can specify one or more usage limits that identify, for example, when at least one of the one or more network services is no longer available, when a billing rate changes, when a service allocation is consumed, or when a service allocation is changed.

According to various embodiments, threshold levels or trigger levels are set and used to detect an event they can give rise to notification. For example, trigger levels can be set at the maximum allocation levels for a given user such that a notification can be made when the user reaches his or her maximum allocation level for a given service or class of services. As another example, trigger levels can be set at and below the maximum allocation level at a point where it may be useful to notify the user that he or she is about to exceed a service activity allocation under his or her current service plan. Likewise, trigger levels can also be set to detect usage rates that indicate the user may exceed a service level application if such usage rate continues throughout the allocation period.

A usage report storage element can also be included to store data gathered by the one or more usage monitors. In some embodiments, the trigger event detection element is provided with access to the usage report store and uses the information in the usage report store to detect trigger events. One or more usage report stores can be provided at various locations throughout the network and on the end-user device.

One or more service controllers can also be provided to coordinate the management, monitoring and notification events and activities. In some embodiments, the service controller can be configured to receive information from the usage monitors, the usage report store, and the trigger detection elements to coordinate notification of end-user of a notification event. In some embodiments, the service controller can be configured to evaluate the information received from one or more of these elements to determine whether or not a notification event has occurred. If so, the service controller sends a notification event message to the end-user device to trigger a notification procedure. In other embodiments, the service controller receives the trigger event from the triggered event detection element and in response sends a notification event to the end-user device. In various other embodiments, the service processor can be provided at the end-user device to receive usage information and trigger information to trigger a notification event for that device.

A notification policy management and user interface element can also be provided to function as a user interface to allow creation and updating of notification policies and parameters. Notification policies can be used to identify events upon which notification is provided. In some embodiments, the notification policies that are created can be provided to an element such as, for example, the service controller (e.g., network element) or service processor to be used to compare to usage data to determine if and when a notification event has occurred.

In various embodiments, the end-user device includes a notification agent and a notification message sequence store to facilitate providing messages to the user in response to a trigger event. For example, the end-user device can include control device link to receive information from the network in the form of either notification events or network usage information. Upon the occurrence of a notification event, the service control device link can be configured to send a trigger event to notification agent. The notification agent can be configured to evaluate information in the trigger event and select the appropriate notification message from the notification message sequence store provided to the user. For example, the trigger event may include information as to the particular event triggering the notification. For example, one or more fields in the trigger event may indicate a particular type of trigger such as where the user has met the allocated capacity for a particular type of service. In this example, the notification agent would evaluate the trigger event and retrieve from the message sequence store the appropriate message corresponding to this particular event. The message sequence can include one or more messages to be provided to the user to provide the user with the appropriate information. In terms of the above example, a notification message sequence can include a message telling the user that he or she has met the allocated capacity for that particular service. In some embodiments, messages can also be included providing the user with options to perform acts such as changed service plan, purchase additional allocations, proceed on a pay-as-you-go basis, and so on.

As the above discussion illustrates, an end user device can be configured to perform the process of storing information about a service plan, the service plan having a limit on usage of one or more network services, the service plan being associated with an end user device; detecting a device action that reflects a past or intended use of the one or more network services; identifying the device action as a trigger event; identifying a notification request based on the trigger event, the notification request corresponding to a notification action to be performed by the end user device to retrieve at least a portion of a notification message associated with a status of the use, the at least a portion of the notification message being separate from the notification request; and transmitting to the end user device the at least a portion of the notification request in response to the trigger event.

A system can also be provided in various embodiments and can include memory for storing information about a service plan, the service plan having a limit on usage of one or more network services, the service plan being associated with an end user device; at least one processor configured to detect a device action that reflects a past or intended use of the one or more network services, to identify the device action as a trigger event, and to identify a notification request based on the trigger event, the notification request corresponding to a notification action to be performed by the end user device to retrieve at least a portion of a notification message associated with a status of the use, the at least a portion of the notification message being separate from the notification request; and a communications interface configured to transmit to the end user device the notification request in response to the device action. In some embodiments, the notification request includes a network destination identifier, the notification action causes the end user device to access a server associated with the network destination identifier to retrieve the at least a portion of the notification message, and the at least one processor is configured to send an index to the server to identify the at least a portion of the notification message. The index may be a numeric index, an alphanumeric string, a pointer, a GUID, or any other indicator that identifies the at least a portion of the notification message.

In further embodiments, the notification action causes the end user device to access a server associated with a predetermined network destination identifier that includes the at least a portion of the notification message, and the at least one processor is configured to send an index to the server to identify the at least a portion of the notification message. In some embodiments the notification request identifies the at least a portion of the notification message in a local notification store, and the at least one processor is configured to configure the local notification store to contain the at least a portion of the notification message associated with the notification request.

According to various embodiments, systems and methods are provided for storing on an end user device one or more notification actions corresponding to one or more notification requests, the end user device being associated with a service plan having a limit on usage of one or more network services; performing a device action that reflects a past or intended use of the one or more network services; receiving by the end user device one of the one or more notification requests from a network element in response to the device action; performing by the end user device one of the one or more notification actions in response to the one of the one or more notification requests, the one of the one or more notification actions causing the end user device to retrieve at least a portion of a notification message associated with a status of the use, the at least a portion of the notification message being separate from the one of the one or more notification requests; and presenting the notification message on a user interface of the end user device, wherein the one of the one or more notification requests identifies the at least a portion of the notification message in a local notification store.

In some embodiments, the usage limit identifies when at least one of the one or more network services is no longer available, when a billing rate changes, when a service allocation is consumed, or when a service allocation is changed.

In some embodiments, the systems and methods are configured such that at least one of the one or more network services is classified as a first type before the usage limit has been reached, and the at least one of the one or more network services is classified as a second type after the usage limit has been reached.

In some embodiments, the device action is based on the service plan. In various embodiments the device action includes actions such as, for example, a device request by the end user device to access a new network service, exceeding a threshold usage amount of the one or more network services a roaming event, and a tethering request.

The end user device in various embodiments can be configured as an intermediate device, and the device action reflects past or intended use by one or more other end user devices in communication with the one or more network services via the intermediate device.

Network services include, in various embodiments, individual services or a category of services. Accordingly, in some embodiments, the device action includes exceeding a threshold amount of the category of services.

In various embodiments, the device is associated with the service plan when a user device or the user currently using the end user device is subscribed to the service plan.

The notification message can include, for example, an offer to cancel, modify, replenish or replace the service plan; an offer to learn more about a service plan feature or different service plan; a link to additional information; a request to acknowledge a usage amount or a new billing rate; and enabling a user of the end user device to respond to the offer. In a further embodiment, the notification request includes a network destination identifier, and the one of the one or more notification actions causes the end user device to access a server associated with the network destination identifier to retrieve the at least a portion of the notification message.

Performing the one of the one or more notification actions can include accessing a server associated with a predetermined network destination identifier that includes the at least a portion of the notification message; and accessing a first server associated with a predetermined network destination identifier that includes a second network destination identifier and retrieving the at least a portion of the notification message using the second network destination identifier.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the systems and methods described herein may provide a communication system and method that provides for flexible service plans and management of user network services to provide consumer choice of more refined service plan offerings and efficient management of network capacity.

Additional embodiments may be provided to manage the level of services delivered to networked devices and to manage such services on a service-by-service basis. For example, various embodiments can be configured to provide cost effective services or service classes that match growing digital networking usage patterns. As a further example, in some embodiments, systems and methods are provided that allow access providers to not only control and bill for basic access, but to control and bill for higher level service delivery on a service-by-service basis. Such service-by-service control and billing can be provided based on service types or on service classes or on a combination thereof. Example services may include rich Internet access and email, application based billing, content distribution, entertainment activities, information or content subscription or gaming.

Various embodiments may also allow for the creation and implementation of special-purpose or custom service plans that can be used for accounts with special purpose devices, or to tailor plans to the preferences of individual users or groups of users. Such plans can be useful, for example with special purpose and general purpose networked device, and plans may be created for particular usage patterns or device usage models. As a further example, some embodiments may allow for the creation and implementation of a special-purpose service plan tailored to a device usage model for a special purpose device such as an e-book reader device.

Further embodiments may also allow increased flexibility in service plan offerings to accommodate growth of network capabilities and new networked device offerings. For example, service plans may be customizable and modifiable to allow the addition of new capabilities, devices, services, device classes and service classes.

Other embodiments may allow definition and implementation of alternative service and billing models to provide more flexible service and billing policy management solutions. For example, machine-to-machine applications such as telemetry, surveillance, shipment tracking and two-way power control systems are examples of applications for which custom service plans and billing policy arrangements may be beneficial.

Accordingly, various embodiments may provide for defining, testing and launching new services with the ability to control service functions and service costs. Examples of this in some embodiments may include, service plans that allow for the provision and billing of different types of service elements either individually or as a composite of a plurality of service elements. Provisioning and billing can be performed on a service element basis so that usage plans and parameters can be controlled by the service provider or the user. Examples of such service elements can include total traffic volume, content of downloads and uploads, application usage, information or content subscription services, people or asset tracking services, real time machine to machine information or electronic commerce transactions.

In some embodiments, network user capacity is increased and user service costs are reduced as compared to conventional methods by managing and billing for service consumption in a more refined manner. For example, service consumption can be managed and billed on a service-by-service basis, to satisfy network neutrality requirements, or to tailor service plans to user needs. For example, by managing service consumption, the service capacity required to satisfy the user device needs can be tailored more closely to the needs of a given user thereby reducing the amount of unused allocated service bandwidth. This can, in turn, result in lower cost service for the user and free up additional bandwidth to be offered to other users. As a further example, various embodiments may be configured to manage service usage and may include service usage policy implementation and policy management to identify, manage and bill for service usage categories, such as total traffic consumption, content downloads, application usage, information or content subscription services, electronic commerce transactions, people or asset tracking services or machine to machine networking services.

Service activities associated with a network generally include usage or access of network applications, elements or other resources. Examples of this can include, usage or traffic usage that can be associated with, for example, an application; a network communication end point, such as an address, uniform resource locator (URL) or other identifier with which the device is communicating; a traffic content type; a transaction where content or other material, information or goods are transacted, purchased, reserved, ordered or exchanged; a download, upload or file transfer; email, text, SMS, IMS or other messaging activity or usage; VOIP services; video services; a device usage event that generates a billing event; service usage associated with a bill by account activity (also referred to as billing by account) as described herein; device location; device service usage patterns, device user interface (UI) discovery patterns, content usage patterns or other characterizations of device usage; or other categories of user or device activity that can be identified, monitored, recorded, reported, controlled or processed in accordance with a set of service control policies. In some embodiments, network services are classified as a first type before the usage limit has been reached, and the at least one of the one or more network services is classified as a second type after the usage limit has been reached.

Further embodiments may be configured to identify various service activities and to break up the overall service usage into sub-categories, classes or types of activities that can be verifiably monitored, categorized, cataloged, reported, controlled, monetized and used for end user notification and billing. Preferably, this is performed in a way that improves the service capabilities for various levels of service cost or for various types of devices or groups. Accordingly, in some embodiments usage can be monitored, controlled and billed (i.e., managed) at the service level, based on service type or class of service; or at the sub-category level, based on a more granular definition of services.

For example a more granular definition of services might divide the services by service type or class, such as audio, video and data. Another example of service class or type might be application type, such as social networking services, scientific database services, and the like. Yet a further example, can divide these into a further level of granularity. Even further levels of granularity can be provided. For example, subcategories of social networking access might include Facebook, vs. LinkedIn, vs. MySpace, etc. As another example sub-categories of the audio/video service might be defined as the content providers (e.g., Blockbuster, Netflix, YouTube). Yet another way to break up the service into subcategories may be, for example, as streaming media versus downloading media. In one embodiment under this example, usage can be monitored, controlled and billed based on the identification of the service—an audio/video service. In another embodiment, finer granularity can be provided by monitoring, controlling and billing based on the sub-category. For example, streaming media may have different limits, rates, and permissions than downloading media, or one service provider may have different limits, rates, and permissions than another service provider.

In some embodiments, the terms service activity and service usage are associated with utilization and activities associated with a particular service, service type or service class. Service activity and service usage may involve any or all of categorizing, monitoring, controlling and billing for uses such as data traffic usage, application usage, communications with certain network end points, or transactions. In some embodiments, this categorizing, monitoring, control and billing can be done on an overall basis or on a service-by-service basis, including on the basis of service type, service class or particular service. Further, this categorizing, monitoring, control and billing can be done on a sub-category basis.

As will be apparent to one of ordinary skill in the art after reading this description, in some embodiments, the terms service activity or service usage include one or more of the broader aspects listed above. The term service usage can be used interchangeably with service activity, but neither term is intended in general to exclude any aspect of the other. In some cases, where the terms service usage or service activity are used, more specific descriptors such as traffic usage, application usage, website usage, and other service usage examples are also used to provide more specific examples. These examples are provided to facilitate description of the systems and methods described herein, and not to narrow the terms service activity and service usage.

In some embodiments, the invention provides service management in a manner that is based or specified by service specifications that may be provided in service profiles. Such service specifications can include, for example, user preferences or specifications; and government rules or regulations, such as, for example, rules regarding open access or network neutrality requirements. In some embodiments, service management solutions that also collect and/or report user or device service usage or service activity behavior to determine how to meet the user's simultaneous desires for service quality and lower service costs are disclosed. For example, such monitoring and reporting are accomplished in a manner that includes approval by the user and in a manner that also protects the privacy of user information and service usage behavior or service activity history.

In some embodiments, products that incorporate device-assisted service policy implementation, network services and service profiles (e.g., a service profile includes a set of one or more service policy settings for the device for a service on the network) are provided, as described below. Service policies or policy components such as, for example, a set of policies/policy settings for the device for network services, typically referring to lower level settings, such as access control settings, traffic control settings, billing system settings, user notification settings, user privacy settings, user preference settings, authentication settings and admission control settings can be provisioned at the client device in some embodiments. For example, aspects of the service policy are, in some embodiments, moved out of the core network and into the end-user, or client device, or duplicated in the network and client device. These aspects may include, for example, certain lower level service policy implementations; service usage or service activity monitoring and reporting including, for example, privacy filtering; customer resource management monitoring and reporting including, for example, privacy filtering; adaptive service policy control; service network access control services; service network authentication services; service network admission control services; service billing; transaction billing; simplified service activation and sign up; user service usage or service activity notification and service preference feedback and other service capabilities.

As discussed below, providing certain aspects of one or more of these service profiles or service policy implementation elements at the client device may be leveraged to achieve several advantageous solutions to the needs described above. For example, embodiments may be provided that allow systems and methods to manage and bill for a richer and more varied set of network services, manage overall network capacity at a more granular level, manage end user access costs, simplify user or new device service activation, simplify development and deployment of new devices with new service plans (e.g., service profile and billing/costs information associated with that service profile), equip central service providers with more effective open access networks for new third party solutions, simplify the equipment and processes necessary to deploy wireless base stations and simplify the core networking equipment required to deploy certain access networks.

The systems and methods described herein are discussed in terms of two network types: a central provider network and a service provider network. After reading this description, one of ordinary skill in the art will understand how the systems and methods described herein can be used with other network types or configurations.

The central provider network generally refers to an access network used to connect a client device to other networks. The central provider network generally includes the physical layer, the Media Access Control (MAC) and various networking functions that can be implemented to perform authentication, authorization and access control, and to route traffic to a network that connects to the control plane servers, as discussed below. The service provider network generally refers to a network that includes the control plane servers. In some embodiments, a central provider network and a service provider network may be the same or they may overlap, and in some embodiments they are different. In some embodiments, the owner or manager of the central provider network and the owner or manager of the service provider network are the same, and in some embodiments, they are different.

In some embodiments, control of the device service policies is accomplished with a set of service control plane servers that reside in the access network or any network that can be reached by the device. This server based control plane architecture provides for a highly efficient means of enabling third party control of services and billing, such as for central carrier open development programs or Mobile Virtual Network Operator (MVNO) relationships. As device processing and memory capacity expands, moving to this distributed service policy processing architecture also becomes more efficient and economical. In some embodiments, several aspects of user privacy and desired network neutrality are provided by enabling user control of certain aspects of device based service usage or service activity reporting, traffic reporting, service policy control and customer resource management (CRM) reporting.

In many access networks, such as wireless access networks, bandwidth capacity is a valuable resource in the face of the increasing popularity of devices, applications and content types that consume more bandwidth. Using conventional techniques, many service providers have adopted a one-size-fits-all policy for user access plans. However, because the multitude of users in a given network have varying demands, not only for the amount of data, but also for the types of and data volumes for various services, the service providers are forced to set plan limits high enough to accommodate high-demand users, and to charge accordingly. Therefore, low-demand users are asked to pay for capacity that they are not consuming. This is not an optimal situation for users who desire to pay less for lower bandwidth service usage or service activity scenarios.

Accordingly, in some embodiments, a range of service plan pricing can be enabled to accommodate a variety of user practices. For example, in some embodiments, plans are provided whereby low-demand users can be charged less for their services than high-demand users, or charges can otherwise be tailored to more accurately reflect user demands or usage. In further embodiments, this may be performed in a way that also maintains service profitability for the service provider. These goals can be accomplished, for example, by providing a more refined set of management and control capabilities for service profiles. For example, this approach generally leads to service management or traffic shaping where certain aspects of a service are controlled based on service policies to provide lower levels of quality of service.

Generally, there are at least three problems that may arise when these techniques are implemented. A first problem that may arise is maintaining user privacy preferences when reporting service usage or service activity to set, manage or verify service policy implementation. This problem, in some embodiments, may be solved in a variety of ways. For example, some embodiments described below provide a combination of user notification, preference feedback and approval for the level of traffic information with which the user is comfortable or for which he or she approves. Embodiments may also provide the ability to filter service usage or service activity, such as, for example, traffic usage or CRM reports, so that only the level of information permitted by the user to be shared is communicated.

A second problem that may arise is satisfying network neutrality requirements in the way that traffic is shaped or services are managed. This problem may be solved in a variety of ways as described in various embodiments described below. For example, some embodiments provide systems and methods that empower the user to make the choices on how service usage, service activity, traffic usage or CRM data is managed. These embodiments can include embodiments that provide user notification and service policy preference feedback. Such management can be provided to allow the user to tailor their access and control costs. By allowing the users to specify how they want to spend and manage their service allowance or resources, a more neutral or completely neutral approach to network usage can be maintained by the service provider.

A third problem that may arise is the constraints that may accompany user-specified service and bandwidth allocations. As described above, service management on a more granular level may be provided to help the user meet his or her service needs for lower cost. Additionally, such offerings may result in wider scale adoption of connected devices and applications. However, such service management can result in plans that are more constrained. Such constraints might be on service activity usage, service options or bandwidth or traffic usage. Because tailored plans in various embodiments include limits on the amount of bandwidth or traffic allowed, management, including usage tracking, billing for overages and access controls are put in place. Such management may result in greater system complexity and thus may result in additional service provider cost. Also, as lower cost service plans are offered, including plans where the basic connection service may be provided to users for free, these service plans may result in additional service provider cost controls to maintain profitability or preserve network capacity that result in lower limits on service usage or service activity.

These lower service usage or service activity limit plans provide the opportunity for the situation to arise where users run over service usage limits. This can result in service shutdowns or service cost overages to those users who overrun their limits. Accordingly, some embodiments provide systems and methods for assisting the users and for providing the users information on how to use the service and how to control usage for the lower cost services. For example, various embodiments provide user notification on service parameters and allow for user updates and interaction. For example, users are provided in some embodiments with service usage and cost projection information, user notification policy feedback, user service policy preference feedback. As another example, other embodiments provide adaptive traffic shaping or service policy implementation.

U.S. patent publication 2010/0198698, filed Jan. 27, 2010 and entitled "Adaptive Ambient Services," discloses various techniques that may be advantageous when a service provider wishes to offer ambient (e.g., sponsored) services in the dynamic (e.g., non-static) environment of the Internet. For example, dynamic allowable source/destination and/or application lists, dynamic blocked (disallowed) source/destination and/or application lists, and dynamic traffic control policies for each source/destination and/or application are some of the techniques that may be advantageous when a service provider, MVNO provider, or virtual service provider desires to provide ambient (e.g., sponsored) service. For example, a provider may wish to allow access to a given web site partner's web service in exchange for a business deal with the web site partner that motivates the service provider to provide the ambient access. In this example, the ambient access is intended to enable access (either wide-open or throttled) to the website partner's collection of URLs (and possibly one or more applications) associated with the service, while blocking or differentially rate-limiting (e.g., throttling) access to other network destinations and/or applications not associated with the web site partner services. A problem can arise in this example whenever the web site partner changes the addresses and/or domains associated with the web site services, because any static access list of associated (e.g., allowed within the ambient service) addresses/domains and access list policies generally makes a static list impractical.

As another example, an ambient service profile for a transaction service provider can include that service provider's domain or web site as an allowed destination. However, many web sites contain inline advertisements provided by ad servers and/or partner sites that should also be included in the set of allowed destinations in the ambient service profile, and these are often dynamic or frequently changing.

As another example, a web site may contain links to destinations that involve relatively high data usage (e.g., streaming and/or downloading of video or audio content). An ambient service provider may not want to sponsor access to such sites, but may still want to sponsor access to other sites that result in less bandwidth-intensive service usage activities.

As another example, during a session a user may attempt to "surf out" of the ambient service, such as when the user attempts to access a web site or service that is not an allowed or pre-approved destination in the ambient service profile (e.g., a search site can be the pre-approved ambient service, but the ambient service partner paying for the search service access may desire also to allow and pay for user click-through to search results and/or advertising offers, or, for example, an ambient shopping service sponsor may desire to also pay for click-through to vendor partners sites to provide a purchase transaction opportunity to the user). Moreover, the defined ambient service profile quickly stagnates as various applications and destinations, for example, change over time or on each request/usage (e.g., new applications become available and/or web site content and link changes occur daily if not hourly and/or are dynamically generated using well known web site techniques).

The dynamic nature of the Internet poses challenges for adaptive classification of traffic. Because web sites and other on-line information sources can change frequently, if the classification specifications (e.g., the classification policies) are static, the device user may be erroneously blocked from destinations that the user should have a right to access under the intended service classification policy. In addition, if the classification policy is not updated to keep pace with changes in a web site, and if block notifications are provided to the user (e.g., a message is presented through a device interface to indicate that an access to a destination has been blocked) when a classification of service is attempted for which there is no service plan purchased to allow the (e.g., erroneous) classification of service, an erroneous block message or "service plan needs to be purchased" message can result, which may degrade the user experience. Furthermore, if an end-user device has a subscription to both an ambient service and a non-ambient service, if the classification policy has not been updated to account for a change in an ambient service destination (e.g., to account for a new advertising site link, additional content on the web site, etc.), then the non-ambient service account may be charged for an access that should have been allocated to the ambient service account.

Consequently, in some embodiments, adaptive classification policy is provided to enable network gateways to keep up with changing conditions in the Internet. In some embodiments, network-based adaptive traffic shaping or service policy implementation is provided with traffic classification and policy enforcement that is based on rules that are adapted to account for changes in the network destination information associated with the service intended to be described by the classification. In some embodiments, an adaptive service classification policy updater is used to determine when a service classification needs to be updated, or to periodically update the service classification policy. In some embodiments, the adaptive service classification policy updater provides a classification policy update automatically to one or more policy provisioning elements that then provide the classification policy to the traffic gateway.

In some embodiments, the adaptive service classification policy updater provides a classification policy update to a service administrator for review prior to providing the updated classification policy to one or more policy provisioning elements that then provide the classification policy to the traffic gateway.

In some embodiments, network-based adaptive classification policy is achieved using adaptive ambient policy rules that associate inspected traffic with a service classification, even if the inspected traffic does not have characteristics that match classification policy traffic identification definitions (e.g., traffic filters or search strings). Examples of associative classification include, for example, the techniques described in U.S. patent publication No. 2010/0198698. These techniques include device-based, device-assisted, and network-based traffic monitoring techniques. For example, in some embodiments, network-based techniques include using a deep packet inspection (DPI) traffic monitoring system. The DPI system examines the header or the data portion of one or more packets as they pass an inspection point and classifies the packet(s) based on pre-defined classification rules. A packet classified by the DPI system can be passed, redirected, marked/tagged, blocked, rate limited, and/or reported to a reporting agent in the network. The DPI system may identify packet flows, or protocol flows, and it may control identified flows based on accumulated flow information.

As another example, whether the requested access is within the same traffic flow as other ambient services traffic can be determined (e.g., using various device based, device assisted and/or network based (such as DPI) traffic monitoring techniques). Various other techniques can also be employed for testing the association of the requested access with the ambient service. Incoming traffic can be classified by a network element (e.g., using a referred URL or an HREF or an IMAGE HTML tag).

As another example, the domain object model (DOM) tree can be analyzed to determine a links model of a requested web page. The analysis involves analyzing the HTML source or DOM for associated links in the document, e.g., by parsing "hrefs" from the DOM and using them to further crawl and also to check that the filters are not going to misclassify the traffic (e.g., block access to a link). As would be understood by a person of ordinary skill in the art, a DOM is a conceptual model of a web page, and the DOM tree describes the various entities or components of the web page, their attributes, roles and relationships, and the constraints that govern the integrity of the components comprising the web page.

As another example, the content of a requested access (e.g., web page content) can be analyzed to determine if the target of the access request is associated with the service classification (e.g., using various content relevancy techniques, such as page-ranking or other techniques that would be known to a person of ordinary skill in the art). As another example, a reverse lookup to the requested network destination (e.g., URL, associated domain, sub-domain, ad server domain, or other destination or source) can be determined to test the association of the requested access with the service classification.

As another example, the source of the requested access is itself tested using various techniques, such as search engine/ web crawler techniques or DOM techniques to determine whether certain web based requests are associated with the service classification, or to verify with a secondary source such as an advertisement server, or to verify ownership of certain network domains by the provider of the classified service or an associated advertiser. As would be understood by a person of ordinary skill in the art, a web crawler is a computer program that browses the web in a methodical, automated way. Web crawlers are also known as ants, automatic indexers, bots, web spiders, web robots, or web scutters. Web crawlers may be used to copy, check, or validate links on web sites. A web crawler may start with a list of URLs to visit. As the crawler visits these URLs, it identifies all the hyperlinks in the page and adds them to the list of URLs to visit. The new list is sometimes called the crawl frontier. URLs from the crawl frontier are then recursively visited according to a set of policies that specify which pages to visit, how often to re-visit those pages, etc.

U.S. patent publication No. 2010/0198698 discloses various ways to control an end-user device's usage of an ambient service, such as by using an intelligent element in the network that performs one or more of the following functions: (1) establish an initial list of allowable ambient service device access behaviors (e.g., a list of allowed addresses/URLs, applications and/or content types, in some cases, with a set of traffic control policies that are differentiated as discussed in U.S. patent publication No. 2010/0198698); (2) as the user accesses the ambient service, determine if the access behavior of the device is within or outside of the desired ambient service access and/or traffic control policies (e.g., determine if the access behavior is properly associated with the desired ambient services and/or service policies); (3) for those access behaviors that are within the desired ambient service policies, expand the list of allowable ambient service device access behaviors to include the new behaviors that are desired and/or preferred (e.g., allow access to new sub-domains, advertising content sources, transaction partner addresses, desired surf-outs, etc.); (4) for those device access behaviors that are outside of the desired/preferred ambient service policies (e.g., are not associated or beneficially associated with the desired/preferred ambient service), create or expand the list of blocked or differentially throttled (e.g., rate-limited) ambient service device access behaviors to include the new behaviors that are undesired or less desired (e.g., not preferred). The intelligent network element used to adapt the ambient service control may be included in one or more network equipment functions (e.g., service gateways, routers, charging gateways, HLRs, AAA, base station, service controller, and/or other network equipment functions), or included in the end-user device and/or intermediate networking device service processor, or included in a combination of the end-user device (and/or intermediate networking device) and one or more network equipment functions.

As disclosed in U.S. patent publication No. 2010/0198698, the adaptive ambient service may be provided initially using a baseline (e.g., a basic starting point) of an adaptive ambient service profile that includes a default or previously defined (e.g., by an ambient service provider, network provider, VSP, or another entity) allowable access list and a default or previously defined disallowed access list for the ambient service, such as to various applications, destinations, sources, traffic control rules, and/or bill by account rules or a combination thereof. In some embodiments, the initial allowable access list is defined based on an initial web crawl or review of a sponsored web site associated with an ambient service. The ambient service profile may be an automated and a self-evolving service profile using various techniques described herein.

In some embodiments, the allowable access list is updated occasionally or periodically based on the results of analyses of sponsored web sites (e.g., using web crawls or the other techniques disclosed herein or known in the art to identify known associated content, destinations, etc.). In some embodiments, the disallowed access list is updated occasionally or periodically. The updates may be based on, for example, input from the sponsor entity, input from an administrator, web crawls, etc.

As disclosed in U.S. patent publication No. 2010/0198698, an adaptive ambient service may include providing an ambient service profile. The ambient service profile may include ambient service allowed access rules and ambient service disallowed access rules, and these rules may incorporate the allowable access list and the disallowed access list discussed above. The ambient service profile may also include ambient service monitored access rules (e.g., rules that provide for what may be considered a temporary access "lease"), in which access to, for example, certain applications or destinations considered suspect or unknown is allowed but monitored (e.g., until the suspicious or unknown application or destination is reclassified under an ambient service allowed access rule or ambient service disallowed access rule). A lease temporarily allows suspicious or unknown activities to take place within the ambient service under the theory that such activities may be the legitimate result of a change in the ambient service, and, therefore, it would be undesirable to block these activities. As would be appreciated by a person of ordinary skill in the art, there are many ways to define the duration of a lease. For example, a lease may be granted for a particular amount of time, a particular amount of data (e.g., a number of bytes), a particular number of unrecognized referrals from a web page associated with the ambient service, etc.

A lease may terminate in any of several ways. For example, the lease may expire naturally (e.g., after the granted time period, after the granted number of bytes, etc.). A lease may terminate if an activity that is not allowed under an ambient service disallowed access policy is detected. Alternatively, the lease may terminate when an activity that is explicitly allowed under an ambient service allowed access policy is detected. For example, if a lease is granted for 2 seconds after an unknown access is attempted, but a destination known to be associated with the ambient service is visited after 1 second, the lease will terminate. A new lease may then be granted when the next unknown or suspicious access occurs. A lease may also terminate if an access is detected that is known to be associated with a different ambient service. Monitored access and leases thus allow some elasticity in the ambient service access to account for changes in the Internet that have not yet been identified or accounted for by the adaptive service classification policy updater.

The ambient service allowed/disallowed/monitored access rules may comprise IP addresses, domains (e.g., URLs for web sites), or any other unique network destination or application or source identifiers, as would be appreciated by one of ordinary skill in the art. The ambient service rules may provide differentiated traffic control rules. The differentiated traffic control rules may provide differentiated bandwidth and/or total data transfer limits according to traffic control policy elements, such as activities associated with the main ambient service functions (e.g., the main partner website or a transaction service), activities associated with secondary ambient service functions (e.g., a secondary surf-out website or a less desired service activity), activities transferring different content types, activities associated with different applications, activities based on time of day, activities based on network busy state, activities that require higher or lower QOS (quality of service), and/or other activities.

As discussed, access for an activity not already on the allowed list or the disallowed list may be allowed initially (and in some embodiments, placed on the monitoring list) if the access is associated with an application already associated with and/or connected to an allowed ambient service. In some embodiments, access for an activity not already on the allowed list or the disallowed list is initially allowed (e.g., a temporary lease is established, and, in some embodiments, the activity is placed on the monitoring list) if the access is associated with a URL referral from an allowed URL (e.g., a URL included in an allowed list of URLs). In some embodiments, access for an activity not already on the allowed list or the disallowed list is initially allowed (e.g., a temporary lease is established, and, in some embodiments, the activity is placed on the monitoring list) if the access is associated with a traffic usage pattern that is within certain pre-set/predefined parameters and/or satisfies other criteria for the ambient service.

As disclosed in U.S. patent publication No. 2010/0198698, various techniques may be used for providing an adaptive ambient service that allows for a surf-out option (e.g., to an advertisement web site or to a web site in a search result, such as a search engine's paid search result or a search engine's organic search result). A surf-out option may be managed using a second set of rules in the ambient service profile for the surf-out option. The initial allowance of a surf-out website access may be based on a main ambient website generating the surf-out (e.g. with a user click), or referring the surf-out. Once the main ambient service creates a surf-out that will be accounted to the main ambient service usage accounting, the surf-out website access rules may be constructed according to a set of temporary allowance rules. These temporary allowance rules allow the main ambient service partner to sponsor the surf-out without the danger of the surf-out website becoming a permanent allowed ambient service that the main ambient service partner must sponsor indefinitely. For example, the temporary surf-out rules can then include one or more of the three access list types, such as an allowed access list, a disallowed access list, and a monitoring access list, as similarly discussed above, and similar types of adaptive rules can be applied to create one or more of the lists. Differences with the temporary surf-out rules may include limitations based on, for example, a total time allowed for access to the surf-out site, rules based on limiting total data transfer or transfer bandwidth, rules on content type, rules on either allowing or disallowing a secondary surf-out (or beyond secondary to third tier, or through multiple/additional tiers/degrees of separation), and/or allowing or disallowing advertising sources. For example, as similar to other ambient access list rules, the surf-out rules can also be modified based on time of day, user priority, user class, user service plan, user useful activity points, and/or network busy state.

Once the content offered to the user is no longer associated with the main ambient service allowed or monitoring access list, the surf-out option may be limited to one or more the following: a limitation on the number of new user actions or choices; a limitation on the number of new web pages or portal pages; a limitation on the number of new URLs or sub-URLs, domains or sub domains; a limitation on the existence or type of advertisements; a limitation on the existence or type or size of certain content; a limitation on the number of new addresses; a limitation on the type of file downloads; a limitation on the number of file downloads; a limitation on the activities of a given application; a limitation on the time for the surf-out sequence; and/or a limitation on the total data transfer for the surf-out sequence. Once one or more of these established limitations are exceeded, the surf-out sequence may be disallowed or differentially traffic controlled or throttled in some way using, for example, the various techniques described herein. The differential throttling may successively reduce the allowed connection bandwidth for the ambient service surf-out sequence based on a length of time from the point at which the surf-out sequence branched from the main ambient service allowed or monitored/monitoring access list, the number of user activities since the surf-out sequence branched from the main ambient service allowed or monitored/monitoring access list, the number of web pages selected since the surf-out sequence branched from the main ambient service allowed or monitored/monitoring access list, the total data transferred since the surf-out sequence branched from the main ambient service allowed or monitored/monitoring access list, the number of new URLs or domains since the surf-out sequence branched from the main ambient service allowed or monitored/monitoring access list. After the surf-out activities or sequence is disallowed or differentially traffic controlled or throttled, once the user again utilizes the ambient service in a manner that is directly associated with the main ambient service allowed access list or monitoring access list, and the main ambient service experience again provides a surf-out or click through option for the same or similar surf-out experience, then the ambient surf-out limitations, for example, can be reset, removed, reduced and/or modified so that the user can again continue the same or similar surf-out experience. The surf-out sequence may be stored in an access list so that the surf-out sequence is remembered (e.g., stored for) the next time a similar sequence is selected from the main ambient service allowed or monitoring lists, and there may be differential service allowances applied to the surf-out sequence. As would be appreciated by a person of ordinary skill in the art, many of the techniques for granting, managing, and limiting surf-out are also applicable to the temporary leases discussed above.

As described herein, some of the embodiments allow a wide range of associative classification and control policies. In some embodiments, a service provider (e.g., a carrier, an MVNO provider, a virtual service provider, etc.) uses a service design center to configure parameters to control ambient service usage. For example, the service provider may configure parameters that govern monitored access (e.g., leases or surf-outs), such as one or more of: amount of data allowed, allowed duration, allowed number of non-referred (e.g., not known to be associated with the ambient service) requests, etc. The service provider may also configure parameters to control access to the ambient service. Such parameters may include settings to block, allow, rate-limit, or skip (e.g., determine whether a different service plan applies).

As described herein, some of the embodiments allow a wide range of associative classification and charging policies. In some embodiments, classifications (e.g., for ambient service) are associated with charging codes that can ultimately be used by a charging element (e.g., an OCS, data mediation element, billing system, etc.) to bill a sponsor entity.

As described herein, some of the embodiments allow a wide range of associative classification and notification policies. In some embodiments, a service provider (e.g., a carrier, an MVNO provider, a virtual service provider, etc.) configures notification parameters for a service classification (e.g., for an ambient service). For example, the service provider may configure parameters to govern notifications sent to a user of the end-user device about access events related to the classification (e.g., to establish notification triggers, configure notification trigger indices, configure notification trigger messages, etc.). For example, the service provider may configure parameters governing when a user of an end-user device receives a notification (e.g., after consuming a particular percentage of a service plan, after the end-user device attempts an access for which the end-user device has no applicable service plan, etc.). In some embodiments, the service provider configures notification parameters using a service design center.

As another example, the service provider may configure the content of a message to be provided to a user of the end-user device. As would be appreciated by a person of ordinary skill in the art, a myriad of messages are possible in view of the disclosures herein, and only a few examples are provided to illustrate the wide variety of potential messages enabled by the disclosures. The content may include, for example, a promotional message or advertisement (e.g., a notification that service is being sponsored by the sponsor entity), a notification that access was blocked because the end-user device is not associated with a service plan that would allow the service or because the ambient service is no longer in effect (e.g., the sponsor entity agreed to sponsor a particular number of bytes, and the end-user device has exceeded that number of bytes; or the sponsor entity agreed to pay for access on weekends, but not on weekdays), a service offer (e.g., a notification that the ambient service has ended, but the user may subscribe to an alternative plan that provides the same service), a notification of an amount of usage (e.g., a message that the end-user device has used 75% of the ambient service plan, or a message that the end-user device has used all of the allowed data under the ambient service plan, and additional use of the services will be charged to the user's account rather than the sponsor's), etc.

In some embodiments, a service provider may set other parameters, including, for example, parameters affecting how a notification message is presented to the user through an interface of the end-user device. For example, if the user interface is a display, the parameters may enable the service provider to configure one or more of background content or design (e.g., color, brightness, etc.), foreground content or design (e.g., logos, message display box, etc.), message design (e.g., font, etc.), available user responses/inputs, offers (e.g., buttons displaying service plans available for purchase, etc.), user interaction parameters (e.g., acknowledgment buttons), etc.

As described herein, some embodiments allow a wide range of flexible and verifiable service plan and service profile implementations. Examples of such implementations include embodiments providing ambient services at a reduced price point or in some cases, for free. Such plans may be provided on a sponsored basis, sponsored by transaction revenues and/or bill by account sponsored service partner revenues. Other examples include intermediately priced plans for basic access services for mass market user devices or machine-to-machine communication devices, or more expensive plans with very high levels of service usage or service activity limits, or no limits at all.

Still further bill-by-account embodiments may also provide cataloging and tracking overhead service usage. One example is tracking the data usage for data that is not a direct benefit to end users but is used for basic maintenance of the device control channels and access network connection. In various embodiments, the cost or usage of such overhead or maintenance traffic service can be removed from the user billing or billed to non-user accounts used to track or account for such service costs. These embodiments and others result in a service usage or service activity control capability that provides more attractive device and service alternatives to end users while maintaining profitability for service providers and their partners.

In some embodiments, the above described various embodiments for device based service policy and/or service profile communications control are implemented using network based service control. Such controls can be implemented, for example, to satisfy various network neutrality and/or privacy requirements, and may be based on indication(s) received from the device or from network-based service control. Such device indications can include, for example, user input provided using the device UI using the service processor. Network-based service control can include, for example, a DPI service monitor or DPC policy implementation and/or other network elements.

In some embodiments, a virtual network overlay includes a device service processor, a network service controller and a control plane communication link to manage various aspects of device based network service policy implementation. In some embodiments, the virtual network overlay networking solution is applied to an existing hierarchical network (e.g., for wireless services), and in some embodiments, is applied to simplify or flatten the network architecture as is described below.

In some embodiments, the large majority of the complex data path network processing required to implement the richer service management objectives of existing hierarchical networks (e.g., for wireless services) are migrated to the device. Such migration may be implemented in a way that requires less data path processing in the edge network and in some cases even less in the core network. Because the control plane traffic between the service control servers and the device agents that implement service policies can be several orders of magnitude slower than the data plane traffic, service control server network placement and backhaul infrastructure is much less performance sensitive than the data plane network. In some embodiments, as described further below, this architecture can be overlaid onto various existing access network architectures used today. In some embodiments, this architecture can be employed to greatly simplify core access network routing and data plane traffic forwarding and management. For example, in the case of wireless networks, the incorporation of device assisted service policy implementation architectures can result in base stations that directly connect to the Internet local loop and the data traffic does not need to be concentrated into a dedicated core network. This results, for example, in a large reduction in backhaul cost, core network cost and maintenance cost. These cost savings can be re-deployed to purchase and install more base stations with smaller cells, which results in higher data capacity for the access network leading to better user experience, more useful applications and lower service costs. This flattened networking architecture also results in latency reduction as fewer routes are needed to move traffic through the Internet. In some embodiments, the present invention provides the necessary teaching to enable this powerful transformation of centralized network service architectures to a more distributed device based service architectures.

Device based billing can be compromised, hacked and/or spoofed in many different ways. Merely determining that billing reports are being received from the device, that the device agent software is present and properly configured (e.g., the billing agent is present and properly configured) is insufficient and easily spoofed. Such spoofing can be done for example by spoofing the agent itself, providing spoofed billing reports using a spoofed billing agent or providing spoofed agent configurations. Accordingly, in some embodiments, verifiable device assisted and/or network based service policy implementation is provided. For example, verifiable service usage and/or service usage billing can be provided as described herein with respect to various embodiments.

While much of the below discussion and embodiments described below focuses on paid service networks, after reading this description those of ordinary skill in the art will appreciate that the systems and methods described herein also apply to other networks, such as, for example, enterprise networks. For example, the same device assisted network services that create access control services, ambient activation services and other service profiles can be used by corporate IT managers to create a controlled cost service policy network for corporate mobile devices. As another example, embodiments described below for providing end user service control can also allow a service provider to offer parental controls by providing parents with access to a website with a web page that controls the policy settings for the access control networking service for a child's device.

In some embodiments, user notifications for DAS are provided, and include providing a network management system for managing programmable network service usage notification policies and enforcement; in which the notification policies define the service usage notification trigger event detection criteria and the associated messages that are intended to be displayed to a user of a device connected to the network; in which the network management system includes a notification policy administrator user interface and a notification policy management communication interface, and the notification policy management communication interface communicates provisioning or programming information to one or more network elements and/or one or more device elements that play a role in enforcement of notification policies; and the network management system performs the following operations to facilitate display of a user service usage notification message sequence to a user of the device connected to the network: enter service usage notification message sequence information; associate the notification message sequence information with a service usage notification trigger event detection criteria, in which the service usage notification trigger event detection criteria defines the service usage conditions or state of service usage for which the service usage notification message sequence is intended to be displayed to a device user; associate the service usage notification trigger event detection criteria with a notification trigger index or notification trigger message; program a notification trigger event detection criteria identification element, that inspects the service usage of the device, to detect the service usage notification trigger event detection criteria and send the notification trigger index or notification trigger message to a service usage notification agent; program a service usage notification agent to perform various operations. In some embodiments, programming a service usage notification agent to perform various operations, includes one or more of the following operations: store the service usage notification message sequence information; associate the notification trigger index or notification trigger message with the service usage notification sequence information; receive the notification trigger index or notification trigger message from the notification trigger event detection criteria identification element; upon receipt of the notification trigger index or notification trigger message from the notification trigger event detection criteria identification element; initiate the device user service notification message sequence based on the stored notification message sequence information and the information included in the notification trigger index or notification trigger message.

FIG. 1 is a functional diagram illustrating an example network architecture for providing user notifications for device assisted services (DAS) in accordance with some embodiments of the systems and methods described herein. This example embodiment illustrates a device 100; a Radio Access Network (RAN 405) and Access Transport Network (ATN 415) connected by 4G/3G/2G Transport Gateways 410; and Data Services Accessed By Device 6520 and Voice Services Accessed By Device 6520 connected with the network via 4G/3G/2G Transport Gateways 420. Also shown are Usage Monitors 130, 140 and a Usage Report Store 136 with a Trigger Event Detect Module 138.

In some embodiments, Transport Gateway 410 is a home agent, GGSN, PDSN, or another type of gateway or router configured to monitor and report traffic usage to enforce an access control policy that is defined for a given user device identified by a device credential or a user credential. In some embodiments, Transport Gateway 410 is a home agent, GGSN, a or another type of gateway or router that has deep packet inspection (DPI) capabilities to characterize or classify the network access for a given device, monitor and report usage, and enforce access control for a specific classification of network usage. Although Transport Gateway 410 is shown as a single element, in some embodiments Transport Gateway 410 can comprise multiple elements. For example, in some of the embodiments described herein, a network element that has DPI capability to classify traffic usage or attempted usage based on network traffic parameters (e.g., access to a specific website, domain, or application server network, etc.) is enhanced with a classification-specific notification trigger capability that might not be available in an existing GGSN or PDSN. In some such embodiments, the GGSN is augmented with a secondary DPI function that can be used to identify the classification-specific notification triggers. The secondary DPI function can also be used to identify traffic classifications for specific flows and enforce the access control policy, or monitoring and reporting policy, according to the policy rules for the specific classification. The secondary DPI function can also be used to identify traffic classifications for specific flows and then feed this information back to a policy control function (e.g., a PCRF) that then instructs the GGSN (or other gateway) to implement the correct policy for that flow. In some embodiments, device 100 is an end user device such as, for example, a client device for accessing network voice and data services. Examples of such an end user device include a mobile handset, a smart phone, a tablet, a PDA, a personal computing device or other like device that accesses one or more services. In the illustrated example, device 100 includes a Service Processor 115 in communication with user interface 120 via agent communication bus 1630. The device 100 in various embodiments can be configured as an intermediate device, and the device action reflects past or intended use by one or more other end user devices in communication with the one or more network services via the intermediate device.

In some embodiments, device 100 is in communication with the over the air network via modem 124. Modem 124 is in communication via RAN 405 through RAN Gateways 410 and ATN 415 through 4G/3G/2G Transport Gateways 420 to access Voice Network Services 6520 AND Data Network Services 6522. Voice Network Services 6520 AND Data Network Services 6522 provide various voice and data network services to device 100 via accessed networks such as cellular provider network(s) and/or the Internet as similarly described herein. As shown, modem 124 is in communication with device networking stack 122 and TCP application 1604, IP application 1605, and voice application 1602, and/or various other application as would be apparent to one of ordinary skill in the art. As shown, communications device 100, which includes Service Processor 115, is in network communication via RAN 405 through RAN Gateways 410 and ATN 415 through 4G/3G/2G Transport Gateways 420 to access Voice Network Services 6520 AND Data Network Services 6522.

As shown in this example, a two tier network embodiment is provided, including a Radio Access Network (RAN 405) and Access Transport Network (ATN 415). As those of ordinary skill in the art will appreciate, FIG. 1 depicts a simplified network functional architecture with a reduced number of network elements to illustrate various embodiments for providing user notifications for DAS.

For ease of description, only one client device 100 is shown, and only one access network (RAN) 405 and one transport network (ATN) 415 are shown. However, after reading this description, one of ordinary skill in the art will appreciate that multiple client devices can be serviced and that multiple network connections to a given device service processor managed by a service controller can also be used in view of the various embodiments described herein. These simplifications are made to facilitate description and aid understanding of the embodiments described herein, and it will be apparent to one of ordinary skill in the art that these and other simplifications herein do not in any way limit the various embodiments for multi-tier networks, multi-technology networks with additional network elements, for additional functionality, or for providing a different architecture and/or allocation of network element functionality.

RAN Gateways 410 conduct and control traffic between RAN 405 networks and ATN 415 networks. In some embodiments, network element 4G/3G/2G Transport Gateways 420 conduct and control traffic between the ATN 415 networks, the carrier core network, and outside networks Data Services Accessed By Device 6520 and Voice Services Accessed By Device 6520. As shown, there are two instantiations of a service monitor function, usage monitor 130 and usage monitor 140. One instantiation Service Usage Monitor elements 130, 140 is shown on each of the two gateway network elements 4G/3G/2G Transport Gateways 410, 420. Particularly, Transport Gateways 420, shown as usage monitor 140, and RAN Gateways 410, shown as usage monitor 130. In some embodiments, the function of the service monitor function 130, 140 is to monitor service usage for the client device(s) 100.

In some embodiments, service usage is monitored at a bulk or aggregate level. In some embodiments, service usage may be monitored at a deeper level such as the various embodiments described herein for service activity usage classification. As shown, the Service Usage Monitor elements 130, 140 in this example are located in their respective 4G/3G/2G Transport Gateways 410, 420 but as described herein in various other embodiments, the service monitor function can be included in only on one of the 4G/3G/2G Transport Gateways, such as service usage monitor 130 and/or service usage monitor 140, on other network elements, and/or on the device 100 (e.g., located in the Service Processor 115 and/or in a secure execution environment on device 100, such as within modem 124, a SIM, and/or a hardware/software partition of a processor of device 100).

In some embodiments, monitored service usage provided by the service Usage Monitor 130, 140 function is classified into various service usage classifications or categories using various techniques as described herein. Such categories can include, for example, browsing, email, music streaming, social networking, video streaming, news, shopping, and/or various other service usage or application categories. In some embodiments, service usage is classified by type, classification, application, usage by destination, usage by time of day or network busy state (e.g., congestion), usage by roaming versus home network, and/or various other categories. In some embodiments, user notifications for DAS includes displaying the classified service usage categories to a user as part of service usage notification sequence that is triggered by user off of option button from a service usage notification message sequence triggered by a service usage trigger event detection criteria or off of the dashboard application.

Also included in the example embodiment of FIG. 1 is a Usage Report, Store element 136. As illustrated, in this example, Usage Report, Store element 136 receives usage information from Service Usage Monitor elements 130, 140. The usage information received from Service Usage Monitor elements 130, 140 can include information regarding the usage of one or more individual services or service classes. For example, Service Usage Monitor elements 130, 140 may be configured to monitor usage parameters for a given service or service class, the parameters including amount of time used or accessed, bandwidth consumed, data volume consumed, data rates, peak and off-peak usage, data type, consumptions, and so on.

In some embodiments, service usage information is communicated from the Service Usage Monitor elements 130, 140 to the Usage Report, Store 136 network element 136. For example, in the example illustrated in FIG. 1, the usage information is transmitted from Service Usage Monitor elements 130, 140 via their respective 4G/3G/2G Transport Gateways 410, 420 to Usage Report, Store element 136.

Usage Report, Store element 136 receives and aggregates the usage information from one or more network elements that have a service monitoring function that contributes to a service usage measurement. For example, 4G/3G/2G Transport Gateways 410, 420, and their respective usage monitors 130, 140 can be configured in some embodiments to send usage information to Usage Report, Store Element 136.

In some embodiments, the Trigger Event Detect 138 function inspects the record of service usage and identifies when a specified event is met or detected. For example, event points can be thresholds or other established values that can be used to detect the occurrence of a reportable or trigger-able event. Event points can be pre-configured (e.g., pre-defined, pre-programmed, pre-stored, or provisioned) and can be defined based in some embodiments on service plan information. For example, where a service plan is defined based on certain limits for certain services, the trigger points can be set to those limits. As further example, consider an example service plan that provides the user with x MB for Exchange ActiveSync email; y MB for social networking access; and z MB for location services on a monthly basis. In such an example, points may be established to trigger, or identify the occurrence of the event, when the user has consumed his or her monthly quota for one or more of the services. In other words, the consumption of the quota for each service may trigger an event. In some embodiments, event points can be established to trigger when the quota is met, as a warning when the quota is being approached (e.g., when 85% of quota is met). In some embodiments, event points can be set to trigger upon the consumption of additional service blocks that may be purchased by the user.

Accordingly, in some embodiments, when Trigger Event Detect 138 function detects a reportable event, a notification message is triggered. This notification message can be sent to any of a number of network entities for appropriate handling and action. For example, the notification event can be sent to device 100 to inform the user that the event has occurred. In terms of the examples described above, the event notification can be used to inform the user that he or she has used up the maximum amount of data allocated for one of the subscribed services, or that he or she is approaching the maximum amount for one or more of the subscribed services.

For example, various service usage notification trigger event detection criteria and associated notification message sequences can be implemented using various embodiments as described herein. As shown in the illustrated example, the Trigger Event Detect 138 function is located in the Usage Report, Store 136 network element, but in other embodiments described herein the Trigger Event Detect 138 function can be located in other network elements or in the device.

As described immediately above, in some embodiments the notification message may be sent to device 100 for subsequent action. For example, the notification message may trigger a user alert to inform the user of the event occurrence. As a further example, the notification message may trigger an alert to the user informing the user that he or she has used up all of his or her allocated minutes or bandwidth for a particular service or class of services.

In some embodiments, upon such notification, the service for which the allocation has been consumed will be terminated until the next billing cycle or until such other time as the service allocation is renewed. In other embodiments, the notification message may trigger a message allowing the user to acknowledge, respond and purchase, renew or otherwise add additional minutes or additional data volume to the depleted service, or allowing the user to enter a pay-as-you-go mode. In still other embodiments, the renewal or reallocation may be automatic, and the message used to inform the user of the renewal and optionally of the additional charges, if applicable.

As another example, the notification message may be a preemptory message, allowing notification of the user that he or she is approaching the maximum allocation for a particular network service. This can be done so as to allow the user to react in advance of service cutoff. For example, the user may decide to conserve the allocation for important transactions. Additionally, the user may be given the option to purchase, renew or otherwise add additional allocations in advance of the actual depletion event to avoid interruption of service.

In some embodiments, the notification includes sufficient details to enable the user to determine the actual service or the service class for which the maximum allocation is being reached. The notification may also include details or links to additional information such as detailed information about the service, the prior service usage history, alternative services available, and the like.

In the illustrated example, Service Processor 115 includes a service control device link 1691, a Notification Agent 1697 and a Notification Message Sequence Store 1697A. These elements are used for creating, compiling, initiating or managing the communication of the notification and notification sequences for device 100. User Interface (UI) 120 is provided to allow display of the notifications to the user and to accept user input as described more fully below.

Service Control Device Link 1691 is the element that performs the communication interface between device 100 and the network components. Service Control Device Link 1691 may include communications capability to receive data from or transmit data to network elements such as, for example, Service Controller 122, as shown by virtual communication channels 1702, 1703. Service Control Device Link 1691 may also include communication capabilities to communicate with other device agents via, for example, Agent Communication Bus 1630. In some embodiments, Service Control Device Link 1691 may also communicate with network elements such as Service Controller 122 via Modem 124.

Notification Agent 1697 initiates user notifications in response to information received from Service Control Device Link 1691. Notification messages, including individual messages and message sequences can be stored locally on device 100, or they can be stored on the network (such as, for example, at Service Controller 122) and communicated to the device upon a notification event. In the illustrated example, Notification Message Sequence Store 1697A is used to locally store notification messages for communication to the user via User Interface 120. Upon a notification event, Notification Agent 1697 retrieves the appropriate message (which can include a sequence of messages) from Notification Message Sequence Store 1697A. In the illustrated example, The Notification Agent 1697 is in communication with other device agents, the UI 120 and the Service Control Device Link 1691 via the Agent Communication Bus 1630.

In some embodiments, an appropriate message is selected based on the type of notification event received. Event specific message sequences tailored to each event can be stored in Notification Message Sequence Store 1697A. The message sequence can be a single message or a series of messages for the event. Thus, for example, if the notification event is an event indicating that the user has consumed his or her allocation for voice services, the notification event specifies the event type and the message or messages to notify the user about this particular occurrence are retrieved.

In some embodiments, programming the notification agent information store 1697A includes either updating the notification message sequence information or updating the entire notification agent application (e.g., replacing that agent with a newly updated/updated version of that agent). In some embodiments, similarly update techniques can similarly be applied to various other elements described herein, such as the notification trigger event detection criteria, trigger index, trigger message, and so forth, as will now be apparent to one of ordinary skill in the art in view of the various embodiments described herein.

In some embodiments, user notifications for DAS includes providing a device notification agent 1697; in which the device maintains a service usage record that is classified into various service usage categories, in which a service usage category is based on a service activity type or an individual service activity; and the device also maintains a record of the service plan usage policies; a notification agent analyzes one or more service activity categories to determine the amount of a service usage allowance or service plan usage charge that is consumed by a category, in which the allowance is determined by one or more aspects of the overall service plan policies; and the amount of service plan allowance or usage charge that is due to the category is displayed to a device UI.

In some embodiments, Service Controller 122 uses Notification Agent 1697 notification message sequence information or other Service Processor 115 agent program information from Notification Policy Management & UI 132 (e.g., or other equivalent network element for notification message provisioning and management) to provision (e.g., program, pre-configure, or download instructions to) the various elements of the notification system.

In some embodiments, the Service Controller 122 is in secure communication with the service processor notification agent 1697 for providing user notifications for DAS as described herein with respect to various embodiments. In some embodiments, service provider IT/configuration server 6515 is in secure communication with Service Controller 122 for configuring the Service Controller 122. For example, service provider IT/configuration server 6515 can provide a service plan and/or service plan update, service policy, and/or service policy update, which can each include notifications for DAS based on service usage.

Service Controller 122 is provided in this example to perform a desired level of coordination and control of the network elements associated with embodiments of the invention. Service Controller 122 communicates with various network elements and the device Service Processor 115 to perform functions such as, for example, updating network elements with new or modified policies and removing deleted policies. In some embodiments, Service Controller 122 can also function as a control element to control the collection of information from network components, to provide network notification to device 100 based on information received, and to receive information from device 100.

For example, in some embodiments, Service Controller 122 collects information from Usage Report Store 136 including usage data or other statistics relating to the usage or consumption of services by one or more devices 100 on the network. This can include, for example, data and information relating to the amount of time a service or service class has been used in a given time period, the amount of bandwidth used for data transfer for a given service or service class, or other service usage metrics. Service controller 122 may be configured to collect this information directly from the appropriate gateways 410, 420 or from usage report, store 136.

Service controller 122 may be further configured to evaluate the usage information received from the network elements (e.g., gateways 410, 420, or usage report, store 136) to determine where a given user or device stands with respect to consumptions of its allocations of one or more network services, and to determine whether a notification should be sent to the one or more devices 100 concerning usage of service allocations in accordance with a service policy. Accordingly, as illustrated in the example of FIG. 1, Service Controller 122 is illustrated as having a communication link via Access transport network 415 and radio access network 405 to device 100. It is via these communication links that Service Controller 122 can provide notifications or other information to the device 100. As will be apparent to one of ordinary skill in the art after reading this description, the dedicated links between Service Controller 122 and Service Processor 115 can be provided through alternative means such as, for example, an alternative communication link. For example, instead of providing access through RAN 405, such as communication link could be provided through a WiFi link on the device via the Internet to Service Controller 122.

In some embodiments, Service Controller 122 can be used to send programming notification policies and to initiate notification message sequences as described herein.

In addition to providing notifications to devices 100 relating to service allocations and usage, in some embodiments, Service Controller 122 functions as a programming agent to configure the device Service Processor 115 and the agents therein. For example, in some embodiments, Service Controller 122 receives new policies or policy updates or changes from notification policy management and user interface 132. Service controller 122 may store the policy locally so that policy can be used to determine whether information from usage monitors 130, 140 indicates that a notification should be generated and sent to a device 100 operating under that policy. Service controller 122 may also be configured to communicate that policy to device 100 such as, for example, via service control device link 1691. Accordingly, Service Controller 122 can be configured to populate a device 100 with one or more policies or policy updates or changes, and can also be configured to remove policies from device 100 as appropriate.

Service Controller 122 is also in communication with Service Provider IT Configuration Server 6515, which is in communication with the two gateway network elements 4G/3G/2G Transport Gateways 420 and RAN Gateways 410 and other network elements. In some embodiments, Service Controller 122 facilitates configuring or programming the Trigger Event Detect 138 function with the service usage notification trigger event detection criteria that is used to trigger a notification message sequence to be sent to the device UI (e.g., device end user UI).

In some embodiments, the Notification Policy Management element & UI 132 (e.g., or other equivalent network element for notification message provisioning and management) is used to provision notification policies and messages. Notification policies and associated messages can be created using Notification Policy Management element & UI 132 and provided to appropriate network devices such as Service Controller 122 and Device 100. Notification Policy Management element & UI 132 provisions (e.g., program, pre-configures, downloads instructions to) the Notification Agent 1697 and/or the Notification Message Sequence Store 1697A to provide notification event and message sequence information.

For example, policies can be created along with their associated notification events and their respective notification messages for use with the systems and methods described herein. Policy events and messages can be pushed or otherwise delivered to device 100 for operation. Likewise, updates such as new policies, policy deletions or policy changes can also be created and communicated to device 100. As illustrated in FIG. 1, this information is provided to device 100 by way of Service Controller 122. This information could also be provided more directly to the device 100 such as, for example, via ATN 415 and RAN 405.

In some embodiments, the Notification Policy Management & UI 132 provisions (e.g., programs, pre-configures, or downloads instructions to) the Trigger Event Detect 138 element (e.g., or Trigger Detect 138 element) to create, update, modify or remove a notification trigger detection criteria. For example, new trigger events can be provided for newly created or modified policies. The trigger information can include trigger values and the associated notification trigger index or notification trigger index message as described herein. The notification trigger index may be a numeric index, an alphanumeric string, a pointer, a GUID, or any other mechanism that identifies the at least a portion of the notification message. In some embodiments, the Notification Policy Management & UI 132 provisions (e.g., programs, pre-configures, or downloads instructions to) the Usage Monitor 140 element and/or Usage Monitor 130 element. For example, new service monitor functions can be added identifying services and usages (e.g., minutes, data volumes, etc.) to be monitored to provide information useful for monitoring performance relative to allocations for new or updated service policies.

In some embodiments provisioning of the network apparatus or device apparatus used to create a service policy using the above notification system embodiments is provided by a service notification system provisioning element, referred to as the notification policy management & UI 132. In some embodiments, the notification policy management & UI 132 programs the network service usage monitoring element with the notification trigger event detection criteria. In some embodiments, the notification policy management & UI 132 programs the network service usage monitoring element with the association between the notification trigger event detection criteria and the notification trigger index or notification trigger message. For example, the programming protocols and programming messages for the service usage monitoring element can be complex and non-intuitive, which can complicate or slow the process of implementing the service usage monitoring element commands, configuration or programming to properly implement a higher level definition of service policy. Accordingly, in some embodiments, notification policy management & UI 132 element includes a UI that allows an operator to define the notification trigger event detection criteria as higher level service usage trigger event detection criteria, service usage events or service usage patterns. The notification policy management & UI 132 element may be further configured to convert these higher level definitions for the notification trigger event detection criteria into the appropriate lower level programming messages, instructions, commands or configurations that are recognized by or required by the service usage monitoring element and that implement the intention of the higher level service usage trigger event detection criteria (e.g., higher level trigger event detection criteria, such as application based service usage limits, and lower level trigger event detection criteria, such as bulk service usage limits).

In some embodiments, notification policy management & UI 132 element includes a UI that allows an operator to define the association between the higher level service usage trigger event detection criteria and the intended corresponding notification trigger index or notification trigger message. Notification policy management & UI 132 element may further include the intended association between the higher level service usage trigger event detection criteria and the intended corresponding notification trigger index or notification trigger message in the lower level programming of the service usage monitoring element. To further simplify the correct programming of the service usage monitoring element to properly implement service usage notification policy, in some embodiments, the notification policy management & UI 132 provides a mechanism for a network administrator to simultaneously define the notification triggers as higher level service usage conditions, and to define the association between the notification trigger event detection criteria and the intended corresponding notification trigger index or notification trigger message.

Similar to the difficulties of transforming higher level service usage notification policies into the required programming and provisioning of the network service usage monitoring element, the process of pre-configuring, programming or pre-loading the local device storage of service usage notification message sequences can be complex, time consuming, and prone to error. An operator responsible for creating the proper notification policy definition and enforcement for the device and the network can benefit from a higher level UI tools to manage design of message sequences, associating of message sequences to the corresponding notification trigger event detection criteria and distribution of the correct pre-stored notification message sequence information to devices in a manner that properly associates the pre-stored notification message sequence information with the proper notification trigger index or notification trigger message to be received from the network. Accordingly, in some embodiments, the notification policy management & UI 132 element programs a local device notification agent storage system with one or more pre-determined notification message sequences that are stored locally on the device, and to associate the notification sequences with a notification trigger index or notification trigger message to be received from the network.

In some embodiments, notification policy management & UI 132 element is included in the notification system, in which the UI accepts carrier network administrator inputs to define, design, specify or provide a reference to the following notification information: (i) the desired notification trigger event detection criteria, (ii) the notification trigger index or trigger message associated with the notification trigger event detection criteria, (iii) the notification message sequence that is to be associated with the notification trigger event detection criteria; and this notification information defined, designed, specified, or referenced by the administrator UI is passed to the service notification provisioning apparatus, which then (iv) programs the programmable notification Trigger Event Detect element 138 (e.g., which in the various embodiments described herein can be programmed within network elements or within device agents) with the notification trigger event detection criteria and trigger index or trigger message (e.g., which is the message sent by the notification Trigger Event Detect element 138 to indicate that the specific notification trigger event has occurred), (v) if required programs the routing of the trigger index or trigger message to the device notification agent 1697, (vi) programs the notification message sequence store 1697A, and, in some embodiments, the device notification agent 1697, with (a) an ordered list of notification message sequence actions (e.g., the sequence of actions to display any required notification message sequence information stored on the device and/or actions to display any notification message sequence information obtained from network elements), and (b) any required notification message sequence information that is stored locally on the device to initiate and complete the desired notification message sequence when the trigger index or trigger message is received.

In some embodiments, the notification policy management & UI 132 pre-configures the device notification agent to maintain a local device storage (e.g., in various embodiments one or more of notification message sequence store 1697A and notification agent 1697) of one or more pre-determined sets of notification sequence information, each set defining at least a portion of the information required to generate a UI notification message sequence; the local storage of notification sequence information is organized so that a specific desired set of notification sequence information is determined by a notification trigger index or notification trigger message; the notification agent receives the notification trigger index or notification trigger message from a notification trigger detection element; and the notification agent creates a complete notification message sequence by performing one or more of the following operations:

a. initiate (e.g., generate, assemble, execute, or manage), a device notification message sequence by using the notification trigger index to look up a pre-stored set of message sequence information (e.g., after adding additional information or additional formatting, such as adding a UI background bitmap that is common to multiple notification message sequences);

b. initiate a device notification message sequence by using the notification trigger message to look up a pre-stored set of message sequence information (e.g., notification information, UI bitmap, and/or UI formatting) and combining the pre-stored information with information included in the notification trigger message (e.g., usage count update, service plan usage condition or status, and/or specific service usage activity information) to form a complete notification message sequence;

c. initiate a device notification message sequence by using the notification trigger index or trigger message information as a reference to initiate a notification message sequence based on information stored on a network element (e.g., pull down a particular set of message sequence information from a server or initiate/redirect a user to a particular portal or website message sequence, such as a series of web pages with options); or d. perform a combination of two or more of the above operations; and the device notification agent communicates with a device UI to provide the notification message sequence to the device user.

To further simplify the task of programming user notifications for DAS as described herein, it is advantageous for a network administrator to be able to simultaneously configure the network service usage notification policies in coordination with the device service usage notification policies. Accordingly, in some embodiments, a notification policy management & UI 132 element is included to provide a network administrator with a UI to simultaneously define higher level definitions and coordinated policy distribution through network element configuration and the device notification agent configuration, with the network and device configuration capabilities including one or more of the following network configurations: higher level definition of trigger event detection criteria, association of trigger event detection criteria with trigger index or trigger message, higher level definition of trigger message content; and various device notification agent configurations (e.g., higher level definition of notification message sequence information, trigger event detection criteria programming in monitor, association of trigger event detection criteria with trigger index or trigger message). In some embodiments, the notification policy management & UI 132 provides a mechanism for a network administrator to simultaneously define the notification triggers as higher level service usage conditions, and to define the association between the notification trigger event detection criteria and the intended corresponding notification trigger index or notification trigger message and the corresponding notification message sequence on the device through a series of related UI screens that organize all of this required provisioning information into a convenient collection of related GUI information display and administrator input interfaces.

In some embodiments, the step of using the notification policy management & UI 132 to pre-configure the device notification agent 1697 to maintain a local device storage of one or more pre-determined sets of notification sequence information includes one or more of the following listed below.

a. Notification policy management & UI 132 can provision (e.g., program, pre-configure, or download instructions to) the device notification agent with ordered text and/or graphics image information required in the notification message sequence and associate the information with a notification trigger index or notification trigger message, in which the information is configured and formatted such that a device service notification agent can access the information from device storage or in the notification agent software to initiate (e.g., generate, execute, assemble, or manage) and display a notification message sequence to the device UI.

b. Notification policy management & UI 132 can provision the device notification agent to execute the ordered steps required to display the notification sequence that include accessing network based information display information or display sequences specified in the notification message sequence steps, and associate the network based notification message sequence information with a notification trigger index or notification trigger message, in which the information is configured and formatted such that a device service notification agent can access the information from the network sources to initiate and display a notification message sequence to the device UI. For example, one or more of the notification message sequence steps can include: initiate a UI sequence that has information downloaded form a network based UI display file or sequence of riles stored on a server, initiate a network based portal page or web view page or sequence of pages, or initiate a network based web site page or sequence of pages.

c. Notification policy management & UI 132 can provision the notification index message triggered by the notification trigger detection element to include ordered text and/or graphics image information required in the notification message sequence, and can provision the device notification agent to incorporate the notification message sequence information included in the notification trigger index message, along with (i) other information stored locally on the device (e.g., message window graphics, UI interface formatting, other text and/or graphics information), and/or (ii) network based information display information or display sequences, into the ordered notification message sequence initiated by the notification agent for display of the notification message sequence to the device UI.

d. The notification sequence information downloaded from the notification policy management & UI 132 can include any combination of steps a, b and c listed above.

e. Notification policy management & UI 132 can update or download the notification agent software to specify a new notification message sequence that can be any combination of steps a, b and c listed above.

In some embodiments, the communication protocol for communication between the device 100 and the associated network elements (e.g., a service controller element 122, a service usage report and store element 136 or another network element that performs similar functions) can comprise a number of communication protocols, including the protocol embodiments described herein or other protocols, such as TCP, SMS, SS7, and various other protocols as would be apparent to one of ordinary skill in the art. In some embodiments, push techniques, pull techniques, and/or various combinations thereof as described herein are used to provide user notifications for DAS as described herein with respect to various embodiments.

As further shown in FIG. 1, Notification Policy management and user interface 132 is in communication with the Service Controller 122, and as described above, in some embodiments, facilitates programming notification policies for the various network elements as described herein. In some embodiments, Notification Policy management and user interface 132 is also connected to other network elements, such as the Service Provider IT Configuration Server 6515. In some embodiments, Notification Policy management and user interface 132 provides a user interface for a carrier network notification policy administrator in which the various programmable settings required for the Trigger Event Detect 138 function, the Notification Agent 1697, and other network or device elements is organized for the notification policy administrator in a manner that facilitates more effective notification policy design, provisioning, and/or enforcement as described herein.

In some embodiments, service provider IT/configuration server 6515 provisions Trigger Event Detect 138 function network element, to trigger or events based on a policy provided by Service Controller 122. For example, service provider IT configuration server 6515 can be configured to provision Trigger Event Detect 138 to set the various detection criteria used by Trigger Event Detect 138 to trigger an event. In other words, service provider IT configuration server 6515 can be used to configure Trigger Event Detect 138 function to monitor usage is for one or more services for device 100 to detect when a service usage notification trigger detection criteria exists; to associate it with a notification trigger index or notification trigger message; and to communicate the notification trigger index or notification trigger message to the device. In some embodiments, trigger event detect 1 and/or usage report store on 36 can be configured to inform service control device link 1691 of the trigger event. Alternatively, as described above, in some embodiments trigger detection events are sent to Service Controller 122, and Service Controller 122 communicates the notification to service control device link 1691 such as, for example, via communication links 1702, 1703.

Device Triggers UI Notification Based on Network Trigger Event

The trigger event in the illustrated example is sent to a notification agent 1697 via agent communication bus 1630. In some embodiments, the trigger event may include a specific index indicator, notification trigger index message, local device notification trigger index processing, and/or local off-line device display of user notifications for DAS as described herein.

Upon receipt of the trigger event, notification agent 1697 causes the appropriate notification to be provided to the user of device 100. For example, in embodiments where pre-scripted notifications are stored in a notification message sequence store 1697A, notification agent 1697 retrieves the appropriate message from notification message sequence store 1697A and causes that message to be delivered to the user such as through user interface 120. For example, where the message is a textual string, the message can be displayed to the user on the user's display screen of device 100. As another example, where the message is an audiophile, the audio file can be delivered to the user via the device's 100 speaker. In various embodiments, the message may be comprised of a single message or may include multiple messages.

Also in various embodiments, the message may be configured to elicit a response from the user of device 100. For example, the user of device 100 may be given the option to purchase additional service allocations as part of the notification transaction. Accordingly, the message can include options that can be followed by the user to purchase such additional allocations, and menu selections or other prompts enabling the user to input information indicating whether a user wishes to purchase such additional allocations. The user response can be communicated via agent communication bus 1632 service control device Link 1691. Service control device Link 1691 can afford this information to a network entity such as, for example, Service Controller 122. Continuing with this example, if the message from the user indicates that the user wishes to purchase additional allocations, Service Controller 122 can notify relevant network elements regarding the additional allocations.

For example, Service Controller 122 can notify usage report store 136 and/or Trigger Event Detect 138 to update the threshold for trigger bubbles so that the appropriate notifications can be provided based on the new allocation levels. Similarly, Service Controller 122 may be configured to provide this information to notification Policy Management and user interface 132 such that the policy can be updated based on the new allocations. Still further, Service Controller 122 may be configured to notify service provider IT configuration server 6515 such that the user or device 100 account records can be updated. This can trigger the appropriate billing events and other administrative sequences as may be appropriate to accommodate the additional allocations purchased. In some embodiments, the additional allocations could be purchased on a one-time basis in which case, Service Controller 122 can be configured to ensure that only a one-time allocation is made, and that the appropriate network elements such as usage report, store 136, Trigger Event Detect 138, notification Policy Management and user interface 132, and other network elements are appropriately reset to previous levels on the additional allocations expires. For example, the user of device 100 may have only elected to increase the allocation for a current billing cycle (e.g. for the current month). In such a case, Service Controller 122 can be configured to reset the network elements to the previous allocation at the end of the current month or current billing cycle.

In some embodiments, if device 100 is associated with a service plan that is a family plan and/or other shared account plan (e.g., a corporate or other shared account plan), account aggregation may performed by an appropriate network element. For example, in some embodiments, usage count or other consumption metrics can be aggregated at a network element, so the actual aggregate usages permitted for a given allocation are tracked to enable detection of when the allocation is reached by the combination of users or devices, and to enable the detection in real-time or near-real-time of the consumption of usages by that combination of users or devices. This aggregation may be done in any of a number of network elements such as, for example, by usage report, store element 136, Trigger Event Detect 138 function, or by Service Controller 122. Event notifications can be pushed to and/or pulled from Service Processor 115 at any or all of the devices 100 associated with the shared account plan.

In some embodiments, the devices 100 associated with a shared account plan can each be configured with the same or similar permissions and authority, and the system can also be configured such that each of the devices 100 associated with the shared account plan receive the same or similar notifications from the network. In further embodiments, different devices 100 associated with a shared account plan can be configured with different permissions or authorities, and may be provided with different notifications depending on the device 100 status. For example, one of the devices 100 associated with a shared account plan may be designated as a master device that can receive additional information as compared to the other devices 100 associated with that shared account plan. As a further example, the master device may also be configured such that it can take actions that the other devices 100 in the shared account plan are not able to perform. Examples of such actions can include purchasing additional allocations of services or service classes, modifying the policy or plan under which one or more of the devices 100 in the shared account plan operates, and terminating or altering the allocations of services or service classes granted to one or more of the devices 100 in the shared account plan.

In some embodiments, a device 100 designated as a master device in a shared account plan may also be given permission to view additional information pertaining to notifications, policies and usages that is not available to other devices 100 in the shared account plan. For example, the master device may be provided with additional information in a notification such that the master device can view the consumption of resources by one or more other devices 100 in the shared account plan. Additional information such as this made available to the user of master device 100 can allow the user to make informed decisions about purchasing additional allocations, modifying policies under which one or more devices operate, and even terminating or altering permissions of the one or more other devices 100 in the shared account plan to access one or more services or service classes.

As would be apparent to one of ordinary skill in the art after reading this description, other levels of hierarchy can be provided to permit two or more classes of users or devices 100 in a shared account plan. Permissions and authorities can be granted to the devices 100 in the shared account plan based on where each device resides in the hierarchy. As would be apparent to one of ordinary skill in the art after reading this description, a number of alternative architectures can be used to provide the features and functionality associated with the systems and methods described herein. FIGS. 2A-2G, 3, 4A-4D, described below, depict a few example alternative architectures that can be used to implement some or all of the features and functionality associated with the systems and methods described herein.

Figure 2A:
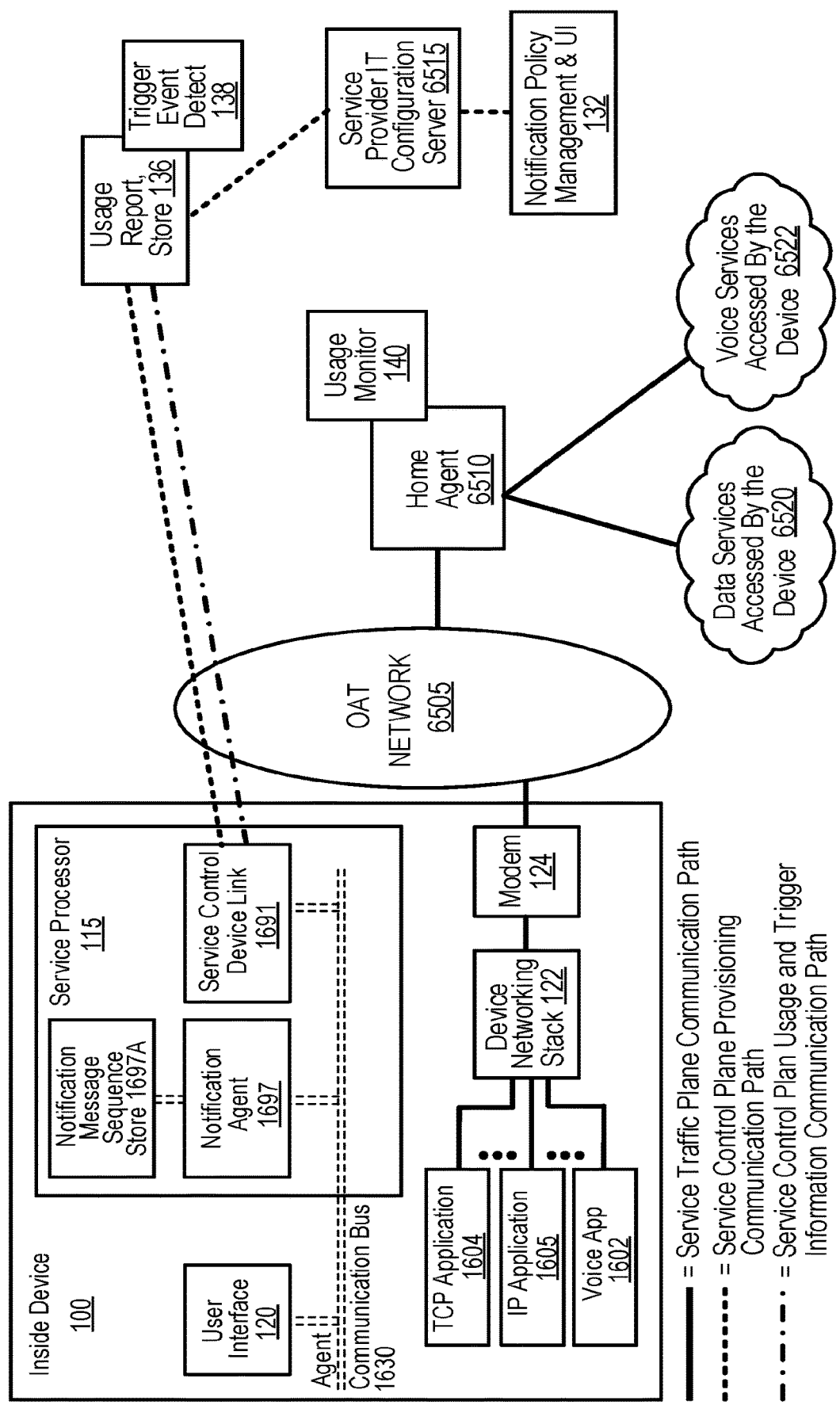
FIG. 2A is a functional diagram illustrating another network architecture for user notifications for device assisted services (DAS) in accordance with various embodiments of the systems and methods described herein.

FIG. 2A is a functional diagram illustrating another example network architecture for providing user notifications for device assisted services (DAS) in accordance with some embodiments. FIG. 2A is similar to FIG. 1 in functionality, except that in FIG. 2A the network architecture has been simplified to show the two-tier network including RAN 405, RAN Gateways 410, ATN 415, and Access Transport Gateways 420 as a single network referred to as Over The Air (OTA) Network 6505 with Home Agent (HA) 6510. These changes are intended to simplify understanding of the embodiments that follow, and it will be apparent to one of ordinary skill in the art that the simplifications do not in any way limit the various embodiments for multi-tier networks, multi-technology networks with additional network elements as described herein or as common in the industry to provide additional functionality not necessary for describing the embodiments, or for providing a different breakdown of network element functionality. For example, the Home Agent 6510 can comprise any of the embodiments disclosed for the Transport Gateway 410 including a GGSN, PDSN, and the multi-element embodiments comprising, for example, a GGSN combined with a DPI element. As will also be apparent to one of ordinary skill in the art after reading this description, OTA network 6505 can be implemented with the systems and methods described herein using any of a number of network topologies, configurations and protocols to allow devices 100 to access one or more services such as voice and data services, and to allow monitoring of service and service class usage and associated notifications as described with respect to various embodiments herein. Accordingly, one of ordinary skill in the art will understand that various embodiments are not limited to a particular network configuration, but can be used in any of a variety of network configurations.

As shown, device 100 which includes/executes Service Processor 115 is in network communication via OTA network communication 6505 to access various voice and data network services 6520, 6522. For example, OTA Network 6505 can provide various voice and data network services via cellular provider network(s) and/or the Internet as similarly described herein.

As described herein with respect to various embodiments, Home Agent 6510 can include the functionality of Access Transport Gateways 420, a GGSN in GSM/UMTS/HSPA network, a gateway and server cluster such as an MME/SGW/PGW/PCRF/HSS(SPR) in an LTE network, a PDSN gateway with AAA server in an EVDO network, an IP/WiFi access point, and/or an access point controller. In some embodiments, some of the functionality described herein as being performed by the Home Agent 6510 can be performed by some other network element/function that is behind the Home Agent 6510 but is in the direct data path of the device 100 before it leaves the carrier network, such as in the case of a proxy gateway/server device that performs layer 3/4 or layer 7 inspection and control of traffic. As shown, usage Report, Store 136 is in communication with Service Processor 115 via Service Control Device Link 1691 as shown via Home Agent 6510 and OTA network communication 6505. The Service Usage Monitor 140 function is located in the Home Agent 6510 to facilitate monitoring of device service usage, which is reported to Usage Report, Store 136 network element.

As also shown in FIG. 2A, Service Provider IT/Configuration Server 6515 is in communication with Usage Report, Store 136 network element and provides the service usage notification trigger event detection criteria programming for the Trigger Event Detect 138 function, which is located in the Usage Report, Store 136. Service Processor 115 includes a Notification Agent 1697 and a Notification Message Sequence Store 1697A that are used for creating, compiling, initiating or managing the communication of the notification sequence with the device UI 120. The Notification Agent 1697 is in communication with other device agents, the UI 120, and the Service Control Device Link 1691 via the Agent Communication Bus 1630.

As further shown in FIG. 2A, the provisioning path for programming the Notification Agent 1697 and the Notification Message Sequence Store 1697A is from the Notification Policy Management & UI 132 through the Service Provider IT/Configuration Server 6515. In some embodiments, the notification policy administrator UI, specification of the notification message sequence, specification of the service usage notification trigger event detection criteria, and specification of the notification trigger index or notification trigger message are all supported by the Notification Policy management and user interface 132, which is in communication with the Service Provider IT/Configuration Server 6515 which in turn is capable of performing the necessary provisioning and/or programming of the various network elements and device agents to facilitate implementation of the notification policy.

In some embodiments, the notification trigger index or notification trigger message is generated in the Trigger Event Detect 138 function which is located in the Usage Report, Store 136 network element and sent to the Notification Agent 1697 via the Service Control Device Link 1691.

Although not illustrated in FIG. 2A, one of ordinary skill in the art would understand that a Service Controller 122 can be provided to control notifications. In some embodiments, a Service Controller 122 can be included and coupled to usage report store on 36 by a service control plan to use each and trigger information communication path, and coupled to service provider IT configuration server or 6515 via a service control plane provisioning communication path. In such embodiments, Service Controller 122 can be configured to perform the same or similar functions as Service Controller 122 described above with reference to FIG. 1.

In some embodiments, Service Processor 115 implements a network service usage notification trigger event in response to a communication from Service Controller 122 or other network entity such as usage report, and/or store element 136. For example, the trigger event can be implemented in response to a notification event received from the Service Controller 122 or other network entity. For example, Service Controller 122 in coordination with Home Agent 6510, which is in the data path and can monitor network service usage as described herein. Service controller may be configured to perform and/or facilitate reporting with service provider IT/configuration server 6515 and can monitor service usage and provide user notifications based on a service plan associated with a device 100. Such notifications may be based on, for example, user notification policies received from Service Controller 122. The reporting function can be configured to provide real-time reporting or near-real-time reporting (RTR) functionality as described herein with respect to various embodiments.

In some embodiments, the Home Agent 6510 monitors an aggregate measure of service usage for the device 100 as described herein. In some embodiments, the Home Agent 6510 in coordination with service provider IT/configuration server 6515 monitors an aggregate measure of service usage for the device as described herein. In some embodiments, the Home Agent 6510 (e.g., or another network element(s)) includes DPI functionality to monitor and account for network service usage at a more detailed level below the aggregate service usage amount for the device as described herein, including, in some embodiments, the ability to monitor and account for the service usage of various service activities as described herein.

In some embodiments, the Home Agent 6510 may be configured to monitor and account for the service usage at a more detailed level below the aggregate service usage amount for the device 100. In some embodiments, this includes the functionality to monitor and account for the service usage of various service activities as described herein. For example, this monitoring and accounting can be performed in coordination with service provider IT/configuration server 6515.

In some embodiments, service provider IT/configuration server 6515 provisions Home Agent 6510 to monitor device 100 based on the service plan associated with device 100. For example, Home Agent 6510 can be configured to monitor network service usage for one or more services and to report on such usage by device 100. Such usage can include information or metrics such as, for example, the cumulative minutes (or other time units) of a service or service class used, cumulative data volumes used for a service or service class or other like data indicating service usage in a manner appropriate based on the allocation and billing for such services. For example, where a given service is a data service and the plan allocation is based on a total amount of data transferred for that service within a given billing cycle, Home Agent 6510 can be configured to monitor the amount of data transferred on a cumulative basis for that billing cycle, and to report such information to the appropriate network entity such as usage report store 136.

Such reporting can provide real-time or near-real-time reporting to facilitate real-time or near-real-time and accurate usage count reporting. As will be appreciated by one of ordinary skill in the art reading this description, the frequency of reporting can affect the timeliness of notifications. For example, real or near-real-time reporting can facilitate more immediate notification to the user of that of an exceeded allocation or of an impending allocation limit. The accuracy of such tracking can be specified to be within an acceptable margin of error/threshold.

In one embodiment, the reporting is done such that the during the delay between actual service usage and a report on service usage there is a relatively small percentage of a service usage as compared to a desired service usage threshold. For example, the service usage reporting delay can be small enough so that the service usage that takes place during the reporting delay is less than approximately 50% of the threshold, with the usage that takes place during the reporting delay ideally being less than approximately 15%. In some embodiments, the Home Agent 6510, and/or the Home Agent 6510 in coordination with service provider IT/configuration server 6515 can identify events/thresholds. Examples of these can include configured reporting events or policies for user notifications. In some embodiments, push techniques, pull techniques, and/or various combinations thereof as described herein are used to provide user notifications for DAS as described herein with respect to various embodiments. As an example, user notifications based on bulk service usage based on network-based service-usage monitoring performed by Home Agent 6510 can be used to provide user notifications based on bulk service usage.

In some embodiments, a network service usage monitoring element, such as Home Agent 6510 or Home Agent 6510 in conjunction with an IT/configuration server 6515, is used for service usage monitoring. In various embodiments, the service usage monitoring element is programmed to detect a pre-determined service usage notification trigger. This trigger may be based on the occurrence of events such as, for example, a service usage condition, a service usage event or a service usage pattern. The service usage monitoring element, in some embodiments, has a pre-defined association of the notification trigger with a pre-determined notification trigger index or notification trigger message. The trigger index may be an identifier or a message that references a pre-determined service usage notification sequence stored on a device storage system. The trigger index may additionally or alternatively includes service usage notification information to be combined with a pre-determined service usage notification sequence stored on a device storage system. Preferably, the service usage monitoring element sends the notification trigger index or notification trigger message to a network service controller element that communicates with the device, and the service controller element sends notification trigger index or notification trigger message to device for the purpose of initiating a service usage notification message sequence in the device UI.

In some embodiments, the notification trigger index or notification trigger message contains only a portion of the notification message sequence information that is intended to be displayed in the device UI. In some embodiments, the notification trigger index is an index to select a pre-determined notification sequence that is stored in the local device storage system such as notification message sequence store 1697A. For example, the notification trigger index can be an identification of the notification that can be provided wherein the notification is detected by notification agent 1697. In this example, notification agent 1697 deciphers the notification trigger index and selects the appropriate notification message from the notification message sequence store 1697A.

In some embodiments, the notification trigger message includes only an index or other identifier. The index or other identifier may be used by the Service Processor 115 to identify the appropriate notification to be provided to the user. For example, where the message is provided between the network elements and Service Processor 115 or packetized messages, one or more fields in a packet of the notification event message that can be used to indicate a particular notification or type of notification. Such fields can be used by the notification agent 1697 to retrieve the appropriate message (which can be a single message or a string of messages) from message store 1697A to deliver to the user via the user interface 120. The information, or a portion of the information that is intended to be displayed via the device UI 120 can be displayed with the remainder of the pre-determined notification sequence is stored in the local device storage system (e.g., message store 1697A) of device 100.

In some embodiments, a device notification agent 1697 is pre-configured on the device to include pre-determined notification sequence information. Such information can be used to identify a single message or a sequence of messages for a particular notification as identified by a notification event to the device 100. The notification sequence information may correspond to either (i) a notification trigger index or (ii) a notification trigger message. For a notification trigger index may identify, the sequence information corresponds to all the information that is to be displayed to a UI 120 for the particular notification. For a notification trigger message, the sequence information corresponds to a portion of the information that is included in the local notification message sequence information and a portion of the information is included in the notification index message.

In various embodiments, the device notification agent 1697 is further configured on the device 100 to accept a notification trigger index or notification trigger message from a network element. This information can be received, for example, via a trigger event generated in response to a notification event received at the device. As described above in various embodiments, the notification events can be received from one or more network elements that monitor service usage. In the example of FIG. 2A, these include, for example, a Home Agent 6510 or Home Agent 6510 in conjunction with an IT/configuration server 6515, usage report, store 136, or Service Controller 122. In the example of FIG. 1, these can include, for example, gateways 410,420 (whether or not in conjunction with IT server 6515), usage report store 136 or Service Controller 122.

Upon receipt of the notification trigger index or notification trigger message, the notification agent either: (i) uses the notification trigger index to create or retrieve a notification message using the locally stored notification sequence information 1697A indexed by the notification trigger index; or (ii) uses the notification trigger message in combination with the locally stored notification sequence information 1697A that is associated with the notification trigger message to create a notification message sequence. In both examples, the notification agent may be configured to display the notification sequence information on the device UI 120.

In some embodiments, the notification agent 1697 determines partitioning of the notification message sequence information that is pre-stored on store 1697A. Such partitioning can be determined on the fly or it can be predetermined and the partitioning information stored, for example, with the message in message sequence store 1697A. The partitioning can be based on factors such as the screen and font size for the UI, the message content, or completeness of the message or message portion.

The information that is either included in the notification trigger index or notification trigger message, or is obtained by the device notification agent as part of the notification agent process, is used by the notification agent 1697 to assemble and display the notification sequence.

In some embodiments, the Home Agent 6510, possibly in coordination with service provider IT/configuration server 6515, monitors service usage and creates a record within the service usage record to identify a pre-determined service usage notification trigger event detection criteria. The Home Agent 6510 looks up a pre-determined service usage notification trigger index or notification trigger message that is associated with the specific notification trigger event detection criteria, and in coordination with the Service Controller 122 sends the service usage notification trigger index or notification trigger message to a device 100. The device notification agent 1697 receives the message for further local device processing of the trigger event message or message index prior to device UI display of an end user notification message.

In some embodiments, a service monitoring element (e.g., usage monitor 140 and/or other service usage monitoring elements in the network and/or on the device) performs service usage monitoring. The monitoring element 140 communicates service usage to a service usage notification trigger detection element (e.g., Trigger Event Detect 138).

Service usage notification trigger detection element 138 is programmed to identify a service usage notification trigger event detection criteria. Such an event can occur, for example, prior to the occurrence of or upon or after the occurrence of a service plan limit being reached. Such events can be detected by inspecting the service usage monitoring history to identify a pre-determined (e.g., pre-programmed) service usage condition or service usage pattern. In various embodiments, service usage notification trigger detection element 138 associates the notification trigger event detection criteria with a pre-determined notification trigger index or a notification trigger message. Service usage notification trigger detection element 138 may be configured to communicate the notification trigger index or notification trigger message to a device 100 for further local device processing by the notification agent 1697 for the purpose of displaying a notification message sequence.

Trigger event detect element 138 is programmed to identify the particular triggers or event points. For example trigger event detect element 138 can be programmed, for example, by Notification Policy management and user interface 132, which can be in communication with Service Provider IT Configuration Server 6515 and/or Service Controller 122.

In some embodiments, the service monitoring element is located in a network element (e.g., Home Agent 6510). In some embodiments, the service monitoring element is located in a device agent on the device (e.g., Policy Implementation Agent 1690), and, in some embodiments, the service monitoring element is secured using various techniques described herein.

In some embodiments, the service usage notification trigger detection element is located in a network element (e.g., Home Agent 6510 or Usage Report, Store 136 or MVNO Service Gateway/Server 292). In some embodiments, the service usage notification trigger detection element is a device agent located on the device (e.g., Service Monitor Agent 1696 or Policy Implementation Agent 1690).

These embodiments provide a general framework for service usage notification that can support identification of a wide variety of notification trigger event detection criteria with a wide variety of associated notification message sequences. These embodiments can also be implemented to provide various techniques for communicating the associated notification trigger indexes or notification trigger messages to a device notification agent to cause the notification message sequences to be delivered to the device UI. For example, while various embodiments described herein provide for powerful and flexible user notifications for DAS, the user notification message sequences can be generated and delivered in a manner that can also be more efficient in terms of network resource utilization and/or faster than the time required to display a user notification of similar complexity using conventional techniques. The flexibility to support a wide range of notification trigger event detection criteria and the associated notification message sequences results from the ability to locate the notification Trigger Event Detect 138 function in various network elements or device agents and to program the service usage notification trigger event detection criteria in an efficient manner using the notification system policy management embodiments disclosed herein.

Network resource savings and/or time savings can be achieved by including message information in the pre-stored notification message sequence information in the device notification message sequence store 1697A. Configurations such as this can be used to reduce the amount of traffic that would otherwise need to be communicated across the network to the device to provide notifications. For example, where the entire notification sequence is locally stored on device 100, this information does not need to be transmitted across the network each time a notification is to be delivered. This allows notification message sequences to be effectively delivered to the device UI that would be impractical due to either the complexity in detecting them or the message volume for communicating them via conventional self contained SMS messages or web site pages. Accordingly, various embodiments described herein provide for many types of notification message sequences to be delivered to a device UI that provide for improved user awareness of service usage status or service options, and provide carriers with the means to inform the user when a service plan is available for a device service usage activity being attempted by the user, or when a more suitable service plan is available for a desired service usage activity or set of service usage activities. In this manner, user notification messages that would, for example, typically consume over-the-air network bandwidth or resources to communicate to the end user, or would typically require a more time consuming or complex message transaction process, can be communicated with less delay or with lower over-the-air network bandwidth or resource consumption.

In some embodiments, the notification trigger event detection criteria identifies one or more of the following service usage conditions and/or events: a pre-determined intermediate service usage amount or service usage level that is less than a service plan service usage limit; a service usage amount or service usage level that is more than a service plan service usage limit; a pre-determined level of service usage velocity; a pre-determined level of service usage velocity that is relatively high or relatively low compared to a service plan usage limit; a service usage activity that is not supported by the current service usage plan policies; a specific pre-determined application or group of applications attempting to use service or reaching a pre-determined level of service usage; a specific pre-determined application or group of applications attempting to use service or reaching a pre-determined level of service usage, in which the application or group of applications typically exhibit usage behavior that is relatively high with respect to service plan limits; a service usage activity attempting to communicate with or communicating with a pre-determined network destination or group of destinations; a service usage activity attempting to communicate with or communicating with a pre-determined network destination or group of destinations, in which the typical service usage for devices connected to the destination or group of destinations is relatively high compared to a service plan limit; a service usage activity for which an alternative service plan is available or better configured to support; a service usage activity for which an alternative network is available or better able to support; a service usage activity or group of services usage activities attempting to use service or reaching a pre-determined level of service usage during a pre-determined time of day, during a time that the network is experiencing a pre-determined level of congestion, or during a time that the network is experiencing a pre-determined level of performance or availability; a service usage activity that a service usage activity that attempts to communicate with or communicates with the network with a specified QoS level; a service usage activity that attempts to communicate via the network with a specified QoS level that is not available under the access policies of the current service plan or due to network congestion; a service usage activity that attempts to communicate with or does communicate with a roaming network; a service usage amount of a specified level is reached on a roaming network; a service usage activity that attempts to communicate with an unauthorized network or network destination; an aggregate service usage amount for a group of devices that belong to a user group or device group plan; a specific set of service usage activities for a device that belongs to a group service plan, in which the device group manager has identified the service usage activities for notification message actions; and various other service usage conditions and/or events as will now be apparent to one of ordinary skill in the art in view of the various embodiments described herein. It will now be apparent to one of ordinary skill in the art that a wide range of service usage notification trigger event detection criteria can be designed and implemented, associated with an arbitrarily sophisticated user notification sequence, in which the user notification sequence is divided or partitioned into components that are stored or programmed locally on a communications device to reduce network notification message communication overhead and improve the notification message sequence delivery performance and process.

In some embodiments, one or more traffic filters are located in a network element, such as a DPI element (e.g., a DPI system, a home agent, a GGSN/PCEF, etc.), to support the implementation of control, charging, or notification policies for a service associated with a service plan, such as an ambient (e.g., sponsored) service. The traffic filters are configured to inspect one or more of a destination, domain, IP address, port, protocol, content type, etc., and identify and classify traffic based on one or more classification rules.

In some embodiments, an enforcement function/agent (e.g., a PCEF function) inside a gateway device (e.g., the GGSN, home agent, etc.) performs DPI on traffic to or from the end-user device. In some embodiments, the DPI is performed by a separate system. In some embodiments, a rules function/agent (e.g., a PCRF) instructs the DPI system to provide the rules function/agent an indication if a particular trigger event occurs, the particular trigger event being associated with an access or attempted access to a network service by the end-user device. When the trigger condition occurs, the DPI system informs the rules function/agent. In response, the rules function/agent sends a message containing information about the access or the attempted access that caused the trigger condition to occur, which may include one or more of, for example, the subscriber identity, device identity, notification message index, date, time, action taken, etc., to a notification system. In some embodiments, the notification system generates at least a portion of a notification message that is sent to the end-user device for presentation to a user of the end-user device through a user interface of the end-user device. In some embodiments, the at least a portion of the notification message that is sent to the end-user device comprises information about the access or attempted access that caused the trigger condition to occur.

In some embodiments, the trigger condition is that the end-user device attempts to access a service for which the end-user device does not have an applicable service plan. In some embodiments, the at least a portion of the notification message comprises an offer for a subscription to a service plan. In some embodiments, the at least a portion of the notification message comprises possible user responses to the notification message. In some embodiments, the user responses may include one or more of an acknowledgment/ dismissal, an agreement to purchase a service plan, a request for more information, and a local device action (e.g., disable roaming, turn on WiFi, etc.). In some embodiments, the user response is sent to a network element. In some embodiments, the network element acts on the user response by, for example, initiating a process to provision a service, initiating a process to cause the charging element to charge the newly-provisioned service to the appropriate entity (e.g., the user or a sponsor entity), and/or initiating a process to store the user response in a data store (e.g., a database, CRM system, etc.). As would be appreciated by a person of ordinary skill in the art, although the network elements are described here as separate elements, some of the described functionalities may be combined into a single element.

In some embodiments, the DPI system uses the allowable access list to identify and classify traffic to and from the end-user device. In some embodiments, the initial DPI system settings are defined based on the results of an initial inspection of a web site, web page, IP address, host, etc. The inspection may be performed by, for example, a web crawler. For example, if the web crawler (or DOM or other technique for characterizing a destination such as a web site, web page, IP address, host, etc.) initially identifies six URLs or network destinations associated with a particular sponsored web site or web page, the DPI system can be configured to classify traffic directed to those six URLs as sponsored traffic, and to classify traffic directed to URLs other than the six URLs as non-sponsored traffic.

In some embodiments, the DPI system adapts to keep up with changes in the Internet. In some embodiments, the DPI system settings (e.g., the lists, filters, or other mechanisms that enable the DPI system to classify traffic) are updated based on the results of an analysis of a web site (e.g., using a web crawler, DOM techniques, or the like). In some embodiments, an administrator reviews the results of a web site analysis (e.g., web crawl, DOM, etc.) and manually updates the DPI system settings. In some embodiments, the DPI system settings are updated automatically by a network element (e.g., a web crawler or other system that can identify changes in a web page). In some embodiments, changes in web pages are detected by a software application that runs in a browser and identifies redirects, JavaScript, Flash, and other content (e.g., third-party party) in a web page that a typical web crawler would not be able to identify. By running in the browser, the software application can ensure that content such as JavaScript, Flash, and other similar content is captured and classified.

As will now be appreciated by a person of ordinary skill in the art in light of the disclosures herein, an adaptive DPI system in conjunction with associative techniques (such as monitored access with temporary leases) to address delays in the update rate of the adaptive DPI system may be used to enable robust ambient services and to provide a positive user experience.

The DPI system can be configured to provide usage measures for classified sponsored and non-sponsored traffic to one or more charging elements (e.g., an OCS, a billing system, a mediation system, etc.). The usage measures may be represented by charging codes, an amount of data (e.g., in bytes), an amount of time, or any other measure that indicates usage. Thus, continuing with the example above, the charging policy can be configured so that traffic directed to the six URLs associated with the sponsored web site or web page is billed to the entity sponsoring the sponsored service, and other traffic is billed to the user of the end-user device (or the party responsible for non-sponsored usage by the end-user device).

Similarly, the DPI system can facilitate the enforcement of a notification policy and can facilitate the providing notifications to the user of an end-user device based on whether usage is sponsored or non-sponsored. For example, if an end-user device has a subscription to a sponsored service that allows X megabytes (MB) of usage per month but does not have a subscription that applies to non-sponsored services, the notification policy may specify that a message is sent to the end-user device after the end-user device's usage of the sponsored service reaches 0.9*X MB, and that a "no applicable service" message is sent to the end-user device when it attempts to use any service other than the sponsored service. As another example, if the end-user device has a subscription to a sponsored service that allows data accesses other than those that result in streaming video being delivered to the end-user device, and the end-user device attempts to access a streaming video source, a notification may be sent to the end-user device to indicate that streaming video is not allowed under the sponsored service plan. As another example, if the end-user device has a sponsored service plan and a non-sponsored service plan, a notification may provide an indication of the amount of data used or remaining in the non-sponsored service plan. As will be appreciated by one of ordinary skill in the art, a myriad of notification scenarios are possible based the disclosures herein.

In some embodiments, the device notification agent is configured to maintain a local device storage 1697A of one or more pre-determined sets of notification sequence information. This information can be initially configured for operation and can be updated as policies and practices for network services and operations change. New and updated messages can be delivered to the local storage from the network or via other communication paths to the device 100. The sets of notification sequence information define in some embodiments at least a portion of the information required to generate a UI notification message sequence. In various embodiments, the local storage of notification sequence information is organized so that a specific desired set of notification sequence information can be determined by a notification trigger index or notification trigger message. For example, in some embodiments the notification agent 1697 receives the notification trigger index or notification trigger message. This message can be received, for example, from a notification trigger detection element. In response to the notification trigger message, the notification agent 1697 creates a complete notification message sequence. Using the notification trigger index or notification trigger message, the notification agent 1697 initiates the notification sequence. In performing the notification, the notification agent 1697 generates, assembles, executes, or manages a notification message sequence for delivery to the user interface 120. For example, the notification agent 1697 can, in some embodiments, use the notification trigger index to look up a pre-stored set of message sequence information in message store 1697A. The notification agent 1697 can add additional information or additional formatting, such as adding a UI background bitmap that is common to multiple notification message sequences.

As another example, notification agent 1697 can use the notification trigger message to look up a pre-stored set of message sequence information. This information can include, for example, notification information, UI bitmap, and/or UI formatting. Accordingly, notification agent 1697 can initiate a notification message sequence by using and combining the information stored in message store 1697A with information included in the notification trigger message to form a complete notification message sequence. This additional information can include, for example, usage count update, service plan usage condition or status, and/or specific service usage activity information.

As yet a further example, notification agent 1697 can use the notification trigger index or trigger message information as a reference to initiate a notification message sequence based on information stored on a network element. For example, the notification agent 1697 may pull down a particular set of message sequence information from a server or initiate/redirect a user to a particular portal or website message sequence, such as a series of web pages with options.

As yet another example, notification agent 1697 may be configured to perform a combination of two or more of the above operations; and the device notification agent communicates with a device UI to provide the notification message sequence to the device user.

In some embodiments, as similarly described herein with respect to various embodiments, a user notification message sequence is initiated by using the notification trigger index to look up a pre-stored set of message sequence information. The sequence can be augmented by adding additional information or additional formatting, such as adding a UI background bitmap that is common to multiple notification message sequences. For example, the notification trigger index can include various additional information for a user notification for when a service usage condition detection indicates that the service usage is outside of the associated service plan for the communications device. Example messages include a warning message and/or an offer for alternative service plan options. As a further example, the messages may notify the user: regarding consumed and available capacity and consumption rate; the his or her capacity has been exceeded; options for modifying the plan to accommodate higher usage, such as purchasing additional capacity; options to transfer capacity from another under-utilized service; and so on.

An example of a scenario where notification agent 1697 provides a stored message notification with additional information not in the message store 1697A, is a message sequence that informs the user of the impending consumption of an allocated service, and also provides additional information on actual consumption to date for that service. Because network-resource consumption is preferably tracked in real time or near real time, this real-time or near-real-time information is not pre-stored in message store. On the other hand, in a scenario wherein the notification does not include actual real-time consumption information, pre-stored messages may be sufficient to provide the intended notification.

Figure 2B:
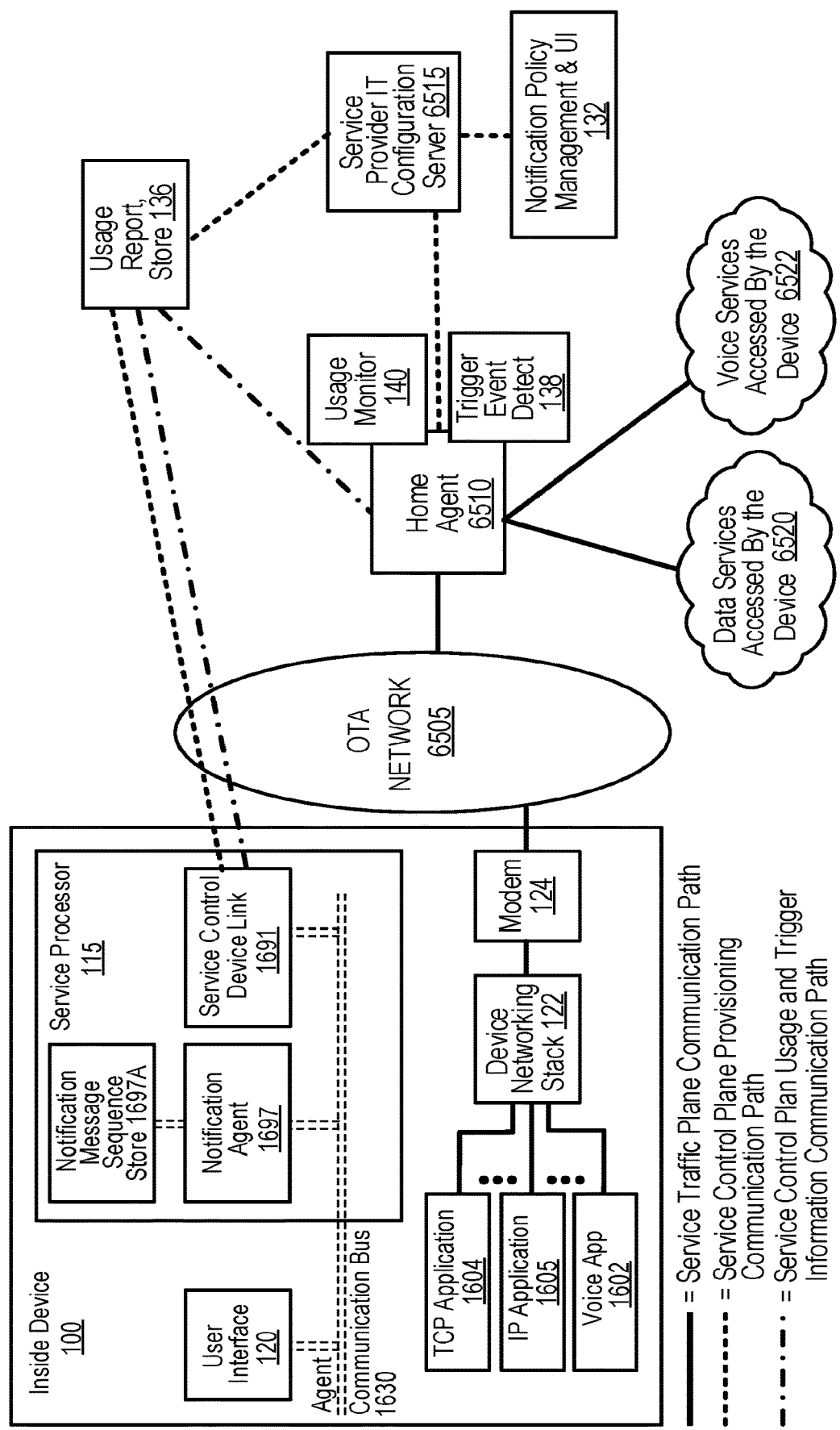
FIG. 2B is a functional diagram illustrating another network architecture for user notifications for device assisted services (DAS) in accordance with various embodiments of the systems and methods described herein.

FIG. 2B is a functional diagram illustrating another network architecture for providing user notifications for device assisted services (DAS) in accordance with various embodiments. FIG. 2B is similar to FIG. 2A in functionality, except that in FIG. 2B the Home Agent 6510 includes both the Trigger Event Detect 138 function and the Service Monitor Function, usage monitor 140. In some embodiments, providing the Home Agent 6510 has, for example, deep packet inspection (DPI) capabilities, can facilitate a deeper level of service usage notification trigger event detection criteria. Where Home Agent 6510 has such deep packet inspection (DPI) capabilities, it may be beneficial to include both the Trigger Event Detect 138 function and the Service Monitor Function, usage monitor 140 on the Home Agent 6510 for trigger detection without sending detailed information across the network to a remote trigger event detect function.

In some embodiments, service usage notification trigger event detection criteria are specified and implemented for bulk usage counts, while in other embodiments, finer classification of service usage can be accommodated. For example, service usage can be monitored based on network/sub network, sponsored services, application (e.g., application specific services that use certain network destinations), allocation for corporate enterprise sponsored traffic versus end user billed traffic, and various other service usage monitoring techniques and classifications as described herein with respect to various embodiments. In some embodiments, the various network elements and device agents that are programmed in a coordinated manner to deliver the proper notification message sequence to the device UI when the service usage notification trigger event detection criteria come into existence are provisioned via the Service Provider IT/Configuration Server 6515 in communication with the Notification Policy Management UI 132 as similarly described above with respect to FIG. 2A. In some embodiments, the notification trigger index or notification trigger message is generated in the Trigger Event Detect 138 function, which is located in the Usage Report, Store 136 network element and sent to the Notification Agent 1697 via the Service Control Device Link 1691.

In some embodiments, it is desirable to generate the service usage notification trigger indexes or messages on the device 100 instead of, or in addition to, on the network. For example, generating the service usage notification trigger indexes on the device 100 can provide for a more flexible, more easily programmed implementation of user notifications for DAS, and, in some cases, network monitoring may not have the capability to generate triggers.

In some embodiments, network based service usage information is communicated to the device 100 where it is processed and, in some cases, stored. The device 100 can also collect and store usage information based on its own usage characteristics. This network based service usage information and/or the locally obtained usage information may be used to generate notification trigger indexes or trigger messages. In some embodiments, device-based service-usage monitoring is the basis for trigger event generation on the device 100. In some embodiments, network-based service-usage information and device-based service-usage information is the basis for trigger event generation on the device. In some embodiments, the device-based service-usage information is synchronized with network based service usage information for generating trigger indexes or trigger messages.

Figure 2C:
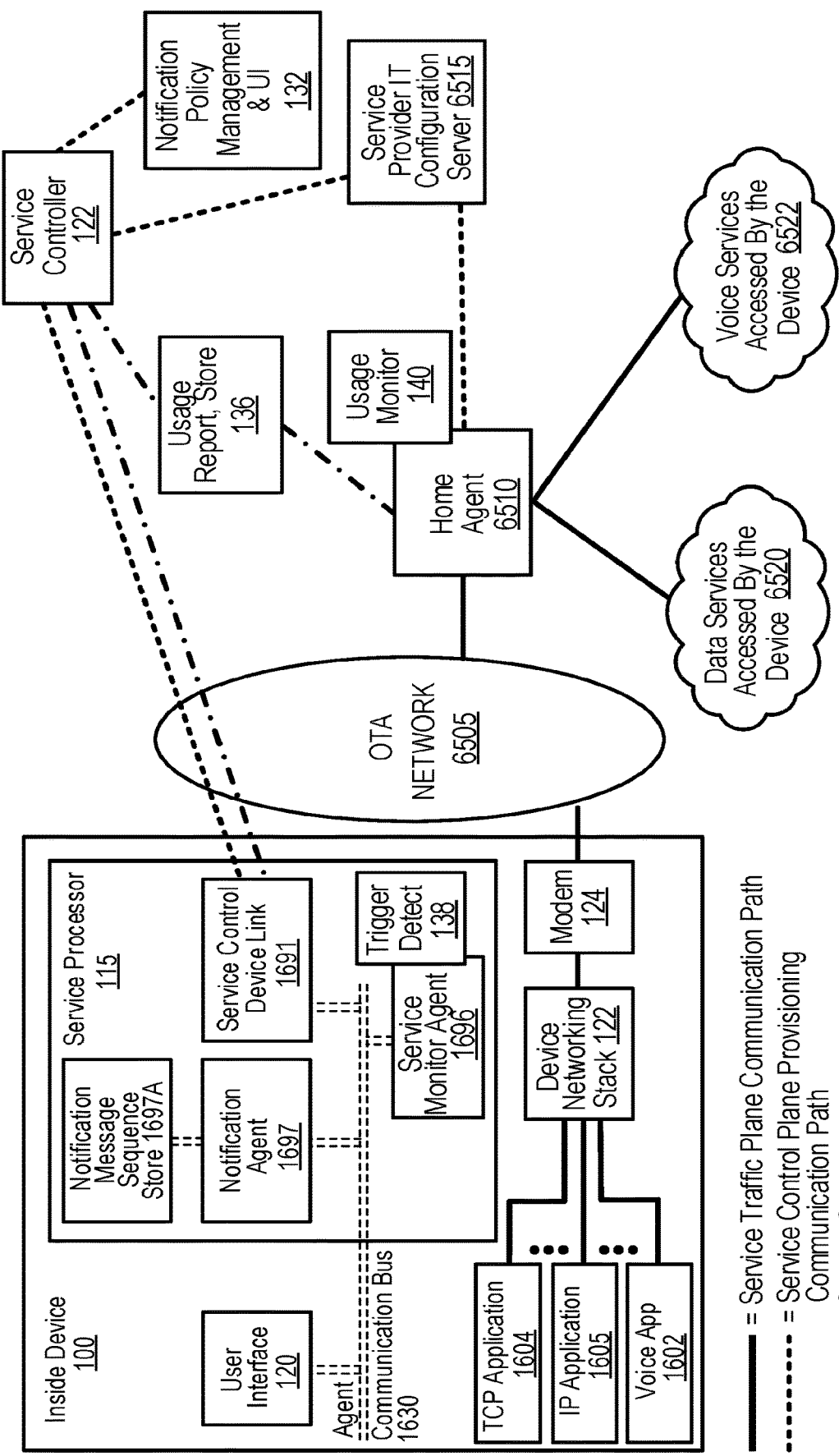
FIG. 2C is a functional diagram illustrating another network architecture for user notifications for device assisted services (DAS) in accordance with various embodiments of the systems and methods described herein.

FIG. 2C is a functional diagram illustrating another network architecture for providing user notifications for device assisted services (DAS) in accordance with some embodiments. FIG. 2C is similar to FIG. 2B in functionality, except that in FIG. 2C the Trigger Event Detect 138 function is implemented by the Service Processor 115, as shown at the service monitor agent 1696, on the device 100. As also shown, a Service Controller 122 is provided in the network to manage notification message communication and notification policy programming of the device Service Processor 115 and various agents of the service processor. In particular, an additional agent is provided at the device Service Processor 115, illustrated as service monitor agent 1696. Service usage data can be monitored and tracked locally. In some embodiments, the Service Monitor Agent 1696 accepts service usage information reported to the device by the Usage Report, Store 136 network element. This can be, for example, via the Service Controller 122. This provides the device 100 with a record of service usage that can be used to detect service usage notification trigger event detection criteria. As shown, the Trigger Event Detect 138 function is located in the Service Monitor Agent 1696. In some embodiments, when a service usage notification trigger index or notification trigger message is generated by the Service Monitor Agent 1696, it is sent directly to the Notification Agent 1697 for notification message sequence processing.

In some embodiments, service processor notification agent 1697 in communication with Service Controller 122 implements device based user notifications for DAS as described herein with respect to various embodiments. For example, Service Processor 115 can monitor service usage and provide user notifications based on a service plan associated with device 100. This can include, for example, user notification policies received from Service Controller 122 and/or in coordination with a provider IT/configuration server 6515. In some embodiments, push techniques, pull techniques, and/or various combinations thereof as described herein are used to provide user notifications for DAS as described herein with respect to various embodiments. As an example, user notifications based on bulk service usage based on device-based service-usage monitoring performed by Service Processor 115 can be used to provide user notifications based on bulk service usage.

Figure 2D:
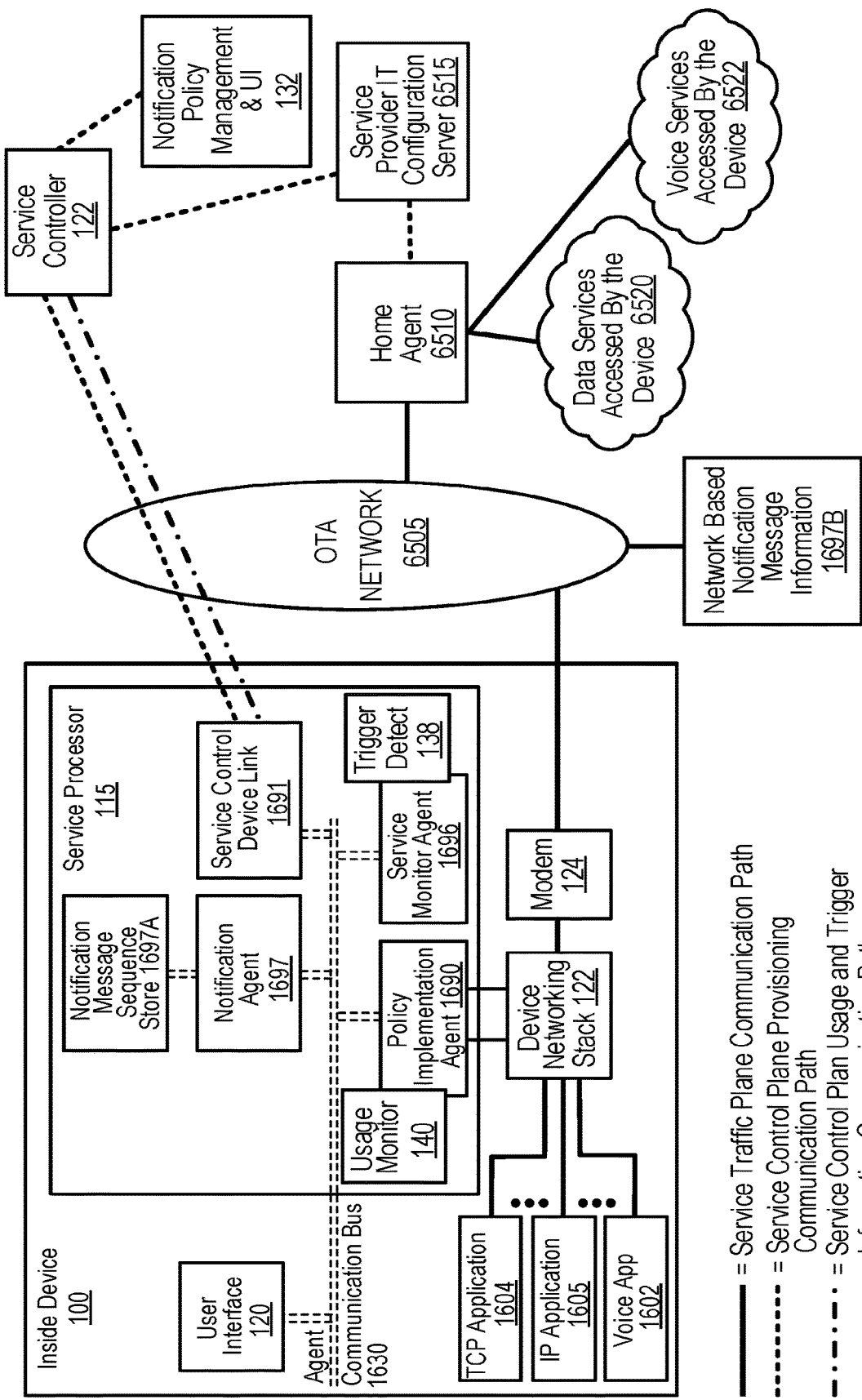
FIG. 2D is a functional diagram illustrating another network architecture for user notifications for device assisted services (DAS) in accordance with various embodiments of the systems and methods described herein.

FIG. 2D is a functional diagram illustrating another network architecture for providing user notifications for device assisted services (DAS) in accordance with some embodiments. FIG. 2D is similar to FIG. 2C in functionality, except that in FIG. 2D, the device Service Processor 115 also includes a device Policy Implementation Agent 1690. In some embodiments, the Policy Implementation Agent 1690 interacts with the device networking stack 122 to detect and monitor device service usage as described herein with respect to various embodiments. As shown, the Service Monitor 140 function is provided at the Policy Implementation Agent 1690. In some embodiments, the service usage information is communicated over the agent communication bus 1630 to the Service Monitor Agent 1696 in which the Trigger Event Detect 138 function identifies service usage notification trigger event detection criteria and initiates the user notification sequence by communicating the notification trigger index or notification trigger message to the Notification Agent 1697.

In some embodiments, a device service usage monitoring agent, such as one of or a combination of a service monitor agent 1696 and a policy implementation agent 1690, is used for service usage monitoring. In such embodiments, the service usage monitoring may be communicated to the device service usage notification agent 1697. The service usage notification agent 1697 may be programmed to detect a pre-determined service usage notification trigger, such as a notification trigger based on the occurrence of a service usage condition, the occurrence of a service usage event or the occurrence of a service usage pattern.

The device service usage notification agent 1697 may also be provided with a pre-defined association of the notification trigger with a pre-determined notification trigger index or notification trigger message, to enable retrieval of the message sequence of one or more messages from the message sequence store 1697A. For example, the trigger index may be an identifier or a message that references a pre-determined service usage notification sequence stored on a device storage system. Alternatively, the trigger index may include service usage notification information that will be combined with a pre-determined service usage notification sequence stored on a device storage system; the device notification agent is pre-configured on the device to include pre-determined notification sequence information.

In various embodiments, the notification sequence information corresponds to one of: (i) a notification trigger index in which the local notification sequence information contains all the information that is to be displayed to a UI; (ii) a notification trigger message in which a portion of the information that is to be displayed to a UI is included in the local notification message sequence information and a portion of the information that is to be displayed to a UI is included in the notification index message; (iii) and the notification agent displays the notification sequence information on the device UI. In some embodiments, the device service usage monitoring agent service usage records are synchronized with network service usage records in a way that minimizes the difference between the two service usage sources.

In some embodiments, service processor notification agent 1697 and a device based Usage Monitor 140 in communication with Service Controller 122 implements device based user notifications for DAS as described herein. For example, Service Processor 115 can monitor service usage and provide user notifications based on a service plan associated with device 100. For example, notifications can be based on user notification policies received from Service Controller 122 and/or in coordination with a provider IT/configuration server 6515. In some embodiments, push techniques, pull techniques, and/or various combinations thereof as described herein are used to provide user notifications for DAS as described herein with respect to various embodiments. As an example, user notifications based on bulk service usage based on device-based service-usage monitoring performed by Service Processor 115 can be used to provide user notifications based on bulk service usage.

Figure 2E:
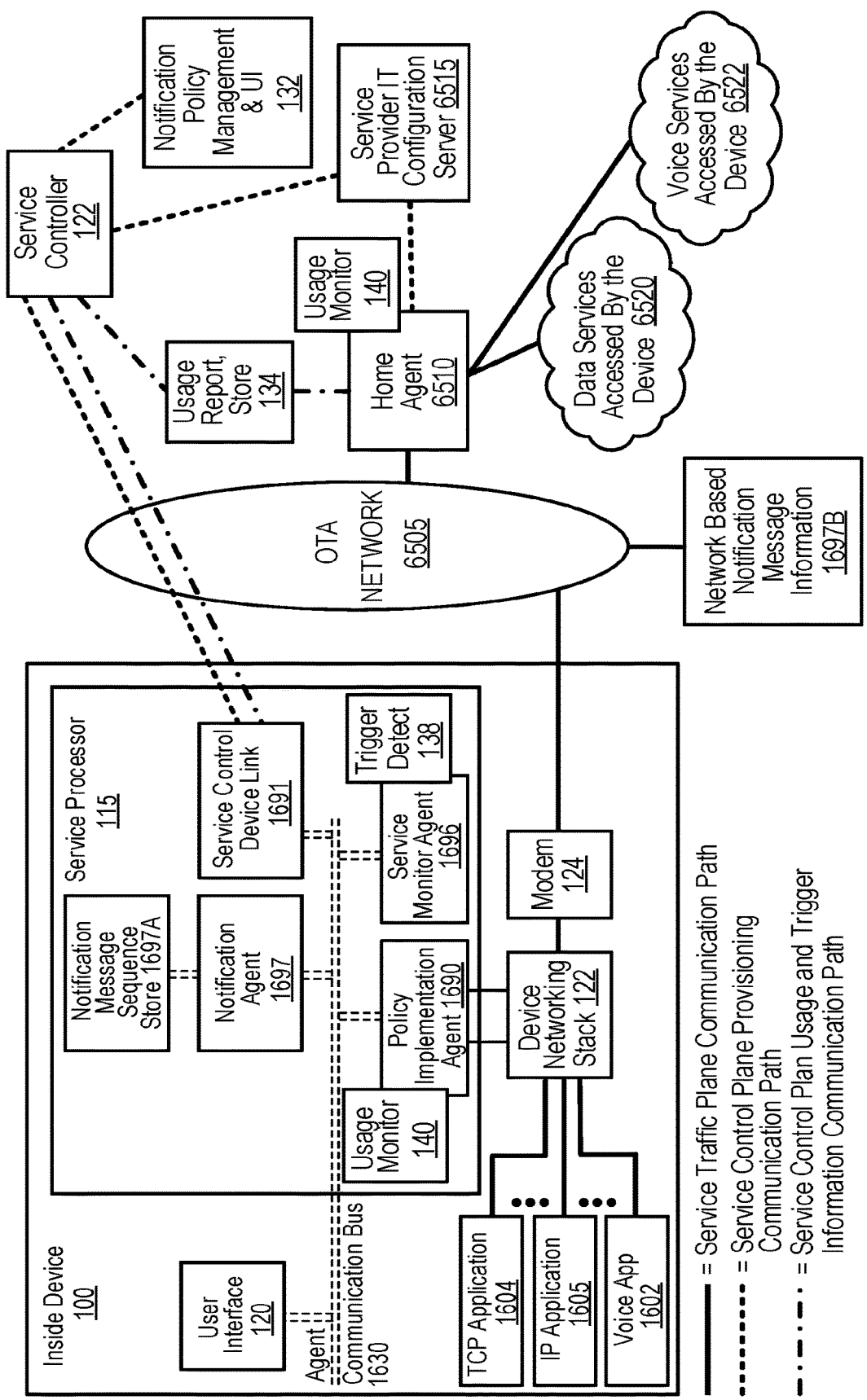
FIG. 2E is a functional diagram illustrating another network architecture for user notifications for device assisted services (DAS) in accordance with various embodiments of the systems and methods described herein.

FIG. 2E is a functional diagram illustrating another example network architecture for providing user notifications for device assisted services (DAS) in accordance with some embodiments. FIG. 2E is similar to FIG. 2D in functionality, except that in FIG. 2E, two Service Usage Monitor 140 functions are provided as shown. Provided are a network-based service-usage monitor on the Home Agent 6510 and a device-based service-usage monitor on the Policy Implementation Agent 1690. As described herein with respect to various embodiments, this approach accommodates service usage measurements on the device 100. Such measurements may accurately represent real-time or near real-time device service usage, and can have a service usage classification that is different from, and in some cases, better than or complimentary to the service usage classification that is available in the network. For example, application based service usage classification can be provided using device-based service-usage monitoring techniques. In some embodiments, the network-based service-usage measure is synchronized with the device-based service-usage measure as described herein with respect to various embodiments. In some embodiments, the network-based service-usage measure is used to secure the notification system as described herein with respect to various embodiments. In some embodiments, the device-based service-usage measure is verified using the network-based service-usage measure as described herein with respect to various embodiments.

In some embodiments, Service Processor 115 in communication with Service Controller 122 implements a hybrid device/network based user notifications for DAS as described herein. For example, certain user notifications for DAS functionality can be implemented using device based techniques as described herein and various other user notifications for DAS functionality can be implemented using network based techniques as described herein. In some embodiments, push techniques, pull techniques, and/or various combinations thereof as described herein are used to provide user notifications for DAS as described herein with respect to various embodiments. As an example, user notifications based on bulk service usage based on network-based service-usage monitoring performed by Home Agent 6510 that is used to periodically synchronize a local bulk service usage measure maintained on the mobile station 100, and the local bulk service usage measure can be used to provide user notifications based on bulk service usage. As another example, Service Processor 115 can supplement the local bulk service usage measure based on device-based service-usage monitoring in between periodic network based service usage synchronizations. As yet another example, local service usage measures are maintained for one or more services and/or applications as described herein with respect to various embodiments. As a further example, various user notifications (e.g., reporting network service usage, cost of network service usage, and/or new service plan/upgrade options) can be provided based on local bulk service usage measures and/or other local service usage measures as described herein with respect to various embodiments.

Figure 2F:
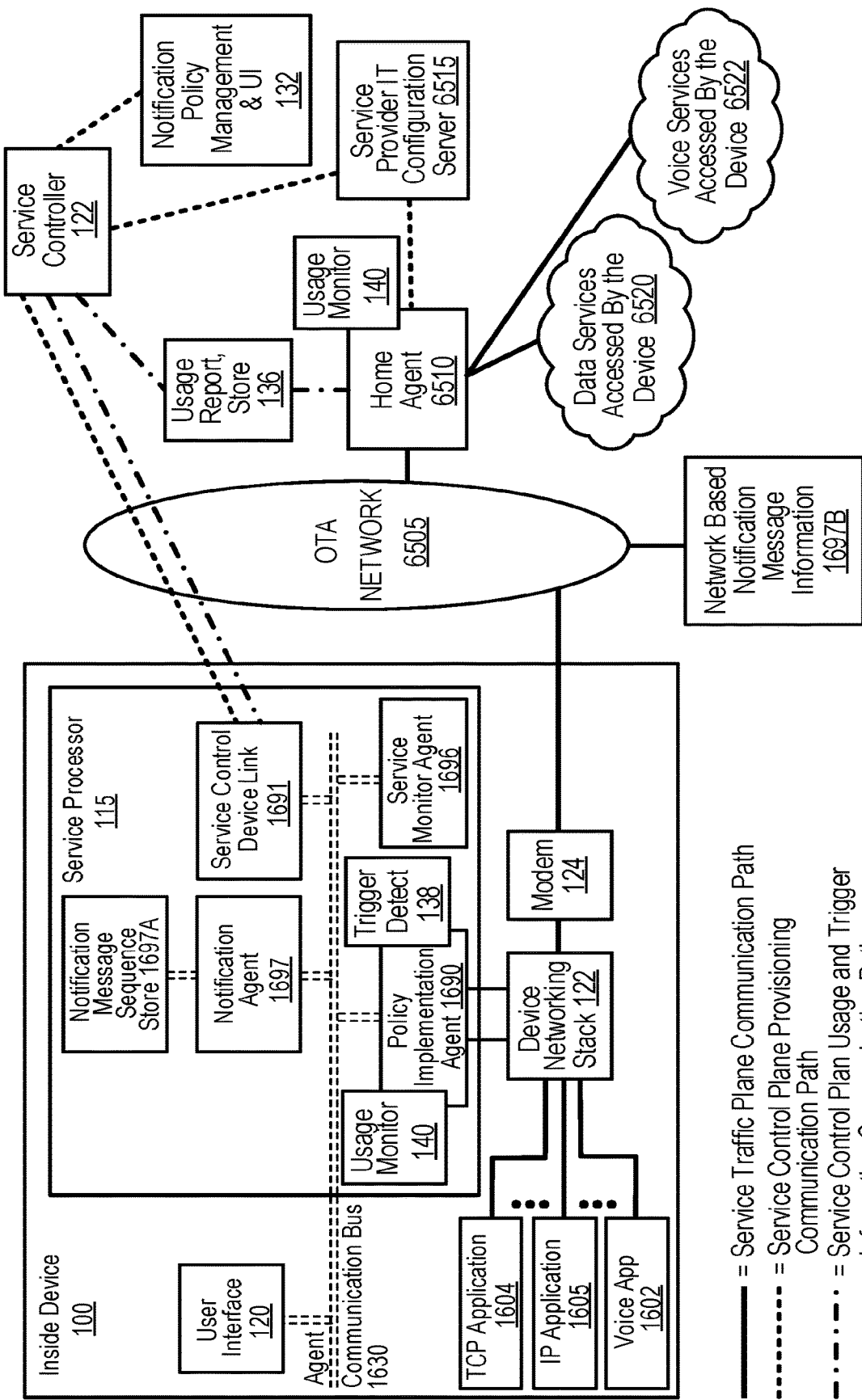
FIG. 2F is a functional diagram illustrating another network architecture for user notifications for device assisted services (DAS) in accordance with various embodiments of the systems and methods described herein.

FIG. 2F is a functional diagram illustrating another network architecture for providing user notifications for device assisted services (DAS) in accordance with some embodiments. FIG. 2F is similar to FIG. 2E in functionality, except that in FIG. 2F, the Trigger Event Detect 138 function is provided by the Policy Implementation Agent 1690 as shown.

In some embodiments, this approach provides a wider range of classification capabilities for service usage notification trigger event detection criteria that can in turn be used to generate a wider range of end user notification message sequences that have more detail about service usage or service activity policies. For example, service usage notification message sequences can be generated that include information about the service usage state, access service policy state, and/or service plan state for specific applications or network destinations.

As would be appreciated by one of ordinary skill in the art after reading this description, Trigger Event Detect 138 function can be implemented at any one location as shown in FIG. 1 and in FIGS. 2A-2G, and Trigger Event Detect 138 function can be implemented in any of a plurality of these locations as may be appropriate, necessary or desired to detect events at various network or device elements. Locating Trigger Event Detect 138 functionality at a network element may be implemented in such a way so as to allow analysis of information gathered by that element locally, without the need to transfer such information to another network location for trigger detection. However, in various embodiments, this information can be transferred to a single or to multiple other Trigger Event Detect 138 elements.

Figure 2G:
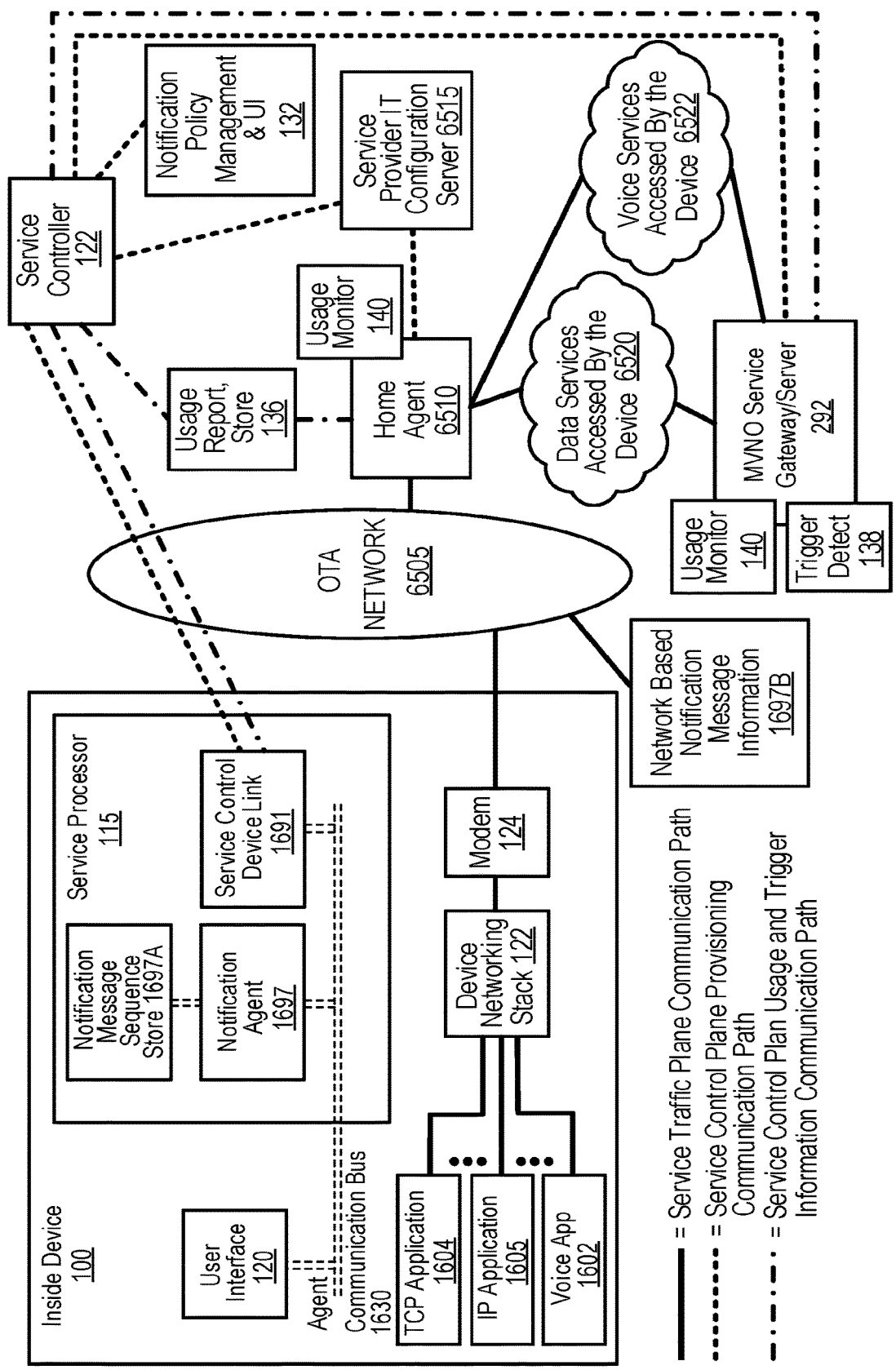
FIG. 2G is a functional diagram illustrating another network architecture for user notifications for device assisted services (DAS) in accordance with various embodiments of the systems and methods described herein.

FIG. 2G is a functional diagram illustrating a network architecture for an MVNO solution for providing user notifications for device assisted services (DAS) in accordance with some embodiments. As shown, a service Usage Monitor 140 function and a Trigger Event Detect 138 function that are in communication with Service Controller 122 are integrated into an MVNO network element, MVNO Service Gateway/Server 292, capable of monitoring device 100 service usage, identifying a service usage notification trigger event detection criteria, and creating a service usage notification trigger index or notification trigger message. In some embodiments, user notification for DAS operates in a similar manner to the previously described embodiments except that the service usage monitoring and notification triggering are implemented and, in some embodiments, managed in the MVNO network. In some embodiments, the second service Usage Monitor 140 function, shown at Home Agent 6510, is typically used for carrier service usage billing and/or reconciliation with the MVNO Usage Monitor 140 function reported service usage.

Figure 3:
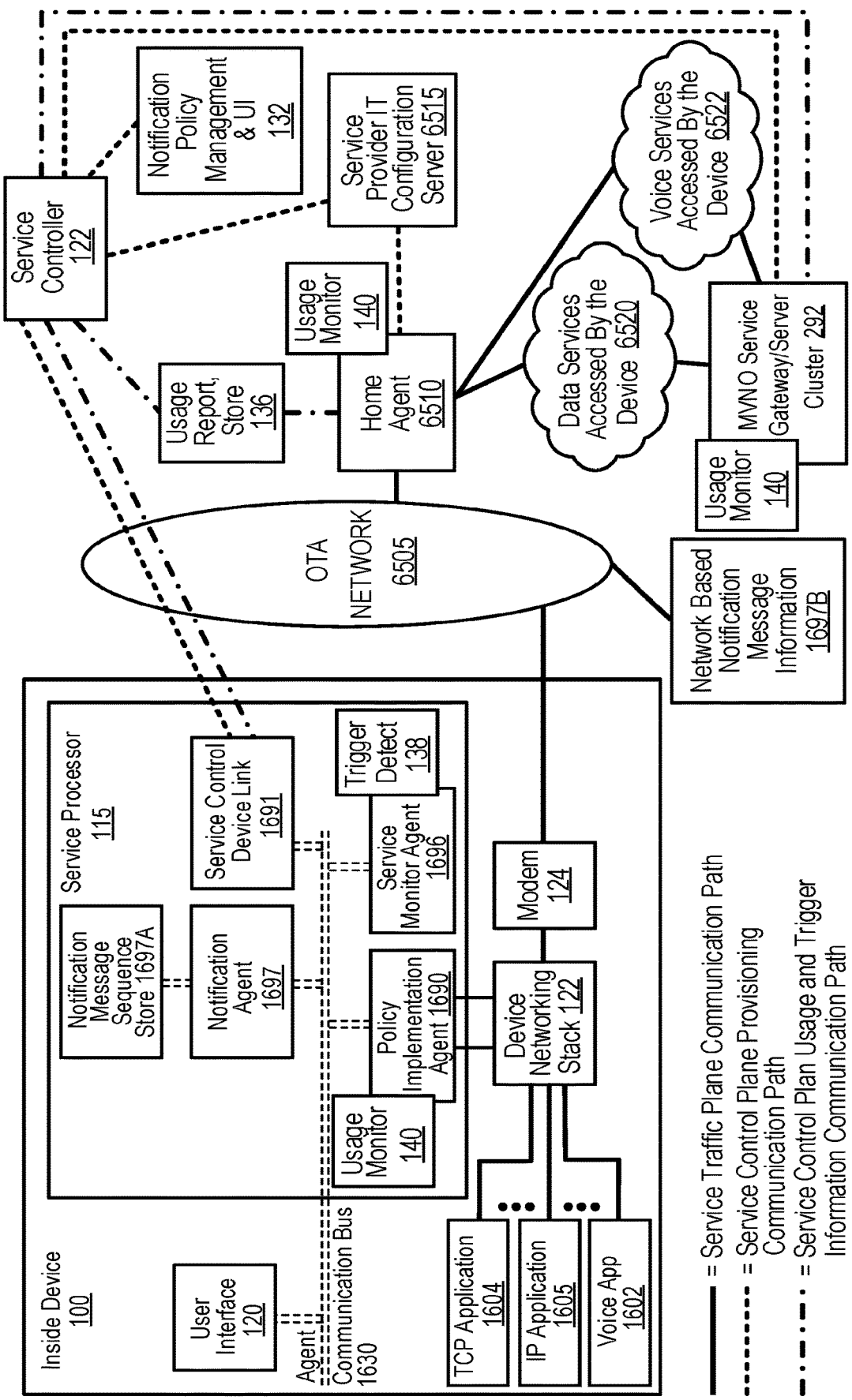
FIG. 3 is a functional diagram illustrating a network architecture for an MVNO platform for user notifications for device assisted services (DAS) in accordance with various embodiments of the systems and methods described herein.

FIG. 3 is a functional diagram illustrating another network architecture for an MVNO solution for providing user notifications for device assisted services (DAS) in accordance with some embodiments. As shown, an MVNO service notification system embodiment is provided that is similar in operation to the carrier service notification system embodiment shown in FIG. 2E.

Figure 4A:
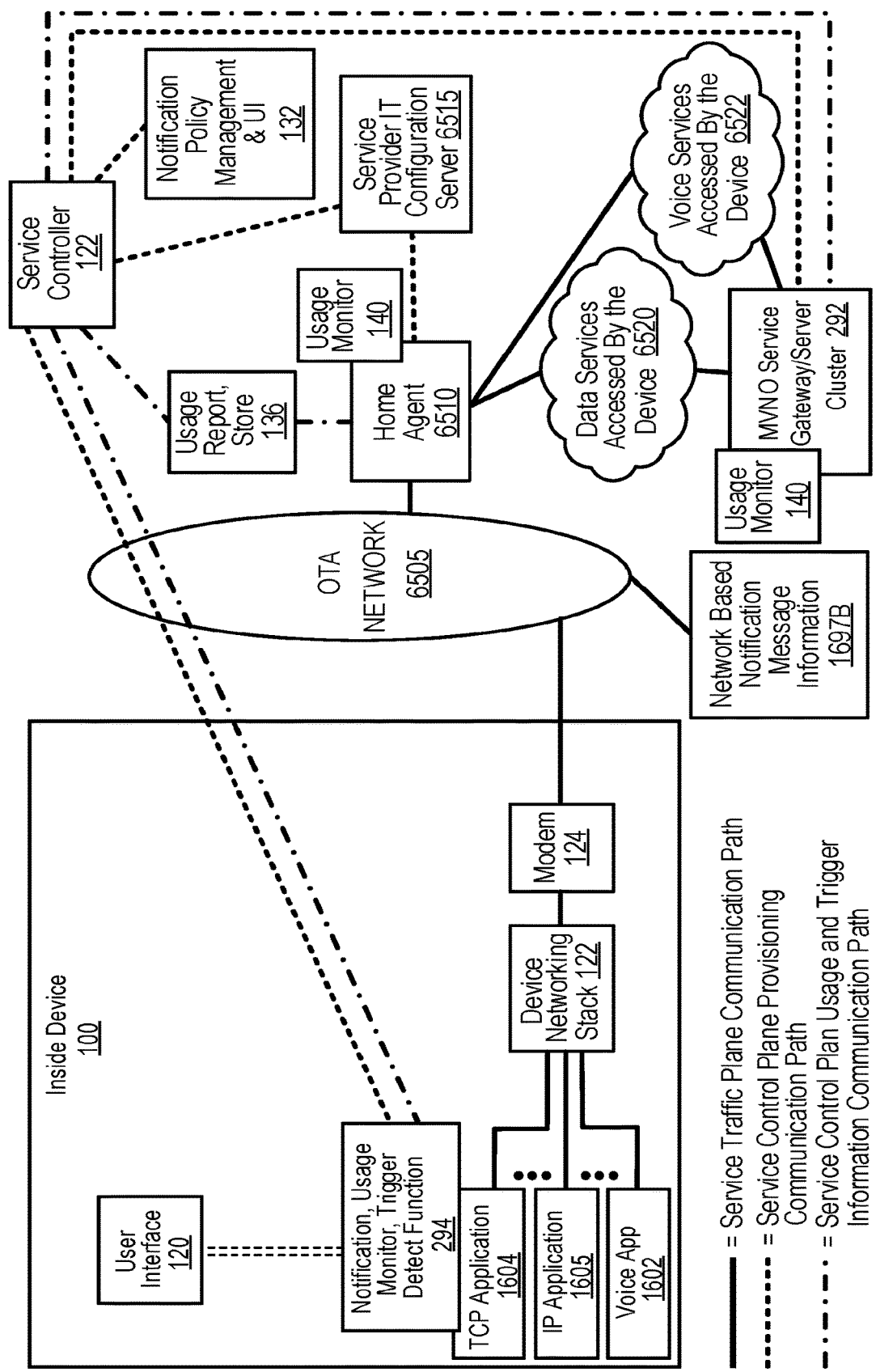
FIG. 4A is a functional diagram illustrating another network architecture for an MVNO platform for user notifications for device assisted services (DAS) in accordance with various embodiments of the systems and methods described herein.

FIG. 4A is a functional diagram illustrating another network architecture for an MVNO solution for providing user notifications for device assisted services (DAS) in accordance with some embodiments. As shown, an MVNO service notification system embodiment is provided in which the service processor functionality is directly integrated into an application. In some embodiments, the device-based service-usage monitor 140 function, the Trigger Event Detect 138 function, and the function of the Notification Agent 1697 are integrated into Application 1604 in the form of the Notification, Usage Monitor and Trigger Detect Function 294 as shown. In some embodiments, these application functions operate in the system in the same manner as their counterparts, Usage Monitor 140 function, the Trigger Event Detect 138 function, and Notification Agent 1697, which are located outside of the application in the various embodiments discussed herein. For example, by locating these functions in an application, an application developer can directly control service usage notification and service plan status notification for an application without needing to control service usage and service plan status notification for the entire device. In some embodiments, application based service plans are provided using this approach in which access network service is provided to one or more applications on a device that has different access service or service usage policies than other applications on the device.

Figure 4B:
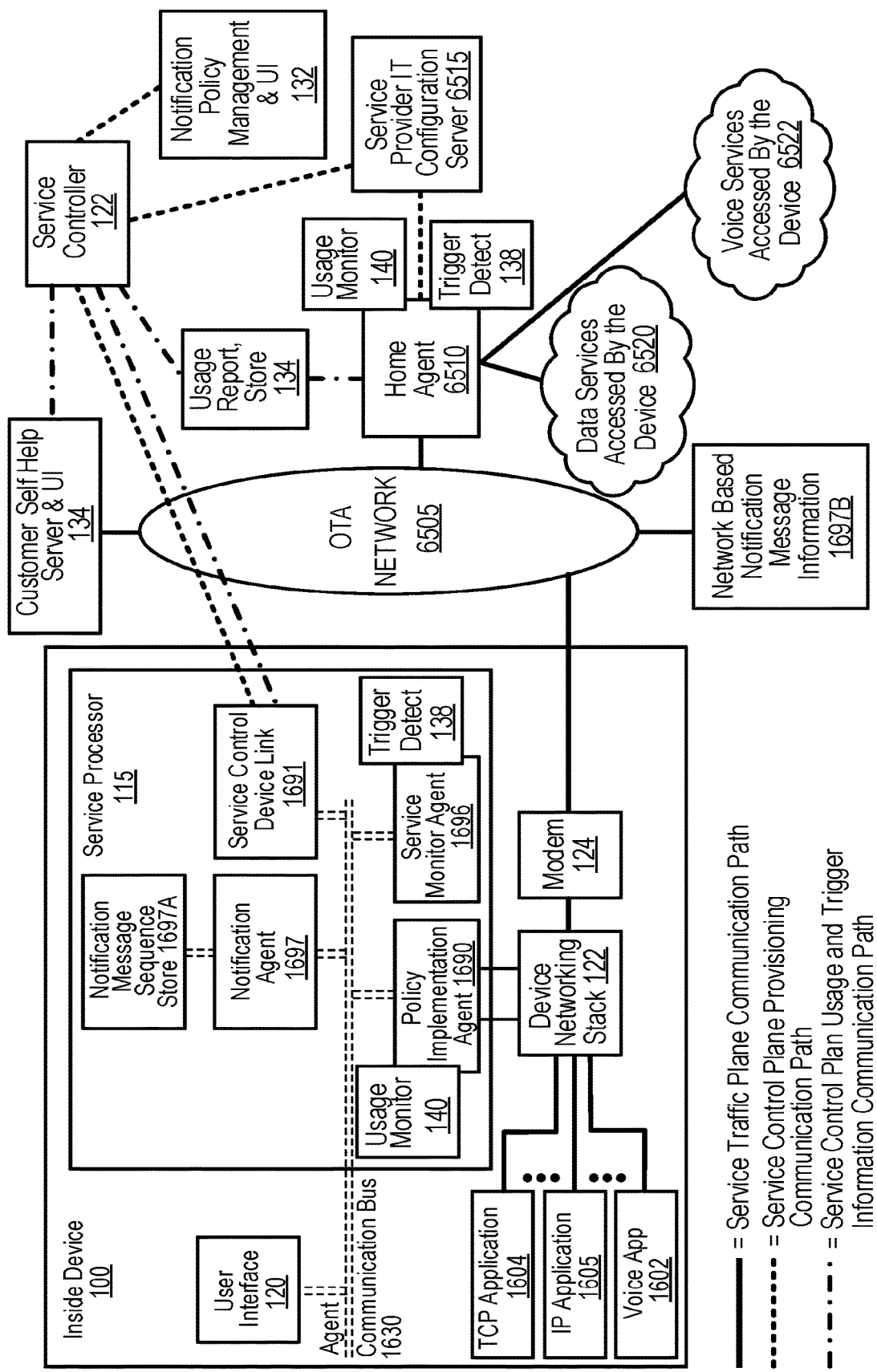
FIG. 4B is a functional diagram illustrating another network architecture for user notifications for device assisted services (DAS) in accordance with various embodiments of the systems and methods described herein that includes a Customer Self Help Server and User Interface.

FIG. 4B is a functional diagram illustrating another network architecture for user notifications for device assisted services (DAS) in accordance with some embodiments that includes a customer self help server and UI. FIG. 4B includes the Customer Self Help Server and UI 134 and both network and device locations for the Trigger Event Detect 138 (e.g., Trigger Detect 138) and Usage Monitor 140 as shown. In some embodiments, the Customer Self Help Server and UI 134 can upload self help information as shown and as described herein with respect to various embodiments.

Figure 4C:
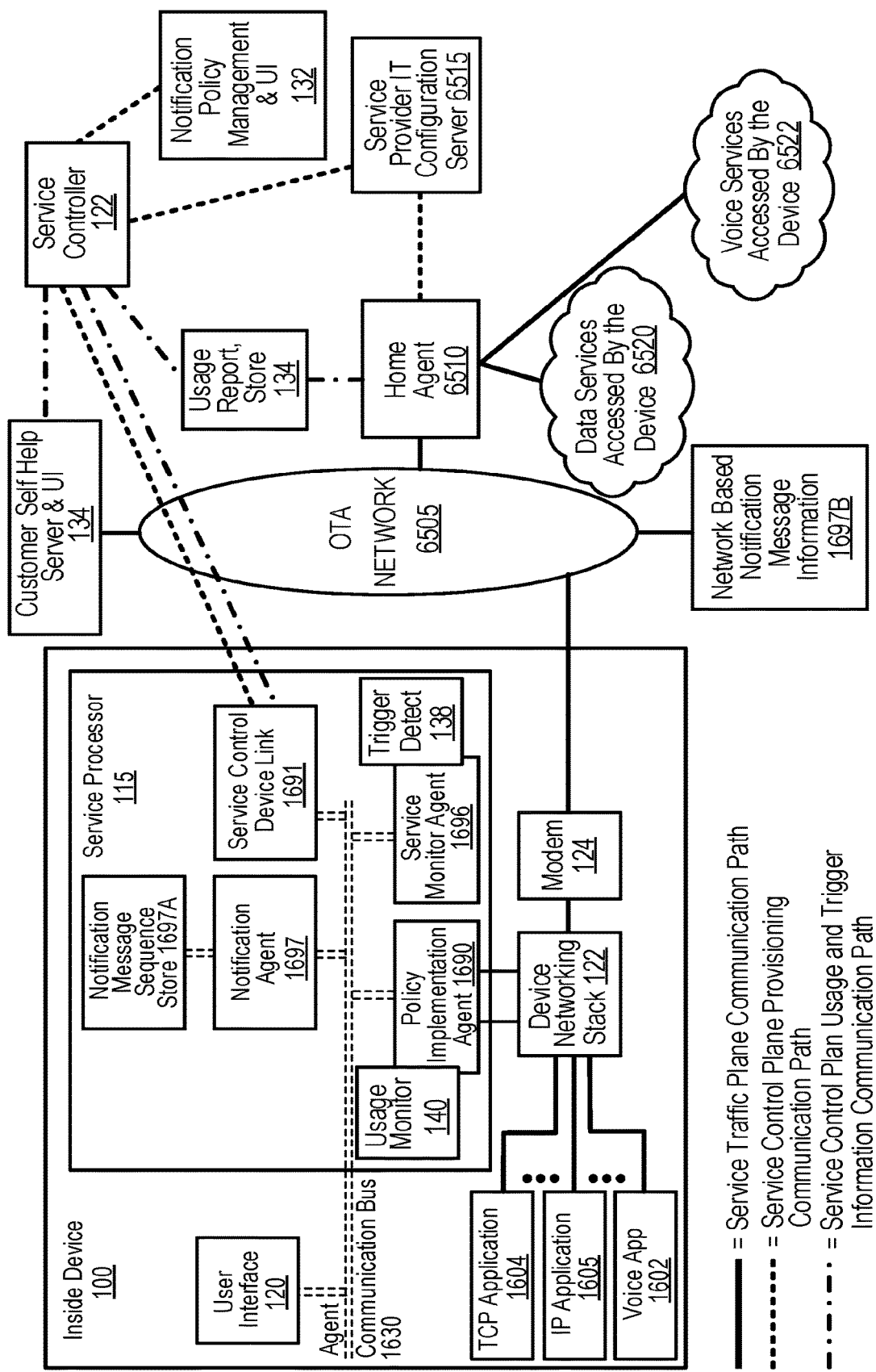
FIG. 4C is a functional diagram illustrating another network architecture for user notifications for device assisted services (DAS) in accordance with various embodiments of the systems and methods described herein that includes a Customer Self Help Server and User Interface.

FIG. 4C is a functional diagram illustrating another network architecture for user notifications for device assisted services (DAS) in accordance with some embodiments that includes a customer self help server and UI. FIG. 4C includes the Customer Self Help Server and UI 134 and network locations for the Trigger Event Detect 138 (Trigger Detect 138) and Usage Monitor 140 as shown. In some embodiments, the Customer Self Help Server and UI 134 can upload self help information as shown and as described herein with respect to various embodiments.

Figure 4D:
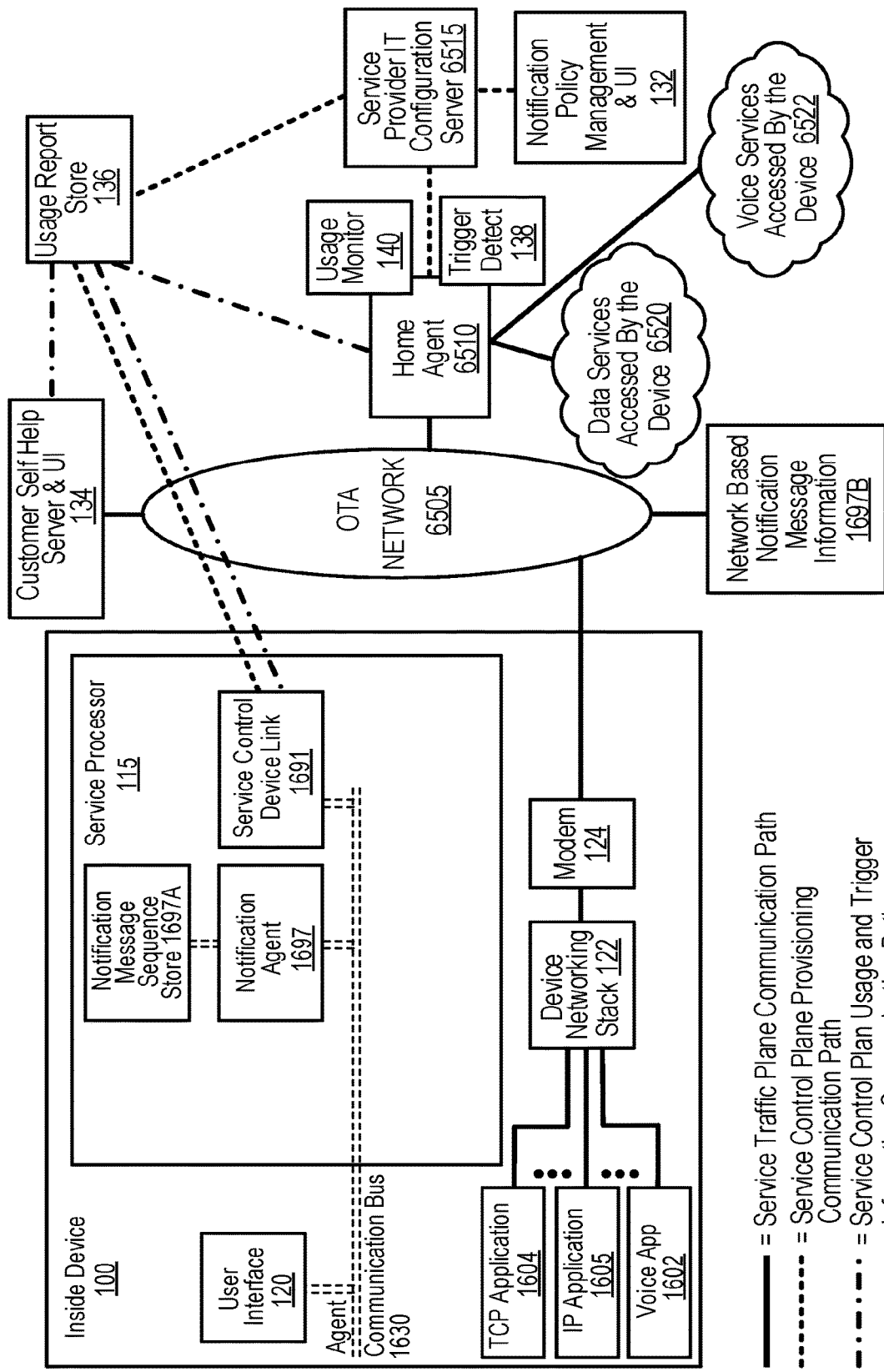
FIG. 4D is a functional diagram illustrating another network architecture for user notifications for device assisted services (DAS) in accordance with various embodiments of the systems and methods described herein that includes a Customer Self Help Server and User Interface.

FIG. 4D is a functional diagram illustrating another network architecture for user notifications for device assisted services (DAS) in accordance with some embodiments that includes a customer self help server and UI. FIG. 4D includes the Customer Self Help Server and UI 134 and device locations for the Trigger Event Detect 138 (Trigger Detect 138) and Usage Monitor 140 as shown. In some embodiments, the Customer Self Help Server and UI 134 can upload self help information as shown and as described herein with respect to various embodiments.

As will now be apparent to one of ordinary skill in the art in view of the various embodiments described herein, various user notification message sequences can be initiated by using a notification trigger index to look up a pre-stored set of message sequence information. In some embodiments, the user notification generates one or more user notification messages, sequences of messages, and/or messages requiring user input and/or confirmation (e.g., user acknowledgement of receipt of the user notification message and/or user approval to proceed with a certain service usage activity based on a notification of cost and/or service usage implications).

In some embodiments, as similarly described herein with respect to various embodiments, a complete user notification message sequence is initiated by using the notification trigger index to look up a pre-stored set of message sequence information. The sequence can optionally be initiated with additional information or additional formatting added by the device, such as by the notification agent 1697. Examples of this include adding a UI background bitmap that is common to multiple notification message sequences, formatting the message for the intended user interface 102, combining the pre-stored information with information included in the notification trigger message (e.g., usage count update, service plan usage condition or status, specific service usage activity information, and/or other service usage/condition/event/other information). The addition of this information, where appropriate, forms a complete notification message sequence. For example, the notification trigger index can include various additional notification information to be included with a notification message. This can include, for example, information such as a warning message, a summary of the service usage that is outside of the service plan (e.g., usage count update, service plan usage condition or status), an offer to purchase additional allocations, and/or an offer for alternative service plan options. As will now be apparent to one of ordinary skill in the art in view of the various embodiments described herein, various user notification message sequences can be initiated by using the notification trigger index to look up a pre-stored set of message sequence information and optionally combining the pre-stored information with information included in or referenced by the notification trigger message.

In some embodiments, a complete user notification message is generated, initiated or managed using the notification trigger index or trigger message information as a reference based on information stored on or gathered from a network element. The trigger can be generated by a network element such as service controller 122, trigger event detect 138, usage monitors 130, 140, or other network element. Alternatively, the trigger or threshold information can be maintained locally on device 100, and device 100 can generate the notification trigger index or trigger message information.

For example, a notification can be generated by pulling down a particular set of message sequence information from a server or initiating/redirecting a user to a particular portal or website message sequence, such as a series of web pages with options. As a further example, a local device stored notification message sequence managed by a notification agent can be instructed by a notification trigger index or notification trigger message to branch out and request or pull information from a network element such as a portal, website, and/or download server to add to the notification message.

In some embodiments, the amount of information included in the notification message sequence obtained from the network element is kept to a minimum or minimized to conserve network bandwidth and other resources, and to improve notification response speed. In some embodiments, notification messages do not include any additional information from the network. In still other embodiments, larger amounts of information to be included in the notifications are provided by the network elements. In still further embodiments, the entire notification message is provided by network elements, with no message content coming from a local store on device 100. In each of the above-described embodiments, the notification messages may be triggered by a local event or by a network event.

In some embodiments, the notification message sequence provides the user with one or more of the following notification information set types and/or action option types.

The message sequence may inform the user of a usage amount for bulk (e.g., open access) usage. This usage can be to-date cumulative usage for a billing-cycle, for device lifetime, or for any other defined period. This usage information can also show usage relative to a service plan limit, whether over or under. The message sequence may inform the user of a usage amount for a detailed service usage classification that is other than bulk. Historic usage data can also be tracked and maintained such that message sequences can inform the user of historic usage, including on a service-by-service basis and for a given time period.

The message sequence may inform the user of a usage activity that is either not allowed by the current service plan policy configuration or is traffic controlled under the current service plan policy configuration. The message sequence may inform the user of the reason that a service usage activity is either allowed, not allowed or is traffic controlled under the current service plan policy configuration;

The message sequence may inform the user of the reason that a service usage activity is either allowed, not allowed or is traffic controlled under the current service plan policy configuration including for example service policies that are dependent on classification of service usage activity, time of day, network congestion state, network type, roaming versus home network connection, QoS level or QoS availability.

The message sequence may inform the user of the service usage velocity or rate as compared to a service plan limit, and may further provide projections regarding whether usage at current rates will exceed or under-exceed plan limits, and if so, by how much. It may also provide the user with an indication of the relative fit for the service plan for a service usage velocity, rate or pattern;

The message sequence may inform the user of options to extend the service, buy additional allocations, swap under-utilized with over-utilized allocations, reallocate service allocations among users in shared account plans, change service plans or otherwise modify the current allocations. Likewise, the message sequence may inform when network access is being attempted but is not available, and provide the user with an option to select a service plan for an available network or provide the user with other options to modify current allocations.

The message sequence may detect service usage patterns and provide the user with a service plan option that is suited for the service usage pattern. The pattern detection and analysis can be for a current billing cycle, or based on historic data.

The message sequence may indicate when a service plan may be better suited for a given usage rate or service activity type as compared to the current service plan; and may accept user input on reconfiguring a service plan or changing a service plan. The message sequence may also accept user input on selecting an initial service plan.

The message sequence may inform a user of a device that belongs to a user group or device group usage plan (i.e., a shared access group) that a certain aggregate usage amount has been reached for the device group or user group or for one or more users in the group; inform a user of a device that belongs to a user group or device group usage plan that a specific set of service usage activities for a given device or user that belongs to the group service plan have occurred; and provide a group manager with the opportunity to extend the service, buy additional allocations, swap under-utilized with over-utilized allocations, reallocate service allocations among users in the group, change service plans or otherwise modify the current allocations.

The message sequence may accept user input to identify the service usage activities for notification message actions. The message sequence may inform the user regarding or prompt for information regarding various other notification information set types and/or action option types as will now be apparent to one of ordinary skill in the art in view of the various embodiments described herein.

In some embodiments, the notification message sequence provides the user with one or more of the following notification information sets and/or user action options. The message sequence may inform the user that a service usage amount or service usage level has been reached. The usage or level that triggers notification can be the maximum allocation for a given service or it can be an intermediate or threshold level that is less than a service plan service usage limit. This can include, for example, notifying the user when a certain percentage of the allocation has been reached. This can include, as another example, notifying the user when the usage rate is running at a rate higher than average or a rate that, if continued, will consume the allocation before the end of the allocation cycle. As yet another example, this can include notifying a user when one or more users in a shared user group are consuming the allocation at a rate that will consume the allocation before the end of the allocation cycle, or at a rate higher than the average rate for the other users, or otherwise exceeding a nominal consumption rate.

Notifying the user when an intermediate level is reached can allow the system to provide the user with advanced notification such that action can be taken, if desired, to alter the allocation or alter usage before the service is cut off. Accordingly, in some embodiments, the message sequence may further provide the user with options where an intermediate service usage amount or level that is reached and provide user with alternatives to modify service plan policy configuration, purchase additional allocations, or alternatives to change service plans or allocations.

In some embodiments, the message sequence may inform the user that a service usage amount or service usage level that is more than a service plan service usage limit has been reached. This message sequence can also inform the user of (i) an overage acknowledgement message, (ii) alternatives to modify service plan policy configuration, or (iii) alternatives to change service plan.

The message sequence may inform the user that a level of service usage rate has been reached. For example, such a message sequence can inform the user that service usage rate is relatively high or relatively low compared to a service plan usage rate limit. The message sequence may also provide user with (i) a high velocity acknowledgement message, (ii) alternatives to modify service plan policy configuration, or (iii) alternatives to change service plan; inform the user that a service usage activity is attempting to receive or has received service and is not supported by the current service usage plan policies.

The message sequence may inform the user that a service usage activity is attempting to receive or has received service and is not supported by the current service usage plan policies (e.g., associated service plan). This may be accomplished with (i) an acknowledgement message, (ii) alternatives to modify service plan policy configuration, or (iii) alternatives to change service plan; inform the user that a service usage activity that is not supported by the current service usage plan policies has been blocked.

The message sequence may inform the user that a service usage activity that is not supported by the current service usage plan policies has been blocked and may optionally provide user with (i) an acknowledgement message, (ii) alternatives to modify service plan policy configuration, or (iii) alternatives to change service plan in order to allow the service usage by the activity.

The message sequence may inform the user that an application or group of applications are attempting to use service or have reached a pre-determined level of service usage, and optionally provide the user with (i) an acknowledgement message, (ii) alternatives to modify service plan policy configuration, or (iii) alternatives to change service plan.

The message sequence may inform the user that an application or group of applications have been blocked, allowed or placed on traffic controlled access (e.g., throttled, backgrounded, provided with QoS) under the current service plan policies and also inform regarding deviations of such policies by the applications. The message sequence may provide information to the user explaining why the access has been blocked allowed or placed on traffic controlled access. The message sequence may also inform the user with (i) an acknowledgement message, (ii) alternatives to modify service plan policy configuration to over-ride the access controls, or (iii) alternatives to change service plan in order to allow the service usage by the activity.

The message sequence may inform the user that an application or group of applications are attempting to use service or have reached a pre-determined level of service usage or service usage rate. The message sequence may also inform the user that the application or group of applications typically exhibit usage behavior that is relatively high with respect to service plan limits. With regard to these notifications, the message sequence may also provide user with (i) an acknowledgement message, (ii) alternatives to modify service plan policy configuration, or (iii) alternatives to change service plan.

The message sequence may inform the user that a service usage activity is attempting to communicate with, is communicating with or has communicated with a specified network destination or group of specified destinations. The message sequence may also inform the user that a service usage activity is attempting to communicate with, is communicating with or has communicated with a specified network destination or group of specified destinations that have been blocked, allowed, or placed on traffic controlled access. In such embodiments, the message sequence may also provide information to the user explaining why the access has been blocked or placed on traffic controlled access. In such embodiments, the message sequence may also inform provide the user with (i) an acknowledgement message, (ii) alternatives to modify service plan policy configuration to over-ride the access controls, or (iii) alternatives to change service plan in order to allow the service usage by the activity.

The message sequence may inform the user that a service usage activity that communicates with a specified network destination or group of specified network destinations has reached a pre-determined level of service usage or service usage rate. In such embodiments, the message sequence may also inform the user that service usage activities communicating with the specified network destinations typically exhibit usage behavior that is relatively high with respect to service plan limits, or has reached a pre-determined level of service usage or service usage rate. In such embodiments, the message sequence may also inform the user with (i) an acknowledgement message, (ii) alternatives to modify service plan policy configuration, or (iii) alternatives to change service plan;

The message sequence may inform the user that a service usage activity is attempting to communicate with or has communicated with the network, and further inform the user that there is an alternative service plan or network that is better configured to support the activity. Examples of an alternative network can include a 2G, 3G, 4G or WiFi network that is available to support the service activity. The message sequence may also inform the user that a service usage activity is attempting to communicate with or has communicated with the network, and further inform the user that an alternative network is available that is better able to support the activity, and under the current service usage plan policies the service usage activities have been blocked, allowed, or have been placed on traffic controlled access. In such embodiments, the message sequence may also inform the user with (i) an acknowledgement message, (ii) alternatives to modify service plan policy configuration, or (iii) alternatives to change service plan; inform the user that a service usage activity or group of services usage activities are attempting to use service or have used service during a specified time of day, during a time that the network is experiencing a specified level of congestion, or during a time that the network is experiencing a specified level of performance or availability The message sequence may inform the user that a service usage activity or group of services usage activities are attempting to use service, are using a service or have used service during or at a specified time. Such a specified time can be, for example, a time of day; a day or other time period in a given cycle; a time during which the network is experiencing a specified level of congestion; or a time during which the network is experiencing a specified level of performance or availability. Such a specified time can occur where, under the current service usage plan policies, the service usage activities have been blocked, allowed or have been placed on traffic controlled access. In such embodiments, the message sequence may also inform the user with (i) an acknowledgement message, (ii) alternatives to modify service plan policy configuration, or (iii) alternatives to change service plan;

The message sequence may inform the user that a service usage activity or group of services usage activities are using, are attempting to use or have used a service with a specified QoS level, and may further inform the user that under current network service plan policies the QoS level is not available or is available. In such embodiments, the message sequence may also inform provide the user with (i) an option to accept QoS service and/or QoS service charges, (ii) alternatives to modify service plan QoS policy configuration, or (iii) alternatives to change QoS service plan.

The message sequence may inform the user that a service usage activity or group of services usage activities are using, attempting to use or have used a service involving connection to a roaming network, or have reached a specified level of service usage involving a connection to a roaming network. In such embodiments, the message sequence may also inform the user with information about the service usage charges, service access policies or service access performance of one or more of the networks.

The message sequence may inform the user that service usage is possible via one or more roaming networks, and provide the user with an option to connect to a roaming network. In such embodiments, the message sequence may also inform provide the user with (i) an option to accept the roaming option and/or roaming service charges, (ii) alternatives to modify service plan configuration, or (iii) alternatives to change the service plan, for example, to avoid roaming or to allow roaming.

The message sequence may further inform the user that a service usage activity that attempts to communicate with an unauthorized network or network destination that is not allowed due to security policies; inform the user that a given level of aggregate usage has occurred on a family plan device group; inform the user that a given level of aggregate usage has occurred on a multi-device plan; inform a parent in a family plan that a specific set of service usage activities for a given device or user that belongs to the group service plan have occurred, in which the device group parent has identified the service usage activities for notification message actions; inform an administrator for an enterprise device group that a specific set of service usage activities for a given device or user that belongs to the group service plan have occurred, in which the administrator has identified the service usage activities for notification message actions; and various other notification information sets and/or user action options as will now be apparent to one of ordinary skill in the art in view of the various embodiments described herein.

In some embodiments, user notifications for DAS include providing various marketing interceptors. In some embodiments, market interceptors include various user notifications (e.g., user notification messages or user notification message sequences) that include offers for services, service plan upgrades or new service plans, or various forms of marketing or advertising information. For example, market interceptors can provide effective up sell and marketing opportunities for service providers (e.g., mobile services/cellular carriers) to market services in devices that may start out with minimal or lower cost service plan limits or only have sponsored services. As described herein with respect to various embodiments, user notification messages/message sequences can include various types of market interceptors (e.g., offer to upgrade a service plan or add a new service plan option). For example, when a service usage attempt is detected that is not supported by a current associated service plan, a notification trigger event can be programmed to provide a user notification message sequence that offers a new service plan or a different service plan to the user.

In some embodiments for architectures such as those described above, service provider IT/configuration server 6515 provisions Home Agent 6510 or Gateways 410, 420 to monitor device 100 based on the service plan associated with device 100 (e.g., to monitor network service usage and report, such as to push real-time reporting (RTR) of usage and/or notification events, based on the monitored network service usage and/or events/thresholds, such as configured reporting events or policies for user notifications) to service provider IT/configuration server 6515. In some embodiments, push techniques, pull techniques, and/or various combinations thereof as described herein are used to provide user notifications for DAS as described herein with respect to various embodiments. In some embodiments, if device 100 is associated with a service plan that is a family plan and/or other shared account plan (e.g., a corporate, family or other shared account plan), account aggregation is performed by service provider IT/configuration server 6515 and usage count or other event notifications are pushed and/or pulled to service processor 115. For example, service usage synchronization can include an updated/current service usage for each user associated with a multi-user/shared account service plan, such as a family plan or corporate plan.

Accordingly, in some embodiments, a network service usage monitoring element, such as an Home Agent 6510 or Home Agent 6510 in conjunction with an IT/configuration server, is used for service usage monitoring; in which the service usage monitoring is communicated to the device service usage notification agent; the service usage notification agent is programmed to detect a pre-determined service usage notification trigger; in which the notification trigger is based on the occurrence of a service usage condition, the occurrence of a service usage event or the occurrence of a service usage pattern; in which the device service usage notification agent has a pre-defined association of the notification trigger with a pre-determined notification trigger index or notification trigger message; in which trigger index is an identifier or a message that references a pre-determined service usage notification sequence stored on a device storage system or contains service usage notification information that will be combined with a pre-determined service usage notification sequence stored on a device storage system; the device notification agent is pre-configured on the device to include pre-determined notification sequence information, in which the notification sequence information corresponds to ether (i) a notification trigger index in which the local notification sequence information includes all the information that is to be displayed to a UI, or (ii) a notification trigger message in which a portion of the information that is to be displayed to a UI is included in the local notification message sequence information and a portion of the information that is to be displayed to a UI is included in the notification index message; and the notification agent displays the notification sequence information on the device UI.

Figure 5:
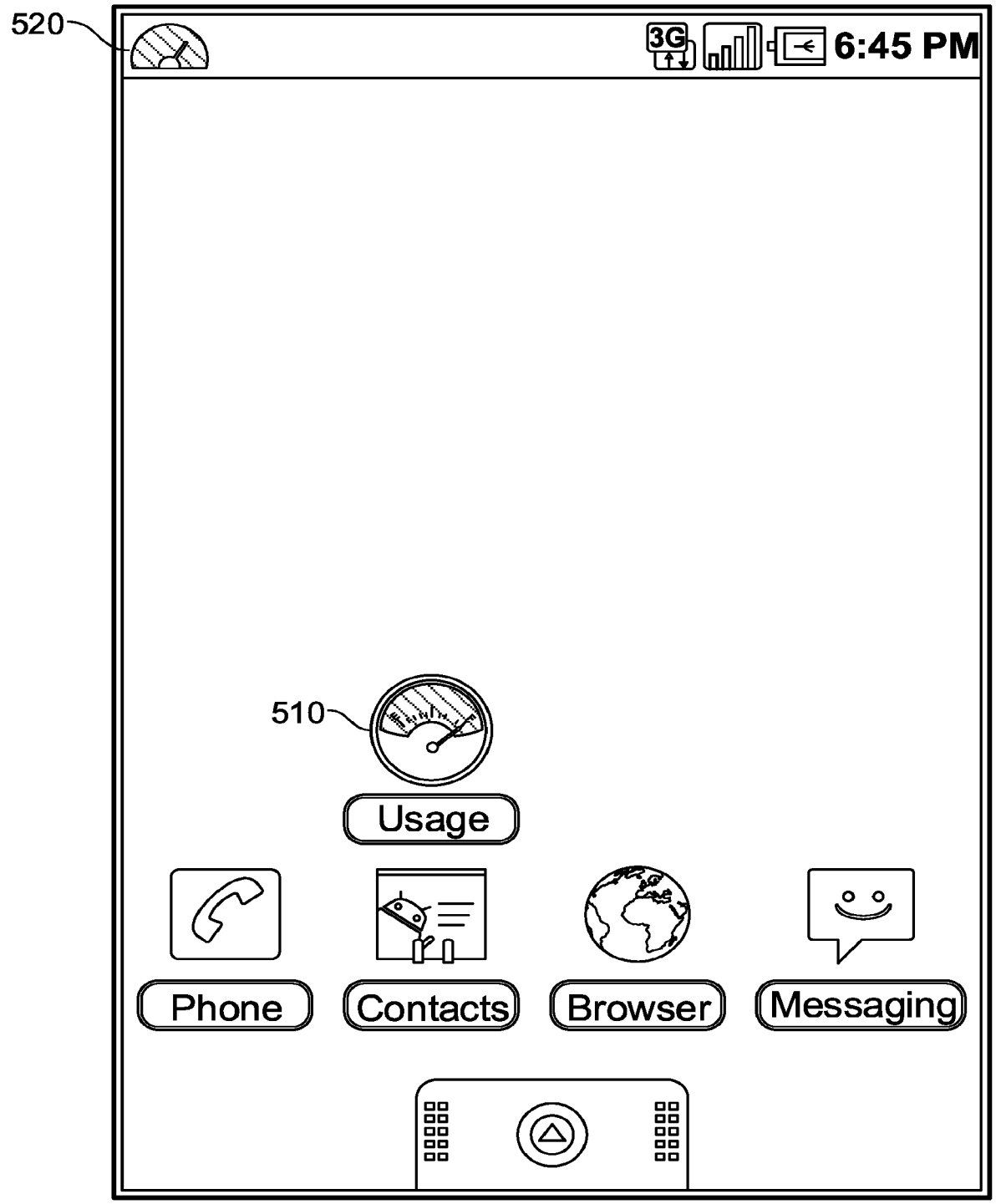
FIG. 5 is a functional diagram illustrating a user interface for user notifications for device assisted services (DAS) in accordance with various embodiments of the systems and methods described herein.

FIG. 5 is a functional diagram illustrating an example of a user interface for user notifications for device assisted services (DAS) in accordance with some embodiments. As shown, a user interface (UI), such as UI 120 for mobile station 100, includes a usage icon 510 on an application/utility portion of a primary or default UI screen 500. The UI also includes a usage gauge 520, as well as other customary UI icons, such as application icons and status bar icons. In the illustrated example, usage gauge 520 is shown as being displayed in a status bar of the primary or default UI screen 500. In various embodiments, the status bar can appear on other UI screens in addition to the primary or default UI screen 500, such as a secondary screen that includes icons for additional folders, utilities, and/or applications installed/available on mobile station 100.

In some embodiments, the usage gauge 520 provides an indication of the allocation remaining for an associated service plan (e.g., the subscriber's data plan). For example, the usage gauge can include a display of the data consumed and/or data remaining for an associated service plan. Likewise, multiple gauges can be provided for multiple services or service types, depending on the plan and plan limits. In the examples illustrated in FIG. 5, usage icon 510 and usage gauge 520 are depictions of an analog gauge similar in appearance to a fuel gauge. As will be apparent to one of ordinary skill in the art after reading this description, any of a number of representations can be utilized to depict usage in usage icon 510 or usage gauge 520. For example, other gauge depictions can be used, as can other symbols such as bar graphs, numeric indicators, textual displays, color-coded images, and the like. As another example, icon 510 and gauge 520 can be configured to show the cost associated with a given consumption. For example, when the user has consumed a specified allocation and is operating on a pay-as-you-go basis, the icons can be configured to show the cost of his or her consumption. The cost can be shown, for example, is a real-time per use cost, as accumulative cost, as the cost projection to the end of the billing cycle, or other like cost depiction. It will be apparent to one of ordinary skill in the art after reading this description that any of a number of different icon or display formats can be used to provide the information provided by icon 510 and gauge 520.

In some embodiments, gauge 520 and icon 510 can be configured to show either the amount of the allocation remaining in a current allocation cycle, the amount of the allocation consumed in a current allocation cycle or both. Gauges 520 and icons 510 can also be included to show information about the allocations for multiple services or for time periods in addition to or other than a current allocation cycle.

As noted above, in some embodiments, the gauge or icon can provide a display including a color coded indication of the data remaining based on current service usage and the associated service plan (e.g., cap on data usage, such as based on bulk service usage and/or specific or itemized service usage by type of service). For example, a green colored usage gauge 520 can indicate 50% to 100% of data remaining under the associated service plan, a yellow colored usage gauge 520 can indicate 25% to 50% of data remaining under the associated service plan, an orange colored usage gauge 520 can indicate 5% to 25% of data remaining under the associated service plan, and a red colored usage gauge 520 can indicate 0% to 5% of data remaining under the associated service plan. As another example, a green colored usage gauge 520 can indicate 50% to 100% of data remaining under the associated service plan, a yellow colored usage gauge 520 can indicate 10% to 50% of data remaining under the associated service plan, and a red colored usage gauge 520 can indicate 0% to 10% of data remaining under the associated service plan. As will now be apparent to one of ordinary skill in the art, various other color or other schemes can be used to provide status user indications based on service usage as described herein.

In some embodiments, usage icon 510 and gauge 520 provide a real-time and accurate service usage implemented using various techniques as described herein (e.g., device based, network based, and/or hybrid based service usage count techniques). For example, in the embodiments described above with respect to FIGS. 1, 2A-2G, 3, and 4A-4D, consumption data gathered by network elements or the device can be used to provide the data for usage icon 510 and gauge 520. This information can be collected and displayed in real-time or near-real-time to provide a current indication to the user of consumption and/or remaining allocation. Also in accordance with the embodiments described above, notification events or trigger events can also be used to trigger the provision of information to the user interface 122 update icon 510 and gauge 524 to provide additional information to be displayed as part of or in addition to icon 510 and gauge 520. For example, notification events and trigger events can be used to retrieve a message sequence from store 1697A to be displayed on the user interface in addition to icon 510 and gauge 520. As another example, a notification event or trigger event may be used to update the status indicated by the icon 510 or gauge 520 or to change its color, to cause it to flash, or to otherwise provide additional indication. In still further embodiments, a notification event or trigger event may be used to cause icon 510 or gauge 522 appear on the user screen. Trigger events and notification events may also be used to provide other types of notification to the user such as, for example, audible, tactile, or textual notifications.

In some embodiments, usage icon 510 is an icon for an operating system function or utility/function bundled or integrated with the operating system (e.g., the operating system installed/preloaded or installed on mobile station 100). In some embodiments, usage icon 510 is an icon for a standalone usage application (e.g., an application that executes on an operating system of mobile station 100, such as an Android operating system, an Apple iPhone operating system, a Microsoft mobile operating system, an HP/Palm operating system, a Blackberry operating system, a Symbian operating system, and/or any other operating system or platform) that provides subscriber real-time data usage information for mobile station 100 and/or for an associated shared account as described herein.

In some embodiments, the usage application or utility/function is pre-installed/preloaded on mobile station 100. In some embodiments, the usage application or utility/function is downloaded (e.g., pushed from a service provider/OEM or another entity and/or pulled by a user, such as via an application market place or application store for purchasing and downloading applications) and installed on mobile station 100 after mobile station 100 has been provisioned and/or is installed at a retail distribution of the service provider pursuant to an initial provisioning and setup of mobile station 100 for a user of mobile station 100 (e.g., for a particular service provider network and associated service plan). In some embodiments, the usage application or utility/function is stored and/or executed in a secure partition (e.g., system partition of the operating system and/or a secure hardware partition of the CPU and/or memory and/or storage of mobile station 100). For example, the usage application can be installed in the system partition to prevent a user from uninstalling the usage application and/or otherwise disabling or compromising the usage application. In some embodiments, updates can be automatically provided to update the usage application or utility/function (e.g., using application updates delivered through an application market place/store to deliver enhancements, software/other fixes, and/or upgrade the usage application to support new operating system updates/versions). In some embodiments, usage icons and/or gauges can be selected by the user, customized by the user, or created by the user to his or her own preferences.

Figure 6:
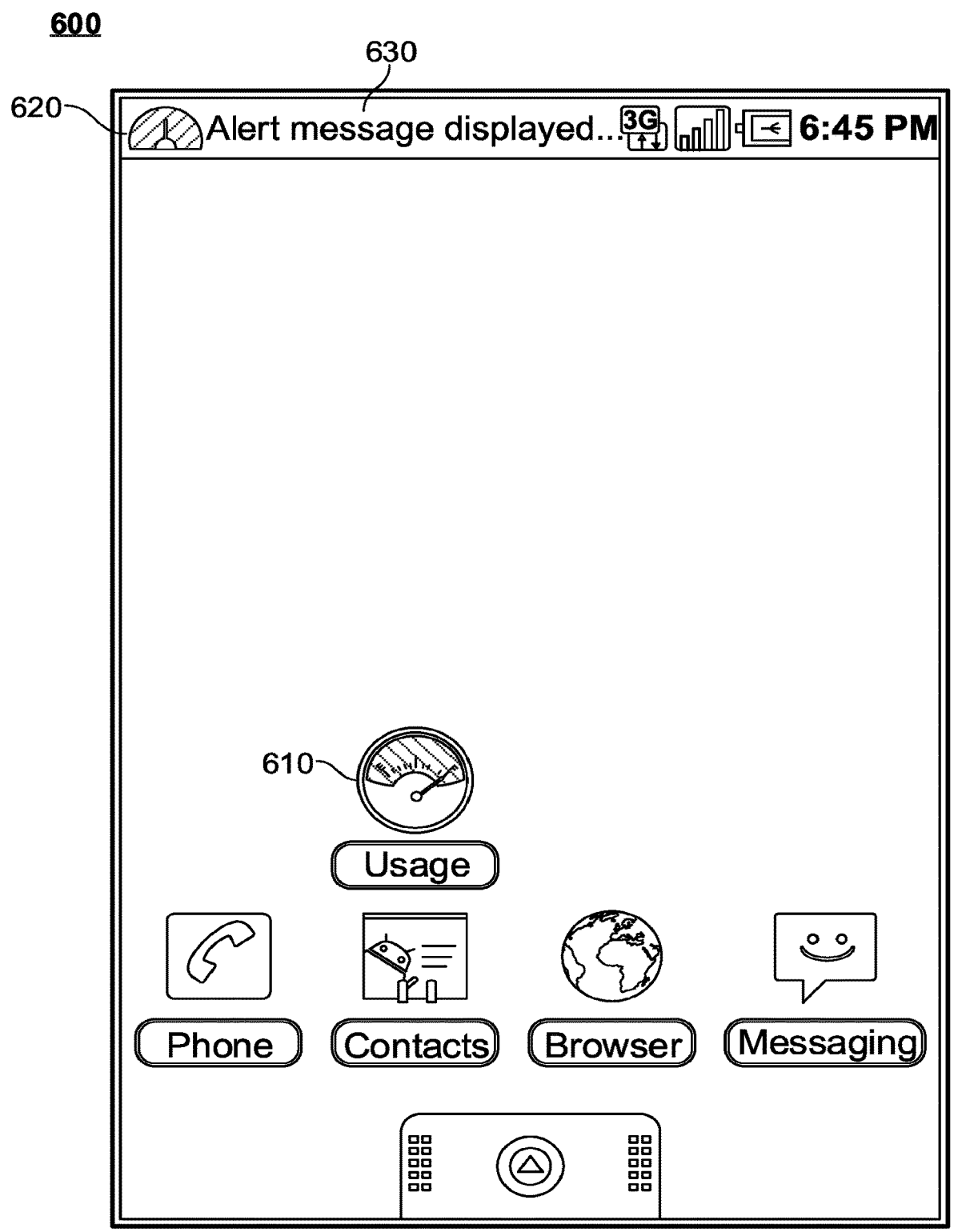
FIG. 6 is a functional diagram illustrating another user interface for user notifications for device assisted services (DAS) in accordance with various embodiments of the systems and methods described herein.

FIG. 6 is a functional diagram illustrating an example user interface in which an alert message is also displayed. In some embodiments, a UI for user notifications for DAS also includes an alert message 630. In the example illustrated in FIG. 6, the alert message 630 is displayed on the status bar. However, in other embodiments, the alert message can be displayed elsewhere on the user interface. In some embodiments, the user can be provided with the option to determine where such alert messages 630 are displayed. The alert message can be accompanied by an alternative alert or indication such as, for example, an audible tone, a tactile alert, or visual alert such as, for example, a flashing display screen.

In some embodiments, if there is a usage alert (e.g., based on a service usage measure and the associated service plan and/or user configured usage alert thresholds/events and/or preferences), usage alert message 630 is displayed along with the usage gauge icon 620. In some embodiments, alert percentages and usage alert messages can be customized via a preferences menu as described herein with respect to various embodiments.

Figure 7:
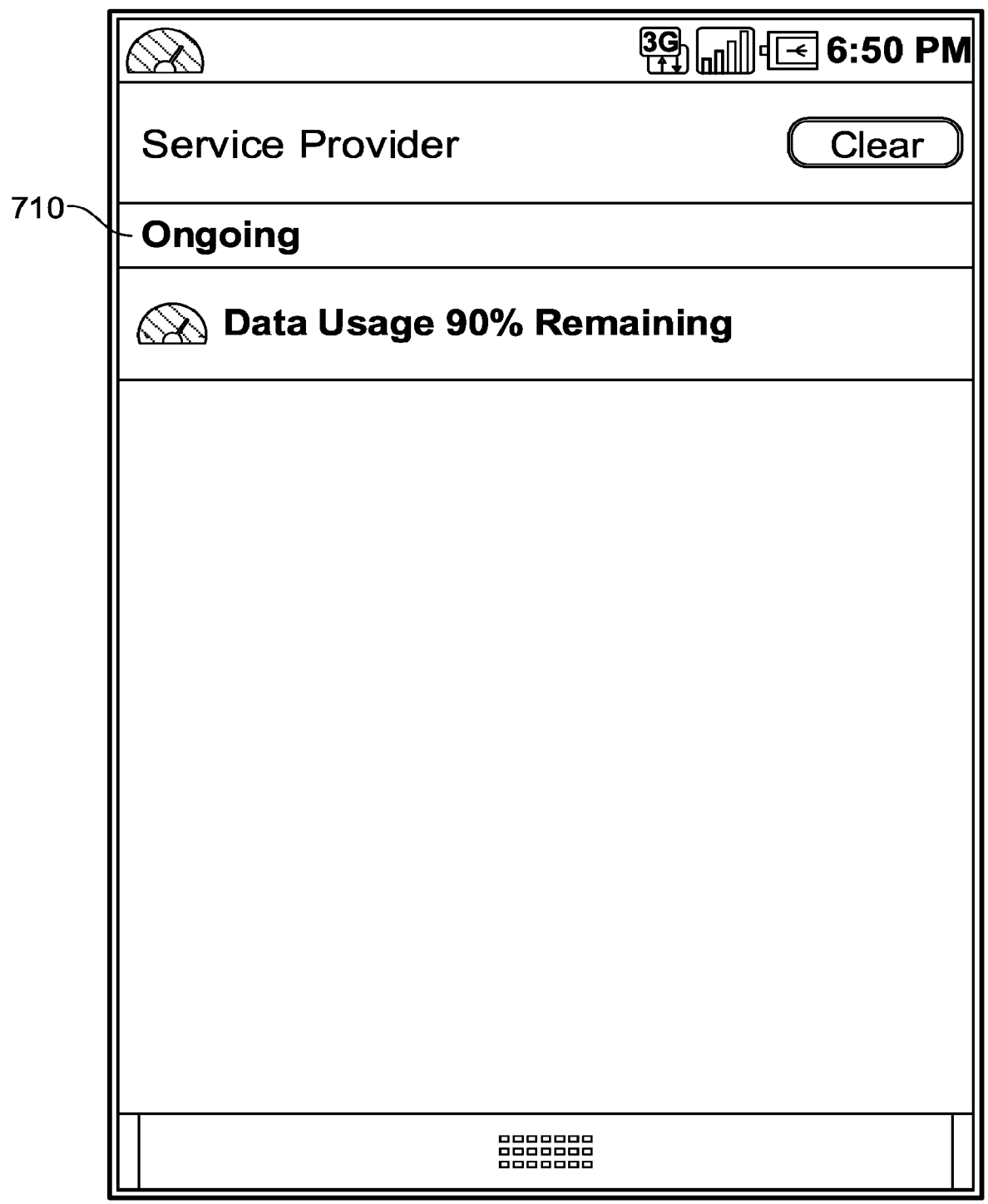
FIG. 7 is a functional diagram illustrating another user interface for user notifications for device assisted services (DAS) in accordance with various embodiments of the systems and methods described herein.

FIG. 7 is a functional diagram for another user interface for user notifications for device assisted services (DAS) in accordance with some embodiments. In some embodiments, a UI screen for user notifications for DAS includes ongoing notifications and alerts. In some embodiments, an ongoing notification and alert screen 700 is presented on a UI screen (e.g., of mobile station 100) as shown. In some embodiments, ongoing notification and alerts screen 700 is presented when a user selects an application. This can be done, for example, by the user clicking or touching the application icon, selecting the application from the applications menu, or clicking or touching the status bar usage notification/alert 630 and/or usage gauge icon 520.

In some embodiments, if the user expands the status bar, ongoing notification and alert screen 700 is presented in the illustrated example. Ongoing notification and alert screen 700 displays Ongoing usage notifications 710 including how much data/service usage is remaining in the plan or a percentage of data/service usage remaining in the plan. This can be based, for example, on a current service usage measure and associated service plan service usage limit). As shown in this example, ongoing usage notifications 710 indicates that 90% of data usage is remaining. In some embodiments, usage notifications that provide an indication of the data remaining for an associated service plan are also indicated with a color coded indication of the data remaining based on current service usage and the associated service plan as described above (e.g., usage gauge(s) and the alert message icon(s) can be color coded based on data remaining and/or other usage parameters and/or user preferences). In some embodiments, a clear button can be provided, and selecting the Clear button removes the displayed/pending notifications, but not the associated information (e.g., the current service usage measure is not cleared).

Figure 8:
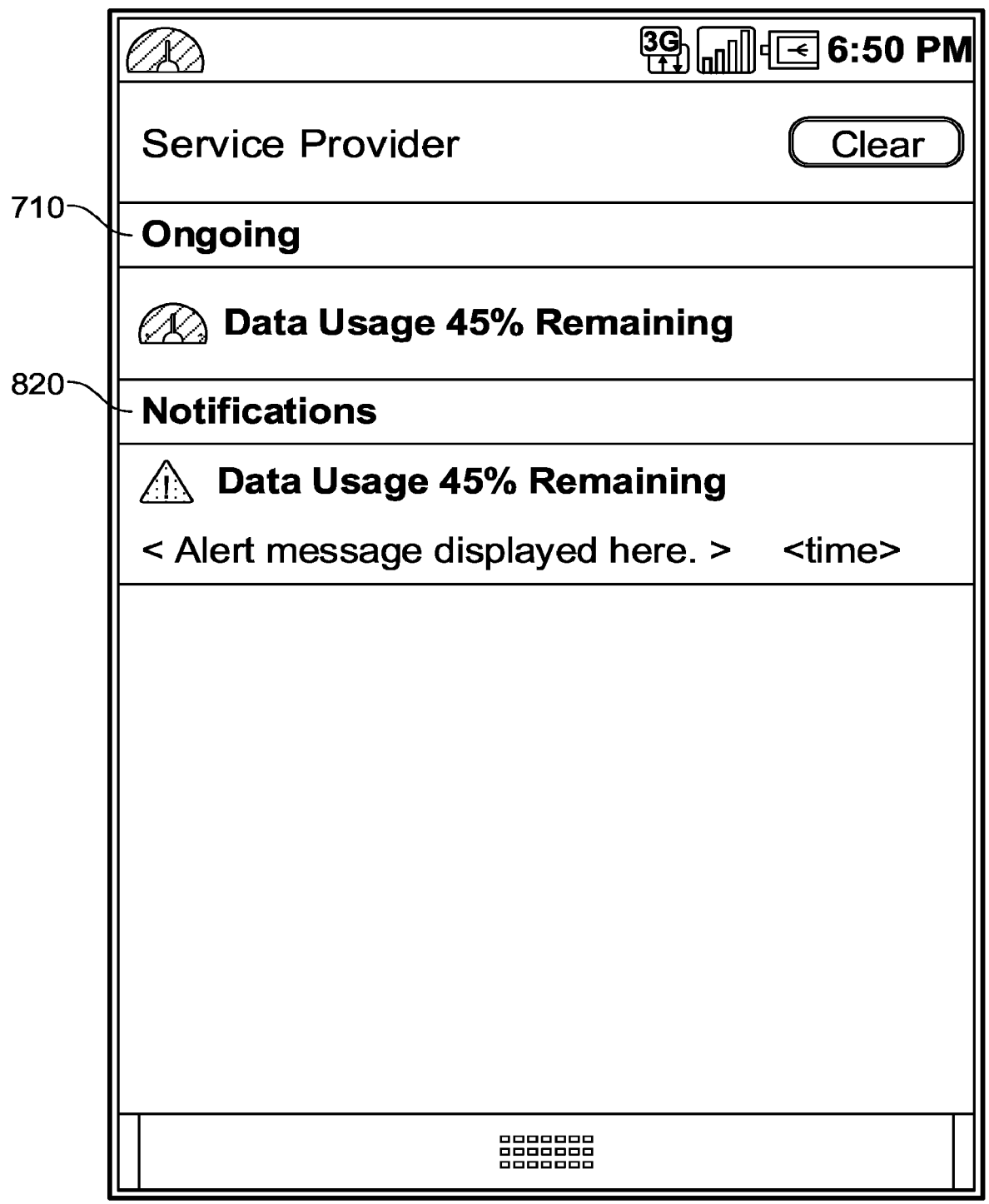
FIG. 8 is a functional diagram illustrating another user interface for user notifications for device assisted services (DAS) in accordance with various embodiments of the systems and methods described herein.

FIG. 8 is a functional diagram for another user interface for user notifications for device assisted services (DAS) in accordance with some embodiments. In some embodiments, ongoing notification and alert screen 800 also displays notifications 820 including any current usage related alerts (e.g., usage related alert messages and/or notifications as described herein). As shown, notifications 820 displays a data usage 45% remaining alert message. As also shown, Ongoing usage notifications 710 displays a current data usage 45% remaining notification. In some embodiments, usage notifications that provide an indication of the data remaining for an associated service plan are also indicated with a color coded indication of the data remaining based on current service usage and the associated service plan as described above (e.g., usage gauge(s) and the alert message icon(s) can be color coded with different colors based on data remaining and/or other usage parameters and/or user preferences, such as the ongoing data usage 45% remaining gauge can be color coded yellow and the data usage 45% data remaining notification icon can be color coded red). Various other alerts and/or user notifications can be displayed in accordance with various embodiments described herein.

Figure 9:
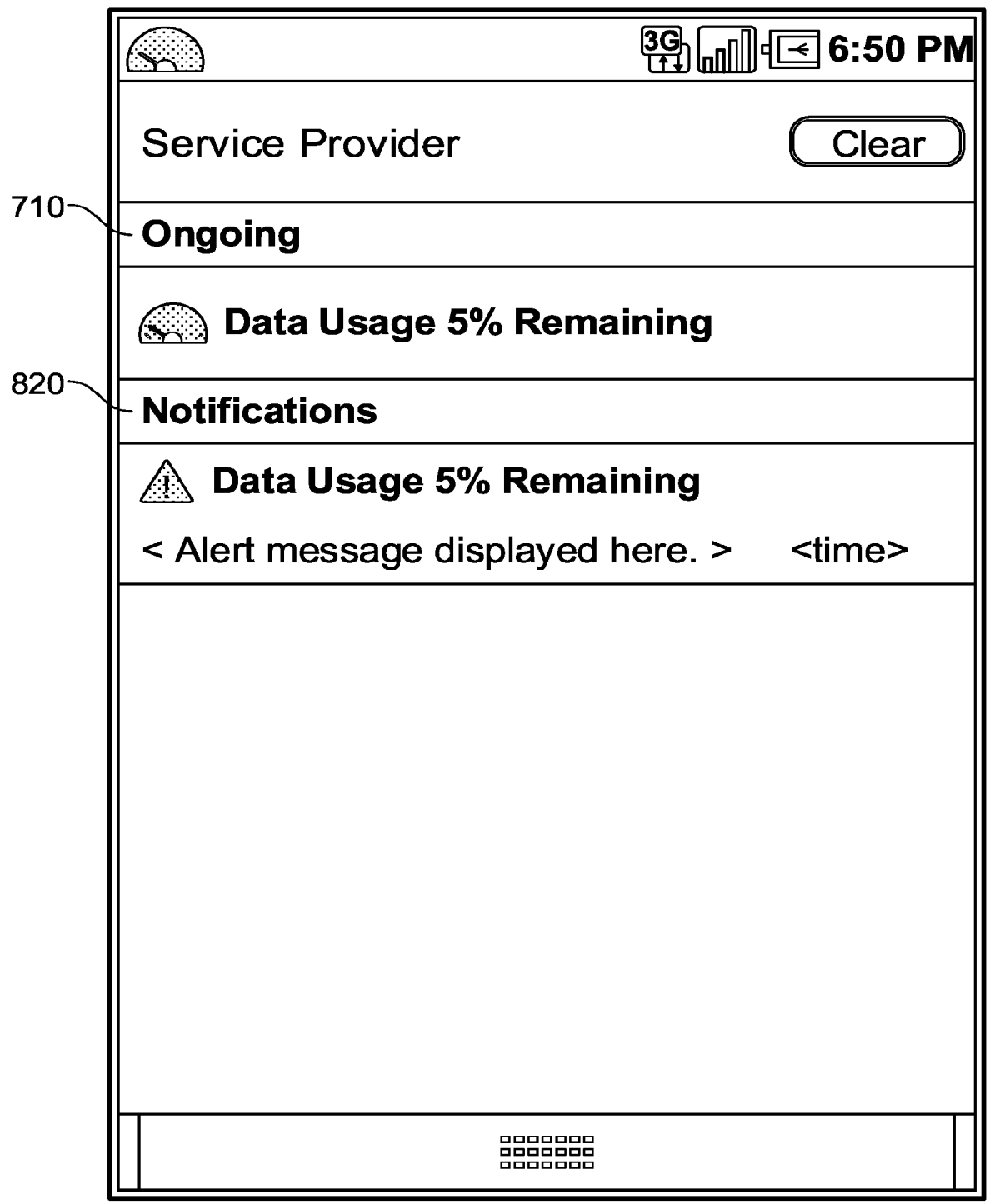
FIG. 9 is a functional diagram illustrating another user interface for user notifications for device assisted services (DAS) in accordance with various embodiments of the systems and methods described herein.

FIG. 9 is a functional diagram for another user interface for user notifications for device assisted services (DAS) in accordance with some embodiments. In some embodiments, ongoing notification and alert screen 900 also displays notifications 820 including any current usage related alerts (e.g., usage related alert messages and/or notifications as described herein). As shown, notifications 7020 displays a data usage 5% remaining alert message. As also shown, Ongoing usage notifications 710 displays a current data usage 45% remaining notification. In some embodiments, selecting the ongoing message 710 and/or the notification message 7020 launches/displays the usage application and/or usage utility/function as described herein with respect to various embodiments. Various other alerts and/or user notifications can be displayed in accordance with various embodiments described herein.

Figure 10:
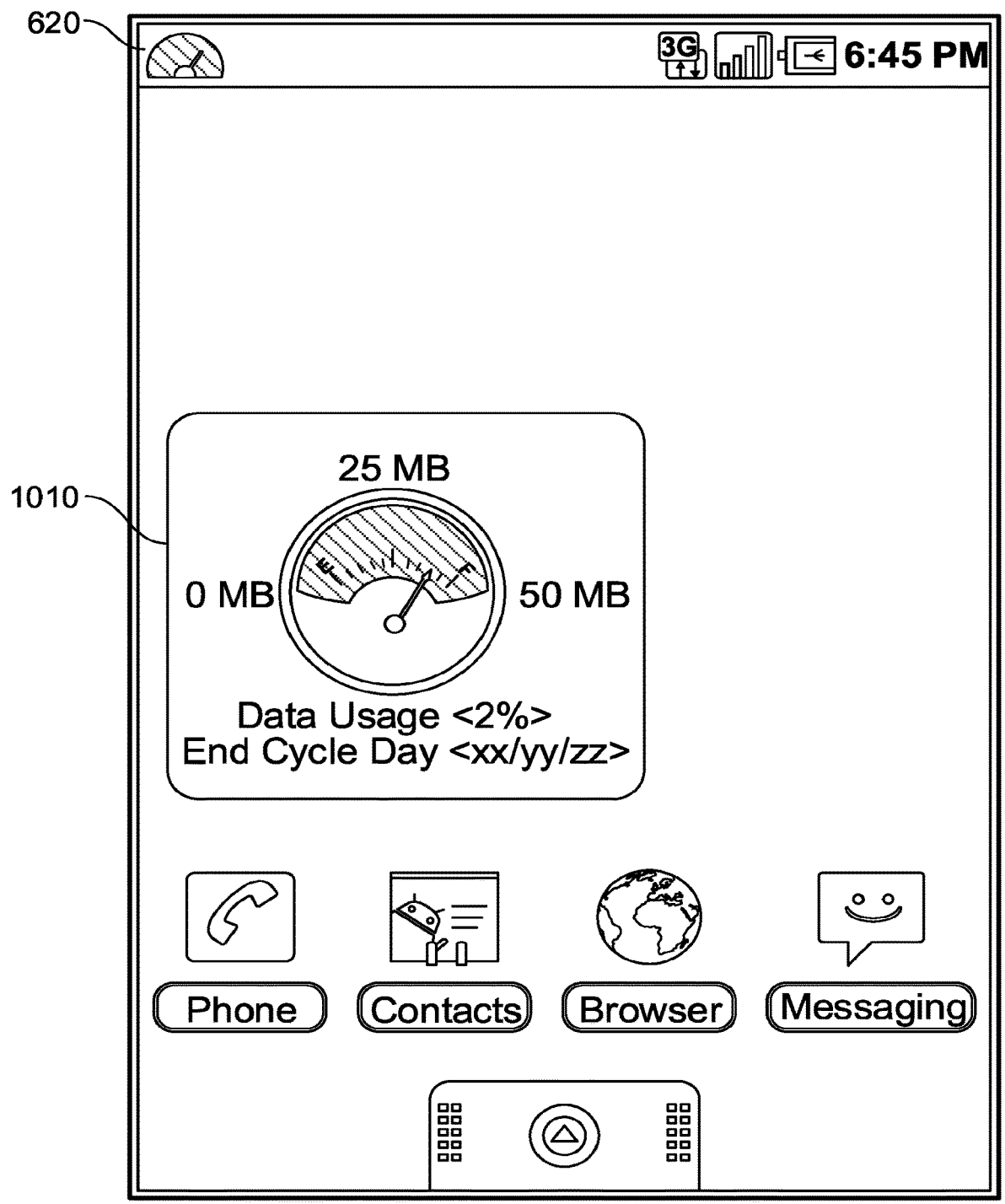
FIG. 10 is a functional diagram illustrating another user interface for user notifications for device assisted services (DAS) in accordance with various embodiments of the systems and methods described herein.

FIG. 10 is a functional diagram for another user interface for user notifications for device assisted services (DAS) in accordance with some embodiments. As shown, a user interface (UI), such as for mobile station 100, includes a usage icon 1010 on an application/utility portion of a primary or default UI screen 1000, and also includes a usage gauge 620 (e.g., also referred to herein as a usage gauge, as similarly described above) in a status bar of the primary or default UI screen 1000 (e.g., the status bar can appear on other UI screens in addition to the primary or default UI screen 1000, such as a secondary screen that includes icons for additional folders, utilities, and/or applications installed/available on device 100). In some embodiments, usage icon 1010 represents a home screen widget that displays a usage gauge with various associated service plan information, current data usage in percentage, and the current end cycle date for the associated service plan. In some embodiments, usage gauge 620 is color coded based the data remaining in the associated service plan (e.g., green indicates 100%-50% remaining, yellow indicates 49%-10% remaining, and red indicates 9%-0% remaining). In some embodiments, if the usage icon or widget 1010 is selected (e.g., tapped/touched or clicked or otherwise selected), the usage application and/or usage utility/function is launched/displayed as described herein with respect to various embodiments.

Figure 11:
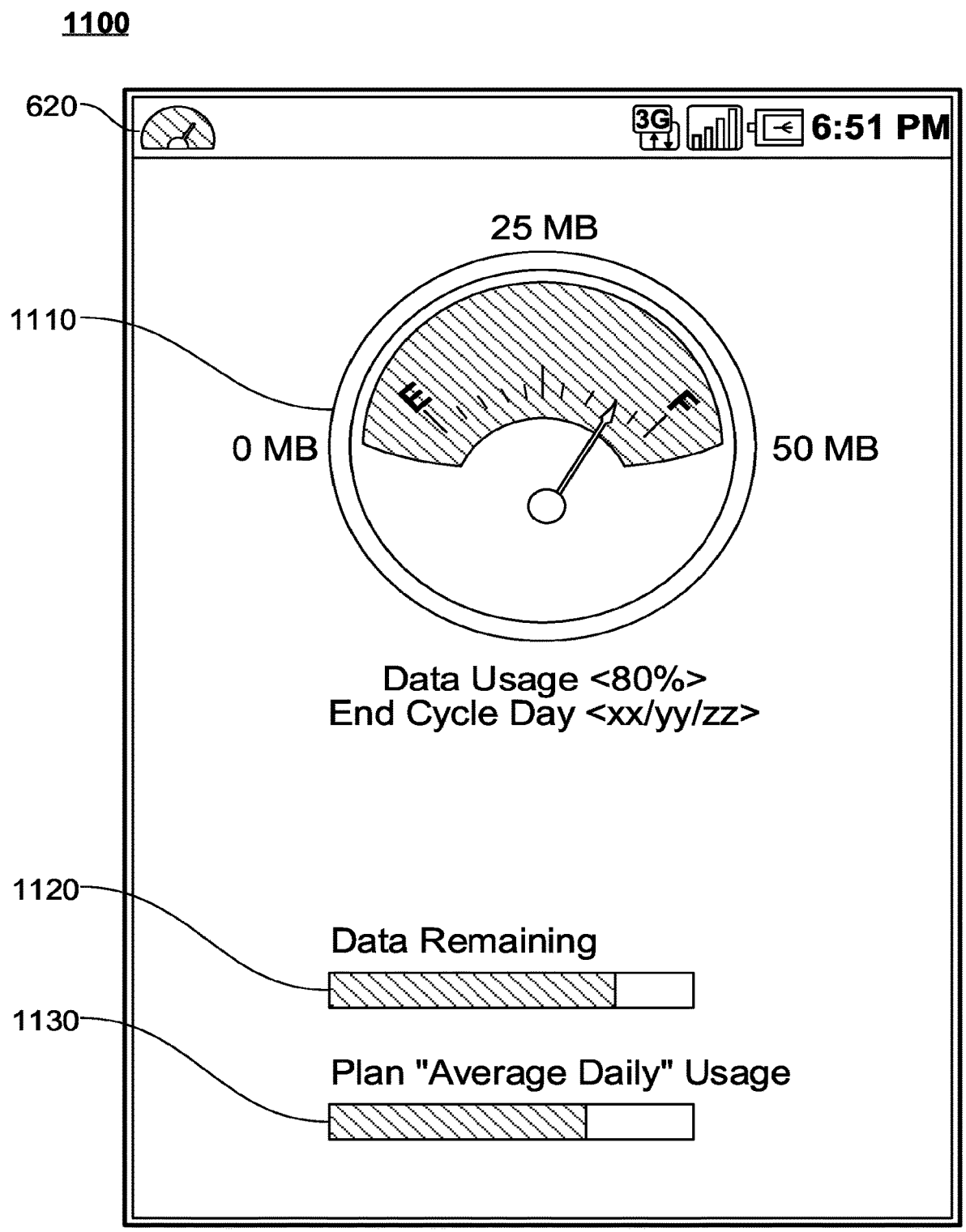
FIG. 11 is a functional diagram illustrating another user interface for user notifications for device assisted services (DAS) in accordance with various embodiments of the systems and methods described herein.

FIG. 11 is a functional diagram for another user interface for user notifications for device assisted services (DAS) in accordance with some embodiments. As shown, a user interface (UI), such as for mobile station 100, includes a detailed usage gauge 1110 on an application/utility portion of a primary or default UI screen 1100 of a usage application and/or usage utility/function, and also includes a Data Remaining usage meter 1120 and a Plan "Average Daily" Usage meter 1130. In some embodiments, a usage application and/or usage utility/function includes a usage gauge (e.g., usage gauge 1110), service plan information (e.g., as shown on screen 900 and/or other or additional service plan information), a service usage/data usage percentage (e.g., Data Remaining usage meter 1120), and a velocity bar or velocity meter (e.g., Plan "Average Daily" Usage meter 1130). In some embodiments, the usage gauge represents the amount of data left in the service plan. In some embodiments, the usage gauge icon is color coded based on data remaining in the associated service plan as described herein (e.g., usage gauge icon 1120, detailed usage gauge 1110, data remaining usage meter 1120, and velocity meter 1130 can be color coded with the same and/or different colors based on associated usage measures and/or configured settings/preferences). In some embodiments, the service plan information details the service plan capacity and the billing cycle end date, such as shown on UI screen 1100.

In some embodiments, velocity bar 1130 indicates current usages vs. average daily usage for the associated service plan and informs the user if he/she is using data at a faster or slower rate than the average daily rate (e.g., for a 50 MB monthly plan, the average daily rate is 50 MB/30 days=1.6 MB/day). In some embodiments, the velocity bar 1130 includes a colored area that indicates a percentage of data remaining in the service plan and a small vertical bar that indicates expected average daily usage based on days into the billing cycle. For example, the colored area can be coded green if the user is using data slower than the average daily rate, yellow if the user is using data at or a little faster than the average daily rate, or red if the user is using data significantly faster than the average daily rate. As shown, UI screen 1100 displays that the user is using data at the associated service plan's "average daily" rate.

Figure 12:
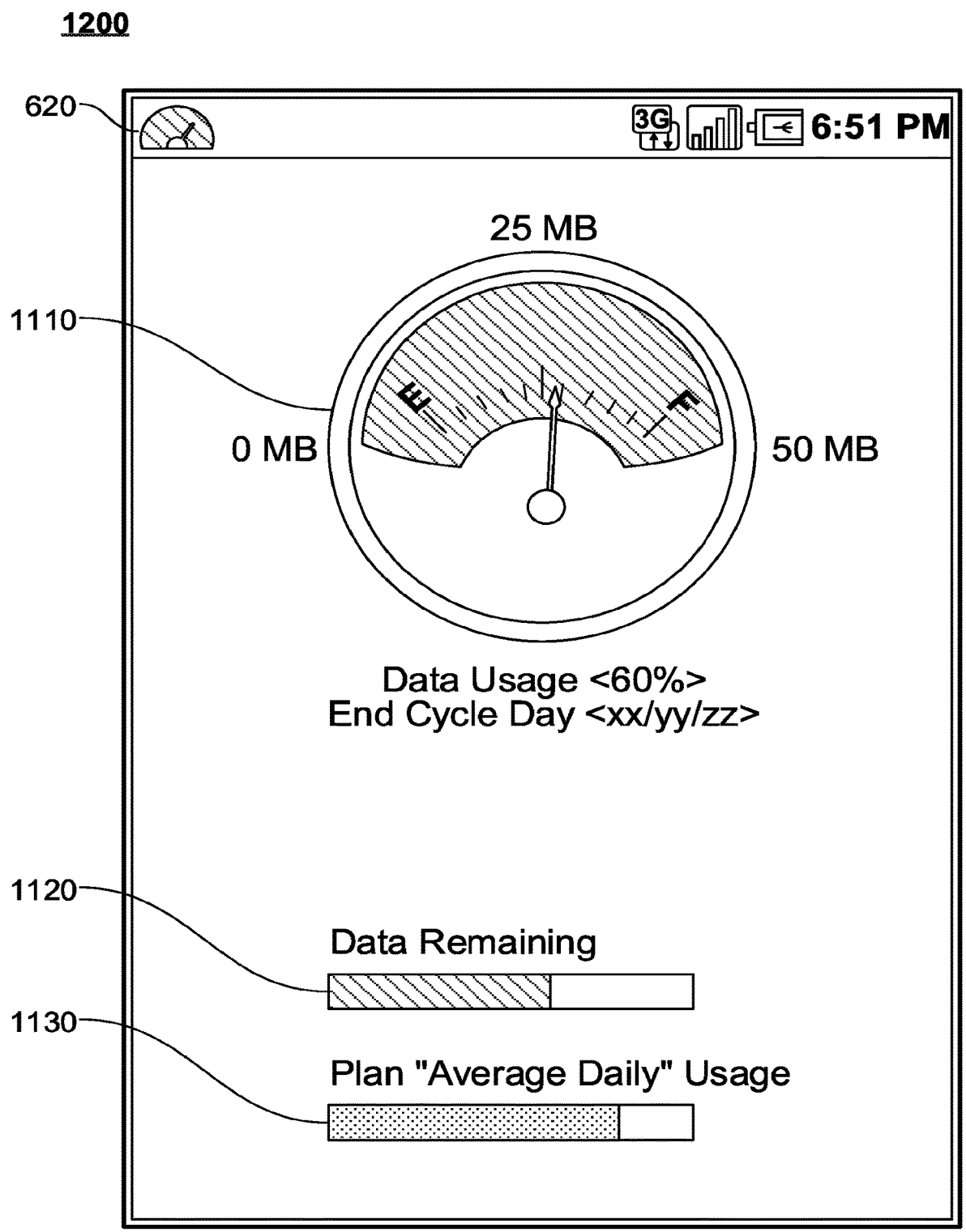
FIG. 12 is a functional diagram illustrating another user interface for user notifications for device assisted services (DAS) in accordance with various embodiments of the systems and methods described herein.

FIG. 12 is a functional diagram for another user interface for user notifications for device assisted services (DAS) in accordance with some embodiments. As shown, FIG. 12 is similar to FIG. 11 except that UI screen 1200 of FIG. 12 indicates that the user has used less than half of the service plan data limit for the current cycle but that the user is using data at a rate that is faster/higher than the associated service plan's "average daily" rate (e.g., the velocity bar can be color coded to provide an alert, such as by color coding the velocity bar as red but color coding the data remaining usage meter and usage gauge as green).

Figure 13:
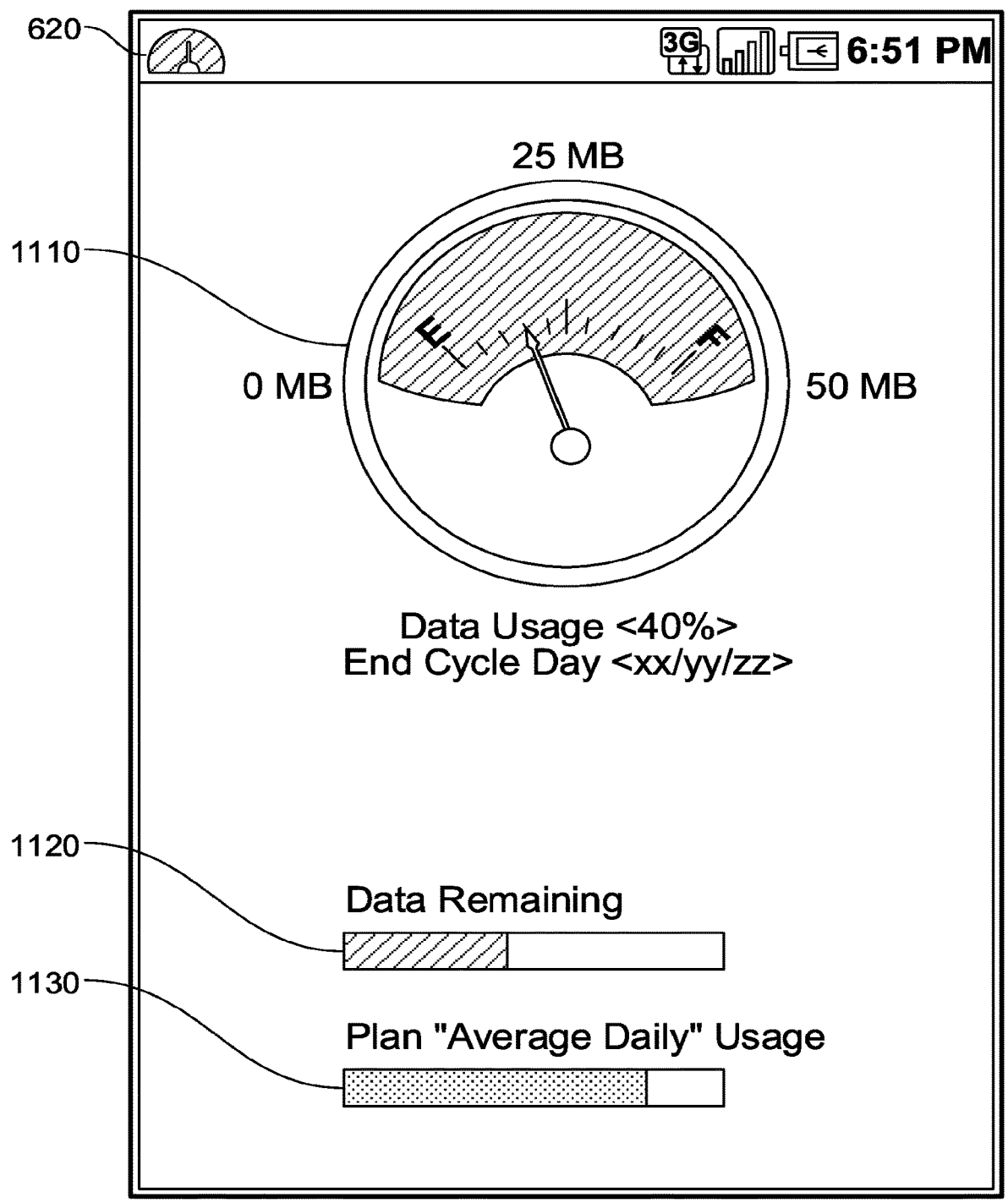
FIG. 13 is a functional diagram illustrating another user interface for user notifications for device assisted services (DAS) in accordance with various embodiments of the systems and methods described herein.

FIG. 13 is a functional diagram for another user interface for user notifications for device assisted services (DAS) in accordance with some embodiments. As shown, FIG. 13 is similar to FIG. 11 except that UI screen 1300 of FIG. 13 indicates that the user has used more than half of the service plan data limit for the current cycle and that the user is using data at a rate that is faster/higher than the associated service plan's "average daily" rate (e.g., the velocity bar can be color coded to provide an alert, such as by color coding the velocity bar as red and color coding the data remaining usage meter and usage gauge as yellow).

Figure 14:
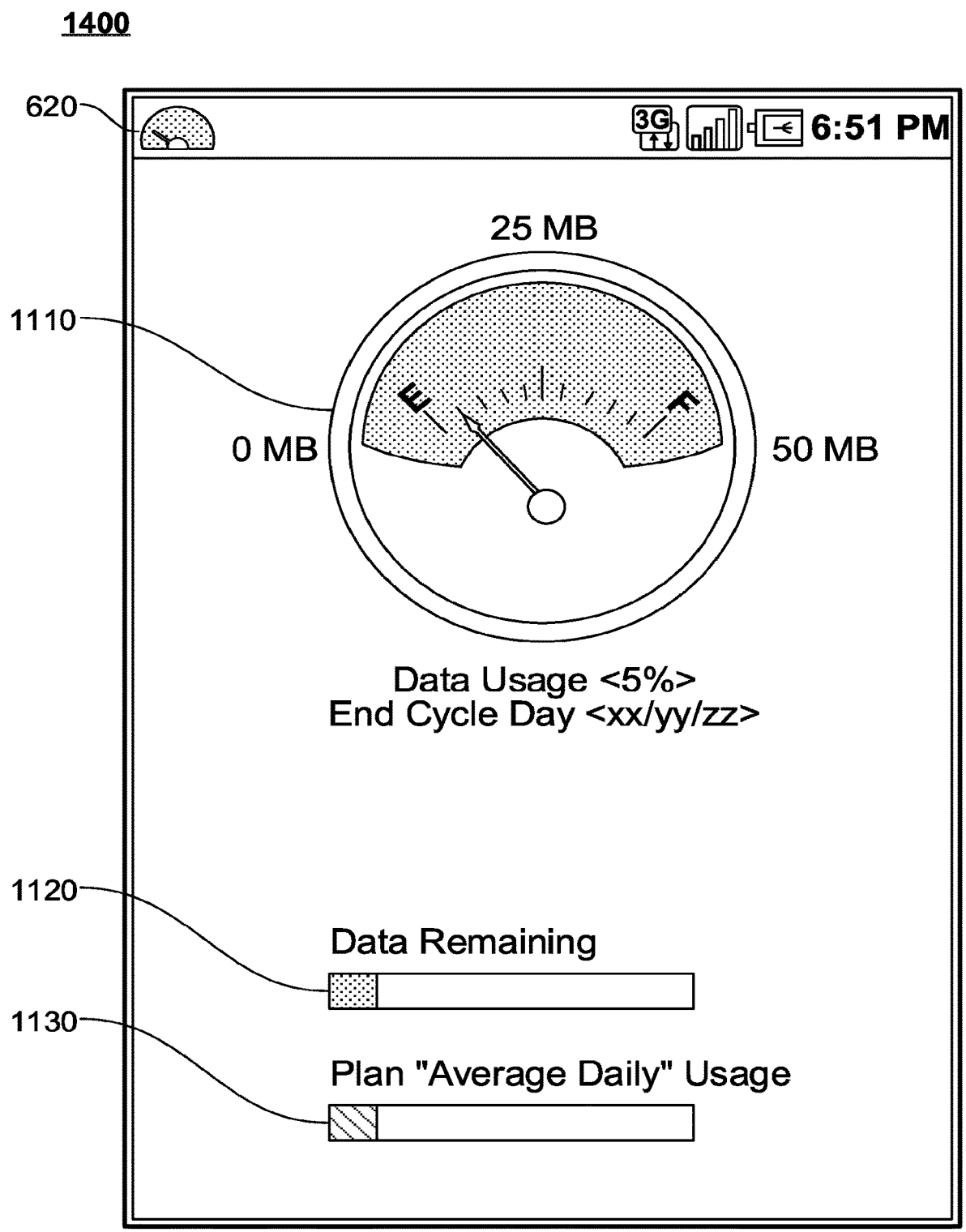
FIG. 14 is a functional diagram illustrating another user interface for user notifications for device assisted services (DAS) in accordance with various embodiments of the systems and methods described herein.

FIG. 14 is a functional diagram for another user interface for user notifications for device assisted services (DAS) in accordance with some embodiments. As shown, FIG. 14 is similar to FIG. 11 except that UI screen 1400 of FIG. 14 indicates that the user has used more than 75% of the service plan data limit for the current cycle but that the user is using data at a rate that is slower/lower than the associated service plan's "average daily" rate (e.g., the velocity bar can be color coded to provide an alert, such as by color coding the velocity bar as green but color coding the data remaining usage meter and usage gauge as red). For example, FIG. 14 can be understood to notify the user that the user is running out of data and using at the plan "average daily" rate.

Figure 15:
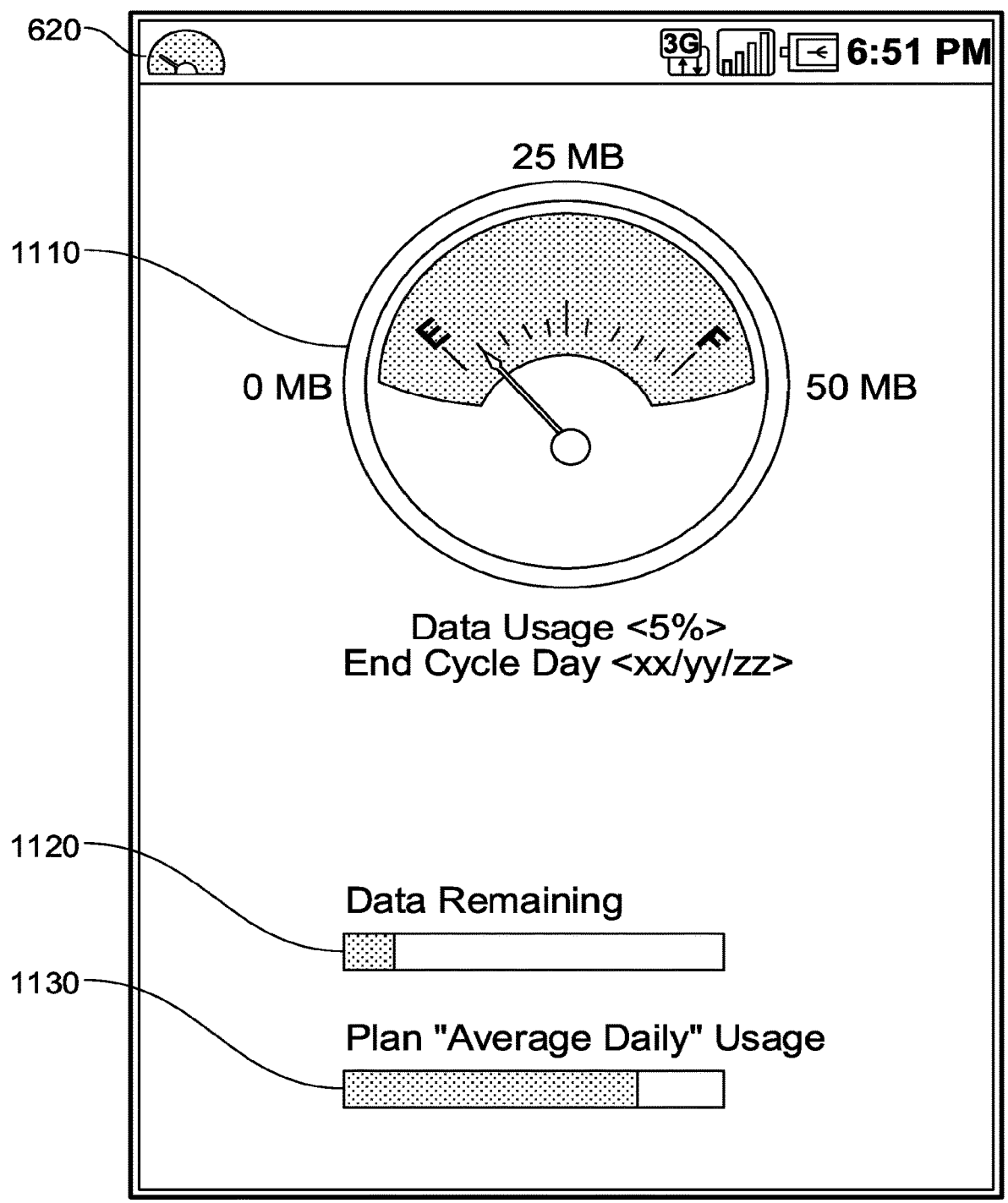
FIG. 15 is a functional diagram illustrating another user interface for user notifications for device assisted services (DAS) in accordance with various embodiments of the systems and methods described herein.

FIG. 15 is a functional diagram for another user interface for user notifications for device assisted services (DAS) in accordance with some embodiments. As shown, FIG. 15 is similar to FIG. 11 except that UI screen 1500 of FIG. 15 indicates that the user has used more than 75% of the service plan data limit for the current cycle and that the user is using data at a rate that is faster/higher than the associated service plan's "average daily" rate (e.g., the velocity bar can be color coded to provide an alert, such as by color coding the velocity bar as red and color coding the data remaining usage meter and usage gauge as red). For example, FIG. 15 can be understood to notify the user that the user is running out of data and using data faster than the plan "average daily" rate.

Figure 16:
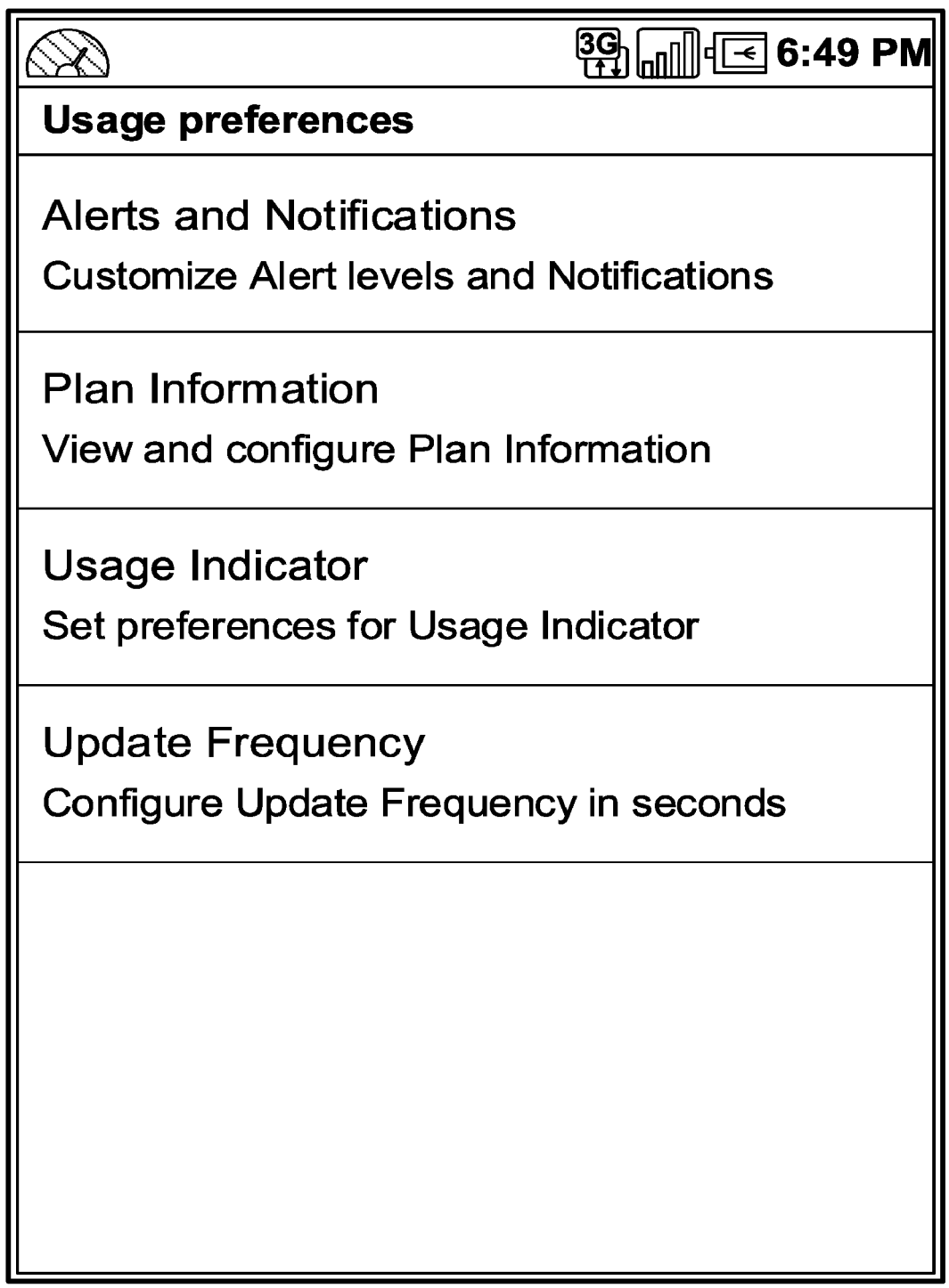
FIG. 16 is a functional diagram illustrating another user interface for user notifications for device assisted services (DAS) in accordance with various embodiments of the systems and methods described herein.

FIG. 16 is a functional diagram for another user interface for user notifications for device assisted services (DAS) in accordance with some embodiments. As shown, a usage preferences screen 1600 is displayed (e.g., a usage preferences screen of a usage application or utility/function). In some embodiments, usage preferences screen 1600 is accessed via a menu preferences screen or other settings menu/preferences option(s) displayed/available on mobile station 100. In some embodiments, usage preferences screen 1600 includes option for configuring/setting preferences related to alerts and notifications (e.g., customize alert levels and notifications), plan information (e.g., view and configure associated service plan information), usage indicator(s) (e.g., set preferences for usage indicator(s), such as usage meters/gauges/bars), and/or update frequency(ies) (e.g., configure update frequency interval/period), as shown. In some embodiments, if a service plan is a shared service plan (e.g., family, corporate, or other shared service plan), the usage preferences are configured for the user and/or for the shared service plan's other users based on user's associated account configuration rights to configure such settings for other users on the share account (e.g., parents or an owner of a family plan can have system admin rights to configure such settings to indicate what information users can see/access and/or configure).

Figure 17:
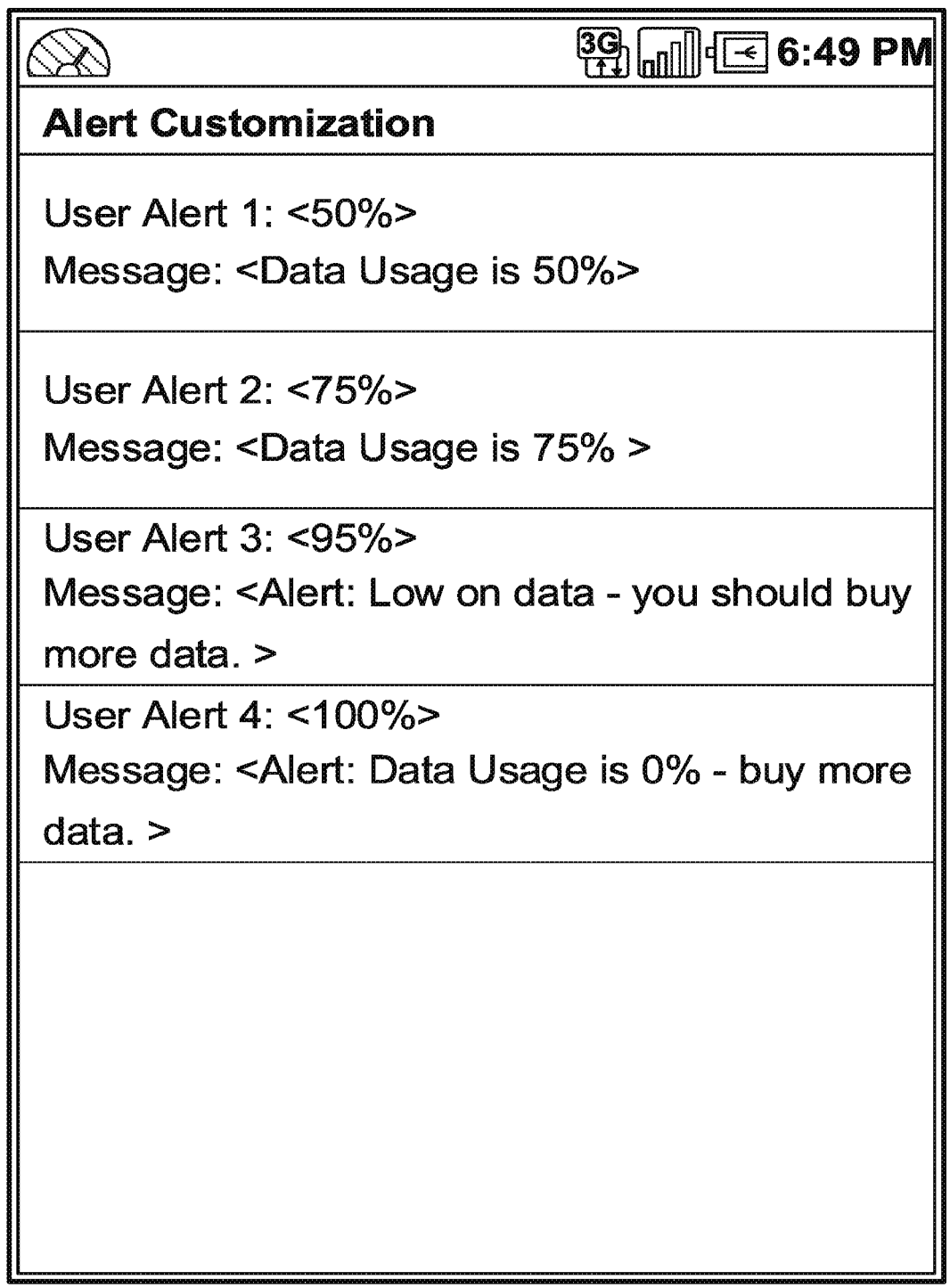
FIG. 17 is a functional diagram illustrating another user interface for user notifications for device assisted services (DAS) in accordance with various embodiments of the systems and methods described herein.

FIG. 17 is a functional diagram for another user interface for user notifications for device assisted services (DAS) in accordance with some embodiments. As shown, an alert customization screen 1700 is displayed (e.g., accessed via a usage preferences screen 1600 of a usage application or utility/function). In some embodiments, alert customization screen 1700 includes options for configuring alerts based on data usage events/thresholds (e.g., to configure alerts based on when certain data usage thresholds are exceeded and/or specific alert messages associated with such threshold events). For example, an alert can be configured to notify the user that 50% of the associated service plan data limit for a given billing cycle has been used, and another can be configured to notify the user that more than 100% of the associated service plan data limit for a given billing cycle has been used and to inform the user that they can/should purchase more data. In some embodiments, alert customization screen 1700 allows a user to customize various alert percentages and associated messages that appear in a service menu. In some embodiments, alert customization screen 7900 allows a user to customize a subset of alert percentages and associated messages that appear in a service menu (e.g., certain alert messages can be required by the service plan and/or service provider, such as an indication that the user has exceeded the service plan capacity for the current billing cycle—the 100% alert). In some embodiments, alert customization screen 7900 allows a user to customize various default alert percentages and associated messages that appear in a service menu, such as alert percentage thresholds for 50%, 75%, 95% and 100% usage of service plan capacity, which can be changed by a user and/or service provider and/or owner of a shared account service plan. In some embodiments, default notification messages are associated with each service plan and set or configured by a service provider of each service plan. Various other alerts can be configured as described herein and as will now be apparent to one of ordinary skill in the art in view of the various embodiments described herein.

Figure 18:
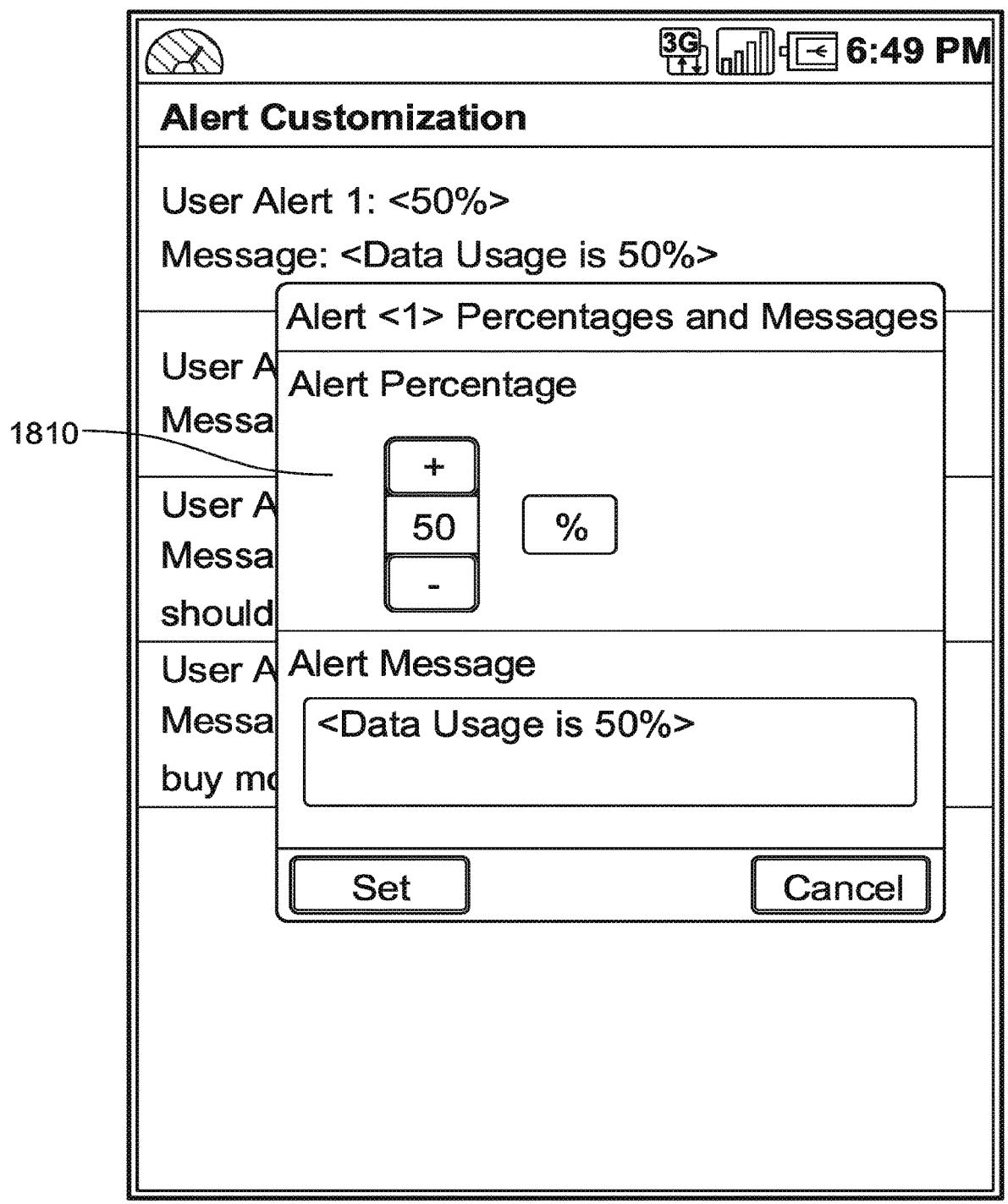
FIG. 18 is a functional diagram illustrating another user interface for user notifications for device assisted services (DAS) in accordance with various embodiments of the systems and methods described herein.

FIG. 18 is a functional diagram for another user interface for user notifications for device assisted services (DAS) in accordance with some embodiments. As shown, an alert customization screen 1800 is displayed (e.g., accessed via a usage preferences screen 1600 of a usage application or utility/function). In some embodiments, alert customization screen 1800 includes a dialog box 1810 to allow for user input for configuring alert preference settings (e.g., based on current data used of the associated service plan, such as 50% of the data limit has been used) and alert messages as shown. In some embodiments, alert percentages indicate percentage used and are customizable in increments of 1% (e.g., range is 1% to 99%). In some embodiments, notification messages are customizable and can be up to 50 characters each or set to some other maximum length. In some embodiments, more sophisticated alert configurations can be input using various user input screens, scripting, and/or programming techniques as would be apparent to one of ordinary skill in the art in view of the various embodiments described herein.

Figure 19:
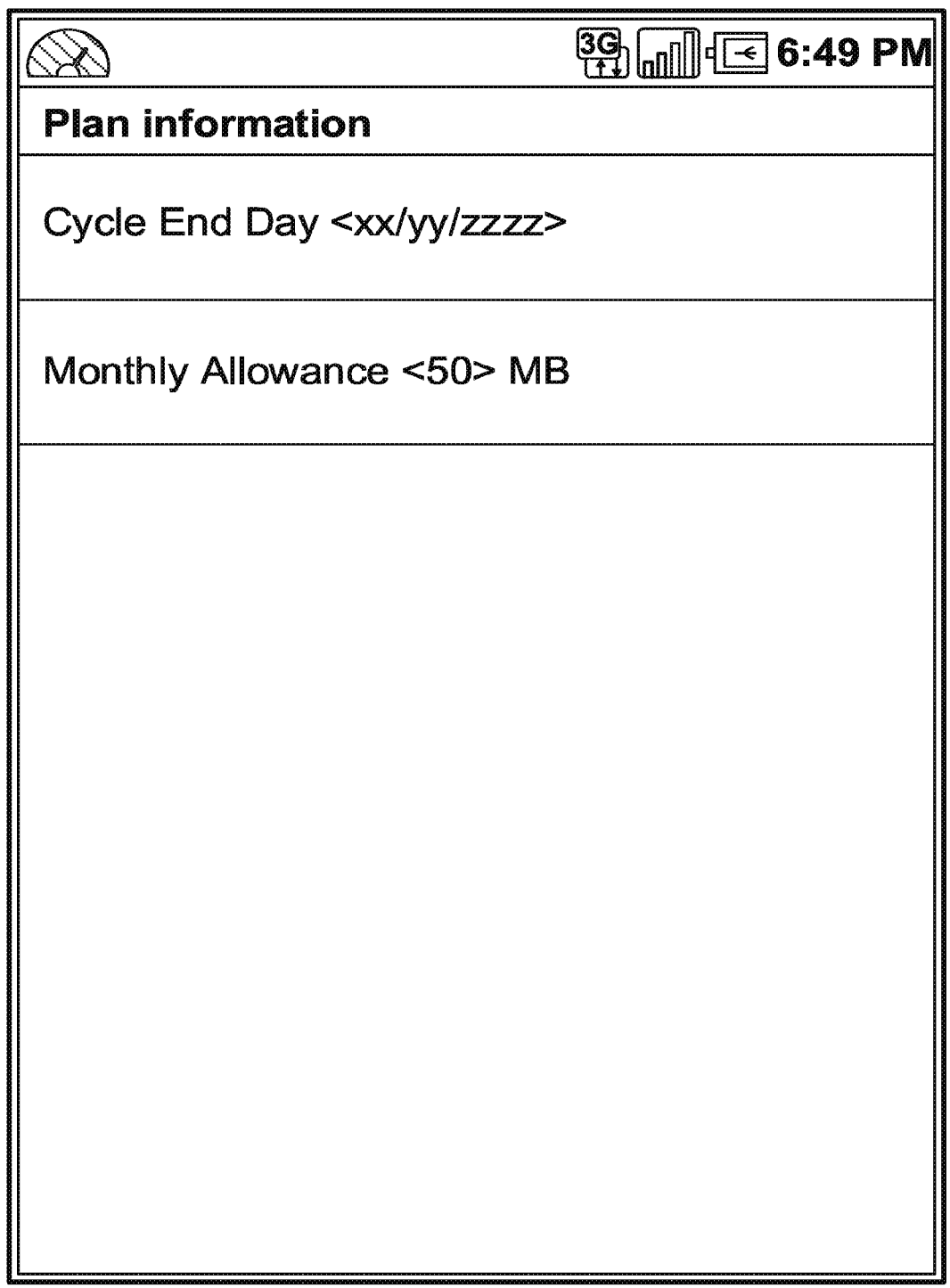
FIG. 19 is a functional diagram illustrating another user interface for user notifications for device assisted services (DAS) in accordance with various embodiments of the systems and methods described herein.

FIG. 19 is a functional diagram for another user interface for user notifications for device assisted services (DAS) in accordance with some embodiments. As shown, a plan information screen 1900 is displayed (e.g., accessed via a usage preferences screen 1600 of a usage application or utility/function). In some embodiments, plan information screen 1900 includes a cycle end date and a monthly allowance/associated service plan capacity or data limit per cycle/period (e.g., 50 MB of data per month) as shown. In some embodiments, plan information screen 1900 allows a user to view and configure service plan capacity (e.g., in MB) and billing cycle end date. In some embodiments, plan information screen 1900 includes various other associated service plan information (e.g., cost per cycle, upgrade options, service plan features and options, and/or other information).

Figure 20:
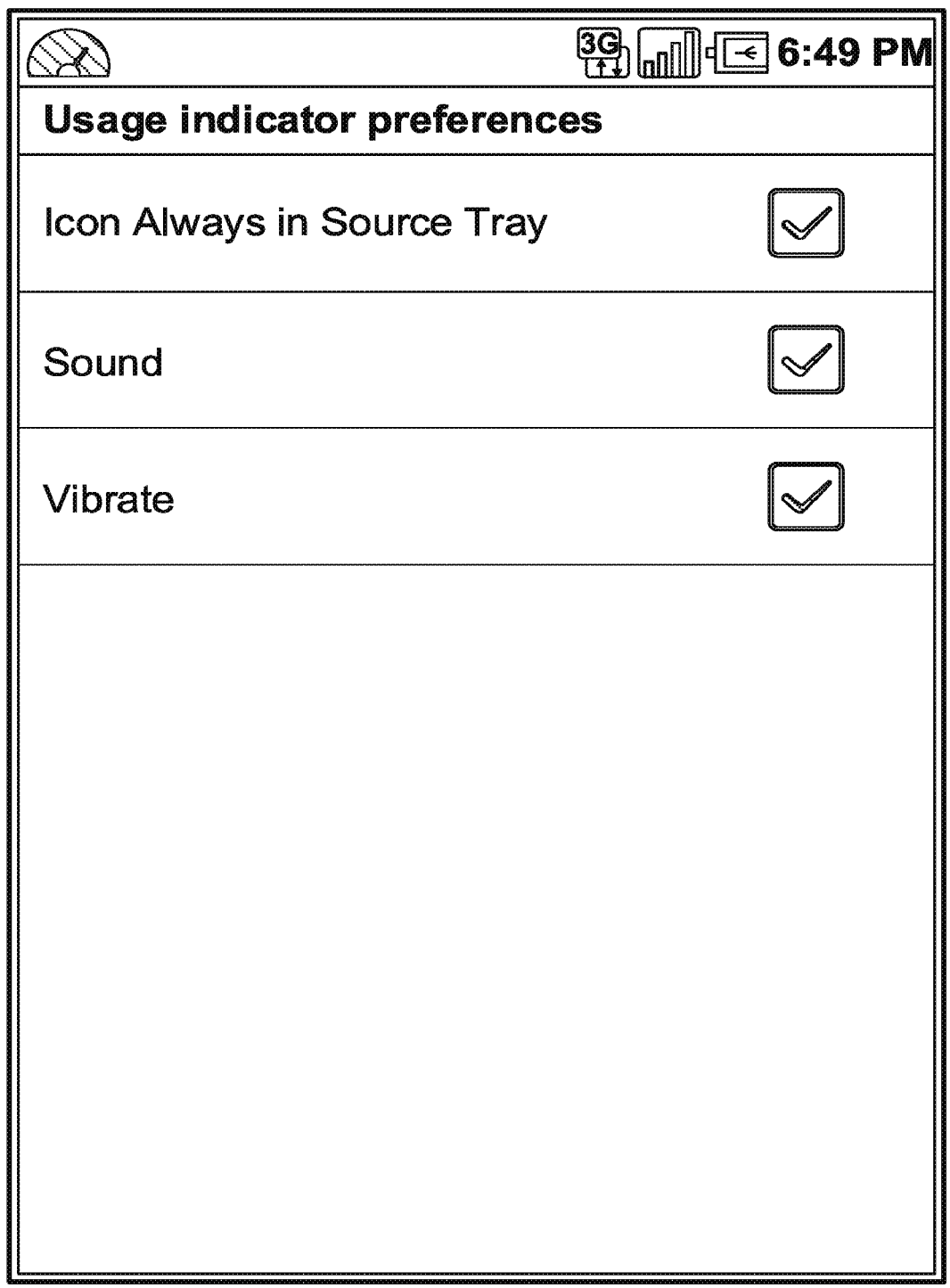
FIG. 20 is a functional diagram illustrating another user interface for user notifications for device assisted services (DAS) in accordance with various embodiments of the systems and methods described herein.

FIG. 20 is a functional diagram for another user interface for user notifications for device assisted services (DAS) in accordance with some embodiments. As shown, a usage indicator preferences screen 2000 is displayed (e.g., accessed via a usage preferences screen 1600 of a usage application or utility/function), which allows a user to turn on and off usage indicator icon behavior and sounds. In some embodiments, usage indicator preferences screen 2000 includes various options/settings for configuring usage indicator preferences, such as whether the usage icon is always displayed in a source tray, whether sounds triggered with usage alerts, vibrating of the mobile station 100 (e.g., if supported) triggered with usage alerts, as shown. In some embodiments, usage indicator preferences screen 2000 includes various other options/settings.

Figure 21:
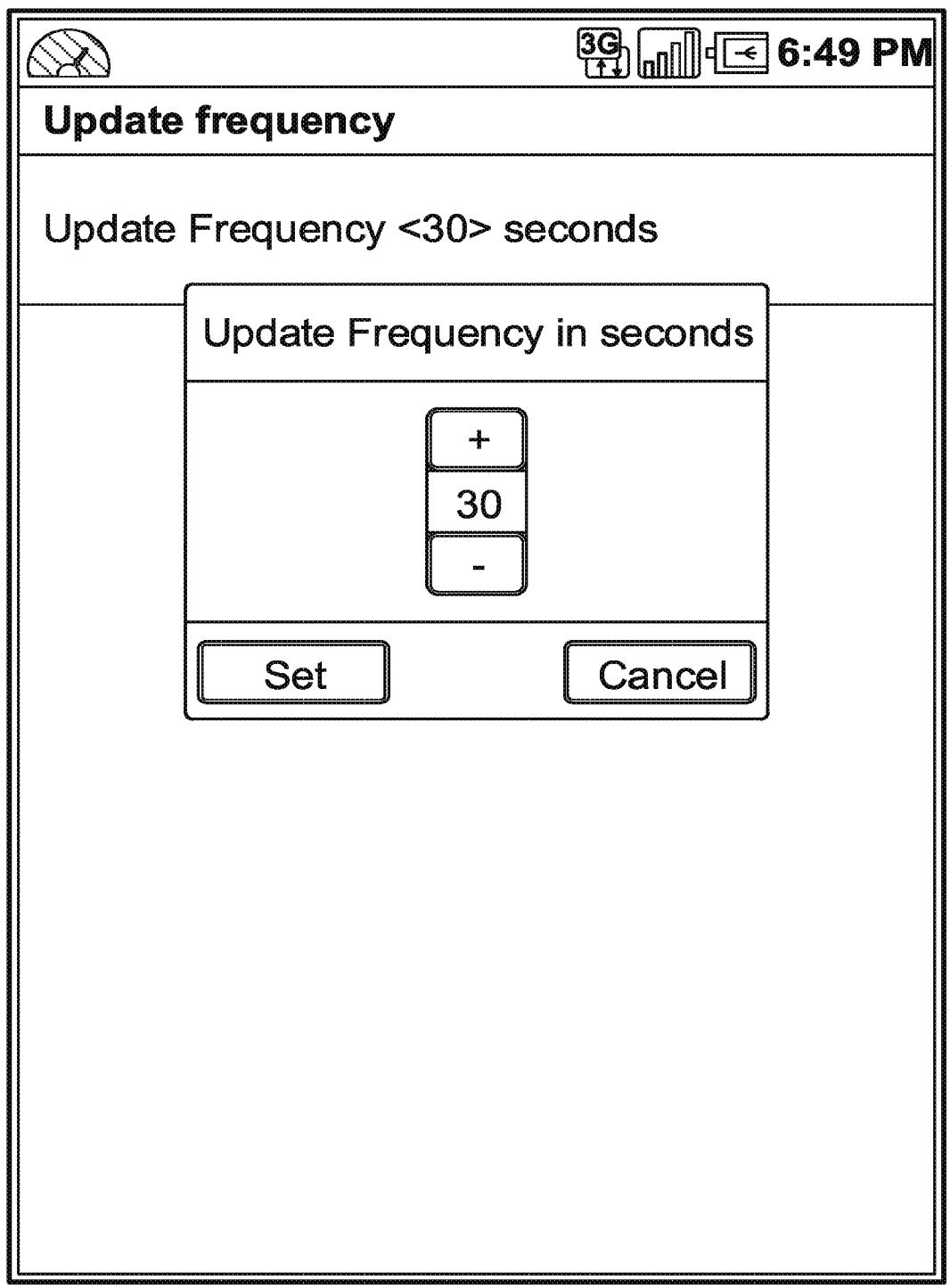
FIG. 21 is a functional diagram illustrating another user interface for user notifications for device assisted services (DAS) in accordance with various embodiments of the systems and methods described herein.

FIG. 21 is a functional diagram for another user interface for user notifications for device assisted services (DAS) in accordance with some embodiments. As shown, an alert/usage update frequency screen 2100 is displayed (e.g., accessed via a usage preferences screen 1600 of a usage application or utility/function). In some embodiments, alert/usage update frequency screen 2100 includes a option for configuring the time period for frequency updates for checking for current service usage (e.g., allows a user to change from a default usage update setting of 30 seconds to a range of 10-3600 seconds or some other frequency update range). In some embodiments, alert/usage update frequency screen 2100 includes a option for configuring the time period for frequency updates for checking for usage alerts (e.g., every 30 seconds).

Figure 22:
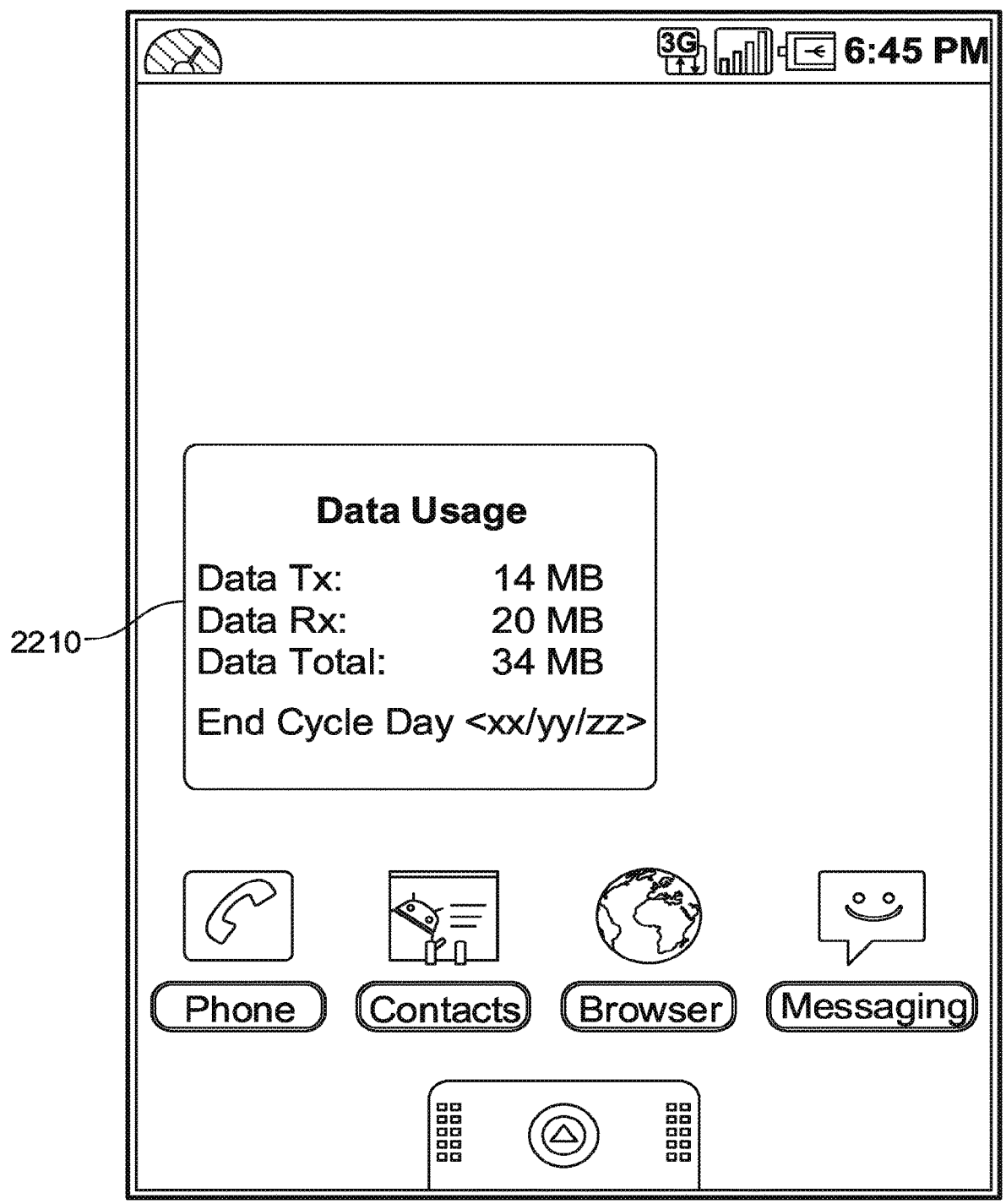
FIG. 22 is a functional diagram illustrating another user interface for user notifications for device assisted services (DAS) in accordance with various embodiments of the systems and methods described herein.

FIG. 22 is a functional diagram for another user interface for user notifications for device assisted services (DAS) in accordance with some embodiments. As shown, UI screen 2200 includes a data usage status display window 2210 (e.g., a data usage widget displayed on a home or default/primary UI screen of mobile station 100). In some embodiments, data usage status display window 2210 (e.g., for unlimited data plans and/or other service plans that can include various service usage limits and/or restrictions) displays current data usage in a widget format. In some embodiments, if data usage status display window 2210 is selected (e.g., touched, tapped, and/or otherwise selected), a usage application or utility/function is launched or displayed.

Figure 23:
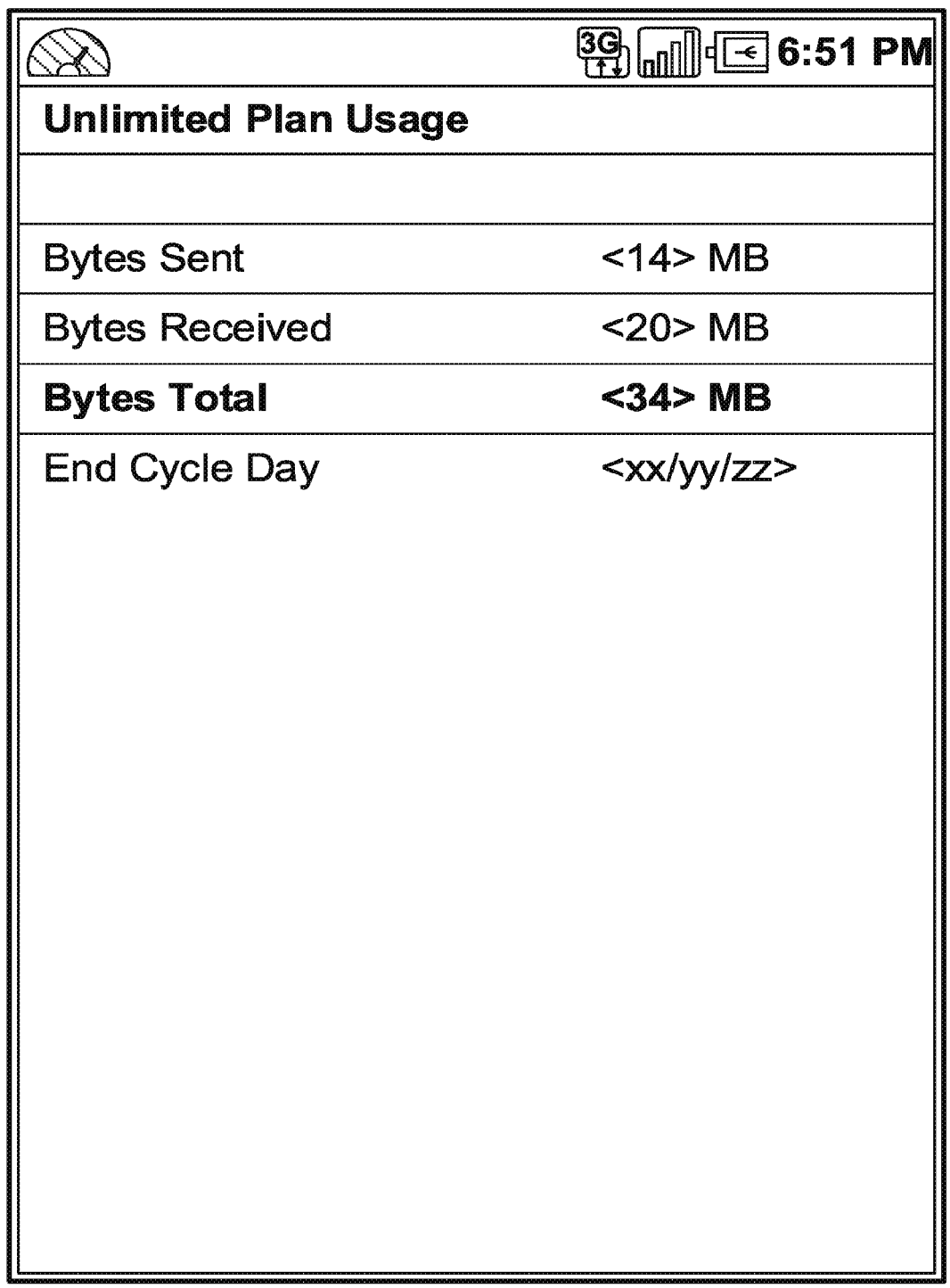
FIG. 23 is a functional diagram illustrating another user interface for user notifications for device assisted services (DAS) in accordance with various embodiments of the systems and methods described herein.

FIG. 23 is a functional diagram for another user interface for user notifications for device assisted services (DAS) in accordance with some embodiments. As shown, an unlimited plan usage screen 2300 is displayed (e.g., accessed via a usage application or utility/function and/or via data usage status display window 2210). In some embodiments, unlimited plan usage screen 2300 displays an amount of data (e.g., bytes, megabytes, and/or other data measure) sent, an amount of data received, a total amount of data usage, and an end cycle date.

Figure 24:
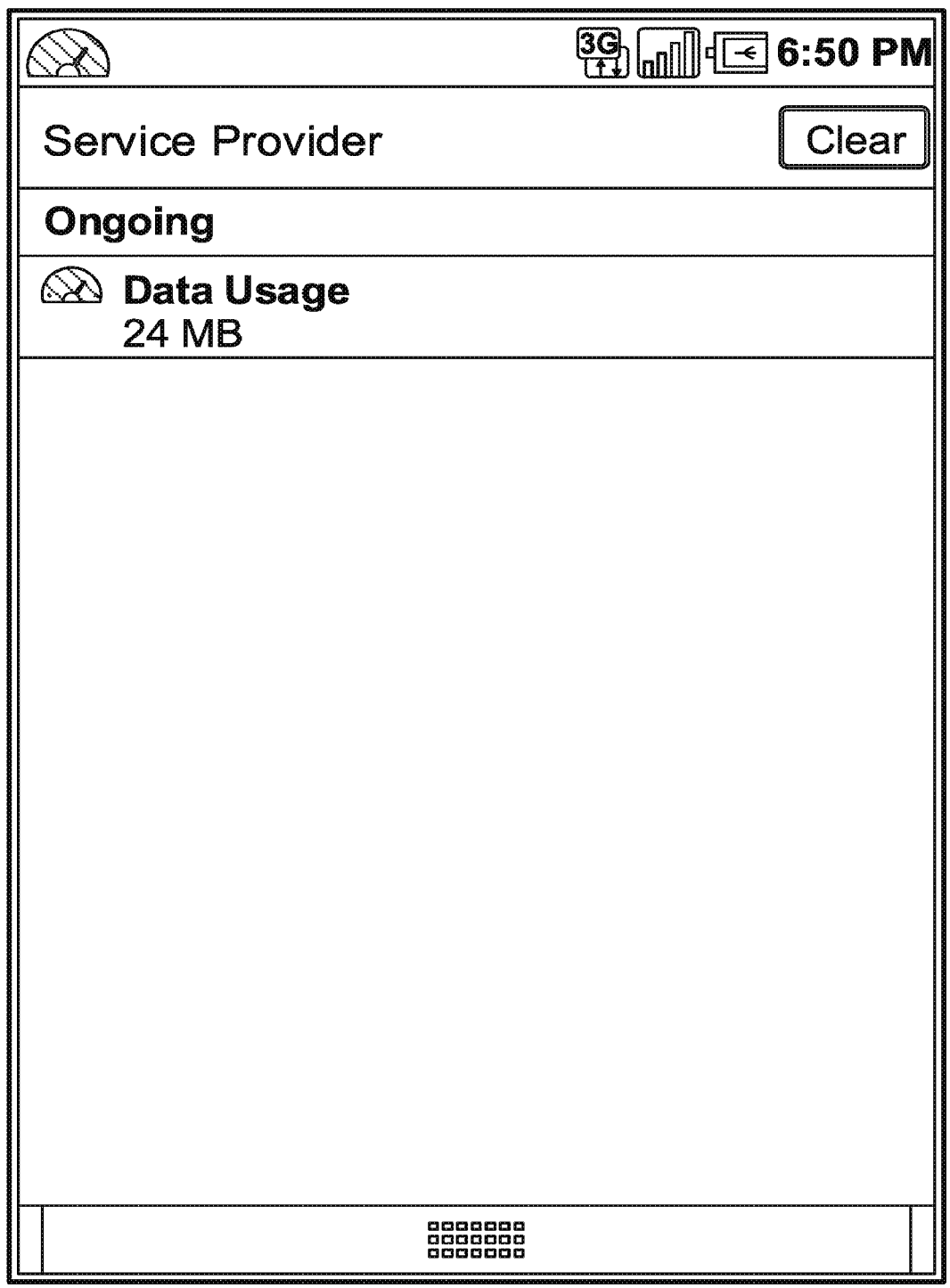
FIG. 24 is a functional diagram illustrating another user interface for user notifications for device assisted services (DAS) in accordance with various embodiments of the systems and methods described herein.

FIG. 24 is a functional diagram for another user interface for user notifications for device assisted services (DAS) in accordance with some embodiments. As shown, an unlimited plan usage notification screen 2400 is displayed (e.g., showing a current data usage in the current cycle of 24 MB as shown). In some embodiments, notification screen 2400 includes various other usage notifications and/or alert messages (e.g., roaming usage notifications that are outside of the unlimited plan).

In some embodiments, user notifications for DAS provides for service plan initial purchase options, configuration options, change options, or service plan status without requiring the user to log into a portal or web page. In some embodiments, service plan information is embedded directly in locally stored user notification message sequence information. In some embodiments, a service plan selection (e.g., user interaction) platform is provided on a device that includes a native user notification agent, local service plan state information, and local service usage state information. In some embodiments, notification trigger event detection criteria that initiate a notification message sequence that provides the user with the option of modifying service policy configuration to better suit the service activities desired by the user that are indicated by the notification trigger event detection criteria is provided.

In some embodiments, user notifications for DAS includes facilitating a service plan selection using various techniques in accordance with various embodiments described herein. In some embodiments, user notifications for DAS includes one or more of the following: service configuration or selection options that are served during a user notification message sequence; service configuration or selection options that are served by branching out of a local user message sequence information stored locally on the device and served by, for example, a user notification agent and into a portal or website that is programmed as part of a user notification agent message sequence; service configuration or selection options that are locally served with a user notification agent and local message notification information store; service configuration or selection options that are served based on one or more notification trigger event detection criteria.

In some embodiments, user notifications for DAS that presents a service plan selection includes a notification trigger event detection criteria that occurs before a service plan limit is reached, and initiates a service plan selection option or configuration option notification message sequence. In some embodiments, user notifications for DAS that presents a service plan selection includes a notification trigger event detection criteria that identifies a service activity usage (e.g., one or more intended service activities) on the device that is not covered by a service plan (e.g., associated with the device, device group, and/or current/active user of the device), and initiates a service plan selection option or configuration option notification message sequence that provides one or more service plans (e.g., service plans or service plan options) that will allow the intended service activities to be served by the network. In some embodiments, user notifications for DAS that presents a service plan selection further includes a notification message sequence that indicates that a network is not available with existing service connections and/or service plans but is available with a new service plan selection option. In some embodiments, user notifications for DAS that presents a service plan selection further includes a notification message sequence that indicates which service plans out of an available set of service plans are suited to the intended service activities.

In some embodiments, user notifications for DAS that presents a service plan selection further includes identifying trigger event detection criteria in which one or more intended service activities or one or more intended service activity patterns that caused a notification detection criteria to exist are not covered by a current available desired network access policy, service plan policy configuration or service plan policy; determining if one or more suitable service plan configurations or alternative service plans for a network are available; providing a notification message sequence (e.g., user notification message sequence) that offers options on the suitable service plan configurations or alternative service plans for a network are available. In some embodiments, user notifications for DAS that presents a service plan selection further includes a notification trigger event detection criteria that identifies intended service activity usage rate or usage patterns that fit the usage rate or usage patterns covered by one or more alternative service plan configurations or alternative service plans; and initiating a notification message sequence that informs a user of the availability of the alternative configuration or plan. In some embodiments, the notification trigger is implemented in the network (e.g., by one or more network elements) and/or on the device, as described herein with respect to various embodiments. In some embodiments, notification sequence information begins on the device and stays on the device (e.g., does not include or request any input from the network, that is, any network elements), as described herein with respect to various embodiments. In some embodiments, notification sequence information begins on the device and, at some point during the user notification messaging sequence process, branches to notification sequence information provided on a portal or website, as described herein with respect to various embodiments.

User support costs to provide users access to support center personnel via live telephone support at call centers can be quite expensive and can significantly lower profit margins for various application and/or service models. What is needed are improved techniques for providing various types of self help to reduce such support costs. Accordingly, in some embodiments, user notifications for DAS includes facilitating self help (e.g., self help for users for using the device, network access, services, billing, service plans, and various other help related to network service usage and/or the wireless communication device) using various techniques in accordance with various embodiments described herein. In some embodiments, user notifications for DAS includes providing self help using various user notification for DAS techniques as described herein with respect to various embodiments. In some embodiments, user notifications for DAS includes providing self help that provides user with an analysis of service usage and offers alternative service plan policy configurations/options and/or alternative service plans. In some embodiments, user notifications for DAS includes providing self help to suggest various service plan configuration enhancements.

In some embodiments, user notifications for DAS includes providing self help to determine what service activities are consuming the largest amount of service usage. In some embodiments, user notifications for DAS includes providing self help to notify of service usage classification by category (e.g., display service usage by category). In some embodiments, classification categories include individual applications, groups of applications, destinations, groups of destinations, users, groups of users, devices, groups of devices. In some embodiments, a classification of service activities is included in a self help screen by application, groups of applications or categories of applications (e.g., email, browsing, social networking, and/or other application categories). In some embodiments, a hierarchical categorization is provided that includes a top level and a next level of the hierarchical categorization, or a top level that allows for a user to then, for example, click/touch or otherwise select down to a next level of the hierarchical categorization. In some embodiments, the classification of activities in the self help is based on individual network destinations, groups of destinations, and/or categories of destinations (e.g., and can similarly provide for a hierarchical categorization as described herein). In some embodiments, for each category, usage can be presented (e.g., listed). For example, for each category, usage can be listed and/or charges categorized by "within service plan" and "over service plan". As another example, for each category, usage can be listed and/or charges classified by one or more of the following: the active network (e.g., 2G, 3G, 4G or WiFi), time of day (TOD) or network busy state (NBS) characterization, QoS characterization, and/or various other classifications as described herein with respect to various embodiments. In some embodiments, the message sequence provides a user option to branch to a service plan selection page, service plan policy configuration page, service plan options page, and/or service plan descriptions page. In some embodiments, the message sequence provides an indication for plan configurations/options or alternative plans that may be better suited to one or more desired service activities or service activity patterns. In some embodiments, the category information is communicated to the network for storage on a network element (e.g., network storage system). In some embodiments, the category information is only communicated to the network for storage on a network element if the user opts in to allow for such category information to be communicated to the network for storage on a network element. In some embodiments, the category information is only communicated to the network for storage on a network element if the user acknowledges a request during a help transmission or help session.

In some embodiments, self help is provided to determine if the device is properly connected to the network. In some embodiments, self help is provided to indicate a type of network for classification categories. In some embodiments, self help is provided to indicate QoS usage of classification categories. In some embodiments, self help is provided to determine if an alternative service plan or alternative network (e.g., 2G, 3G, 4G or WiFi) is better suited for service usage activities desired by user.

In some embodiments, device stored notification sequence information can include notification branches and/or view objects that allow users to immediately view service plan status or make changes to service plan status (e.g., without delay that can be caused by network latency if such information must be requested and received from a network element via wireless network communication). In some embodiments, user notifications for DAS that provides self help includes detecting notification trigger event detection criteria on the device and suggesting changes in the service plan status, configuration, or choice based on the detected trigger, as similarly described herein with respect to various embodiments. In some embodiments, user notifications for DAS that provides self help includes a helper notification message sequence that is triggered based on notification trigger event detection criteria that assist the user in analyzing service plan usage, as similarly described herein with respect to various embodiments. In some embodiments, user notifications for DAS that provides self help includes a helper notification message sequence that is triggered based on notification trigger event detection criteria that assist the user in analyzing service plan usage, and suggesting possible alternative plans that are better suited to the user's desired service usage patterns or activities (e.g., when user attempts activities that are not allowed; and/or user attempts activities that have high usage for the service plan that is selected; user attempts activities that have higher level QoS needs than what is available with the service plan selected, current NBS, current network performance, current network or on roaming network), as described herein with respect to various embodiments. In some embodiments, user notifications for DAS that provides self help includes a helper notification message sequence that is triggered based on notification trigger event detection criteria that assist the user in analyzing service plan usage, and suggesting an alternative service plan configuration, service plan, and/or network, as described herein with respect to various embodiments.

Figure 25:
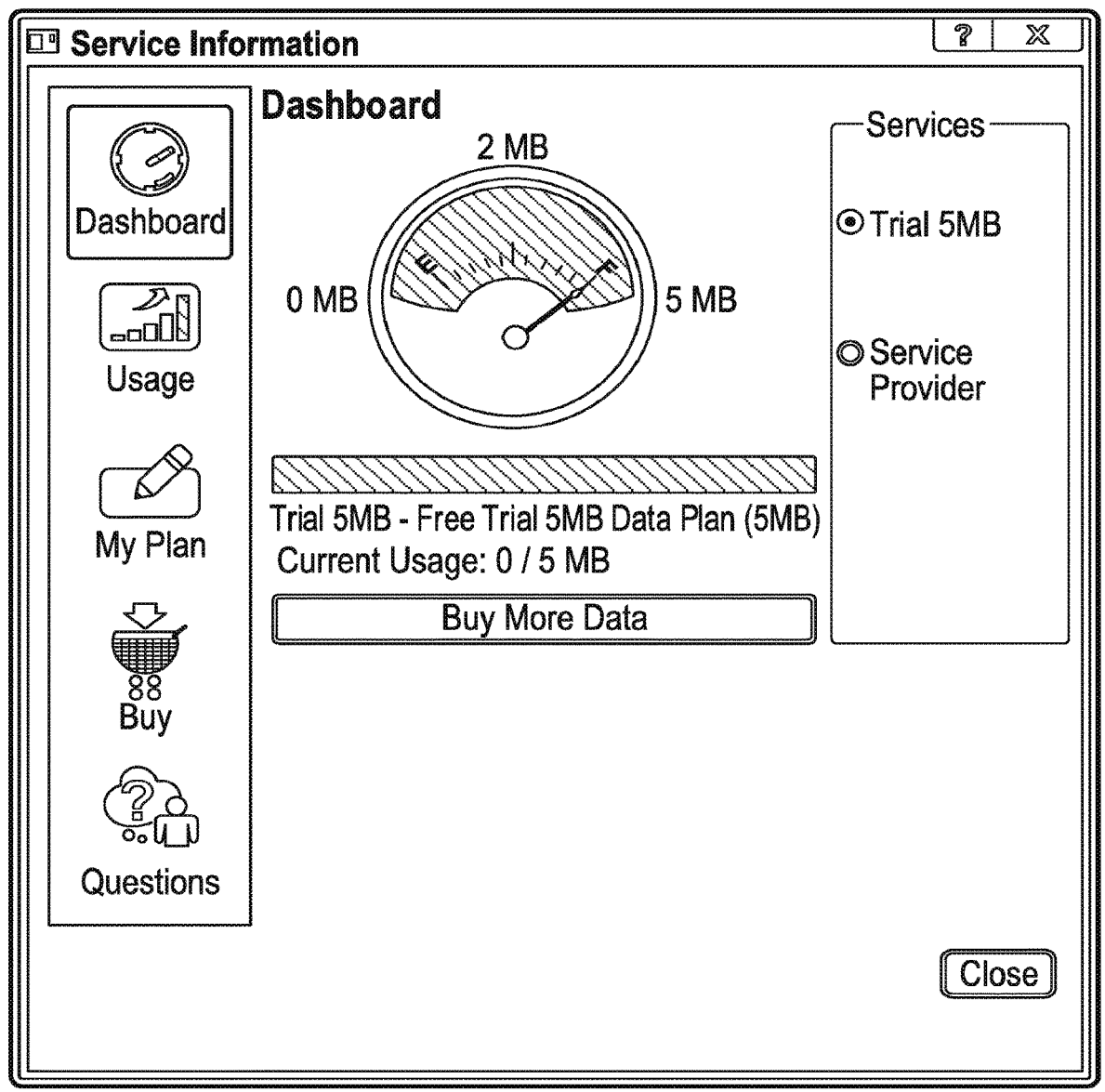
FIG. 25 is a functional diagram illustrating another user interface for user notifications for device assisted services (DAS) in accordance with various embodiments of the systems and methods described herein.

FIG. 25 is a functional diagram for another user interface for user notifications for device assisted services (DAS) in accordance with some embodiments. As shown, a usage dashboard 2500 displays a usage gauge, a usage meter, an indication of the current service plan (e.g., trial plan of 5 MB and/or a Service Provider service plan), and an option to buy more data.

Figure 26:
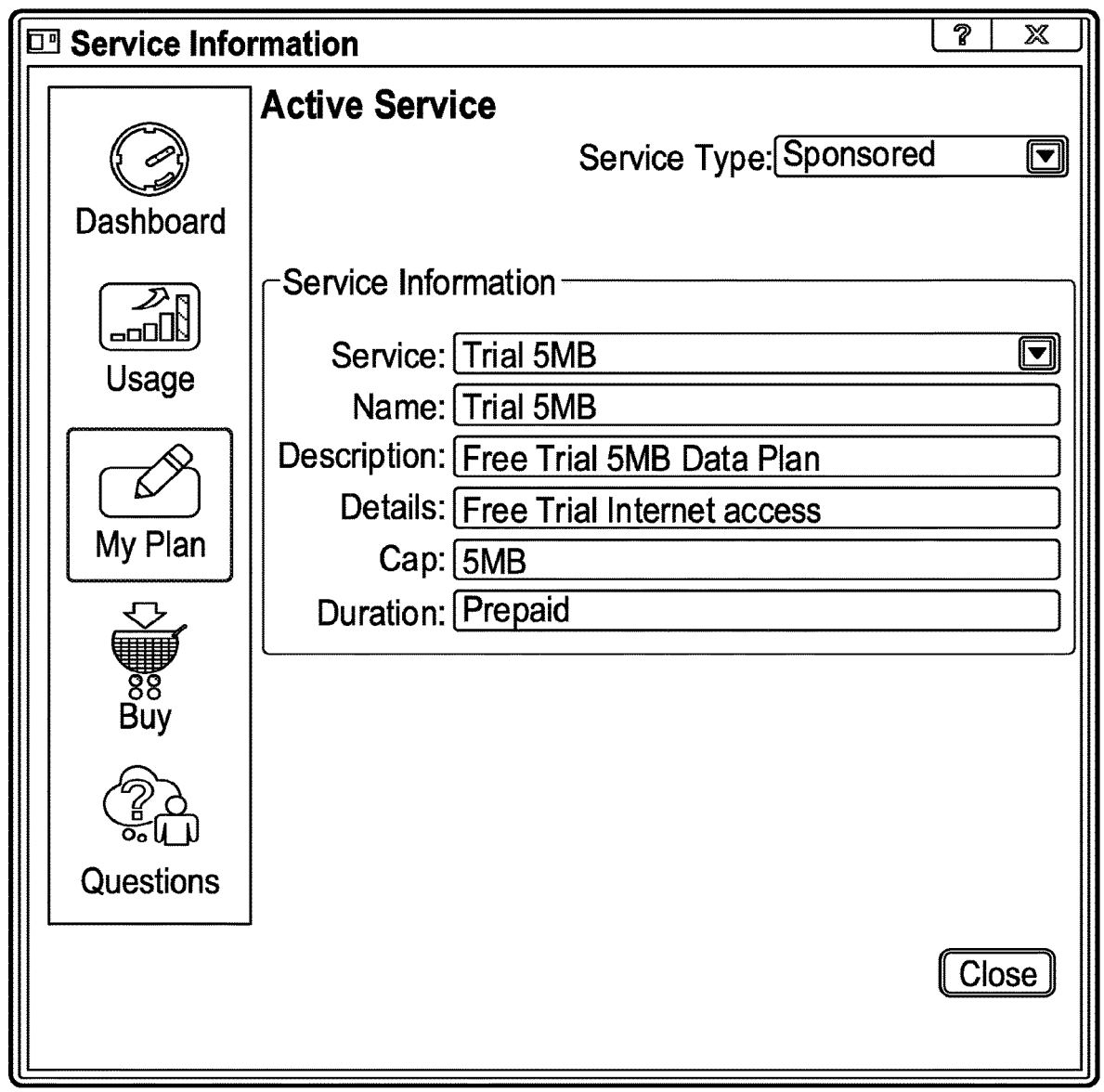
FIG. 26 is a functional diagram illustrating another user interface for user notifications for device assisted services (DAS) in accordance with various embodiments of the systems and methods described herein.

FIG. 26 is a functional diagram for another user interface for user notifications for device assisted services (DAS) in accordance with some embodiments. As shown, an Active Service screen 2600 various information associated with an active service for Free Trial Internet Access (e.g., sponsored service, and associated service information including service plan data usage cap/limit of 5 MB, as shown).

Figure 27:
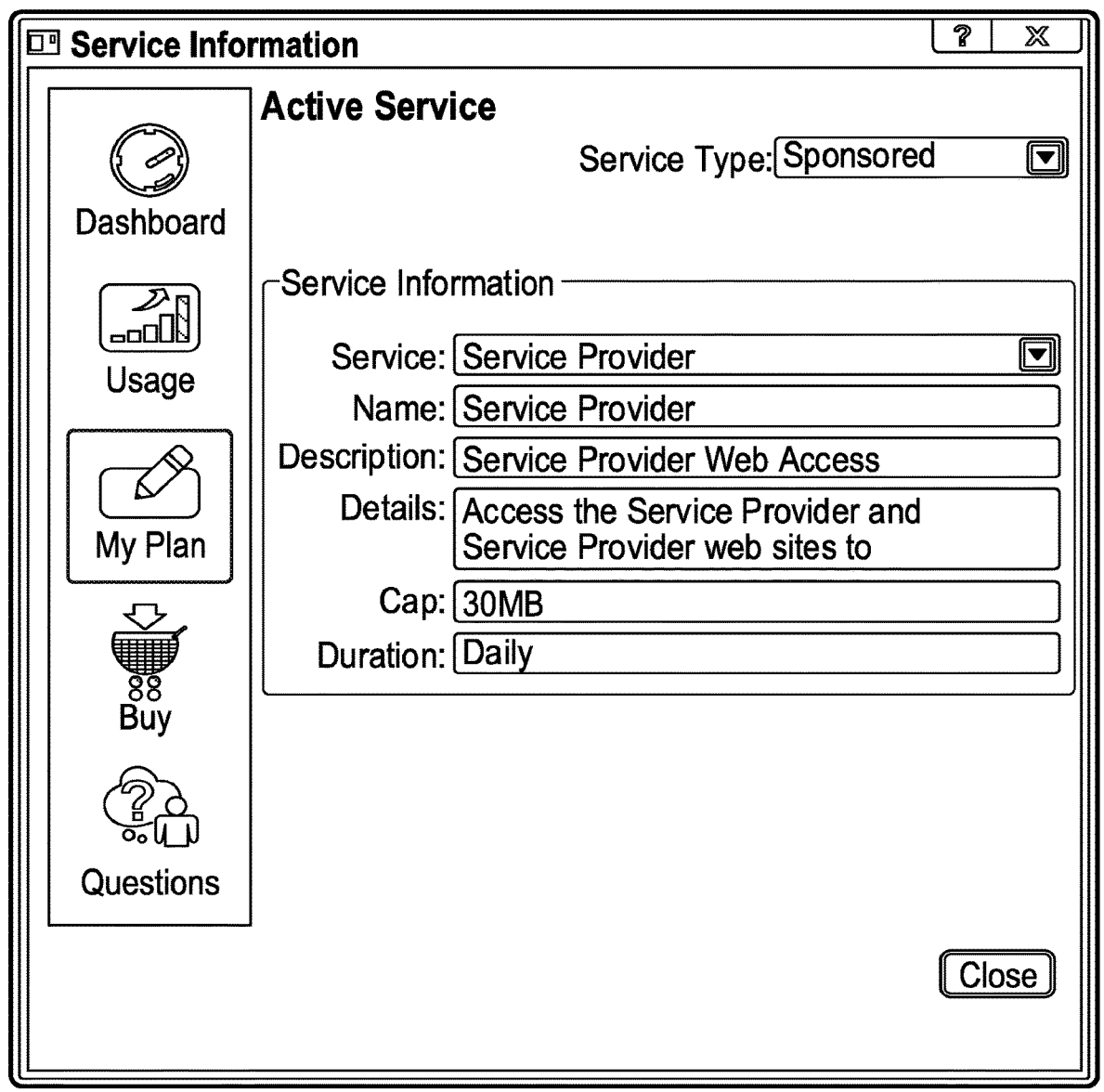
FIG. 27 is a functional diagram illustrating another user interface for user notifications for device assisted services (DAS) in accordance with various embodiments of the systems and methods described herein.

FIG. 27 is a functional diagram for another user interface for user notifications for device assisted services (DAS) in accordance with some embodiments. As shown, Active Service screen 2700 includes various other information associated with another active service for Service Provider Web Access (e.g., sponsored service, and associated service information including service plan data usage cap/limit of 30 MB, as shown).

Figure 28:
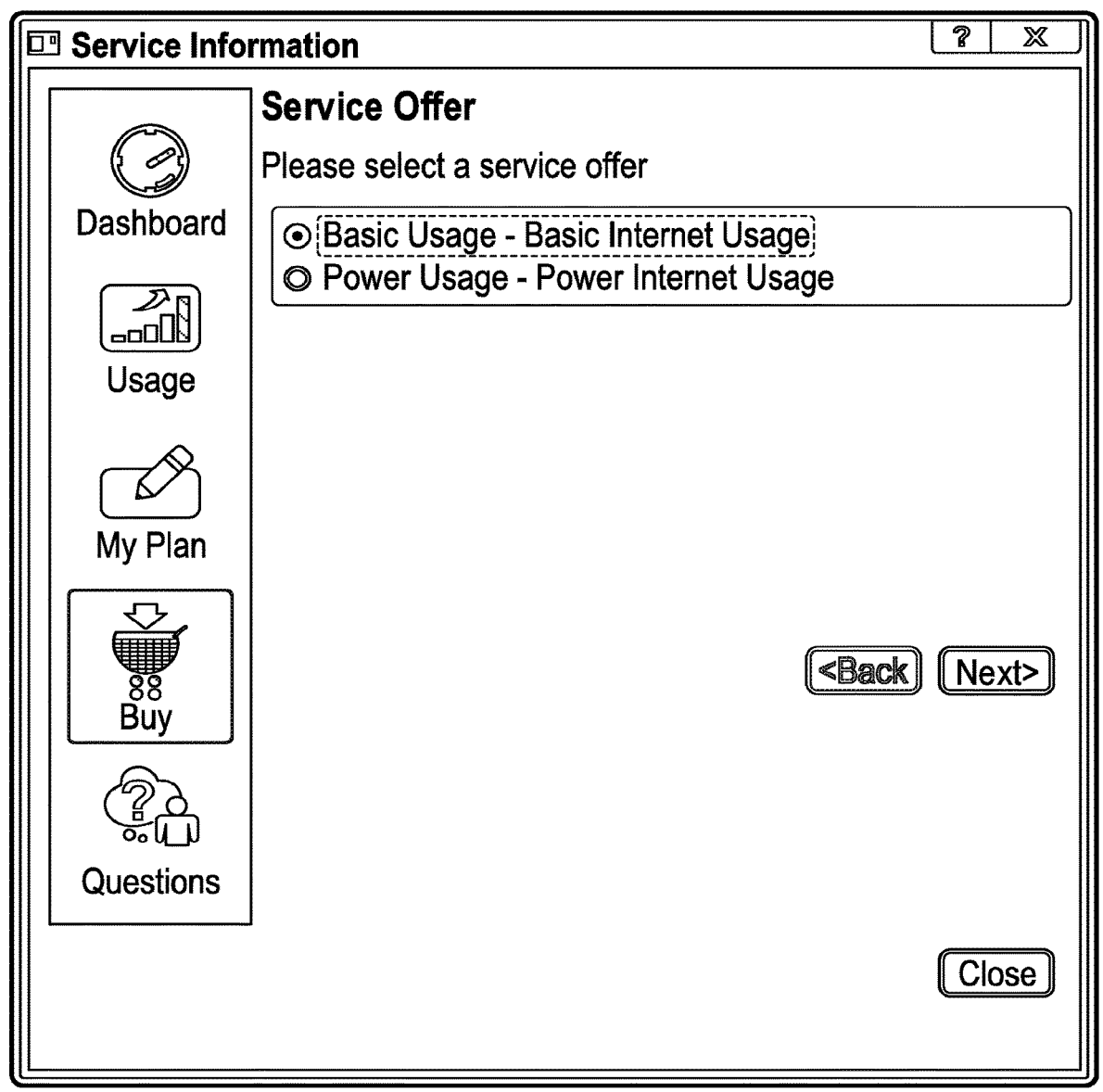
FIG. 28 is a functional diagram illustrating another user interface for user notifications for device assisted services (DAS) in accordance with various embodiments of the systems and methods described herein.

FIG. 28 is a functional diagram for another user interface for user notifications for device assisted services (DAS) in accordance with some embodiments. As shown, a Service Offer selection screen 2800 includes options for a user to select a service plan offer. In some embodiments, the service offer selection screen 2800 allows a user to purchase and/or set up a mobile broadband access service plan for a laptop/computer, smart phone/PDA, a PC card (e.g., wireless modem or USB modem), and/or cell phone.

Figure 29:
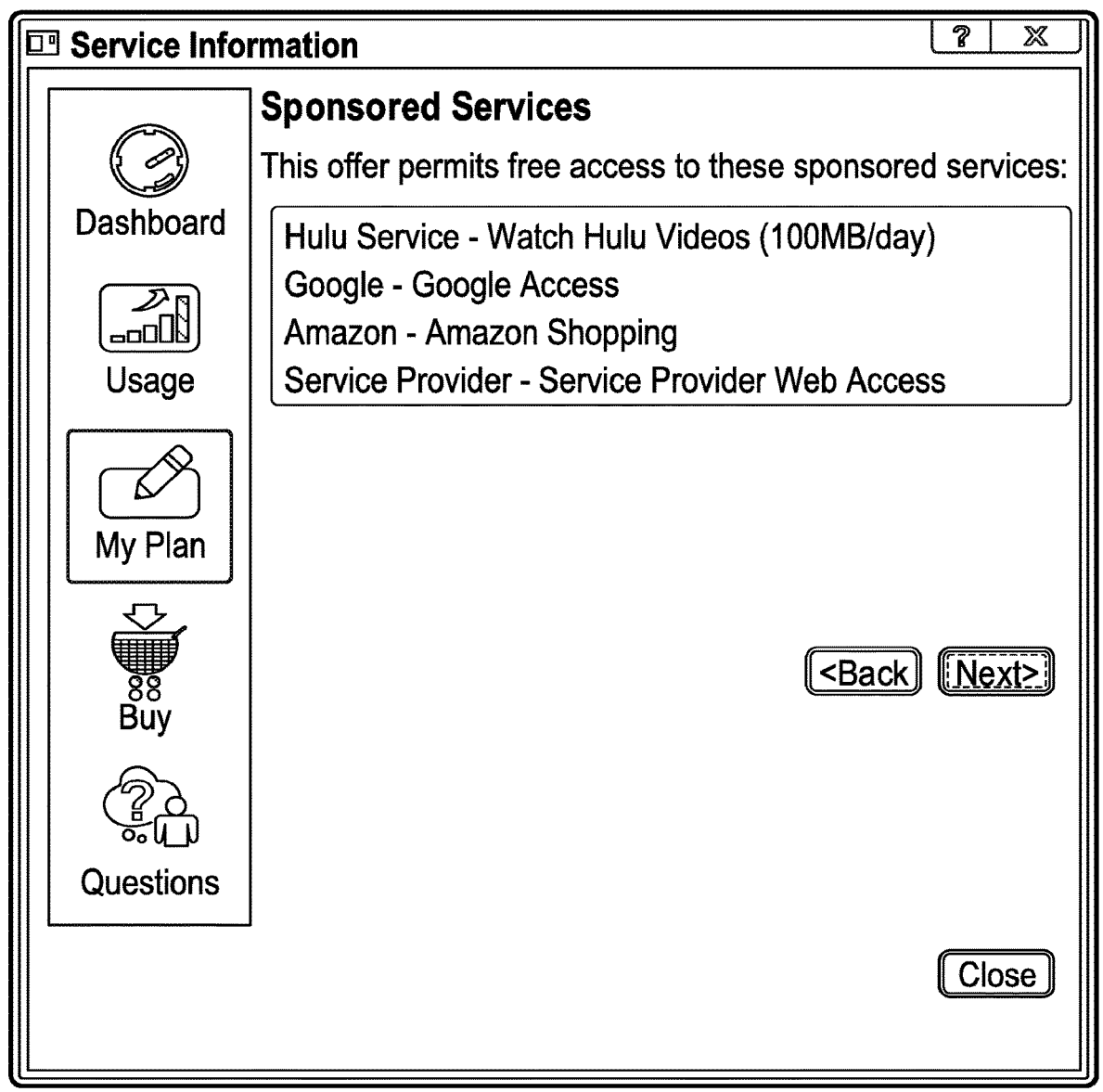
FIG. 29 is a functional diagram illustrating another user interface for user notifications for device assisted services (DAS) in accordance with various embodiments of the systems and methods described herein.

FIG. 29 is a functional diagram for another user interface for user notifications for device assisted services (DAS) in accordance with some embodiments. As shown, a Sponsored Services screen 2900 displays sponsored service offers as described herein with respect to various embodiments (e.g., a Google sponsored service for Google access and an Amazon sponsored service for Amazon shopping and/or Kindle access).

Figure 30:
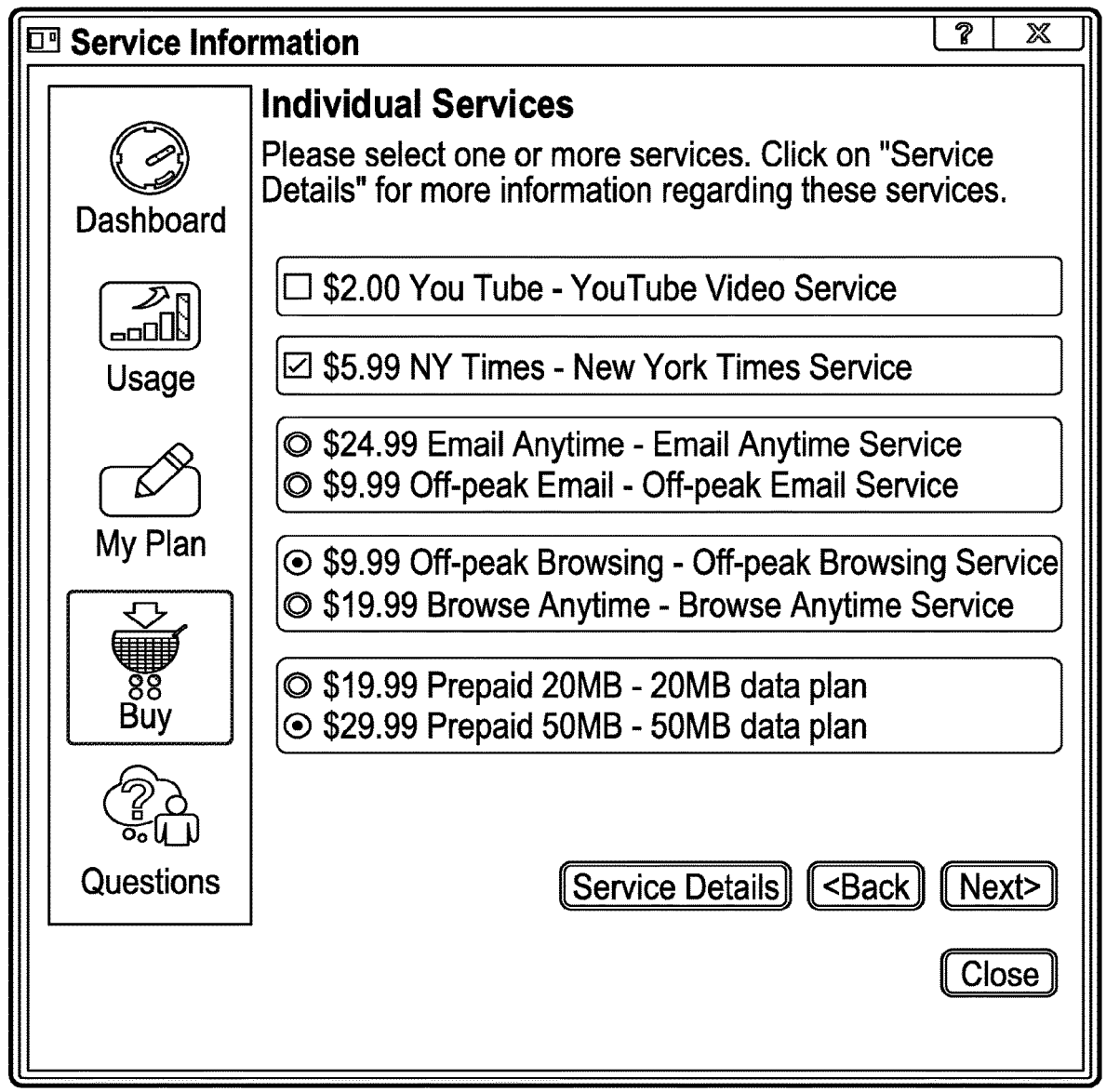
FIG. 30 is a functional diagram illustrating another user interface for user notifications for device assisted services (DAS) in accordance with various embodiments of the systems and methods described herein.

FIG. 30 is a functional diagram for another user interface for user notifications for device assisted services (DAS) in accordance with some embodiments. As shown, an Individual Services screen 3000 displays options for selecting and/or purchasing various individual service offers (e.g., a NY Times service for NY Times online news access and a prepaid data plan). In some embodiments, a purchase confirmation screen, email, online receipt, mailed receipt, and/or other purchase confirmation response is presented or provided to the user upon confirmation and completion of a service purchase order.

Figure 31:
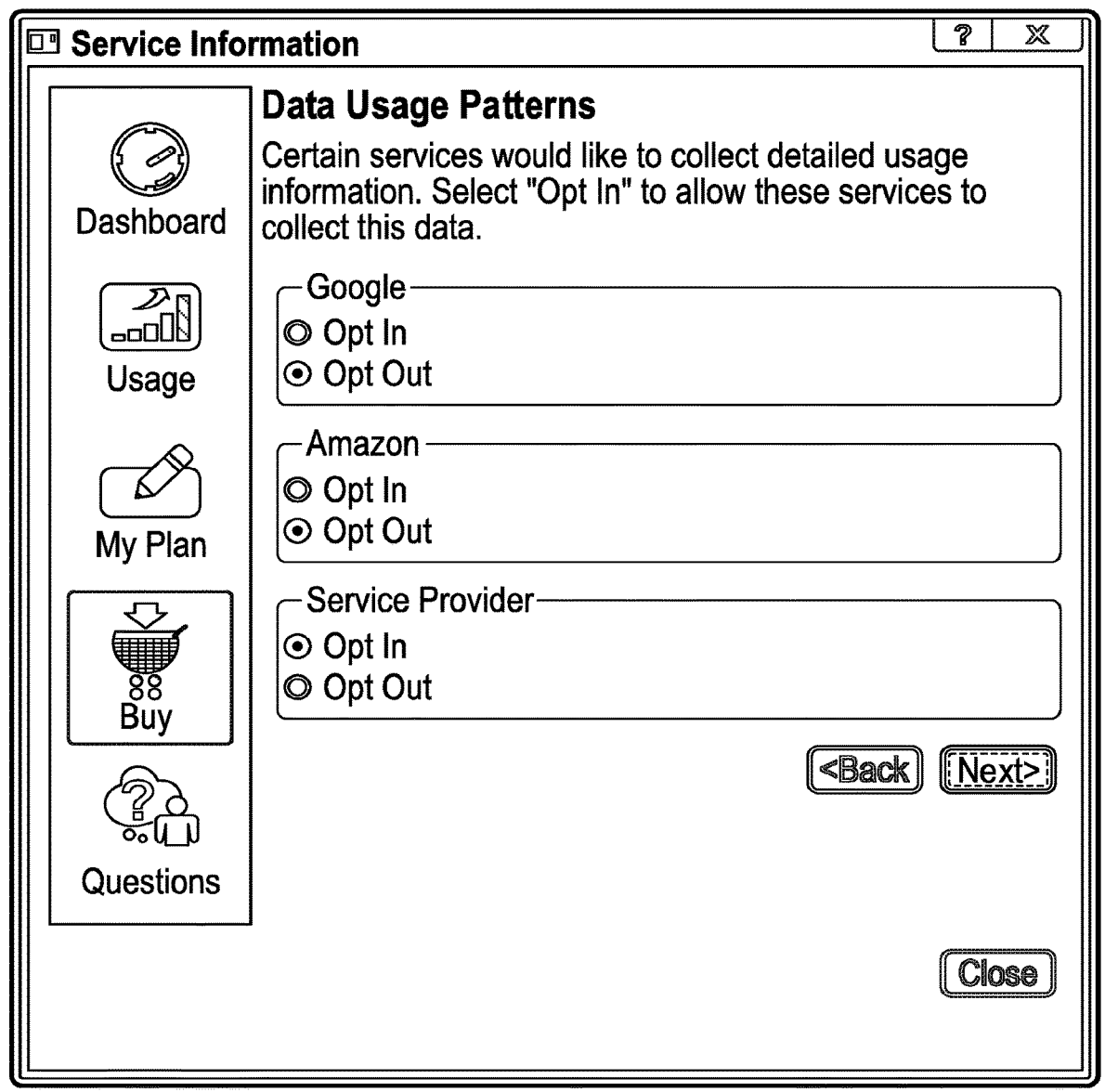
FIG. 31 is a functional diagram illustrating another user interface for user notifications for device assisted services (DAS) in accordance with various embodiments of the systems and methods described herein.

FIG. 31 is a functional diagram for another user interface for user notifications for device assisted services (DAS) in accordance with some embodiments. As shown, a data usage patterns screen 3100 displays "Opt In" and "Opt Out" options for the monitoring and/or collection of certain detailed usage information (e.g., allowing users to opt in/out to allow various sponsored services or other services to collect detailed service usage information). /or alert messages (e.g., roaming usage notifications that are outside of the unlimited plan).

Figure 32:
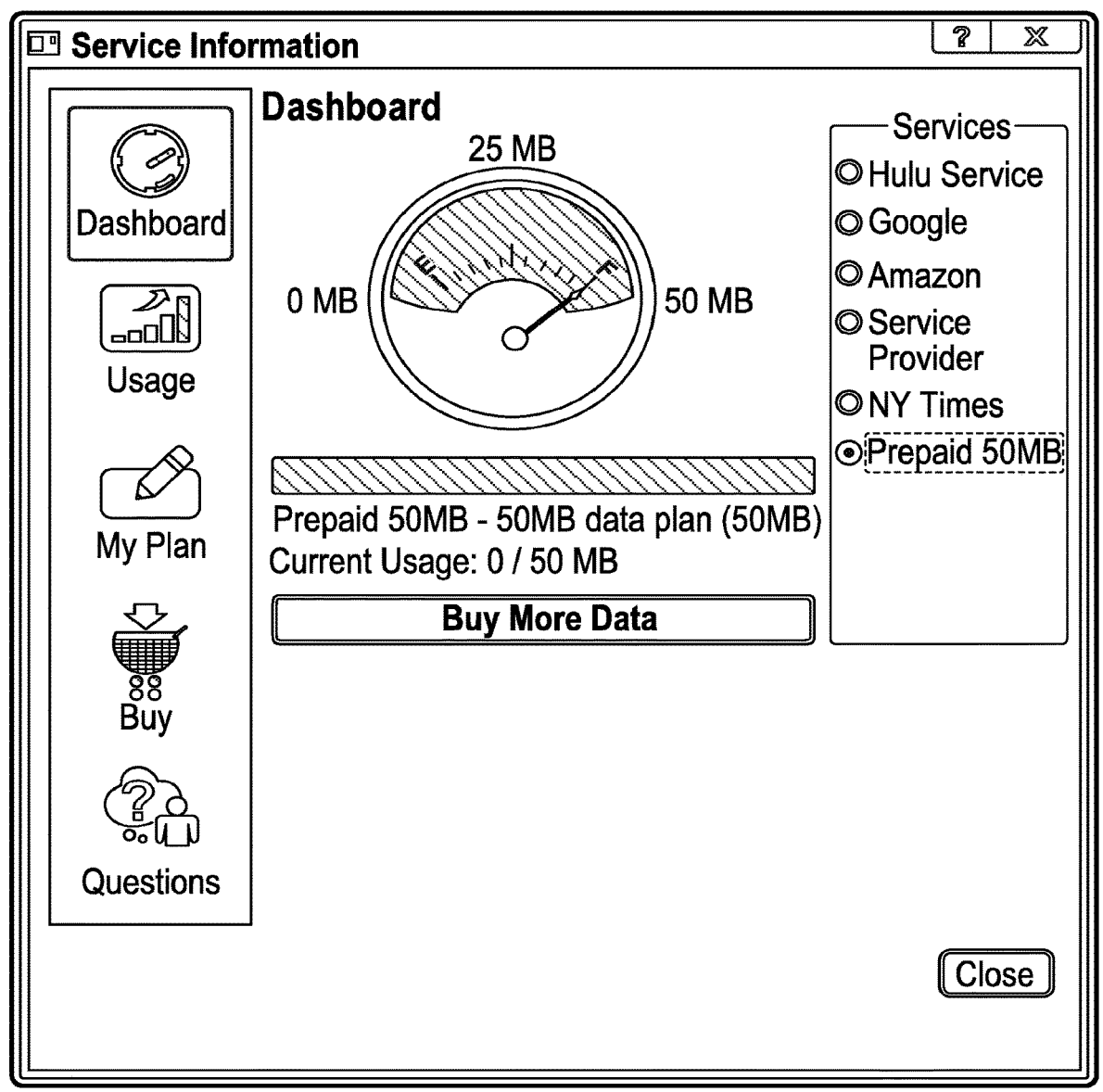
FIG. 32 is a functional diagram illustrating another user interface for user notifications for device assisted services (DAS) in accordance with various embodiments of the systems and methods described herein.

FIG. 32 is a functional diagram for another user interface for user notifications for device assisted services (DAS) in accordance with some embodiments. As shown, a usage dashboard 3200 displays a usage gauge, a usage meter, an indication of the current service plan (e.g., prepaid 50 MB plan as shown), and an option to buy more data.

Figure 33:
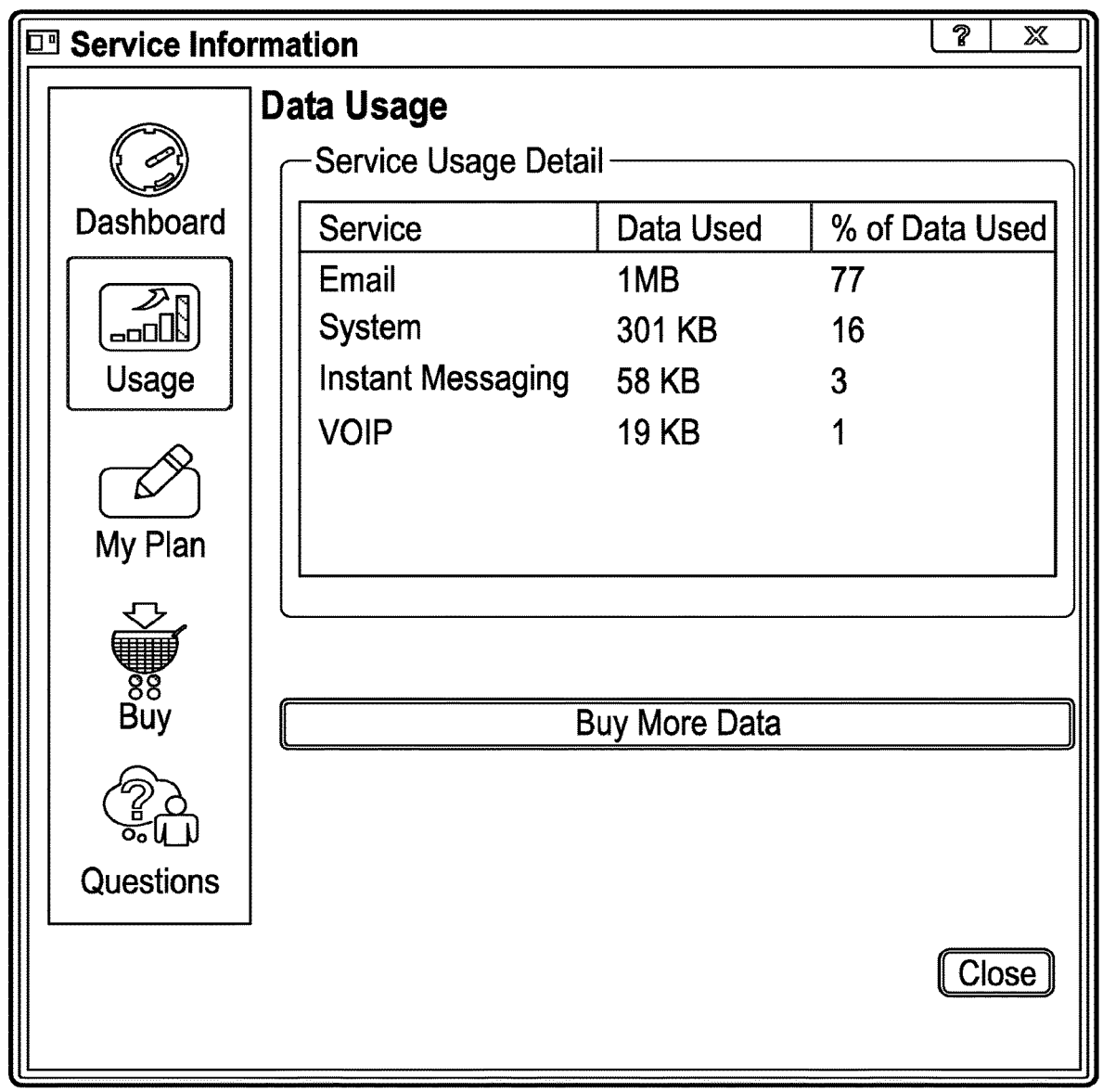
FIG. 33 is a functional diagram illustrating another user interface for user notifications for device assisted services (DAS) in accordance with various embodiments of the systems and methods described herein.

FIG. 33 is a functional diagram for another user interface for user notifications for device assisted services (DAS) in accordance with some embodiments. As shown, a Service Usage Detail screen 3300 displays service usage by service including service name/type (e.g., email, system, instant messaging, and VOIP, as shown), data used for each service for a current cycle, and percentage of service plan capacity used for each service for a current cycle, and an option to buy more data option is also displayed. In some embodiments, Service Usage Detail screen 3300 is implemented as a widget (e.g., accessed/displayed on a primary screen/display of the communications device, such that when the user selects the widget, Service Usage Detail screen 3300 is displayed. In some embodiments, Service Usage Detail screen 3300 includes a graph of data usage broken down by, for example, the top 5 or top 10 usage categories (e.g., applications, browsing, email, online video, online social networking, online music, and/or any other category of service usage).

Figure 34:
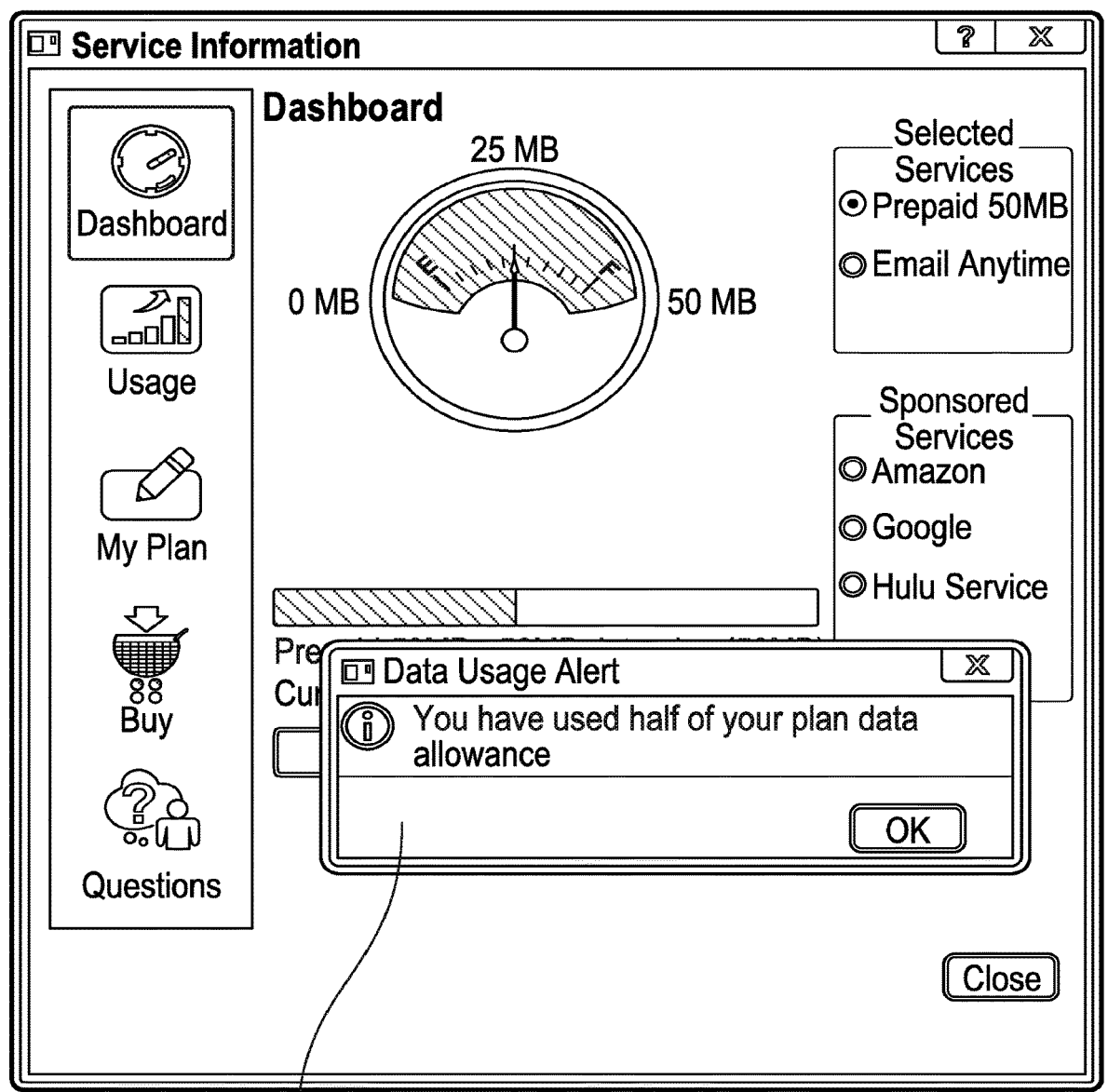
FIG. 34 is a functional diagram illustrating another user interface for user notifications for device assisted services (DAS) in accordance with various embodiments of the systems and methods described herein.

FIG. 34 is a functional diagram for another user interface for user notifications for device assisted services (DAS) in accordance with some embodiments. As shown, usage dashboard 3400 is displayed, and a data usage alert 3410 is also displayed notifying the user that the user has used half of their service plan allowance.

Figure 35:
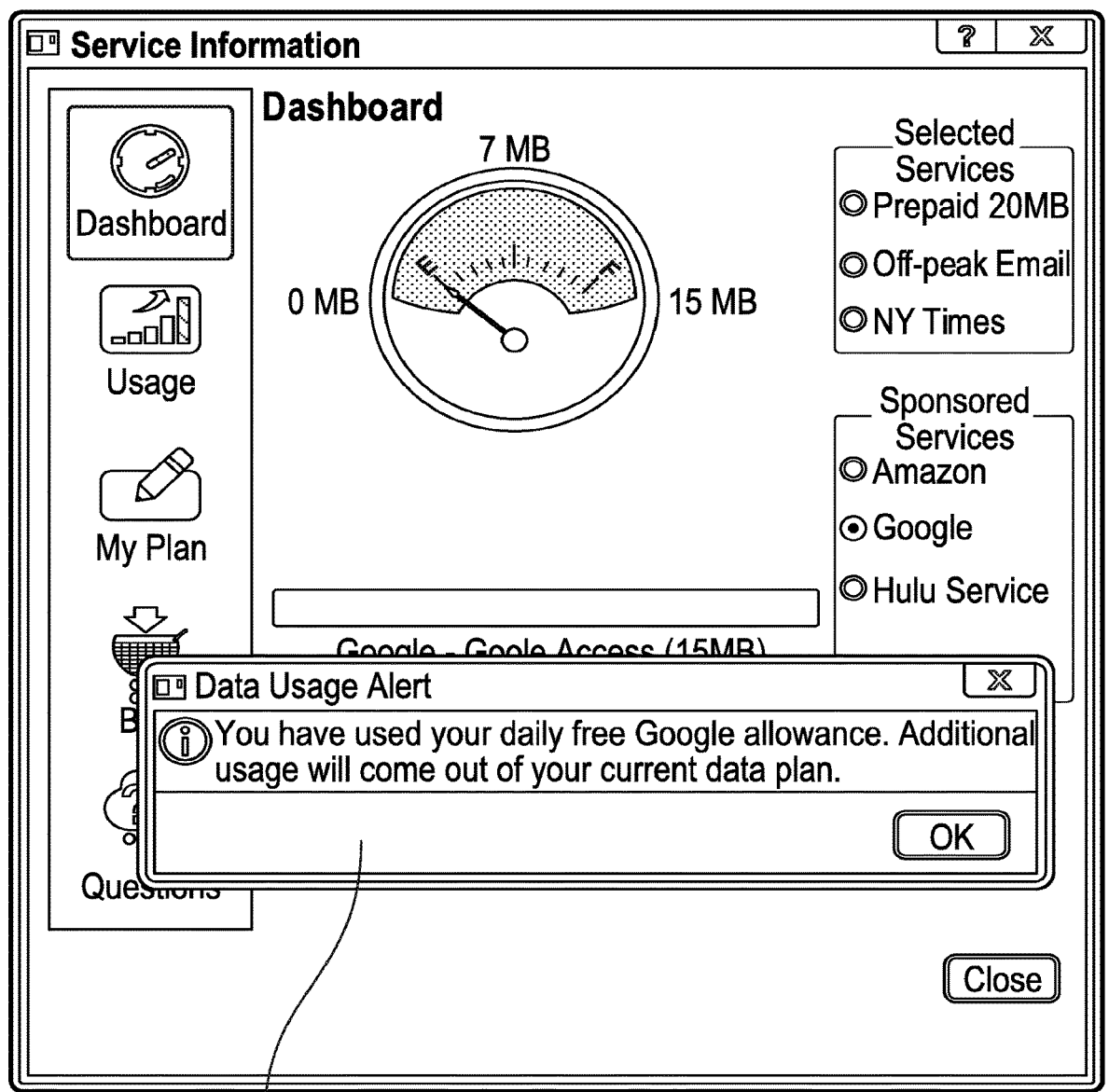
FIG. 35 is a functional diagram illustrating another user interface for user notifications for device assisted services (DAS) in accordance with various embodiments of the systems and methods described herein.

FIG. 35 is a functional diagram for another user interface for user notifications for device assisted services (DAS) in accordance with some embodiments. As shown, usage dashboard 9400 is displayed, and another data usage alert 3510 is also displayed notifying the user that the user has used their daily free Google sponsored service allowance and that any additional Google service related data usage will come out of the associated service data plan. In some embodiments, service plan options and service plan monitoring is based on a time of day of service usage (e.g., plan is off peak, usage on peak; such as a service plan for off peak email and email text only on peak and/or a service plan that only allows for off peak downloads).

Figure 36:
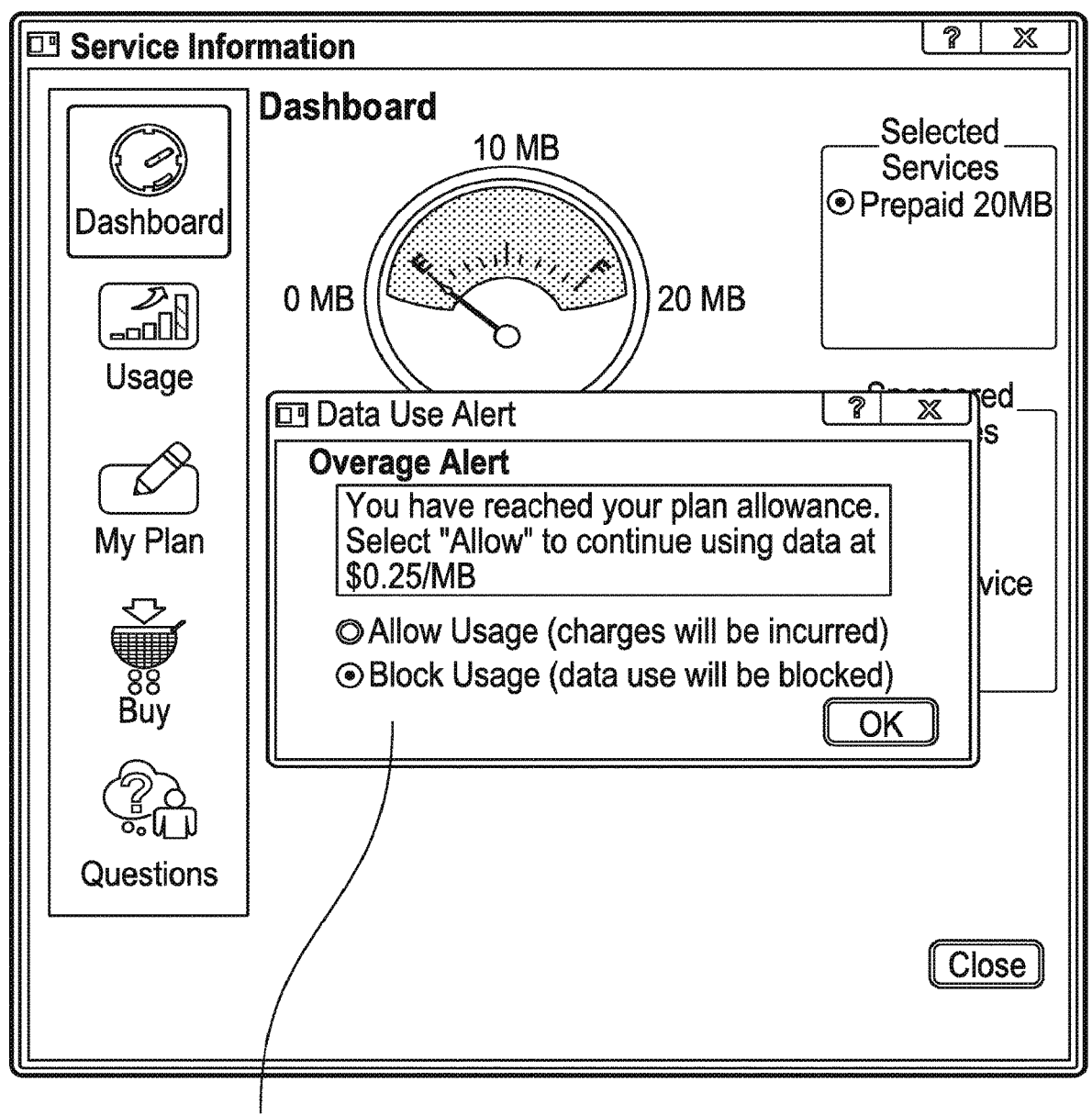
FIG. 36 is a functional diagram illustrating another user interface for user notifications for device assisted services (DAS) in accordance with various embodiments of the systems and methods described herein.

FIG. 36 is a functional diagram for another user interface for user notifications for device assisted services (DAS) in accordance with some embodiments. As shown, usage dashboard 3600 is displayed, and an overage alert 3610 is also displayed notifying the user that the user has reached their service plan allowance/capacity and providing options for the user to either block the service usage or to allow the service usage (e.g., charges will be incurred).

Figure 37:
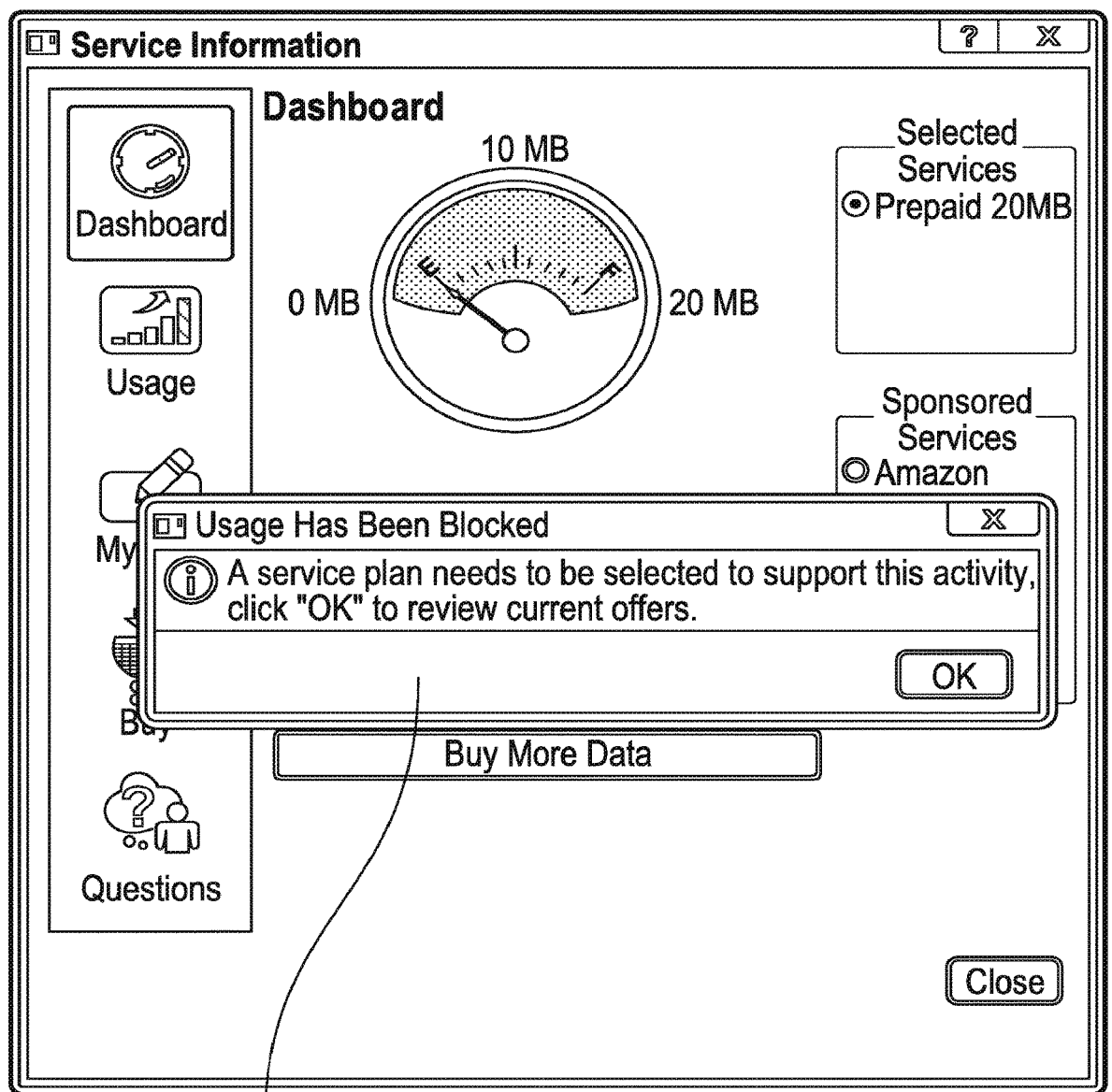
FIG. 37 is a functional diagram illustrating another user interface for user notifications for device assisted services (DAS) in accordance with various embodiments of the systems and methods described herein.

FIG. 37 is a functional diagram for another user interface for user notifications for device assisted services (DAS) in accordance with some embodiments. As shown, usage dashboard 3700 is displayed, and as usage block alert 3710 is also displayed notifying the user that a service plan needs to be selected to support the current/requested service usage activity and to click "OK" to review current service plan offers that would allow for/support the current/requested service usage activity.

Figure 38A:
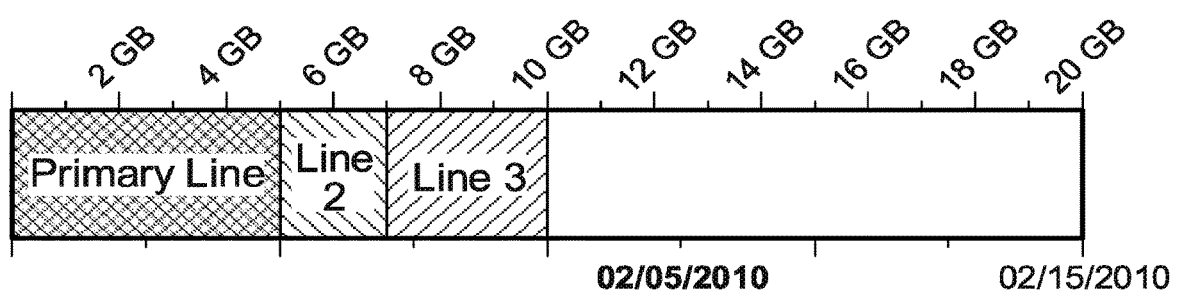
FIGS. 38A-B are functional diagrams for another user interface for user notifications for device assisted services (DAS) in accordance with various embodiments of the systems and methods described herein.
Figure 38B:
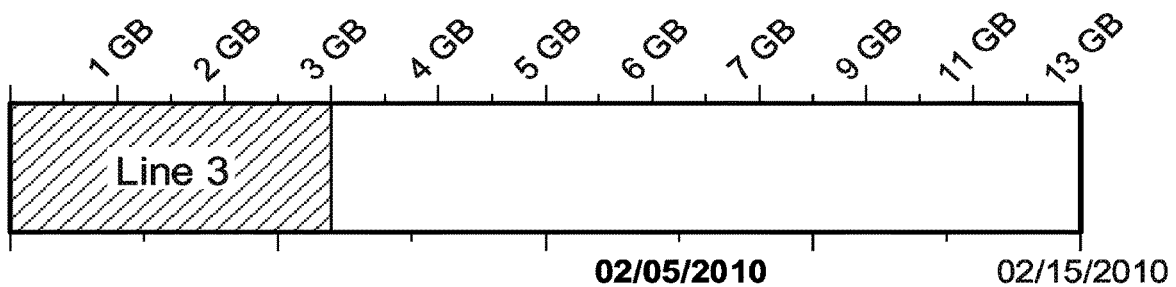

FIGS. 38A-B are functional diagrams for another user interface for user notifications for device assisted services (DAS) in accordance with some embodiments. As shown, FIG. 38A displays a service usage bar/meter (e.g., a master usage bar/meter) for a shared account service plan that includes a current service usage for a Primary Line (e.g., primary user/device/line) of the shared account service plan, a current service usage for a line 2 (e.g., second user/device/line) associated with the shared account service plan, and a current service usage for a line 3 (e.g., third user/device/line) associated with the shared account service plan. As shown, FIG. 38B shows another service usage bar/meter (e.g., an individual usage bar/meter) for the shared account service plan that only includes a current service usage for line 3 (e.g., third user/device/line) associated with the shared account service plan. In some embodiments, an owner or primary user (e.g., user associated with the primary line) of the shared account service plan can access/view the service usage bar/meter as shown in FIG. 38A. In some embodiments, the third user (e.g., user associated with the third line) of the shared account service plan can only access/view the service usage bar/meter as shown in FIG. 38B.

In some embodiments, if a member of the family plan is a child, then a parent owner of the family plan can set/configure their usage alerts. For example, alerts can be configured to be sent to the parent via user notification on the communications device associated with the parent, e-mail, SMS, voice message, and/or any other user notification. In some embodiments, the user notification to the parent can also allow the parent to perform usage alert related actions, such as to disable the child's service usage, continue with an overage, and/or update/select a new service plan. In some embodiments, the parent can allocate certain and/or all configuration of alerts to other members of the family plan. In some embodiments, the owner/point of contact of a corporate plan can have similar embodiments as described herein with respect to family plans and user notifications.

Figure 39:
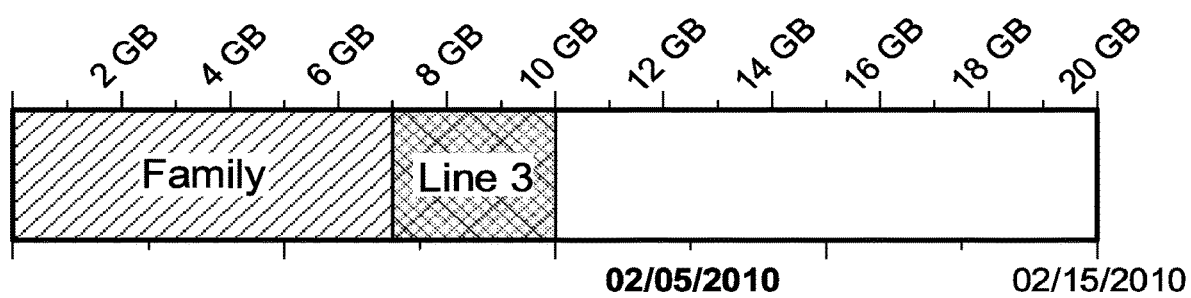
FIG. 39 is a functional diagram illustrating another user interface for user notifications for device assisted services (DAS) in accordance with various embodiments of the systems and methods described herein.

FIG. 39 is a functional diagram for another user interface for user notifications for device assisted services (DAS) in accordance with some embodiments. As shown, FIG. 39 shows a service usage bar/meter (e.g., a master usage bar/meter) for a family plan that includes a current service usage for the family and for line 3 (e.g., third user/device/line) associated with the family plan.

Figure 40:
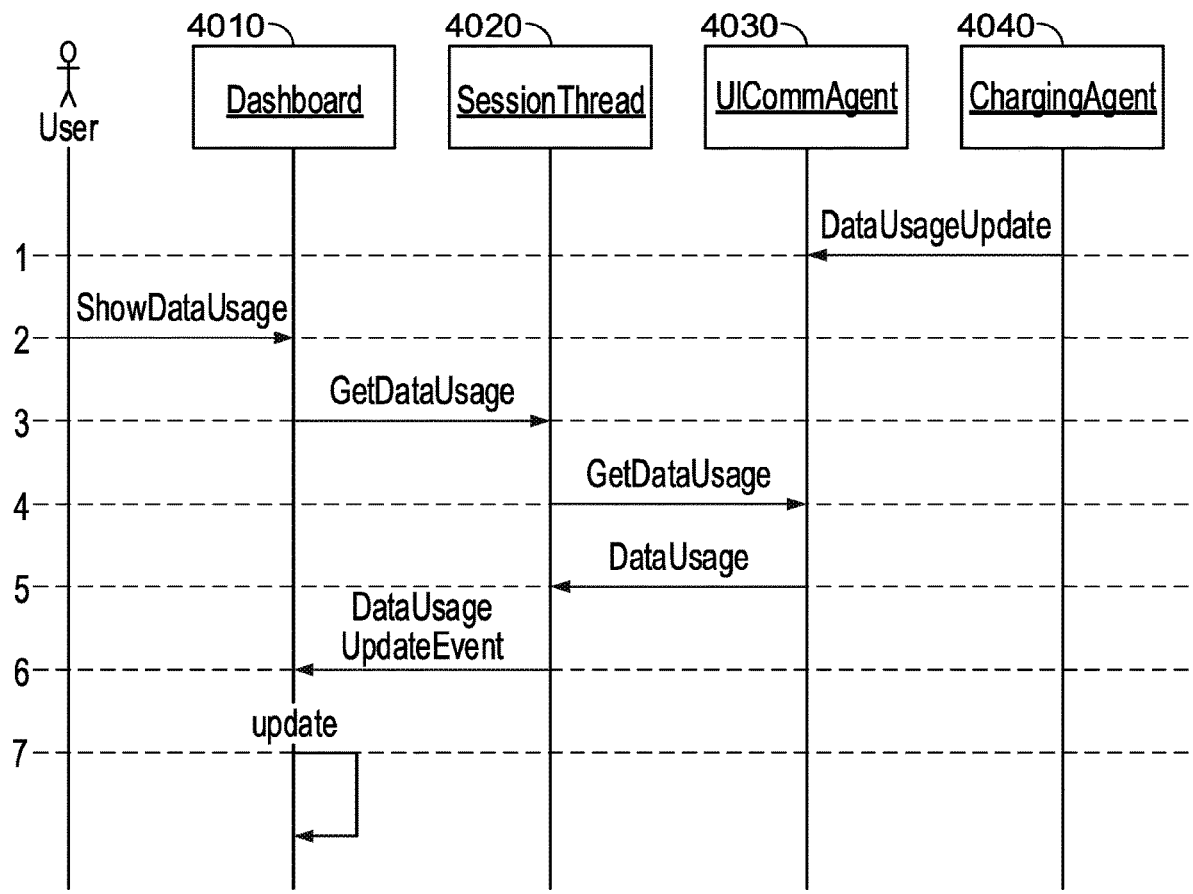
FIG. 40 is a functional diagram for requesting user notifications for device assisted services (DAS) in accordance with various embodiments of the systems and methods described herein.

FIG. 40 is a functional diagram for requesting user notifications for device assisted services (DAS) in accordance with some embodiments. In some embodiments, a charging agent is implemented using a network element/function (e.g., Service Controller 122, Home Agent 6510, and/or another function/element). In some embodiments, the charging agent 4040 (e.g., an agent or function/element that monitors and/or reports data service usage, such as a service monitoring agent as described herein with respect to various embodiments) reports data/service usage updates to a reporting agent (e.g., UI Communication Agent 4030 or another agent or element/function that can be implemented in a network element/function, such as Service Controller 122, Home Agent 6510, and/or another function/element, and/or implemented as a device element/function, such as Service Processor 115 another function/element of mobile station 100). As shown, charging agent 4040 reports data usage update information to UI Communication Agent 4030. When a user accesses a usage dashboard 4010, such as the usage dashboard described herein with respect to various embodiments, the usage dashboard 4010 access initiates a get data usage request to a Session Thread 4020. The Session Thread 4020 sends the get data usage request to the UI Communication Agent 4030, which responds with a current data usage update measure/count. The Session Thread 4020 reports the data usage update event to the usage dashboard 4010, which periodically requests and/or receives data usage updates as shown. In some embodiments, the charging agent 4040 is implemented on the device (e.g., Service Processor 115 of device 100, and the service/data usage update communications are secure local/inter-agent/process communications on the device, which can be periodically verified using various verification techniques as described herein). In some embodiments, data usage update events are periodically received and/or synchronized (e.g., pushed and/or pulled) based on network service usage measures as similarly described herein with respect to various embodiments. As will be apparent to one of ordinary skill in the art in view of the various embodiments described herein, various update and communication protocols can be implemented to provide current and accurate service/data usage measure information on the usage dashboard.

Figure 41:
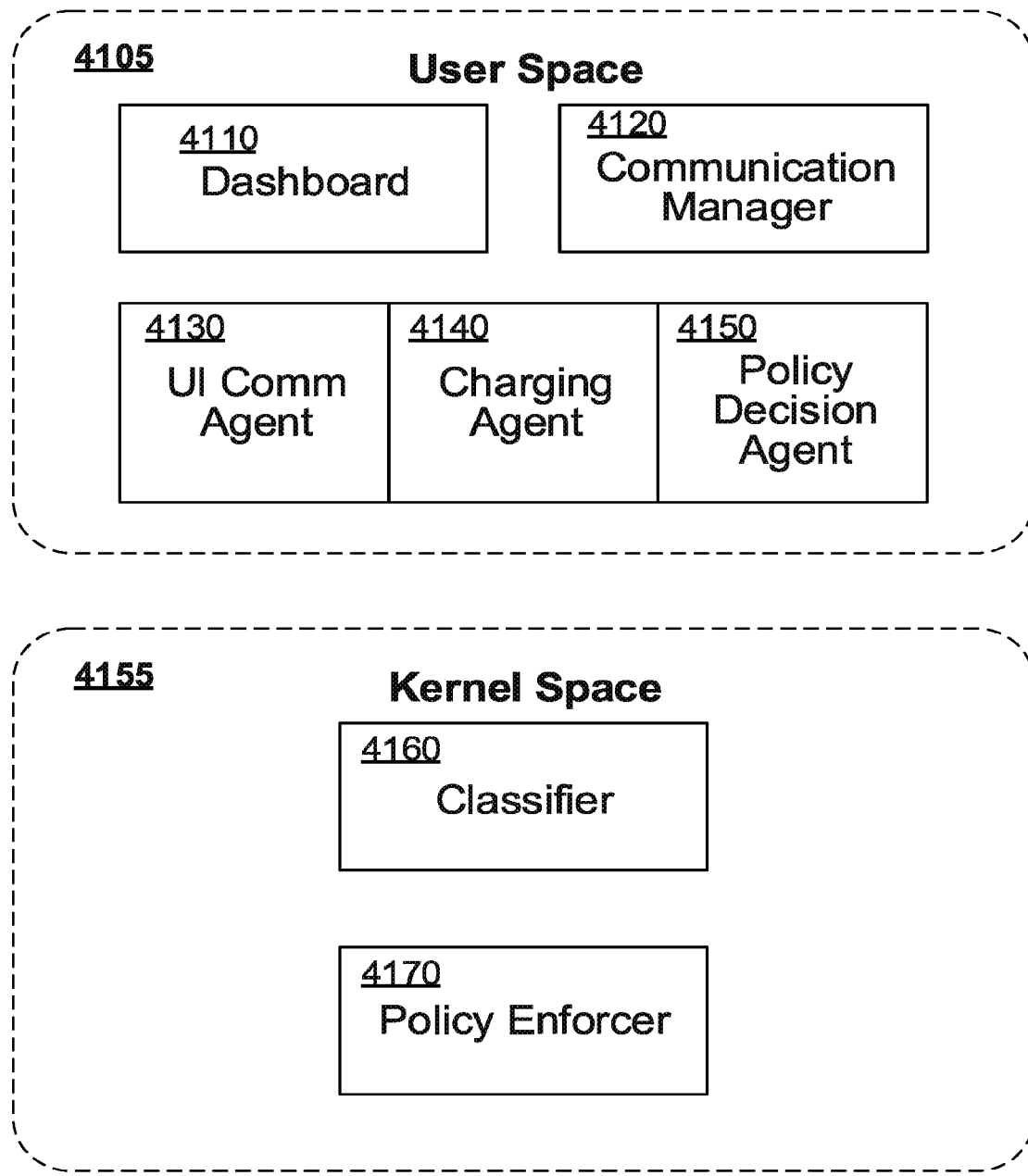
FIG. 41 is a functional diagram for a platform architecture for user notifications for device assisted services (DAS) in accordance with various embodiments of the systems and methods described herein.

FIG. 41 is a functional diagram for a platform architecture for user notifications for device assisted services (DAS) in accordance with some embodiments. In some embodiments, a usage dashboard is implemented in user space 4105 (e.g., user space of an operating system, such as a framework layer of an Android operating system) and various policy enforcement and classification functions are implemented in a kernel space 4155 of an operating system of device 100. As shown, dashboard 4110 is implemented in user space 4105 along with a communication manager 4120, a UI communication agent 4130 (e.g., for implementing UI notifications as described herein with respect to various embodiments, such as user interface 120), a charging agent 4140 (e.g., a service monitoring/reporting agent as described herein with respect to various embodiments, such as service monitor agent 1696), and a policy decision agent 4150 (e.g., a policy control agent as described herein with respect to various embodiments, such as policy control agent 1692). As also shown, classifier 4160 (e.g., a service control monitoring and classification function as similarly described herein with respect to various embodiments) is implemented in kernel space 4155 along with a policy enforcer 4170. In some embodiments, communication manager 4120 is responsible for messaging between Service Processor 115 and Service Controller 122 (e.g., or equivalent network element, such as RTR).

In some embodiments, communication manager 4120 collaborates with a message bus component to send and receive model objects to policy decision agent 4150 and communication agent 4130. In some embodiments, policy decision agent 4150 is responsible for adapting service access policies (e.g., filters and/or actions) into access and classification rules. In some embodiments, policy decision agent 4150 is responsible for communicating adapted policies to classifier 4160 and policy enforcer 4170. In some embodiments, policy decision agent 4150 receives and persistent classification rules (e.g., earned rules) from the classifier 4160. In some embodiments, policy decision agent 4150 collaborates with the message bus to receive service access policies from communication manager 4120. In some embodiments, policy decision agent 4150 collaborates with the message bus to receive usage reports from charging agent 4140. In some embodiments, charging agent 4140 is responsible for receiving usage counting counts from policy enforcer 4170. In some embodiments, charging agent 4140 generates usage reports based on aggregation defined by the charging/service usage policy. In some embodiments, charging agent 4140 communicates usage reports to the message bus. In some embodiments, UI communication agent 4130 collaborates with the message bus for policy decision agent 4150 and charging agent 4140 messages. In some embodiments, UI communication agent 4130 is responsible for UI notification messaging between the Service Processor 115 and the dashboard application or utility/function 4110. In some embodiments, dashboard 4110 is a user application that displays usage notification information and/or alerts and/or messages, allows a user to select service(s), and assists in service usage measurement/monitoring. In some embodiments, dashboard 4110 collaborates with the Service Processor 115 via the message bus. In some embodiments, classifier 4160 maps data streams to access policy filters. In some embodiments, classifier 4160 is responsible for finding the matching set of actions for a data/service usage stream. In some embodiments, policy enforcer 4170 enforces actions on the data/service stream. In some embodiments, the policy enforcement agent classifies the stream as background services (e.g., which, in some cases/per some service policies, can be blocked during peak hours and/or not allowed at all, such as when no bulk service plan has been activated), and if a classified background service is blocked, the policy decision agent informs the UI communication agent via the message bus to notify the user (e.g., not by sending an alert message, which can be considered annoying to the user, but rather using a dynamic icon, such as a glowing icon or toast, as when users select to see details can get the alert message, and in some cases, the device can continually glow the dynamic icon while detecting any disallowed background services as an example form of UI notification for certain types of alerts/events).

Figure 42:
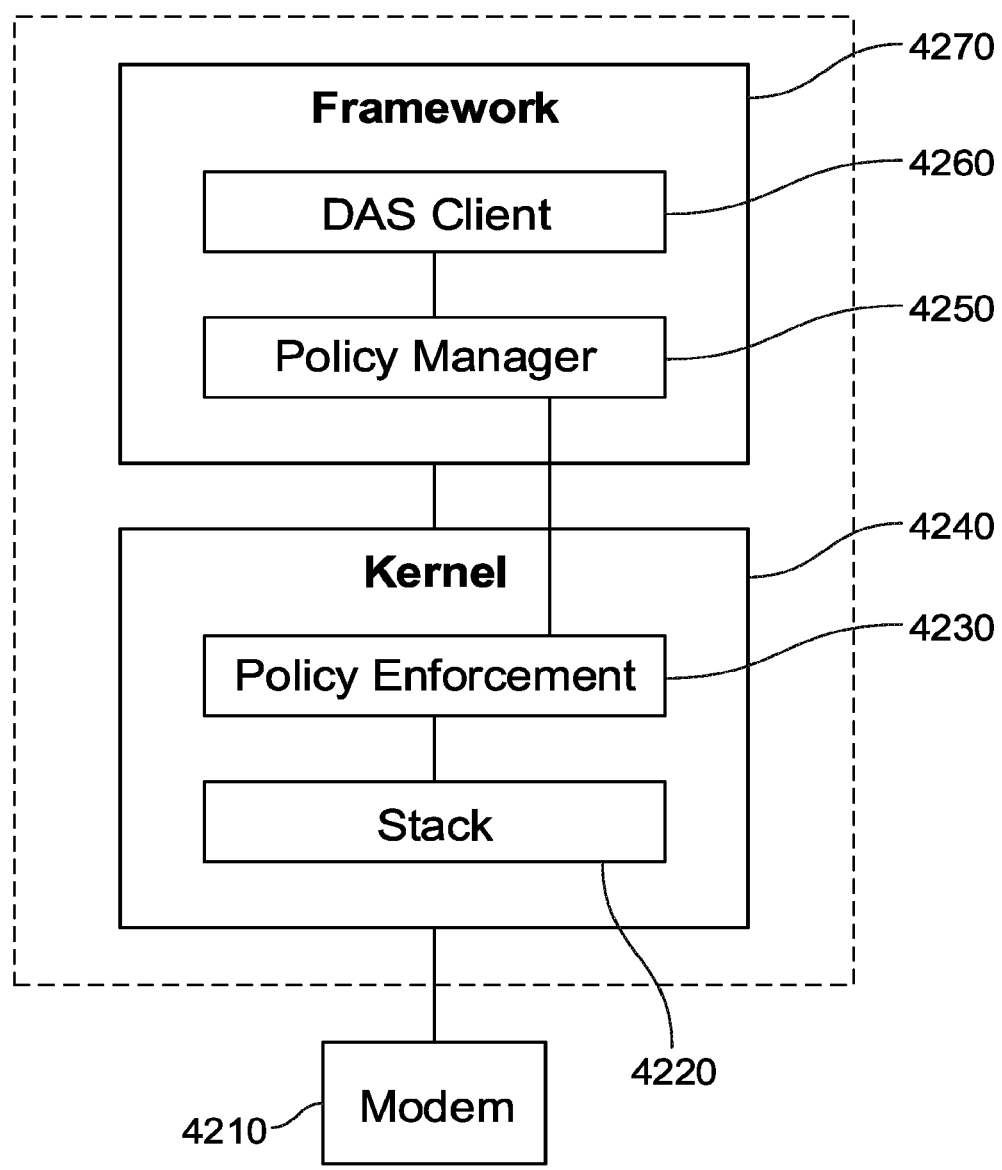
FIG. 42 is a functional diagram for another platform architecture for user notifications for device assisted services (DAS) in accordance with various embodiments of the systems and methods described herein.

FIG. 42 is a functional diagram for another platform architecture for user notifications for device assisted services (DAS) in accordance with some embodiments. In some embodiments, a modem 4210 is in communication with a kernel layer 4240 of a platform of a device (e.g., mobile station 100), and the kernel 4240 includes a stack 4220 for network communication via modem 4210 and a policy enforcement 4230 for controlling network communication (e.g., access controls, such as allow, block, throttle, and/or other access controls, which can be based on various service policies received from a service cloud, such as from a Service Controller 122 in communication with a policy manager 4250). As also shown, policy manager 4250 is in communication with policy enforcement 4230, and resides in a framework layer 4270 of the platform. DAS client 4260 is in communication with policy manager 4250 and also resides in the framework layer 4270. In some embodiments, the platform is a Linux based platform, such as Android or another operating system or platform, and the framework layer 4270 generally is understood to reside in user space of the operating system platform and the kernel layer 4240 in the kernel space of the operating system platform. In some embodiments, DAS client 4260 implements various UI notifications for DAS techniques as described herein with respect to various embodiments. In some embodiments, DAS client 4260 implements various other DAS techniques as described herein with respect to various embodiments.

In some embodiments, a launch or execution of an application on the device is determined/detected using various techniques. For example, policy manager agent 4250 can subscribe as a listener to applicant start intent to listen to such application start events. The policy manager agent 4250 can determine whether a policy exists/applies to a started application. If a policy exists and applies to the started application, then the policy manager agent 4250 can communicate the policy to policy enforcement agent 4230 to enforce that policy (e.g., allow, block, throttle, monitor and cap usage based on an associated data limit, or another service policy related enforcement action) with respect to service usage associated with that application (e.g., based on a package name/application name and/or a unique process ID associated with that application). In some embodiments, policy enforcement components are implemented in the kernel 4240 layer on, for example, a Linux platform or another operating system platform, as an extension to the operating system kernel (e.g., using a kernel patch for adding new kernel level interfaces and using proprietary code/modules/programs that call/exercise those kernel level interfaces (inbound and outbound interface) in which various necessary components get included with the kernel) for intercept and stack control for various policy enforcement functions as described herein with respect to various embodiments. In some embodiments, policy enforcement 4230 implements various policy enforcement functions (e.g., using net filter, tc, queue disc, and/or other traffic control functions) including, for example, traffic inspection for classification and/or traffic control implementation using various techniques as described herein with respect to various embodiments. For example, using these client based policy enforcement techniques, an application/new service usage that is not allowed under a current policy can be blocked and/or otherwise controlled without having to initiate and use OTA network communication bandwidth to reach a network based policy enforcement element/function (e.g., Home Agent 6510 and/or another network element/function). In some embodiments, when an application is exited, an associated event indicating that the application is exited is intercepted as similarly described above with respect to application start events, and the event is passed to the policy enforcement agent 4230 to remove any associated policy for that application. In some embodiments, different policies apply to a given application based on an Access Point Name (APN) (e.g., 2G, 3G, 4G, WiFi, or other APNs). In some embodiments, a 5-tuple is used to provide classification (e.g., layer 4 and/or layer 7 classification) for filtering (e.g., the 5-tuple can include protocol type, source port, source IP, destination port, destination IP, in addition to an application/process ID).

In some embodiments, an alert classification is provided (e.g., based on activity; such as whether the monitored service usage activity is an application that the user is currently interacting with or a hidden application that is running but not currently being interacted with by the user, such as a background synchronization, system service, or other activity/application/function in which case the UI notification can be provided in the form of a glowing icon or another form of a less intrusive UI notification mechanism). In some embodiments, DPI functions performed by network based monitoring perform granular service usage monitoring but cannot necessarily detect/determine service usage activity at the same level of granularity as can be provided by DAS based monitoring and classification (e.g., whether the monitored service usage activity is an application that the user is currently interacting with or a hidden application that is running but not currently being interacted with by the user and/or encrypted service usage). In some embodiments, UI notifications can be triggered for various reasons, such as there is no capable plan that allows for/permits a requested service usage, the requested service usage is blocked by current service policies, and/or a service plan limit has been reached or exceeded.

In some embodiments, policy manager detects events/alerts (e.g., usage events/alerts) and generates UI notifications (e.g., toasts, widget updates, dynamic icons, glowing icons, and/or other UI notifications). In some embodiments, alerts can be in message notifications referred to as toasts (e.g., a small window that appears in lower portion of screen for a specific period of time). In some embodiments, policy manager 4250 generates UI notification messages using a message bus that other agents/components listen to and display as applicable. In some embodiments, a status bar and status tray provides usage notification information, such as for a real-time or near real-time service usage indicator(s) as similarly described herein with respect to various embodiments. In some embodiments, a widget displays UI notification information, such as for real-time or near real-time service usage versus service plan in which the widget can be selected to launch a usage that can provide additional usage information and/or options as similarly described herein with respect to various embodiments.

In some embodiments, UI features and/or displays, such as UI notifications for DAS, are platform independent. In some embodiments, UI features and/or displays, such as UI notifications for DAS, are platform independent. For example, using a platform independent implementation, various usage notification displays (e.g., usage gauges/meters/bars) as described herein with respect to various embodiments, are common across platforms, that is, can be identically or similarly implemented across multiple platforms so that users can readily recognize such UI notifications on various platforms as would be appreciated by one of ordinary skill in the art in view of the various embodiments described herein.

Figure 43:
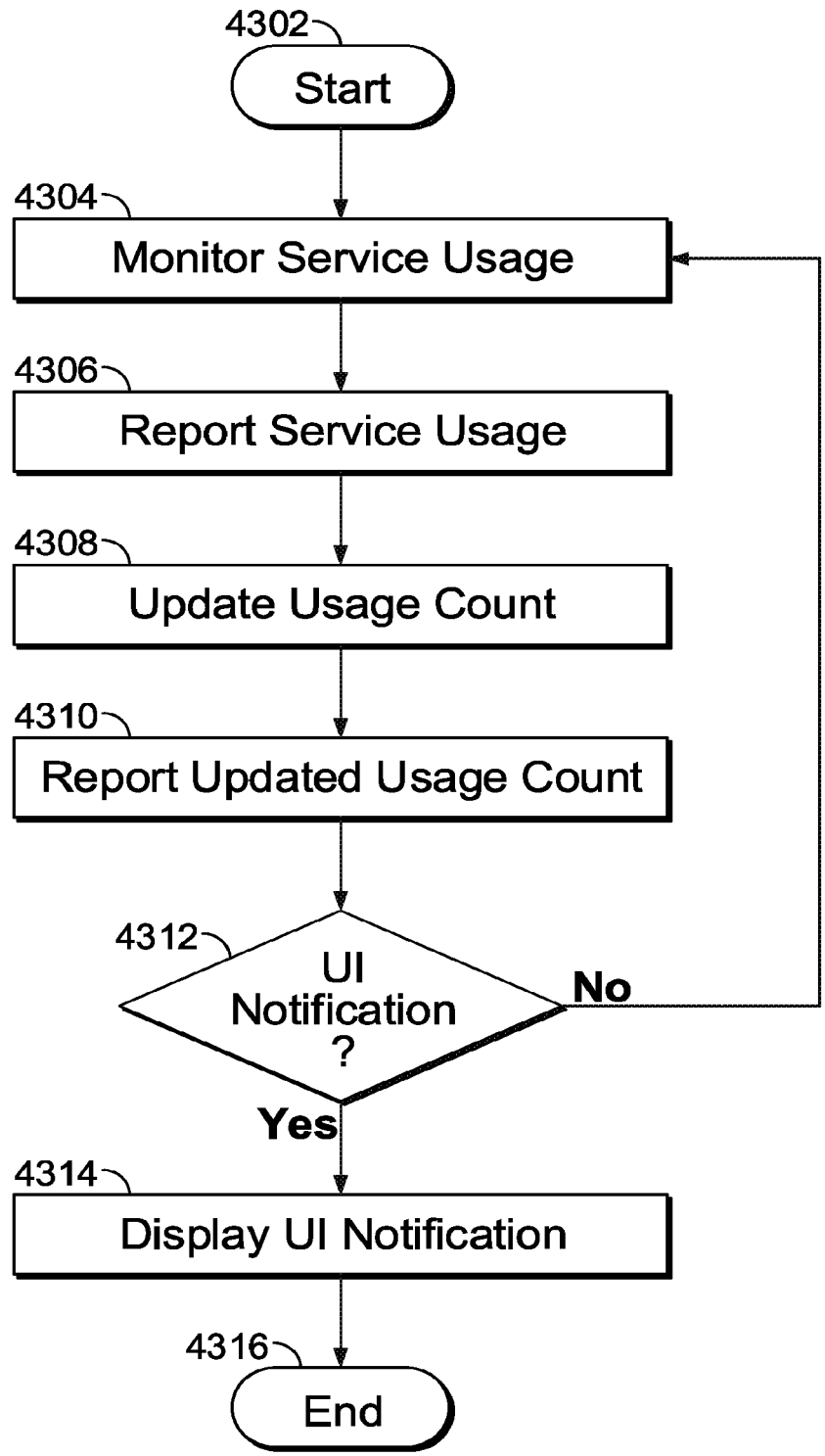
FIG. 43 is a flow diagram for user notifications for device assisted services (DAS) in accordance with various embodiments of the systems and methods described herein.

FIG. 43 is a flow diagram for user notifications for device assisted services (DAS) in accordance with some embodiments. At 4302, a process for user notifications for DAS begins. At 4304, service usage is monitored. At 4306, service usage is reported. In some embodiments, service usage monitoring is performed using network based techniques, device assisted techniques, and/or various combinations of network based and device assisted techniques as described herein with respect to various embodiments. At 4308, a service usage measure or count is updated. At 4310, the updated service usage count is reported (e.g., a network-based service-usage measure can be reported to the device, such as mobile station 100, and/or the network-based service-usage measure can be used to synchronize a local service usage measure, as described herein with respect to various embodiments). At 4312, whether a UI notification is triggered based on the updated service usage count is determined. If not, then process flow returns to 4304 and service usage is monitored. If a UI notification is triggered, then a UI notification is displayed at 4314 in accordance with various embodiments described herein.

Various embodiments for user notifications (e.g., user interface (UI) notifications) for device-assisted services (DAS) are provided. In various embodiments, the notification message can include, for example, an offer to cancel, modify, replenish or replace the service plan; an offer to learn more about a service plan feature or different service plan; a link to additional information; a request to acknowledge a usage amount or a new billing rate; and enabling a user of the end user device to respond to the offer. In a further embodiment, the notification request includes a network destination identifier, and the one of the one or more notification actions causes the end user device to access a server associated with the network destination identifier to retrieve the at least a portion of the notification message.

Performing the one of the one or more notification actions can include, for example, accessing a server associated with a predetermined network destination identifier that includes the at least a portion of the notification message; and accessing a first server associated with a predetermined network destination identifier that includes a second network destination identifier and retrieving the at least a portion of the notification message using the second network destination identifier.

In some embodiments, UI notifications for device assisted services includes a processor of a communications device configured to: monitor a network service usage activity based on a service policy for assisting control of the communications device use of a network service, in which the service policy includes one or more user notification settings based on use of the network service; determine whether the monitored network service usage activity requires a user notification based on the service policy and based on a device-based service-usage measure; and generate the user notification, in which the device based service usage for the communications device is periodically synchronized with a network based service usage; and a memory of the communications device coupled to the processor and configured to provide the processor with instructions. In some embodiments, user notifications for device assisted services are implemented as a computer readable storage medium and/or a method performed on a communications device using a processor as described herein.

In some embodiments, the communications device is a mobile communications device, and the network service includes one or more Internet based services, and the mobile communications device includes one or more of the following: a mobile phone, a PDA, an eBook reader, a music device, an entertainment/gaming device, a computer, laptop, a net book, a home networking system, and a navigation system.

In some embodiments, user notification is a client driven user notification controlled by the communications device implementing the service policy, in which a service plan is associated with the communications device, and in which the monitored network service usage activity exceeds a limit associated with the service plan, the monitored network service usage activity is outside the service plan, and/or the monitored network service usage activity violates the service policy. In some embodiments, the service policy includes one or more of the following: user notification with acknowledgement settings, user notification with synchronized service usage information, user notification preference settings, and user privacy settings.

In some embodiments, UI notifications for device assisted services includes receiving a trigger event detection indication for user notification (e.g., the notification trigger event detector sends an indication that a notification trigger event has occurred, such as for a usage related user notification, and the trigger event detector can be implemented on the communications device and/or on a network element, and this function is referred to herein as a notification trigger event detector, and is referred to in the various figures as notification Trigger Event Detect 138 or trigger detect 138), send a trigger event message to a user notification agent (e.g., a service processor notification agent), determine a user notification message based on the trigger event message (e.g., index the trigger event message using to a set of user notification message objects locally stored on the communications device (e.g., on a local memory or other local storage and/or insertable storage element, such as a SIM) to select a stored user notification message object), and generate the determined user notification message (e.g., send the selected user notification message object to a user interface of the communications device).

In some embodiments, UI notifications for device assisted services includes: (a) using a notification trigger detector (e.g., Trigger Event Detect 138 or trigger detect 138) to identify that a notification trigger event has occurred according to a pre-configured (e.g., pre-programmed, pre-stored, or provisioned) set of notification trigger event detection criteria for a wireless device, (b) generate a pre-configured (e.g., pre-provisioned, pre-programmed, or pre-stored) notification trigger index or notification trigger message that identifies the specific notification message sequence that is to be displayed on the device as a result of the occurrence of the notification trigger event, (c) send or route the notification trigger index or notification trigger message sequence to a notification agent on the device (e.g., notification agent 1697), and (d) based on receipt of the notification trigger index or trigger message the device notification agent executes a pre-configured set of ordered steps required to display a notification sequence message that corresponds to the notification trigger index or notification trigger message to the device UI, in which the notification message sequence information used in the display of the notification message sequence is obtained from one or more of: (i) any required message sequence information stored (e.g., provisioned or programmed) locally on the device (e.g., text and/or graphics information stored on the device that is used to display a portion or all of the notification message sequence stored in device notification message sequence store 1697A), (ii) information contained in the notification trigger message, and (iii) any required notification message sequence information stored (e.g., provisioned or programmed) on network elements (e.g., text and/or graphics information stored on one or more network elements that is used to display a portion or all of the notification message sequence).

In some embodiments, the notification trigger detector is implemented within a network element. For example, the notification trigger detector can be located within: a gateway or router (e.g., a Home Agent 6510, 4G/3G/2G transport gateways 420, 4G/3G/2G RAN gateways 410 as shown in the various figures herein); a real time reporting network element or a near-real-time reporting network element used to provide device service usage reports (e.g., a usage report, store 136 as shown in the various figures herein); another element in the network device service usage reporting and charging system; or another element in the device data path traffic inspection and processing system.

In some embodiments, the notification trigger detector is implemented within a device agent. For example, the notification trigger detector can be implemented in a device service monitor agent (e.g., a service monitor agent 1696 as shown in the various figures herein); a device policy decision agent (e.g., a policy implementation agent 1690 as shown in the various figures herein); in an application program (e.g., a TCP application 1604 as shown in the various figures herein); or in another device agent or function with access to device application behavior and/or service usage information.

In some embodiments, a device notification agent is pre-configured to maintain a local device storage of one or more pre-determined sets of notification sequence information (e.g., in a notification message sequence store 1697A as shown in the various figures herein), each set defining at least a portion of the information required to generate a UI notification message sequence; the local storage of notification sequence information is organized so that a desired set of notification sequence information is indexed by a notification trigger index or notification trigger message; the notification agent receives the notification trigger index or notification trigger message from a notification trigger detection element; and the notification agent initiates (e.g., generates, assembles, executes, or manages) a complete notification message sequence by performing one or more of the following operations:

a. initiate (e.g., generate, assemble, execute, or manage) a device notification message sequence by using the notification trigger index to look up a pre-stored set of message sequence information (e.g., after adding additional information or additional formatting, such as adding a UI background bitmap that is common to multiple notification message sequences);

b. initiate a device notification message sequence by using the notification trigger message to look up a pre-stored set of message sequence information (e.g., notification information, UI bitmap, and/or UI formatting) and combining the pre-stored information with information included in the notification trigger message (e.g., usage count update, service plan usage condition or status, and/or specific service usage activity information) to form a complete notification message sequence;

c. initiate a device notification message sequence by using the notification trigger index or trigger message information as a reference to initiate a notification message sequence based on information stored on a network element, such as Network Based Notification Message Information 1697B (e.g., pull down a particular set of message sequence information from a server or initiate/redirect a user to a particular portal or website message sequence, such as a series of web pages with options); or d. perform a combination of two or more of the above operations; and the device notification agent communicates with a device UI to provide the notification message sequence to the device user.

For example, the notification agent can initiate a message sequence (e.g., launch a web site series of pages), generate a message or assemble a message (e.g., receive/request/retrieve information from various places on the device and/or network and assemble the text and graphics into a message sequence), or execute a message (e.g., use numbers to embed them into a more complex UI display object).

In some embodiments, the service usage notification trigger detection element is a network element. In some embodiments, the service usage notification trigger detection element is a device agent located on the device.

The programmable device user notification agent system described herein offers more flexible and comprehensive definitions for notification trigger event detection criteria and associated notification message sequence types and specific notification message sequences for wireless communication devices, such as mobile wireless devices. For example, using various embodiments described herein, a wide variety of notification trigger event detection criteria can be defined and provisioned, and a corresponding wide variety of associated notification message sequences (e.g., also referred to herein as notifications) can be defined and provisioned. In some embodiments, the user notification that is initiated by the notification trigger event (e.g., and subsequent receipt of the notification trigger index or notification trigger message) includes, one or more of the following:

1. a notification that the monitored network service usage activity is out of policy based on the service policy;
2. an option to modify one or more service policy settings of the communications device;
3. a notification describing or offering user selection of a service plan change;
4. a notification acknowledgement in which the user is required to acknowledge that a service usage notification has been received by the user;
5. a notification acknowledgement of a service usage overage condition or service usage present or future cost condition;
6. a notification describing or offering user selection of a service plan upgrade or temporary allowance for a service usage activity (e.g., application (such as a browser, email program or web view, mapping or directions application or web view, audio application or web view, voice application or web view, chat application or web view, streaming music or video application or web view, eReader, gaming application or web view, calendar application or web view, contacts application or web view, social network application or web view, or other application programs or web views); network destination (such as a web site or server address); content type (such as http, web links to audio or video, ads, file downloads, picture files, video files or streaming, audio files, or streaming); traffic type, service type (such as data, video, audio, or voice); carrier sponsored service, third party sponsored service, or user paid service);
7. a notification describing or offering user selection of a service plan upgrade or temporary allowance for a service usage activity that is not covered or allowed with the current service plan policies;
8. a notification describing or offering user selection of an upgrade to the current service plan (e.g., including possibly no current paid service plan), a downgrade to the current service plan or a modification to the current service plan;
9. a notification describing or offering user selection of an upgrade to the current service plan (e.g., including possibly no current paid service plan), a downgrade to the current service plan or a modification to the current service plan based on a detected pattern of usage that indicates a more suitable service plan as compared to the current service plan is available;
10. a notification indicating or describing the current busy state or congestion state of the network connected to the device;
11. a notification that a service usage activity requires a given level of QoS that is either not part of the current service plan or is not available;
12. a notification that a service usage activity requires a given level of QoS that is either not part of the current service plan, and providing the user with an option to modify the service plan selection or user controlled service plan policies to include the required level of QoS to perform the service usage activity;
13. a notification indicating that a user service usage activity (e.g., a service usage activity initiated by a device user) is being limited based on background priority policies or QoS priority policies specified in the current service plan policy set (e.g., in which limited includes one or more of blocked, throttled, aggregated and held, delayed, or otherwise controlled or restricted);
14. a notification indicating that a user service usage activity is being limited based on background priority policies or QoS priority policies specified in the current service plan policy set, and providing the user with an option to over-ride the background policy;
15. a notification indicating that a device system activity or other non-user service usage activity (e.g., an OS service usage activity, a software update, an RSS feed, a service usage activity spawned by an application or widget, or an Ethernet message) is being limited based on background priority policies or QoS priority policies specified in the current service plan policy set;
16. a notification indicating that a device system activity or other non-user service usage activity is being limited based on background priority policies or QoS priority policies specified in the current service plan policy set, and providing the user with an option to over-ride the background policy;
17. a notification regarding the current QoS availability of the network connected to the device;
18. a notification that a given service activity is not allowed; a notification that one or more service usage activities are not available or are not allowed for the present service plan at the present time, or for the present active network, or for a roaming network, or for the present network busy state or congestion state, or for the present QoS availability;
19. a notification that one or more service usage activities are not available or is not allowed for the present service plan at the present time, or for the present active network, or for a roaming network, or for the present network busy state or congestion state, or for the present QoS availability, and an associated offer to temporarily or permanently upgrade the service policy (e.g., service plan) capabilities to allow the one or more service usage activities;
20. a notification that one or more service usage activities are available or are allowed for the present service plan at the present time, or for the present active network, or for a roaming network, or for the present network busy state or congestion state, or for the present QoS availability;
21. a notification that one or more service usage activities are available or are allowed with a reduced access network performance (e.g., throttled, background service status, or certain level of QoS) for the present service plan at the present time, or for the present active network, or for a roaming network, or for the present network busy state or congestion state, or for the present QoS availability;
22. a notification that one or more service usage activities are available or are allowed with a reduced access network performance for the present service plan at the present time, or for the present active network, or for a roaming network, or for the present network busy state or congestion state, or for the present QoS availability, and an associated offer to temporarily or permanently upgrade the service policy (e.g., service plan) capabilities to allow the one or more service usage activities with higher access network performance or full access network performance;
23. a notification that one or more service usage activities are available or are allowed for the present service plan at the present time, or for the present active network, or for a roaming network, or for the present network busy state or congestion state, or for the present QoS availability, and the present service cost, price, rate of cost or rate of price for the one or more service usage activities;
24. a notification that a service usage activity is not allowed on the current active network but is available on an alternative network;
25. a special service offer to provide a discounted, free, limited service allowance or limited time offer to try one or more service usage activities;
26. a notification indicating that a new service plan or new service usage activity is available for the device;

27. a notification indicating that another network with enhanced or potentially enhanced service performance, service usage policy allowances, or service usage pricing is available;
28. an indication of the amount of service used (e.g., bytes, minutes/time, number of usage events (such as a number of videos watched, number of web sites visited, number of URLs, number of songs, or number of transactions), percentage of service plan limit consumed, or cost of service consumed) by the device;
29. an indication of the amount of service used by a user;
30. an indication of the amount of service used by a device group;
31. an indication of the amount of service used by a user group;
32. an indication of the amount of service usage allowance remaining for a device, a service usage activity (e.g., an application, a network destination, or a service type) or a device group;
33. an indication of the service usage velocity (e.g., rate of service usage, rate of service usage compared to a rate of service usage equal to the service usage limit divided by service plan period, service usage per unit of time, % of plan limit per unit of time, projected period of time to reach usage limit, rate of service cost or service charge accumulation, or projected usage or cost at end of plan period) of a device;
34. an indication of the service usage velocity of a user;
35. an indication of the service usage velocity of a device group;
36. an indication of the service usage velocity of a user group;
37. a notification that a service usage activity may cause a service usage overage;
38. a notification that a service usage activity may cause a service usage overage, with a user option to continue the activity or discontinue the activity;
39. a notification that a service usage activity may cause a service usage overage, with a user option to continue the activity or discontinue the activity, and a user acknowledgement if the user elects to continue the activity;
40. a notification informing the user that typical service usage of a service usage activity selected by the user would result in a specified service usage velocity;
41. a notification informing the user that typical service usage of a service usage activity selected by the user would result in a specified service usage velocity, and providing the user with the option to discontinue or continue the service usage activity;
42. a notification informing the user that typical service usage of a service usage activity selected by the user would result in a specified service usage velocity, and providing the user with the option to discontinue or continue the service usage activity, and a user acknowledgement if the user elects to continue the service usage activity;
43. a notification of which service usage activities are contributing to, or contributing most significantly to, service usage;
44. a notification of which service usage activities are contributing to, or contributing most significantly to, service usage, where the service usages are classified by application, network destination or service type;
45. a notification of which service usage activities are contributing to, or contributing most significantly to, a potential service usage overage or a potential service usage overage;
46. an indication of the amount of service used by a service usage activity on the device or by a group of service usage activities on the device;
47. an overage notification of a service usage overage based on the service policy, in which the overage notification includes an indication that the service usage overage is being billed to a service account associated with the communications device or a user of the communications device;
48. an indication of the amount of service used by a group of devices or users;
49. an indication of the amount of service used by a service usage activity or group of service usage activities common to a group of devices or users;
50. an indication of the amount of service usage consumed by a different device than the device the notification is displayed on;
51. an indication of the amount of service usage consumed by a different device than the device the notification is displayed on where the different device is a member of the device group (e.g., family plan group or corporate group) that the notification display device also belongs to;
52. an overage notification of a service usage overage based on the service policy, in which the overage notification includes an indication that the service usage overage is being billed to a multi-user service account associated with the communications device, in which the multi-user service account includes an enterprise account or a family plan account for a plurality of users;
53. an overage notification of a service usage overage based on the service policy, in which the overage notification includes an indication that the service usage overage is being billed to a service account associated with the communications device or a user of the communications device, and in which the processor of the communications device is further configured to request an acknowledgement of the notification and report the acknowledgement to a network device;
54. a notification to one device in a device group (e.g., a family plan or enterprise user plan) that provides usage breakdown for one or more other devices in the device group;
55. a notification to one device in a device group that provides options to control or modify access policies, performance or limits for one or more service usage activities for the device group or for a subset of the devices in the device group;
56. a notification that a service usage activity, service plan or service capability was added, updated, upgraded, or changed on the device
57. a notification that a service usage policy was changed on the device;
58. a notification indicating that a sponsored service usage activity (e.g., service usage activity paid for by a party other than the user; sponsored application or website access for shopping or books or other products or services; or sponsored application or website access for search, news, video clips, or other content; or sponsored enterprise network services access) is available on the device;
59. an indication of the amount of service used by a sponsored service usage activity;
60. a notification that the usage of a sponsored service activity is outside of sponsored service usage policy limits;
61. a notification stating that a service usage limit is being approached or has been reached for a sponsored service activity;

62. a notification stating that a service usage limit is being approached or has been reached for a sponsored service activity and offering a set of alternatives to continue using services;
63. a notification of device user good customer standing;
64. a notification that device user good customer standing is sufficient to perform a set of service usage activities;
65. a notification that device user good customer standing is insufficient to perform a set of service usage activities;
66. a notification informing the user how to accumulate good customer standing;
67. a notification indicating the amount of good customer standing points;
68. a notification message providing a user offer to purchase a service plan or other transaction based on a programmable notification trigger event detection criteria (e.g., a pattern of one or more applications and/or network destinations being accessed by the user, an access to a particular network, or access to a network with a particular device geographic location);
69. a notification message providing a user with the available roaming networks that can be automatically joined;
70. a notification message providing a user with the available roaming networks and their associated usage fees;
71. a notification message providing a user with the available roaming networks and their associated performance, service plan policies, or service policy allowances;
72. a notification message providing a user with the estimated roaming service usage amount;
73. a notification message providing a user with the estimated roaming service usage cost;
74. a notification message providing a user with the estimated roaming service usage velocity or rate of cost accumulation;
75. a notification message providing a user with the estimated roaming service usage amount or cost given current or historical usage behavior;
76. a notification message warning a user that a service usage activity that has been selected may or will result in a high rate of roaming service usage or a high rate of service usage cost accumulation;
77. a notification message warning a user that a roaming service usage activity has been initiated or attempted that has a typical or average service usage velocity or service cost accumulation that is higher than a user specified or a service design administrator specified roaming service usage velocity or cost accumulation limit;
78. a notification message warning a user that a roaming service usage activity has been initiated or attempted that has a typical or average service usage velocity or service cost accumulation that is higher than a user specified or a service design administrator specified roaming service usage velocity or cost accumulation limit, and a user option to discontinue or continue the service usage activity;
79. a notification message providing a user with the estimated roaming service usage velocity or rate of cost accumulation for the device, a service usage activity, or a collection of service usage activities;
80. a notification message provided to one device user regarding the roaming usage behavior of another device or another device user;
81. the aggregate roaming service usage for a device group or a user group;
82. a notification informing a device user of the present service level that is selected or available but not selected for streaming audio or video services (e.g., available bit rates for audio or video, or audio or video resolutions);
83. a notification message providing a device user with a list of typical, expected, average or actual service activity usage events or usage units that a service plan or service policy set usage limit will provide (e.g., typical number web page downloads or minutes/hours, number of social networking pages or minutes/hours, number of voice calls or minutes/hours at one or more audio quality levels or resolutions, number of video calls or minutes/hours at one or more video quality levels or resolutions, number of streaming audio clips or songs or minutes/hours at one or more audio quality levels, number of video clips or minutes/hours at one or more video quality levels or resolutions, number of email text messages or downloads, number of file downloads, number of games played or gaming minutes/hours, number of books downloaded, number of songs played or downloaded, number of news report or magazine deliveries or hours/minutes, number of web site page downloads or minutes/hours, or number of application usages or hours/minutes);
84. a notification message providing a user with a list of questions, and possibly contingent questions resulting from answers, regarding their access service needs to assist the user in determining a service plan (e.g., or service policy set) that fits the user's needs;
85. a notification message providing a user with a list of questions, and possibly contingent questions resulting from answers, regarding issues or problems they are having with their access service to assist the user in determining the root cause or a resolution;
86. a notification message to the user recommending action to resolve an access service problem or issue;
87. a notification message to the user requesting or recommending initiation of a remote diagnostics service, instruction service (e.g., sequence of instruction pages or possibly interactive instruction pages), chat service, voice service or video service to provide assistance the user in selecting a service plan or troubleshooting an access service issue or problem;
88. a notification message to the user requesting or recommending initiation of a remote diagnostics service, instruction service (e.g., sequence of instruction pages or possibly interactive instruction pages), chat service, voice service or video service to provide assistance the user in selecting a service plan or troubleshooting an access service issue or problem, in which the notification message and user options are provided as a sponsored service for the device;
89. a notification message sequence to the user initiating and conducting a remote diagnostics service or chat service to assist the user in selecting a service plan or troubleshoot an access service issue or problem;
90. a notification message sequence to the user initiating and conducting a remote diagnostics service or chat service to assist the user in selecting a service plan or troubleshoot an access service issue or problem, where the notification message sequence and user communication is provided as a sponsored service for the device;
91. notification message requesting permission from the user to upload to the network service usage history or service activity history or application activity history (e.g., device service usage history or attempted service usage history, or service usage activity history or application activity hi story);
92. a notification message providing a user with one or more of: network connection status, network connection throughput (e.g., bit rate and/or packet rate measured at the PPP layer, IP layer, or stream layer), network connection throughput variability, network connection bit error rate or packet error rate, network connection success vs. connection attempt (e.g., percentage of successes, or counts of attempts and successes), or another measure of network connection performance;

93. a notification message requesting permission from the user to upload to the network, access network connection performance history information;

94. a notification message sequence in which the user is provided with the result of an analysis of wireless connection performance, quality or status history information, possibly with recommendations on how to resolve an access service issue;

95. a notification message providing a user with one or more of: network connection signal strength, network connection signal to noise ratio, raw modem bit rate, modem bit error rate, modem channel, base station or base station sector, network busy state or network congestion state, or another measure of wireless connection performance, wireless connection quality, or wireless connection status;

96. a notification message requesting permission from the user to upload to the network, wireless connection performance, or quality or status history information;

97. a notification message sequence in which the user is provided with the result of an analysis of wireless connection performance, quality or status history information, possibly with recommendations on how to resolve an access service issue; and 98. any of the above notification embodiments in which a notification of the amount, velocity, or typical projection of service usage is specified in the above embodiment description, and the notification of the amount, velocity, or typical projection of service usage specified in the above embodiment description is replaced by a notification of the amount, velocity, or typical projection of service cost or price.

In some embodiments, the processor of the communications device is further configured to: detect that multiple wireless networks are available for wireless communication for network service usage (e.g., 2G, 3G, 4G, WiFi, and/or other types of wireless network access); and generate a user notification including multi-network service plan options (e.g., service plan options and/or differentiated notification policy settings for 2G, 3G, 4G, WiFi, and/or other types of wireless network access).

In some embodiments, the processor of the communications device is further configured to: detect when the communications device is connected to a roaming network; and generate a roaming cost notification including roaming cost information for roaming service usage on the roaming network. In some embodiments, the processor of the communications device is further configured to: detect when the communications device enters and leaves a roaming network; and generate both roaming cost notification based on service usage on a roaming network as well as cost notification associated for when communication device uses services within network so that at all times the device user/owner is aware of the total cost where the cost is a function of the roaming network where the device is currently roaming. In some embodiments, the processor of the communications device is further configured to: generate a cost notification that includes a roaming cost notification including roaming cost information for roaming service usage on the roaming network and an in-network cost notification including in-network cost information for service usage on one or more networks that are in-network for a service plan associated with the communications device. In some embodiments, a communications device can roam across various networks in different international regions (e.g., CDMA, GSM, GPRS, EDGE, HSPA, and LTE roaming capabilities). In some embodiments, a roaming service usage measure is displayed while a communications device is in a roaming mode. In some embodiments, the roaming service usage measure indicates a data usage measure (e.g., the roaming service usage measure can display data usage in kilobytes (KBs), for example, an international meter/gauge, and the non-roaming/in plan service usage measure can display data usage in megabytes (MBs), for example, a domestic usage meter/gauge). In some embodiments, a pay for service usage measure is displayed along with a cost of service usage while a communications device is in a roaming mode that is in a pay for service roaming service mode (e.g., is not within a covered service plan under a roaming service plan). In some embodiments, a differentiated notification policy is provided, in which, for example, the user notification is adapted or customized to provide user notifications based on a service plan, service component, and/or service activity associated with the device. For example, different UI notification triggers and message sequences can be provided for different services. As another example, different gauges or meters can be provided for different services. In some embodiments, thresholds and alerts are different and/or can be configured differently for in plan, roaming, and/or pay for service network service usage. In some embodiments, a service usage measure is a hyperlinked widget that when selected by a user connects to a service plan options portal or web page or other application that allows a user to view the current service plan and select changes, options, and/or upgrades or new service plans.

In some embodiments, the processor of the communications device is further configured to: receive a network-based service-usage measure to periodically synchronize the device-based service-usage measure based on the network-based service-usage measure. In some embodiments, the processor of the communications device is further configured to: receive a network-based service-usage measure to synchronize the device-based service-usage measure based on the network-based service-usage measure, in which the network-based service-usage measures are sent to the communications device based on one or more of the following: a time based event, a service usage based event, and a service plan based event (e.g., plan start date, plan rollover date, service plan feature change, new/upgraded service plan, and/or other service plan based events). In some embodiments, the processor of the communications device is further configured to: receive a network-based service-usage measure to periodically synchronize the device-based service-usage measure based on the network-based service-usage measure, in which the device-based service-usage measure includes a bulk service usage measure by service plan and/or by service provider; and monitor network based service usage to update the device-based service-usage measure between network-based service-usage measure synchronizations. In some embodiments, the user notification generates an alert based on the monitored network based service usage, and the alert is not displayed until the monitored network-based service-usage measure is verified based on a network-based service-usage measure synchronization. In some embodiments, the processor of the communications device is further configured to: receive a network-based service-usage measure to periodically synchronize the device-based service-usage measure based on the network-based service-usage measure, in which the device-based service-usage measure includes a bulk service usage measure by service plan and/or by service provider.

In some embodiments, the processor of the communications device is further configured to: receive the service policy for assisting control of the communications device use of a network service, in which the service plan includes an overall service usage limit and/or a per service usage limit, and in which the service policy is periodically updated.

In some embodiments, the processor of the communications device is further configured to: determine a velocity of service usage based on a projected service usage; and generate a velocity of service usage notification, in which the velocity of service usage notification includes, for example, the amount of service usage compared to the service usage that would be achieved at the present time if the service limit were to be consumed linearly over the service usage plan period. In some embodiments, a velocity of service usage notification can include the projected service usage at the end of the service plan period if current usage patterns continue. In view of the various embodiments described herein, one of ordinary skill in the art will appreciate that various service usage velocity related user notifications can be provided. In some embodiments, a service usage velocity related user notification includes an indication of whether the current rate of service usage is likely to result in a service usage over-run during the plan period or result in service usage that is within the service plan cap. In some embodiments, service usage velocity related user notification includes generating a alert message user notification when the service usage velocity is high. In some embodiments, after the alert message user notification is generated, the user is provided with an option to select another service plan (e.g., or service plan option/feature) that may be better suited to the user's service usage behavior.

In some embodiments, the processor of the communications device is further configured to: analyze a service usage history for the communications device; determine a service usage ranking; and generate a service usage notification including a service usage ranking for one or more monitored network service usage activities and a relative share of overall service usage by each of the one or more monitored network service usage activities.

In some embodiments, the processor of the communications device is further configured to: display one or more options for purchasing one or more of the following: a requested service usage activity, time for additional network service usage, a new service plan, an upgraded service plan, and a sponsored service; and request a user acknowledgement, in which the user acknowledgement authorizes a user's purchase. In some embodiments, the processor of the communications device is further configured to: display one or more options for purchasing network service access, in which the one or more options are based on the service policy, and in which the network service usage is off peak or on peak, and the network service usage is controlled based on whether the network service usage is off peak or on peak. For example, the UI notification can include new and/or upgrade/downgrade service plan options, including, in some examples, recommendations based on monitored service usage behavior/patterns (e.g., a high bandwidth service usage user is recommended to purchase an unlimited data plan or higher data limit plan than a low bandwidth service usage user). In another example, the UI notification can include bulk service offerings and or specific/individual service offerings (e.g., e-mail, music download/streaming, video/TV streaming, and/or other services).

In some embodiments, the processor of the communications device is further configured to: classify one or more monitored network service usage activities; and generate one or more user notifications based on the one or more classified network service usage activities. In some embodiments, the processor of the communications device is further configured to: classify one or more monitored network service usage activities as foreground activities, background activities, system activities, network capacity controlled service activities, and/or service plan based alert activities; and generate one or more user notifications based on the one or more classified network service usage activities. In some embodiments, the processor of the communications device is further configured to: identify one or more monitored network service usage activities using one or more signatures to identify one or more applications executed on the communications device (e.g., using a table stored on the communications device or a network based table to verify/validate the application name, for example, to verify that the application, such as to verify that iexplore.exe is not masquerading as outlook.exe); and generate one or more user notifications based on the one or more classified network service usage activities. In some embodiments, the processor of the communications device is further configured to: classify one or more monitored network service usage activities as foreground activities, background activities, system activities, network capacity controlled service activities, and/or service plan based alert activities; and generate one or more user notifications based on the one or more classified network service usage activities, in which a user notification for a foreground activity, network capacity controlled activity, and/or a service plan based alert generates a user notification alert, and a user notification for a background activity and/or a system activity generates a queued user notification, in which the user notification alert includes one or more of the following: a status tray based message, a widget based message, a pop-up window based message (e.g., a toast), an email message, a text message (e.g., SMS message), and a voice message.

In some embodiments, the user notification includes a service plan alert based on monitored network service usage on the communications device and alerting thresholds associated with the service policy, a service plan associated with the communications device, configured alerting thresholds, and/or user configured preferences for user notifications. In some embodiments, the user notification includes a service plan alert based on monitored network service usage on the communications device and one or more alerting thresholds based on a percentage of overall service usage and/or per service usage allowance under a service plan associated with the communications device. In some embodiments, the user notification includes a service plan alert that a requested network service access is being blocked as it exceeds an allowance under a service plan associated with the communications device, and in which the service plan alert includes an option for the user to proceed with the requested network service access including an acknowledgement of any associated overage charges associated with the requested network service access. In some embodiments, the user notification includes a service plan alert that a requested network service access is being blocked as it exceeds an allowance under a service plan associated with the communications device, and in which the service plan alert includes an option for the user to select one or more offers for free or for purchase that would allow for the requested network access.

In some embodiments, the user notification includes a user interface gauge. In some embodiments, the user notification includes a user interface gauge, in which the usage gauge includes a usage gauge and/or usage meter (e.g., a usage meter with overage indicates a current service usage in excess of a current service plan capacity/data limit, and/or a velocity meter can provide a velocity of current usage and an estimate of cost for estimated service usage for a period of time based on the current and/or estimated usage). In some embodiments, the user notification includes a usage gauge and/or usage meter providing an indication of an overall network service usage of the communications device during a period of time. In some embodiments, the user notification includes a usage gauge and/or usage meter (e.g., a usage bar) providing an indication of an overall network service usage of the communications device during a period of time for a limited data plan, and in which the user notification further includes a purchase more data option, a purchase individual services option, and/or purchase a new service plan option. In some embodiments, the user notification includes a usage gauge and/or usage meter providing an indication of network service usage by one or more monitored network service usage activities of the communications device during a period of time. In some embodiments, the user notification includes user privacy input controls, in which the user privacy input controls include an opt in/out option to allow a user to select an opt in or opt out option for data usage patterns monitoring and reporting for one or more network services. In some embodiments, user privacy information (e.g., user visited web sites, user purchase transactions, service usage information, and/or other user privacy information) is securely stored locally on the device and not shared with any third parties or communicated to any network elements unless a user selects an opt in option and/or otherwise configures/agrees to share certain such privacy information. In some embodiments, the user notification includes a usage meter relative to a velocity gauge.

In some embodiments, the processor of the communications device is further configured to: calculate a cost of monitored network service usage, in which the user notification includes a meter with overage to provide a cost notification including the cost of monitored network service usage. In some embodiments, the user notification includes a meter with overage to provide a projected cost notification including a projected cost of monitored network service usage. In some embodiments, the user notification includes a cost alert to indicate a cost notification or projected cost notification for monitored network service usage activities of the communications device during a period of time. In some embodiments, the user notification includes a roaming indicator to indicate that the communications device is roaming and whether the roaming is with an in plan roaming partner or not with an in plan roaming partner. In some embodiments, the user notification includes a time of day indicator to indicate whether it is in peak time or off peak time based on a service plan associated with the communications device. In some embodiments, the user notification includes master usage gauge, and in which the master usage gauge provides a master service usage indicator for a plurality of communications devices associated with a multi-device or multi-user service plan associated with the communications device.

In some embodiments, the user notification includes a single device usage gauge and a master usage gauge, in which the master usage gauge provides a master service usage indicator for a plurality of communications devices associated with a multi-device or multi-user service plan associated with the communications device, and in which the master usage gauge provides an overall service usage activity and/or a per service usage activity during a period of time. In some embodiments, the multi-user or multi-device service usage accounting for the device notification usage gauge or service usage indicator is implemented as follows. Device service usage monitoring for more than one device is maintained in the network. A network element identifies the devices that belong to a given multi-user or multi-device account and aggregates the usage account for the usage information available at a given usage update time for all devices belonging to the account. The network element provides/makes available the aggregate usage indication to a single device for display on the device multi-user or multi-device usage gauge or usage indicator. In some embodiments, the network element makes the aggregate usage indication available to a given device by placing the information in a service usage synchronization update as described herein with respect to various embodiments. In some embodiments, the network element makes the aggregate usage indication available to a given device by responding to a device request for aggregate multi-user or multi-device service usage update.

In some embodiments, the multi-user or multi-device service usage accounting for the device notification usage gauge or service usage indicator is implemented as follows. Each device that belongs to a multi-user or multi-device account separately reports the device service usage as measure by the device as described herein with respect to various embodiments. A network element identifies the devices that belong to a given multi-user or multi-device account and aggregates the usage account for the usage information available at a given usage update time for all devices belonging to the account. The network element makes the aggregate usage indication available to a single device for display on the device multi-user or multi-device usage gauge or usage indicator. In some embodiments, the network element makes the aggregate usage indication available to a given device by placing the information in a service usage synchronization update as described herein with respect to various embodiments. In some embodiments, the network element makes the aggregate usage indication available to a given device by responding to a device request for aggregate multi-user or multi-device service usage update. In some embodiments, for multi-user or multi-device service usage notification, the device service usage measure is also synchronized or updated on the device using one of the network service usage synchronization embodiments described herein with respect to various embodiments. In some embodiments, for multi-user or multi-device service plan service usage notification the device based measures are synchronized with network-based service-usage measures in the network prior to aggregation of device usage for all devices that belong to a multi-user or multi-device service plan.

In some embodiments, the multi-user or multi-device service usage notification system is configured by the service provider or by the user to inform the user of one device when another user or another device reaches a certain service usage state or when a certain service usage pattern is detected. For example, a master user (e.g., plan owner) for a multi-user account or a multi-device account can be informed when another user or another device reaches a pre-defined service usage threshold, a service usage limit or a particular service usage pattern occurs, and this pattern is used to define the notification trigger event detection criteria. In some embodiments, service usage patterns include one or more of the following: one or more applications executing on the device, service usage velocity or rate over a given period of time above a given threshold, service usage cost above a given threshold, certain network destinations being accessed, a certain amount of time spent a given service usage activity or set of service usage activities (e.g., texting or social networking usage, such as Facebook), or any of the above service usage patterns that occur in a given pre-determined time period or during a given network busy state. In some embodiments, service usage patterns are determined by having the network detect the service usage threshold or service usage pattern and then sending the user or device a usage notification message to the master user's device notification system. In some embodiments, service usage patterns are determined by sending individual usage measures for each user or device to the master user's device, and the master user device notification system determines when the service usage threshold is reached or service usage pattern occurs. In some embodiments, the user sets the criteria for such a usage threshold or usage pattern notification trigger event, and this user input is then used to define a notification trigger event detection criteria. For example, using these techniques a parent can set daily or monthly service usage limits on a child's device and desire to be notified when those limits are exceeded, or can be notified when a child uses certain service activities such as text, email, or Facebook after a given time in the evening. In some embodiments, a user notification function is provided to a master device to allow the user to set thresholds or identify notification service activity usage pattern trigger events that are used to define one or more notification trigger event detection criteria. In some embodiments, the user can also use the user notification function to set service usage limits and/or service activity network access permissions, such as bulk (e.g., open access plan) daily or monthly usage limits for another user or another device, service activity network access restrictions based on time of day, service cost limits for a given period of time, and various other service usage limits and/or service activity network access permissions.

In some embodiments, the processor of the communications device is further configured to: receive a network-based service-usage measure to periodically synchronize the device-based service-usage measure based on the network-based service-usage measure, in which the user notification includes a master usage gauge, and in which the received network-based service-usage measure includes network-based service-usage measures for each of the communications devices and/or users associated with a multi-device or multi-user service plan associated with the communications device.

In some embodiments, the user notification includes one or more of the following: a text message, an email message, a voice message, a user portal accessible via a web site, a hyperlinked user interface notification, and/or an application executed on the communications device. In some embodiments, the user notification includes a plurality of graphical user interface notifications that are implemented in a common format across a plurality of system and/or software operating platforms for a plurality of communications device types. In some embodiments, the user notification includes a widget, in which the widget when selected by a user launches an application executed on the communications device for displaying additional information and/or options for user selection. In some embodiments, the user notification includes one or more of the following: a toast (e.g., a toast UI element that provides a pop-up window/ message with information displayed to a user for a specified/ configurable/dynamically determined period of time and/or until dismissed by the user; for example, on the Android operating system platform, toast refers to an Android class that handles pop-up messages that appear for durations of time), a widget, a desktop icon (e.g., implemented as a widget), a dynamic desktop icon (e.g., implemented as a widget), a hyperlinked user notification, and a status tray message (e.g., a status tray message element on an Android based operating system).

In some embodiments, monitoring the network service usage activity based on a service policy for assisting control of the communications device use of a network service is implemented using a mobile operating system, in which the mobile platform operating system includes one or more of the following: an Android operating system, a Microsoft Windows Mobile operating system, an Apple iPhone operating system, a Symbian operating system, and an HP/Palm operating system. In some embodiments, the monitor the network service usage activity based on a service policy for assisting control of the communications device use of a network service is implemented using a mobile platform operating system, and in which application event monitoring is performed in a user space of the mobile platform operating system and a policy enforcement is performed in a kernel space of the mobile platform operating system. In some embodiments, the monitor the network service usage activity based on a service policy for assisting control of the communications device use of a network service is implemented using an Android operating system, and in which the processor is further configured to: listen to an application start intent thread using a policy manager executed in a framework layer of the Android operating system to identify a request to execute a first application, in which the policy manager is a subscriber to the application start intent; determine if the service policy includes a first set of policies that apply to the first application using the policy manager; and communicate the set of policies to a policy enforcement agent, in which the policy enforcement agent executes in a kernel layer of the Android operating system.

In some embodiments, monitoring the network service usage activity based on a service policy for assisting control of the communications device use of a network service is implemented using an Android operating system, and in which the processor is further configured to: listen to an application start intent thread using a policy manager executed in a framework layer of the Android operating system to identify a request to execute a first application, in which the policy manager is a subscriber to the application start intent; determine if the service policy includes a first set of policies that apply to the first application using the policy manager; and communicate the set of policies to a policy enforcement agent using an interface request that includes an application identifier and a control request, in which the policy enforcement agent executes in a kernel layer of the Android operating system, in which the control request includes one or more of the following: a user notification setting, a throttle setting, a block setting, an access control setting, a traffic control setting, a billing system setting, a user notification with acknowledgement setting, a user notification with synchronized service usage information, a user privacy setting, a user preference setting, an authentication setting, an admission control setting, an application access setting, a content access setting, a transaction setting, and a network or device management communication setting.

In some embodiments, the device-based service-usage measure based on a network-based service-usage measure, in which the network-based service-usage measures pulled and/or pushed to the communications device. In some embodiments, the push and/or pull of the network-based service-usage measure(s) are sent to the communications device based on one or more of the following: a time based event (e.g., periodically), a service usage based event (e.g., approaching, at, or exceeding a service usage threshold such as 50%, 75%, 90%, and/or 100% of a service plan data limit, and/or a type or category of service usage request, such as a roaming service usage request, and/or a pattern of service usage or change in pattern of service usage), and a service plan based event (e.g., approaching, at, or exceeding a service usage threshold based on the service plan or increments such as 5% or 10% increments relative to a service plan limit, and/or a type or category of service usage request, such as a service usage request that is outside of the service plan, and/or a new service plan or upgraded service plan). For example, by providing a periodic and/or event based synchronization, the communications device can have a relatively accurate service usage measure while not using unnecessary network bandwidth for such synchronization communications over the wireless network. In some embodiments, the synchronization communications can be performed over WiFi and/or other non-cellular network communications when available to reduce over the air cellular network usage for such synchronization communications. In some embodiments, a service controller or other network element/function provides the network-based service-usage measure in communication (e.g., secure communication) with the communications device using push and/or pull techniques as discussed herein.

In some embodiments, the various pull and/or push techniques described herein can provide for network communications to the communication device for implementation of various embodiments of UI notifications for DAS, including, for example, service usage synchronization information, status information, and/or alert or other types of notifications. For example, using the techniques described herein, UI notifications for DAS can provide various service usage, service plan, charging, and/or billing related information without requiring the user to log into a web page to access such information to learn, for example, that they are projected to exceed or have exceeded their service plan usage limit for a particular service or bulk service usage or other events or information that may be of interest to a particular user. In some embodiments, various thin client techniques used in which, for example, the device presents notifications based on network communications as would be apparent to one of ordinary skill in the art in view of the various embodiments described herein. In some embodiments, various smart client techniques used in which, for example, the device presents notifications based on network communications and using locally stored or cached information that can be generated using client based techniques and/or stored based on previously received network communications and/or using client based UI notification and/or display techniques as would be apparent to one of ordinary skill in the art in view of the various embodiments described herein. For example, as described herein, the communications device can maintain a local service usage measure using device-based service-usage monitoring to supplement the synchronized service usage measure since a last network communication to synchronize the service usage measure.

In some embodiments, various hybrid techniques are provided that include various combinations of device based and network based techniques for providing UI notifications for DAS as described herein. For example, network based and device-based service-usage measures can be synchronized based on time stamps or other or similar techniques to facilitate an accurate service usage measure synchronization. For example, the communications device can receive only needed information since a last network communication (e.g., an updated network-based service-usage measure if that measure has changed since a last synchronization communication, but the service plan is not requested/received if the service plan information has not changed since the last synchronization communication) and/or request only needed information since a last network communication (e.g., parameters requested are only those needed as the communications device stores other parameters that were previously received and not updated/changed, and the communications device presents UI notifications using a locally generated/implemented UI, such as a native UI). As another example, certain alerts can be implemented/performed locally (e.g., alerts for 25% and 50% of service usage based on a local usage measure relative to a locally stored/cached service plan service usage limit, such as estimated or project usage counts, but synchronization can be required before generating alerts that also include a service plan upgrade option and/or warnings that the user is exceeding and/or projecting to exceed a service plan service usage limit). As another example, a native UI implementation (e.g., smart UI) can present a user with options to buy/accept overage or select a new/upgraded service plan upon receiving network usage synchronization indicating the current service plan is about to and/or is projected to reach its limit (e.g., 95% or higher of a service plan capacity/data limit/cap) or just exceeded its cap (e.g., 100% or higher of a service plan capacity/data limit/cap), and if the user selects a request to either buy/accept overage or select a new/upgraded service plan the communication device can then notify a network element/function of the request to be implemented in, for example, network provisioning elements/functions to continue uninterrupted network service (e.g., this functionality is facilitated by the communication device implementing a native UI or smart UI as described herein with respect to various embodiments) (e.g., and usage meters and user notifications can be updated as appropriate, and the current data session (if any) is not dropped). As another example, an alert can be queued/cached as pending (e.g., not yet presented to the user) until a network synchronization communication to verify service usage measure and/or other device based monitored/measured information that triggered that alert, and the alert can then be presented/displayed to the user if the network synchronization communication verifies the information supporting such an alert. As another example, a Real Time Reporting (RTR) element/function can be configured with rules/alerts based on a network-based service-usage measure, which are communicated to a Home Agent (HA) that is in the data path for monitoring the service usage of the communications device, which can then monitor the service usage and then generates alerts/reports/updates to the communications device based on the configured rules/alerts. As yet another example, UI can be implemented by the communications device and the traffic control (e.g., blocking, throttling, and/or other traffic control techniques) can be implemented on the network, on the communications device, and/or various combinations based on the communications device, the network, the type of service usage or traffic (e.g., encrypted service usage may be implemented on the communications device and may not be subject to deep packet inspection for traffic control/monitoring on the network, such as at a DPI due to encryption of such traffic).

In some embodiments, a service usage measure is reset upon a service plan rollover date/end of period (e.g., a monthly service plan cap/limit associated with certain service usage can be reset at the end of each monthly period under the service plan based on a time stamp indicating when the service plan rolled over). In some embodiments, UI notifications for DAS includes providing a remaining service usage availability notification based on upon the service plan cap/limit and current service usage measure and/or projected service usage measure, for example, prior to the service plan roll over date. In some embodiments, the service plan usage measure includes a service usage data volume measure. In some embodiments, the service usage measure includes a voice minutes measure. In some embodiments, the service usage measure includes a QoS related service usage measure. In some embodiments, UI notifications for DAS include providing a UI notification for an overage charge when service usage exceeds a service plan cap and/or different notifications when excess usage surpasses various thresholds beyond the service plan cap (e.g., charging and/or penalty for service usage can change depending on the amount of service usage over the service plan cap and/or based on various other criteria). In some embodiments, UI notifications for DAS include providing a UI notification that includes charging information and/or billing due date and/or other charging and/or billing related information. In some embodiments, UI notifications for DAS include providing a UI notification that includes charging information and/or billing due date and/or other charging and/or billing related information also requests and stores/forwards a user acknowledgement for such charging and/or billing related information (e.g., service plan upgrade/downgrade, overage acknowledgement, and/or other or similar acknowledgement).

In some embodiments, a service usage measure and a service plan are associated with a subscriber identity module (SIM), and the SIM can be swapped into another communications device (e.g., into another smart phone or other cellular phone and/or a USB dongle for cellular access via, for example, a laptop or net book) for network service usage under the service plan. In some embodiments, the network based service usage continues to be tracked and associated with the network service usage measure and service plan. In some embodiments, a usage measure (e.g., a usage measure can be based on device assisted service usage monitoring), a device assisted usage measure that is maintained (e.g., stored or cached) on a SIM card and the usage measure is used for updating, synchronizing, and/or initializing device service usage gauge or other UI notifications. In some embodiments, a device-based service-usage measure, a network-based service-usage measure, or a combination of both (e.g., a synchronized device/network based usage measure) updates a service usage measure stored on a SIM card. In some embodiments, the SIM card can be replaced with a variety of storage media (e.g., secured media or not secured) that can be moved from device to device. For example, when a user is using a first device, device service usage UI (e.g., a service usage gauge or meter) can be synchronized with an overall service usage measure storage source (e.g., a network element, a SIM, and/or another source). When the user then uses another device, the device service usage UI can first be initialized with the overall service usage storage measure, and the latest usage information can be stored on SIM card so that user can look it up. In some embodiments, SIM card storage is accessed from the network to update usage. In some embodiments, a service usage measure is obtained from the network (e.g., a network element/function, such as a service controller), and the service usage measure is then updated/stored on the SIM card in the device. In some embodiments, a service usage measure is obtained from a SIM card and communicated to the network (e.g., a network element/function, such as a service controller). In some embodiments, a device-based service-usage measure is stored on the SIM card in the device (e.g., the SIM card storage is accessed to load the current/latest usage and updated with the device based usage measure). In some embodiments, a UI program (e.g., that can be downloaded to the device in one or multiple versions for multiple types of OS and/or devices) downloads usage information and stores the usage information on the SIM card. In some embodiments, SIM service usage information storage is stored in a standardized format (e.g., across SIM cards/media, devices, device OS platforms, and/or carriers). In some embodiments, multiple types of usage information are stored on the SIM card (e.g., including multiple plans and/or multiple plans including with and without separated tethered plans, multiple networks and/or multiple networks including roaming networks, multiple devices, and/or multiple users, such as a family plan, an enterprise plan, or a group plan). In some embodiments, device group information is stored on the SIM card. In some embodiments, the service processor is stored on the SIM (e.g., SIM card) so that it can load into and run on multiple devices it is installed into. In some embodiments, the service processor is executed on the SIM so that it can run on multiple devices the SIM is installed into. In some embodiments, a portion of the service processor is executed on the SIM, and a portion of the service processor is stored on the SIM that is then loaded onto the device so that the service processor can run on multiple devices the SIM is installed into. In some embodiments, a service usage measure and a service plan are associated with a mobile directory number (MDN). In some embodiments, a service usage measure and a service plan are associated with a mobile directory number (MDN), and a user can change MDNs to get a new MDN, and the service usage measure and service plan can be associated with the new MDN.

In some embodiments, a monitored network service usage activity includes a tethered network service usage activity (e.g., network service usage activity via a tethered connection, such as tethering a laptop to a mobile/smart phone for cellular access over a 3G/4G or other cellular network in which the laptop is communicating to the mobile/smart phone through some wireless or wired communication link to access the mobile/smart phone's modem for cellular access), and the tethered network service usage activity counts towards a tethered network service usage count and associated with a tethered network service plan. In some embodiments, a user notification is based on the tethered network service usage count and the tethered network service plan. In some embodiments, tethered network service usage activity counts towards a user's service plan data allowance (e.g., tethered usage and non-tethered usage from the communications device will accrue service usage counts from the same data allowance of the service plan associated with the communications device and/or, for example, associated with the SIM inserted in the communications device).

In some embodiments, UI notifications for DAS includes monitoring a network service usage activity based on a service policy for assisting control of a communications device use of a network service, in which the service policy includes one or more user notification settings based on use of the network service; determining whether the monitored network service usage activity requires a user notification based on the service policy and based on a device-based service-usage measure using a processor of the communications device; and generating the user notification, in which the device based service usage for the communications device is periodically synchronized with a network based service usage.

In some embodiments, UI notifications for DAS includes monitoring a network service usage activity based on a service policy for assisting control of a communications device use of a network service, in which the service policy includes one or more user notification settings based on use of the network service; determining whether the monitored network service usage activity requires a user notification based on the service policy and based on a device-based service-usage measure; and generating the user notification, in which the device based service usage for the communications device is periodically synchronized with a network based service usage.

In some embodiments, UI notifications for DAS includes determining whether a network service usage activity requires a user notification based on a service policy and based on a service usage measure; and generating the user notification, in which the device based service usage for the communications device is periodically synchronized with a network based service usage.

In some embodiments, provisioning (e.g., or programming) the notification trigger event detection criteria and subsequent notification message sequences to implement an access service "self help" services by detecting an issue or problem with a user's service plan selection processes or the network connection performance for the device. For example, various notification triggers can be pre-programmed to initiate a user notification to analyze, diagnose or change the service plan, change the network connection, or fix an issue with the network connection. As another example, a notification trigger can be programmed to identify when a pattern exists in service usage activity history for the device that indicates the user's service plan selection is not well suited for the user's desired service usage activities. As yet another example, a notification trigger can be programmed to identify when a pattern exists in service usage activity history for the device that indicates a problem with the device network connection. As yet another example, a notification trigger can be programmed to identify when a pattern exists in service usage activity history for the device that indicates another available network is better suited to the user's desired service usage activities. These trigger event detection criteria can then lead to trigger index or trigger messages being sent to the notification agent that in turn provides the user with a notification message sequence to assist in "self help" for service plan optimization or network connection performance optimization. In some embodiments, this self help function is offered as an option to the user in the basic notification message sequences associated with service plan selection.

For example, service usage activity history can include service usage; service usage classified by service usage activity, time of day, type of network, network busy state, QoS level; service usage attempts vs. successes (e.g., or failures); or performance of the overall device connection or performance of the connection for a specific service usage activity or group of service usage activities. Performance of the connection can be characterized by a variety of measures including bit rate and/or packet rate measured at the PPP layer, IP layer, or stream layer, network connection throughput variability, network connection bit error rate or packet error rate, network connection success vs. connection attempt (e.g., percentage of successes, or counts of attempts and successes), or another measure of network connection performance, network connection signal strength, network connection signal to noise ratio, raw modem bit rate, modem bit error rate, modem channel, base station or base station sector, network busy state or network congestion state, or another measure of wireless connection performance, wireless connection quality or wireless connection status. In some embodiments, some aspects of service usage activity history information can be monitored and reported by network elements. In some embodiments, some aspects of the service usage activity history is or, in some cases, is preferably monitored and reported from the device. In some embodiments, service usage activity history is reported to a network database on a regular basis. In some embodiments, service usage activity history is reported when it is needed.

As another example, a notification trigger event detection criteria can be set to detect patterns in service usage activity access attempts vs. successes to determine if the user service plan is adequate or optimized for the usage patterns of the user. For example, a notification trigger event detection criteria can be set to indicate when a user is attempting service usage activities that are being blocked, limited or are not receiving good network connection performance. In some embodiments, the service usage history indicates that the service plan is insufficient for one or more usage activities the user is attempting or using, user is experiencing poor network performance, user is experiencing poor network performance compared to the type of service activities the user is attempting to use or is using, or user cannot get access service.

In some embodiments, the user is provided with a notification message offering initiation of an "assisted self help service" via connection to a Customer Self Help Server and UI 134, such as for a remote diagnostics service, instruction service (e.g., sequence of instruction pages, or possibly interactive instruction pages), chat service, voice service or video service to provide assistance the user in selecting a service plan or troubleshooting a service plan selection or network connection performance issue or problem. In some embodiments, during the assisted self help service interaction between the device notification agent and the Customer Self Help Server and UI 134, the device service usage activity history is used by a customer care representative who utilizes the UI in the Customer Self Help Server and UI 134 to aid in diagnosis of the device service plan status, service usage activity patterns or network connection status. This service usage activity history information may already be available to the Customer Self Help Server and UI 134 via a network data base for service usage activity history (e.g., Usage Report Store 136) in which the service usage activity history is reported to a network data base on a regular basis. In this example, the device credential associated with the assisted self help session to the customer care representative can be referenced by the Customer Self Help Server and UI 134 as a look up to load the device service usage activity history information into the UI of the Customer Self Help Server and UI 134 for analysis and diagnosis.

In some embodiments, the service usage activity history information is uploaded to the Customer Self Help Server and UI 134 from the device after the assisted self help session is started and the information may then be displayed on a customer care representative screen for analysis and diagnosis. In some embodiments, the upload of the service usage activity history information from the device into the Customer Self Help Server and UI 134 is automatic. In some embodiments, the upload of the service usage activity history information from the device into the Customer Self Help Server and UI 134 can occur after the user responds to a notification message requesting authorization to upload the service usage activity history information. In some embodiments, the service usage activity history information is periodically uploaded into a network storage data base connected to the upload of the service usage activity history information from the device into the Customer Self Help Server and UI 134, the service usage activity history information is then processed by the upload of the service usage activity history information from the device into the Customer Self Help Server and UI 134 to analyze the history to identify self help notification trigger events, and then the upload of the service usage activity history information from the device into the Customer Self Help Server and UI 134 either initiates the notification sequence by sending a trigger index or trigger index message, or the upload of the service usage activity history information from the device into the Customer Self Help Server and UI 134 informs a network administrator who then takes action to notify the user.

In some embodiments, this type of self help or assisted self help notification service is a sponsored service in which the user does not pay for the access fees. In some embodiments, this type of sponsored self help or assisted self help service may be offered on devices that "ship hot" without paid user service plans until a user selects a service plan. In some embodiments, this type of self help or assisted self help service plan or network connection optimization can provide for low cost customer care/support of sponsored service connections, "ships hot" devices that start with free or low cost services and provide service plan upgrade options in the device, and other device service conditions in which it is desired to reduce conventional service calls or carrier service outlet visits.

In some embodiments, UI notifications for DAS includes receiving a network-based service-usage measure and a user notification request; and generating a user notification based on the user notification request.

In some embodiments, UI notifications for DAS includes requesting a network based service status, in which the network based service status includes a network-based service-usage measure, a service plan information, and/or a user notification request; and generate a user notification based on the network based service status.

In some embodiments, UI notifications for DAS includes receiving a network based service status, in which the network based service status includes a network-based service-usage measure, a service plan update, and/or a user notification request; and generating a user notification based on the network based service status.

In some embodiments, UI notifications for DAS includes receiving a network based service status, in which the network based service status includes a network-based service-usage measure, a service plan information, and/or a user notification request; and generating a user notification based on the network based service status; in which the first communications device includes a removable subscriber identity module (SIM), the network based service status is associated with the SIM, the SIM can be swapped into a second communications device for network service usage under a service plan associated with the SIM, and the network based service usage continues to be counted and associated with the network-based service-usage measure and the service plan.

In some embodiments, device assisted notification with network based service monitoring is provided. In some embodiments, network based notification event trigger detection is provided. In some embodiments, device based notification management is provided. In some embodiments, a flexible notification system is provided with (i) a wide range of notification trigger event detection criteria, including, for example, DPI service activity usage notification capabilities, (ii) a wide range of arbitrarily complex notification message sequences that can be displayed to a device UI in a manner that is efficient with network bandwidth and resources, and (iii) easy to provision (e.g., program) various network elements and/or device agents required to make the notification system work properly. For example, using such a flexible notification system, a device UI (e.g., GUI) can be used to display various notification messages and/or message sequences, as compared to a simple SMS/text message notification. As another example, using such a flexible notification system, a device UI (e.g., GUI) can be used to display various notification messages and/or message sequences related to current and/or real time service usage monitoring, as compared to simple notifications regarding a usage cap and/or a usage amount available on a web site/service portal.

In some embodiments, a network service monitoring element (e.g., a Home Agent 410) determines service usage; a programmable notification trigger element (e.g., an OCS, PCRF, etc.) inspects service usage records (e.g., identifies that the GGSN or the DPI box has blocked a classification or used a classification or hit a limit on a classification) to identify a trigger event detection criteria and generate a trigger index or trigger message. In some embodiments, the trigger index or trigger message is sent to a communications device; and a device notification element (e.g., agent or other functional implementation) performs one or more of the following: (i) generate a message by using the trigger index to look up pre-stored message sequence information that is sent to the UI (e.g., after additional formatting, such as adding a UI background bitmap), (ii) generate a notification sequence by using a trigger message to look up pre-stored message sequence information (e.g., UI bitmap or UI formatting) and combining the pre-stored information with information included in the trigger message to form the complete notification message sequence that is sent to UI, (iii) generate a notification message by using the trigger index or trigger message information as a reference to notification message sequence information stored on a network element (e.g., initiate a selected portal or website message, or request a particular set of message sequence information from a server), and send the network stored information to a UI, and (iv) a combination of two or more of the above.

In some embodiments, a service notification design user interface and associated service notification system provisioning element is included in the notification system, in which the UI accepts carrier network administrator inputs to define, design, specify or provide a reference to the following notification information: (i) the desired notification trigger event detection criteria, (ii) the notification trigger index or trigger message associated with the notification trigger event detection criteria, (iii) the notification message sequence that is to be associated with the notification trigger event detection criteria; and this notification information defined, designed, specified or referenced by the administrator UI is passed to the service notification provisioning apparatus, which then, (iv) programs the programmable notification trigger element with the notification trigger event detection criteria and trigger index or trigger message, (iv) if required programs the routing of the trigger index or trigger message to the device notification element, (v) programs the device notification agent to initiate the desired notification message sequence when the trigger index or trigger message is received.

In some embodiments, the notification system parameters are distributed between the network element and the device element in which the network element includes the Notification Policy management and user interface 132 functionality in which case the carrier is able to define various notification trigger event detection criteria that include, for example, the following:

1. A notification trigger event detection criteria in which a service usage activity is initiated by a user or device and the service usage activity is on a pre-determined programmable list defined by the Notification Policy management and user interface 132 as a notification trigger event intended to initiate a notification message sequence using one of the notification sequence embodiments disclosed herein;
2. a notification trigger event detection criteria in which a desired service usage activity or the service activity usage patterns for the device are not supported by the network access policies for the current service plan (e.g., or current service policy set) and network;
3. a notification trigger event detection criteria in which a desired service usage activity or the service activity usage patterns for the device are better suited for a service plan or service policy set other than the current service plan or service policy set;
4. a notification trigger event detection criteria in which a desired service usage activity or the service activity usage patterns for the device are better suited for the service plan policies for an alternative available network other than the current network the device is connected to;
5. a notification trigger event detection criteria in which a device or device service usage activity is provided with access service that is limited by the service plan or service policy set, and an alternative service plan or service policy set is available that would result in less access service limitation or no access service limitation;
6. a notification trigger event detection criteria in which a device or device service usage activity is provided with access service that is limited by the service plan or service policy set for the current network, and an alternative network is available that provides a service plan or service policy set that would result in less access service limitation or no access service limitation;
7. a notification trigger event detection criteria in which a device or device service usage activity is provided with access service that is priced at a first cost according to the service plan or service policy set, and an alternative service plan or service policy set is available that would result in a second cost that results in a preferred price result;
8. a notification trigger event detection criteria in which a device or device service usage activity is provided with access service that is priced at a first cost according to the service plan or service policy set for the current network, and an alternative network is available that would result in a second cost that results in a preferred price result;
9. a notification trigger event detection criteria in which the service usage velocity may result in or is likely to result in a service overage given the current service plan or service policy set;
10. a notification trigger event detection criteria in which the service usage velocity is low so that a service plan or service policy set with a lower service usage limit may be better suited to the device or user service usage behavior;
11. a notification trigger event detection criteria in which a service offer is presented to the user when one or more pre-defined service usage activities are initiated;
12. a notification trigger event detection criteria in which a service offer is presented to the user when one or more pre-defined applications are selected or used by the user (e.g., identify an application in a network by observing the network destinations access by the app, identify an application in the network when an application header information is detected in the traffic, identify an application traffic event or flow on a device associated with an application);
13. a notification trigger event detection criteria in which a service offer is presented to the user when one or more pre-defined patterns of service usage activities or patterns of application selection or application usage activities are present on the device;
14. a notification trigger event detection criteria where a pre-defined level of service usage is reached for the device;
15. a notification trigger event detection criteria where a pre-determined level of service usage is reached for a service usage activity or a group of service usage activities;
16. a notification trigger event detection criteria in which a pre-determined level of service overage is reached, where the service overage is measured in usage amount, percentage of service limit or cost;
17. a notification trigger event detection criteria in which an application that is on a list of high usage apps (e.g., streaming audio, streaming video, or file download or sharing) for the current service plan is selected or used by the user or device;
18. a notification trigger event detection criteria in which the device contains device assisted services agents and a possible fraud event has been detected;
19. a notification trigger event detection criteria where a pre-defined level of service usage velocity is reached for the device;
20. a notification trigger event detection criteria where a pre-determined level of service usage velocity is reached for a service usage activity or a group of service usage activities;
21. a notification trigger event detection criteria in which the user has not yet signed up for service on an available network and is attempting to use a service usage activity that can be supported with the available network;
22. a notification trigger event detection criteria in which the user has not yet signed up for service on an available network and is attempting to use a service usage activity that can be supported with the available network, and no other network is available to the device or user;
23. a notification trigger event detection criteria in which the user or device attempts to use a service usage activity that requires or exhibits improved performance with a QoS level that is beyond the QoS allowance of the current service plan or service policy set;
24. a notification trigger event detection criteria in which the user or device attempts to use a service usage activity that requires or exhibits improved performance with a QoS level that is beyond the QoS available on the current network;
25. a notification trigger event detection criteria in which the user or device attempts to use a service usage activity that requires or exhibits improved performance with a QoS level that is available on an alternative network other than the network the device is connected to;
26. a notification trigger event detection criteria in which a device on the far end of a QoS connection does not have the same QoS availability as the device on the near end;

27. a notification trigger event detection criteria in which the network busy state reaches a pre-determined level or changes to a new level;
28. a notification trigger event detection criteria in which the time of day window reaches a pre-determined state or changes;
29. a notification trigger event detection criteria in which the network busy state or time of day window results in a modification to access service for a service usage activity selected by the user or device;
30. a notification trigger event detection criteria in which a service usage activity that has been selected or is running is provided with background access policies or is provided with access service that is limited in some way;
31. a notification trigger event detection criteria in which a service usage activity access policy is dependent on network busy state or time of day window and the network busy state or time of day window changes;
32. a notification trigger event detection criteria in which device service usage activities are classified into (i) user selected or foreground activities and (ii) OS system, application, or background activities;
33. a notification trigger event detection criteria in which one or more active service usage activities have access policies that are dependent on a combination of one or more of (i) network busy state, (ii) time of day, (iii) active network, (iv) available networks, (v) QoS availability, (collectively the "network state indexes"), and one or more of the network state indexes change;
34. a notification trigger event detection criteria in which a new service plan offering or trial service plan offering has been made available to the device;
35. a notification trigger event detection criteria in which a service usage activity capability, service plan policy or service policy set was added, updated, upgraded, or changed on the device;
36. a notification trigger event detection criteria in which the total service usage amount or service usage velocity for a device group has reached a pre-determined level;
37. a notification trigger event detection criteria in which a first device receives service usage or service cost information pertaining to a second device, a second user, a device group, or a user group;
38. a notification condition wherein the service usage amount or service usage velocity for a first device within a device group reaches a pre-determined level and this is intended to trigger a notification to a second device;
39. a notification trigger event detection criteria in which a pre-determined service usage activity is initiated for a first device and this is intended to initiate a notification for a second device;
40. a notification trigger event detection criteria in which the total service usage amount or service usage velocity for a user group has reached a pre-determined level;
41. a notification condition in which the service usage amount or service usage velocity for a first user within a user group reaches a pre-determined level and this is intended to trigger a notification to a second user;
42. a notification trigger event detection criteria in which a pre-determined service usage activity is initiated for a first user and this is intended to initiate a notification for a second user;
43. a notification trigger event detection criteria in which the service usage or service usage velocity for a sponsored service usage activity exceeds the policy limits for the sponsored service usage activity;
44. a notification trigger event detection criteria in which a service usage activity or a subset of service usage activities running on the device are contributing disproportionately to device service usage amount;
45. a notification trigger event detection criteria in which a service usage activity is available that will provide the user with an opportunity to increase good customer standing or good customer points;
46. a notification trigger event detection criteria in which a service usage activity is available that can be paid for with customer standing or good customer points;
47. a notification trigger event detection criteria in which a service usage activity that can be paid for with good customer standing or points is not available due to insufficient good customer standing or points to pay for the activity;
48. a notification trigger event detection criteria in which a pre-determined level of good customer standing or points is reached;
49. a notification trigger event detection criteria in which one or more roaming networks becomes available;
50. a notification trigger event detection criteria in which one or more roaming networks becomes available and a device based table specifying roaming network costs or a network based table specifying roaming network costs is available to the device notification agent;
51. a notification trigger event detection criteria in which one or more roaming networks becomes available and a device based table specifying roaming network performance (e.g., speed, voice quality, video quality, or QoS capability) or a network based table specifying roaming network performance is available to the device notification agent;
52. a notification trigger event detection criteria in which a pre-determined amount of roaming service usage or roaming service cost is reached;
53. a notification condition in which a pre-determined roaming service velocity or rate of cost accumulation is reached;
54. a notification trigger event detection criteria in which a service usage activity identified as a high roaming service usage activity is initiated by the user or device;
55. a notification trigger event detection criteria in which a service usage activity is initiated that has a defined typical or average service usage velocity that is above a roaming service usage velocity limit set by the user or a service design administrator;
56. a notification trigger event detection criteria in which a service usage activity specified as a low priority or background roaming service usage activity is initiated by the user or device;
57. a notification trigger event detection criteria in which there is an issue or problem identified in the status or performance of the device connection to the network; and
58. a notification trigger event detection criteria in which a first device receives information about the roaming service usage of a second device, a second user, a device group, or a user group.

In some embodiments, the Notification Policy management and user interface 132 includes separate device group partitions for multiple device groups so that different service usage notification policies and/or message sequences can be supported for different devices, user groups, and/or distribution channels. In some embodiments, the device group partition is defined by the collection of device credentials or user credentials that belong to the device group, and all devices in that device group received the same notification policies and messages sequences. In some embodiments, each device group is managed by a separate secure Notification Policy management and user interface 132 device policy management partition and UI login so that the device groups can be managed by different Notification Policy management and user interface 132 administrators, who may or may not work for the same corporate entity and may or may not be part of the carrier corporate entity.

In some embodiments, the notification message sequence information can be entered into the UI of the Notification Policy management and user interface 132 or referenced by the Notification Policy management and user interface 132 (e.g., notification message sequence information located on Network Based Notification Message Information 1697B, a reference to a file, a server location, a portal, or a website). This notification message sequence information that can be programmed or referenced with the Notification Policy management and user interface 132 includes information, such as the notification text displayed in various UI interfaces (e.g., dashboard, widget, status or tray); selection buttons such as radio buttons and/or checkbox buttons; notification "shell" or "look and feel" information (e.g., notification message background "branding" information in the form of images, bitmaps, or network server or site references); or notification user decision trees and the associated notification message sequencing in the form of links to network based UI display files, portal pages (e.g., web view pages) or web pages.

In some embodiments, most or all of the notification message sequence information is contained on device storage and displayed via a native device UI (e.g., pop-up UI message window, toast message window, or tray message window) or pulled into a browser window as the device notification agent processes and executes the notification message sequence. Such embodiments reduce the air bandwidth, improve the user experience as the user notification is more immediate due to minimal delay between notification trigger and notification message sequence display, and the notification message system is robust as it is not as subject to poor connection or wireless communication conditions and/or can be used in some off-line conditions. In some embodiments, the Notification Policy management and user interface 132 includes provisions to specify what type of notification message is to be sent for a given portion of a notification message sequence (e.g., pop-up, toast, tray, web view, or browser view).

In some embodiments, some or most of the notification message sequence information is stored on network elements (e.g., notification message sequence information located on Network Based Notification Message Information 1697B, server files, portal pages, or website pages) and displayed via a native device UI (e.g., pop-up UI message window, toast message window, or tray message window) or pulled into a browser window as the device notification agent processes and executes the notification message sequence. Such embodiments can be advantageous when notification message sequence information is more complex and would require large amounts of device memory or the information needs to be updated or modified in real time based on exhibited device service usage behavior, location, and/or application usage characteristics. In some embodiments, the Notification Policy management and user interface 132 can include provisioning to specify what type of notification message is to be sent for a given portion of a notification message sequence (e.g., pop-up, toast, tray, web view, or browser view) and specify the network resources and destination addresses for various portions of the notification message sequence information that are contained on network resources. In some embodiments, the Notification Policy management and user interface 132 can include provisioning the network based notification message sequence information stored on Network Based Notification Message Information 1697B (e.g., or other server files, portal pages, or website pages).

In some embodiments, an optimized combination of device based notification message sequence information storage and/or display and network based notification message sequence information storage and/or display is utilized in which: (A) some notification message sequences are created with largely device based notification message sequence information storage and/or display when the notification message sequence (i) occurs frequently, (ii) requires rapid UI display timing, and/or (iii) has relatively low complexity or relatively confined sequence decision tree branches; and (B) some notification message sequences are created with largely network based notification message sequence information storage and/or display when the notification message sequence (i) is relatively complex or has relatively many sequence decision branches, (ii) occurs less frequently, and/or (iii) needs to be adapted in real time based on user service usage behavior, application usage behavior, or other user based feedback.

As described herein, the Notification Policy management and user interface 132 can also be used to program or provision the notification trigger events that are to initiate the notification message sequences, and associate the trigger events with trigger indexes or trigger message, which in turn are associated with the notification sequences. In some embodiments, the trigger events and trigger indexes are programmed into network elements (e.g., home agents or RTR reporting elements). In some embodiments, the trigger events and trigger indexes are programmed into device elements (e.g., device agents as described herein).

In some embodiments, user notifications for DAS includes providing a user notification that includes an indication that a requested application is not supported under a current service plan and an offer to present alternative service plans that support the requested application. In some embodiments, an application startup interceptor blocks the requested application based on a service plan, monitored service usage levels, and/or other criteria, such as network busy state, available quality of service (QoS) level and various other criteria and measures as described herein. In some embodiments, the user notification provides an indication that a requested application is not supported under a current service plan and an offer to present allow the requested application for a higher service usage fee, in which an application startup interceptor blocks the requested application based on a current network busy state. In some embodiments, the user notification provides an indication that a requested application is not supported under a current service plan and an offer to present allowing the requested application for a higher service usage fee, in which an application startup interceptor blocks the requested application based on a current quality of service level. In some embodiments, the user notification provides an indication that a requested application is being throttled under a current service plan and an offer to present allowing the requested application for a higher service usage fee.

In some embodiments, user notifications for DAS includes monitoring usage of one or more applications on a plurality of communications devices; determining which of the one or more applications are likely to cause service usage overages or have contributed (e.g., significantly) to service usage overages for one or more service plans; and sending a user notification message to one of the plurality of communications devices, in which the user notification includes an indication that usage of the one or more applications is likely to cause a service plan overage or have contributed (e.g., significantly) to a service usage overage. In some embodiments, user notifications for DAS further includes sending to one of the plurality of communications devices a list of the one or more applications determined to likely cause service usage overages or have contributed (e.g., significantly) to service usage overages for a service plan associated with the one of the plurality of communications devices. In some embodiments, user notifications for DAS further includes sending to one of the plurality of communications devices a list of the one or more applications determined to likely cause a service usage overage or have contributed (e.g., significantly) to service usage overages for a service plan associated with the one of the plurality of communications devices, in which the list of the one or more applications is included in a user notification (e.g., including a UI message or a UI message acknowledgement request).

In some embodiments, user notifications for DAS further includes receiving at a service usage analytics network element a plurality of service usage reports from a plurality of communications devices; analyzing the service usage report to determine which applications are likely to cause service usage overages or have contributed (e.g., significantly) to service usage overages, and using this information to (i) notify a network administrator of the applications that are likely to cause service usage overages or have contributed (e.g., significantly) to service usage overages; or (ii) automatically program a user notification message in which the user notification includes an indication that usage of the one or more applications is likely to cause a service plan overage or have contributed (e.g., significantly) to a service usage overage. In some embodiments, user notifications for DAS further includes receiving at a service usage analytics network element a plurality of device service usage reports from a network service usage monitoring element; analyzing the service usage report to determine which applications are likely to cause service usage overages or have contributed (e.g., significantly) to service usage overages, and using this information to (i) notify a network administrator of the applications that are likely to cause service usage overages or have contributed (e.g., significantly) to service usage overages; or (ii) automatically program a user notification message in which the user notification includes an indication that usage of the one or more applications is likely to cause a service plan overage or have contributed (e.g., significantly) to a service usage overage.

In some embodiments, user notifications for DAS further includes receiving a service usage report from one of the plurality of communications devices; analyzing the service usage report to determine whether to generate a user notification based on the service usage report; and sending a user notification request message to the one of the plurality of communications devices based on the determination, in which the one of the plurality of communications devices uses the user notification request message to identify a pre-stored user notification. In some embodiments, user notifications for DAS further includes monitoring a network based service usage for one of the plurality of communications devices; and sending a user notification request message to the one of the plurality of communications devices based on the monitored network based service usage for the one of the plurality of communications devices, in which the one of the plurality of communications devices uses the user notification request message to identify a pre-stored user notification.

In some embodiments, user notifications for DAS includes monitoring usage of one or more network destinations on a plurality of communications devices; determining which of the one or more network destinations are likely to cause service usage overages or have contributed (e.g., significantly) to service usage overages for one or more service plans; and sending a user notification message to one of the plurality of communications devices, in which the user notification includes an indication that usage of the one or more network destinations is likely to cause a service plan overage or have contributed to a service usage overage. In some embodiments, user notifications for DAS further includes sending to one of the plurality of communications devices a list of the one or more network destinations determined to likely cause service usage overages or have contributed to service usage overages for a service plan associated with the one of the plurality of communications devices. In some embodiments, user notifications for DAS further includes sending to one of the plurality of communications devices a list of the one or more network destinations determined to likely cause a service usage overage or have contributed to service usage overages for a service plan associated with the one of the plurality of communications devices, in which the list of the one or more network destinations is included in a user notification (e.g., including a UI message or a UI message acknowledgement request).

In some embodiments, user notifications for DAS further includes receiving at a service usage analytics network element a plurality of service usage reports from a plurality of communications devices; analyzing the service usage report to determine which network destinations are likely to cause service usage overages or have contributed to service usage overages, and using this information to (i) notify a network administrator of the network destinations that are likely to cause service usage overages or have contributed to service usage overages; or (ii) automatically program a user notification message in which the user notification includes an indication that usage of the one or more network destinations is likely to cause a service plan overage or have contributed to a service usage overage. In some embodiments, user notifications for DAS further includes receiving at a service usage analytics network element a plurality of device service usage reports from a network service usage monitoring element; analyzing the service usage report to determine which network destinations are likely to cause service usage overages or have contributed to service usage overages, and using this information to (i) notify a network administrator of the network destinations that are likely to cause service usage overages or have contributed to service usage overages; or (ii) automatically program a user notification message in which the user notification includes an indication that usage of the one or more network destinations is likely to cause a service plan overage or have contributed to a service usage overage.

In some embodiments, user notifications for DAS includes monitoring usage of one or more content types, service types or traffic types on a plurality of communications devices; determining which of the one or more content types, service types or traffic types are likely to cause service usage overages or have contributed to service usage overages for one or more service plans; and sending a user notification message to one of the plurality of communications devices, in which the user notification includes an indication that usage of the one or more content types, service types or traffic types is likely to cause a service plan overage or have contributed to a service usage overage. In some embodiments, user notifications for DAS further includes sending to one of the plurality of communications devices a list of the one or more content types, service types or traffic types determined to likely cause service usage overages or have contributed to service usage overages for a service plan associated with the one of the plurality of communications devices. In some embodiments, user notifications for DAS further includes sending to one of the plurality of communications devices a list of the one or more content types, service types or traffic types determined to likely cause a service usage overage or have contributed to service usage overages for a service plan associated with the one of the plurality of communications devices, in which the list of the one or more content types, service types or traffic types is included in a user notification (e.g., including a UI message or a UI message acknowledgement request).

In some embodiments, user notifications for DAS further includes receiving at a service usage analytics network element a plurality of service usage reports from a plurality of communications devices; analyzing the service usage report to determine which content types, service types or traffic types are likely to cause service usage overages or have contributed to service usage overages, and using this information to (i) notify a network administrator of the content types, service types or traffic types that are likely to cause service usage overages or have contributed to service usage overages; or (ii) automatically program a user notification message in which the user notification includes an indication that usage of the one or more content types, service types or traffic types is likely to cause a service plan overage or have contributed to a service usage overage. In some embodiments, user notifications for DAS further includes receiving at a service usage analytics network element a plurality of device service usage reports from a network service usage monitoring element; analyzing the service usage report to determine which content types, service types or traffic types are likely to cause service usage overages or have contributed to service usage overages, and using this information to (i) notify a network administrator of the content types, service types or traffic types that are likely to cause service usage overages or have contributed to service usage overages; or (ii) automatically program a user notification message in which the user notification includes an indication that usage of the one or more content types, service types or traffic types is likely to cause a service plan overage or have contributed to a service usage overage.

Example Embodiments for Network-Based Classification Notification System

In some embodiments, a network-based device notification system provides for end-user device service notification for services comprising a network-based traffic classification, the classification comprising a subset of available network destinations. In some embodiments, the traffic classification is defined by a set of one or more traffic filters or traffic object identifiers. This notification system can comprise the various embodiments for traffic classification, notification trigger identification, and notification message display to the user. The following description is of an advantageous embodiment. This example is not intended to be exhaustive or limiting.

In some embodiments, a network-based device notification system comprises a notification provisioning system that is configured to (a) program storage for a device notification system with a device notification message and an association of the notification message with a notification trigger index, (b) program storage for a network traffic gateway with a traffic classification policy for a classification of traffic that is allowed when a service plan is in effect, the service plan being available for network access service by an end-user device identified by a device credential (in some embodiments the service plan can be a service plan that allows only certain classifications of service including those encompassed by the classification policy), and (c) program storage for a notification trigger detection system with the notification trigger condition comprising a classification of network traffic and a network access event. In some such embodiments, the network traffic gateway is configured with DPI capability comprising a traffic classification system to inspect network traffic from the end-user device, determine when a traffic event meets the traffic classification policy, and report the network access event and device credential to the notification trigger detection system. In some embodiments, the notification trigger detection system is configured to observe the traffic classification and network access event to determine if a notification trigger condition has been satisfied and, if so, communicate the notification trigger index and the device credential to the device notification system. In some embodiments, the device notification system is configured to receive the notification trigger index and initiate a procedure to cause a device agent to display the notification message to the device user.

In some embodiments, the network-based device notification system can be further configured to detect traffic that meets the classification, determine if a user service plan is in effect that allows the traffic that meets the classification, and, if there is no user service plan in effect that allows the traffic that meets the classification, send the user a notification message that a service plan must be purchased. The notification message may be further configured to provide information about the service classification.

In some embodiments, the traffic gateway used in the network-based device notification system can be a home agent 6510 or any of the other traffic gateway elements disclosed herein. In some embodiments, the traffic gateway includes the notification trigger detection system. In some embodiments, the notification trigger detection system is located in usage report store 136 (e.g., a service usage charging system or PCRF system). In some embodiments, the device notification system is located in the usage report store 136 (e.g., a charging system or PCRF). In some embodiments, the notification system is a separate server (e.g., a service controller or a device notification client communication server). In some embodiments, the notification system can be located in the traffic gateway.

In some embodiments of the network-based device notification system, the Notification Policy Management & UI 132 is used to accept a high-level input from one or more network policy administrators, the input comprising information about the service classification, trigger condition, and notification message. In some embodiments, the Notification Policy Management & UI 132 accepts these inputs in a graphical design environment, and translates the administrative user input into one or more provisioning instruction files for programming the notification message, the trigger condition, and the classification definition into the appropriate network elements.

In some network-based device notification system embodiments, the traffic classification is based on one or more of: a network server identifier or address, a gateway identifier or address, a website identifier or address, a domain identifier or address, a web page identifier or address, a WAP site identifier or address, a WAP page identifier or address, an application identifier included in the traffic (e.g., an application header field or other field specifying an application identifier), a portal site identifier or address, a traffic route identifier, or a traffic tunnel identifier.

In some network-based device notification system embodiments, the notification trigger condition comprises an attempt to use a classification of service for which a service plan has not been purchased. In some embodiments, the notification trigger condition comprises an amount of service being reached for a classification of service. In some embodiments, the notification trigger condition comprises a limit being reached for a classification of service. In some embodiments, the notification trigger condition comprises a detected device service usage or attempted service usage for a service classification that indicates the user might accept a service offer. In other embodiments, the device trigger condition can be any of the other trigger conditions disclosed herein.

In some network-based device notification system embodiments, the traffic classification is based on traffic inspection filter definitions comprising attributes of traffic that are to be examined by the traffic inspection system on the network traffic gateway. In some embodiments, these traffic filters specify objects found in a website or WAP site, and, as would be understood by one of ordinary skill in the art, these objects can be detected by searching for various object identifiers.

In some network-based device notification system embodiments, the traffic classification is based on rules that are frequently adapted to account for changes in the network destination information associated with the service intended to be described by the classification. Such changes often occur in websites and other on-line information sources, and if the classification specifications are static, the device user can be erroneously blocked from destinations that the user would have a right to access under the intended service classification policy. In addition, if a block notification is provided to the user when a classification of service is attempted that does not have a service plan purchased to allow the classification of service, then if the classification policy is not adaptively updated then an erroneous block message or "service plan needs to be purchased" message can result. In some embodiments, an adaptive service classification policy updater is used to determine when a service classification needs to be updated, or to periodically update the service classification policy. In some embodiments the adaptive service classification policy updater provides a classification policy update automatically to one or more policy provisioning elements that then provide the classification policy to the traffic gateway. In some embodiments, the adaptive service classification policy updater provides a classification policy update to a service administrator for review prior to providing the updated classification policy to one or more policy provisioning elements that then provide the classification policy to the traffic gateway.

In some network-based device notification system embodiments, the adaptive service classification policy updater uses a web crawler to search items on a website, domain, or server network. In some embodiments, the adaptive service classification policy updater has rules for what level of objects to include in the classification. For example, the rules may specify that the adaptive service classification policy updater should only include object descriptions that result from web page loads, or also include object descriptions that result from a click on the web page. In some embodiments, the adaptive service classification policy updater uses domain objet language analysis to identify which objects to include in a service classification policy.

In some network-based device notification system embodiments, the adaptive classification is achieved by adapting the allowed traffic definition in the traffic gateway itself. This can be advantageously accomplished in a number of ways, including an adaptive ambient implementation (also referred to herein as an associative classification implementation). In adaptive ambient (i.e., associative classification), unknown traffic objects (or unknown traffic flows associated with the objects) that are identified with DPI gateways that are in close association with known traffic objects (or known traffic flows associated with the objects) are provided with a temporary allowance to be included in the traffic classification policy. Another way to associate traffic with a service classification is to search for an application header text string or other application information in the traffic headers. In this way, objects that are not specific to a given domain (such as advertising domain objects that may comprise a large percentage of traffic) can be accounted for in an appropriate manner when they are being used by one classification service, and accounted to a different classification service when they are used for that service. The temporary association of unknown traffic objects or traffic flows can be based on a time lease or a service usage (e.g., byte) lease. In some embodiments, the lease is terminated when a traffic object that is known not to belong to the service classification is identified. In some embodiments, the traffic gateway can be programmed to allow a "one-click away" policy where not only the first domain and all objects identified as belonging to that page are allowed for a website, but also an object on the page can be clicked and accessed. It is also advantageous in some embodiments to use these same adaptive ambient or associative techniques with a device agent DPI.

Example Embodiments of Associative Classification for a Notification System

In some embodiments, a network based access service notification system comprises (1) an access notification provisioning system configured to program storage for a network traffic gateway with a notification trigger policy comprising a notification trigger index and a traffic classification policy comprising a set of one or more traffic classification identifiers for traffic that is allowed when a service plan is in effect, the service plan being available for network access service by a device user identified by a device credential; (2) a network traffic gateway configured with DPI capability comprising a traffic classification system configured to inspect network traffic associated with the user device credential, determine when a traffic event meets the traffic classification policy, and communicate the notification trigger index to a device notification message gateway; and (3) an adaptive classification policy system comprising a network destination search system configured to identify changes in a network destination associated with the traffic classification policy, and a classification policy update system configured to cause the notification provisioning system to update the traffic classification policy stored in the gateway.

In some embodiments, the network traffic gateway identifies a sponsored service classification and a non-sponsored service classification. In some embodiments, if the end-user device is not authorized to use the non-sponsored service, the notification trigger index is configured to communicate to the device notification message gateway that the end-user device attempted, but was not allowed, to access the non-sponsored service. In some embodiments, the device notification message gateway then causes an offer for a service plan to allow access to the non-sponsored service to be presented through a user interface of the end-user device.

In some embodiments, the network traffic gateway identifies a subset of a non-sponsored service, and the device notification message gateway causes an offer for a service plan to allow access to the subset of the non-sponsored service to be presented through a user interface of the end-user device.

Example Embodiments of Associative Classification for a Charging System

In some embodiments, a network-based access charging system comprises (1) an access charging provisioning system configured to program storage for a network traffic gateway with a traffic charging policy comprising an accounting policy and a traffic classification policy comprising a set of one or more traffic classification identifiers for traffic that is allowed when a service plan is in effect, the service plan being available for network access service by a device user identified by a device credential; (2) a network traffic gateway configured with a DPI capability comprising a traffic classification system configured to inspect network traffic associated with the user device credential, determine when a traffic event meets the traffic classification policy, implement the accounting policy, and report a traffic classification accounting measure to a service charging system; and (3) an adaptive classification policy system comprising (a) a network destination search system configured to identify changes in a network destination associated with the traffic classification policy, and (b) a classification policy update system configured to cause the access control provisioning system to update the traffic classification policy stored in the gateway.

In some embodiments, the network destination search system is configured to identify changes in a network destination associated with the traffic classification policy by accessing a website to catalog a traffic inspection characteristic of the objects available on the website. In some such embodiments, accessing a website includes accessing website objects that spawn additional traffic objects sourced from domains or URLs other than the domains or URLs contained in the original traffic classification list. In some embodiments, the network destination search system is configured to identify changes in a network destination associated with the traffic classification policy by performing a Domain Object Model analysis of a website to catalog a traffic inspection characteristic of the objects available on the website.

In some embodiments, the network destination search system is configured to identify changes in a network destination associated with the traffic classification policy by identifying an association of traffic properties between an unknown traffic object and a traffic object that satisfies the classification policy. In some such embodiments, the association of traffic properties between the unknown traffic object and the traffic object that satisfies the classification policy is based on the amount of service usage that has transpired since one or more known traffic events that fall under the classification policy. In some embodiments, the association of traffic properties between the unknown traffic object and the traffic object that satisfies the classification policy is based on an analysis of the traffic that determines the application is associated with the classification policy. In some such embodiments, the analysis of the traffic identifies an application header that satisfies the classification policy.

In some embodiments, a management system is provided facilitating order and subscriber management of services for end-user devices. In some embodiments, the management system is capable of receiving high-level user inputs on classification, traffic policy, and adaptive classification search parameters. In some embodiments, the management system is configured to determine provisioning instructions to facilitate programming of network elements responsible for identifying notification triggers, implementing notification policy, implementing control policy, or implementing charging policy.

In some embodiments, a network-based access charging system is further configured to detect traffic that meets a classification, determine if a user service plan is in effect that allows the traffic that meets the classification, and, if not, assist in informing the user that a service plan must be purchased before the end-user device may access the classified network service. In some such embodiments, the notification is dependent on the service classification.

Example Embodiments of Associative Classification for an Access Control System

In some embodiments, a network based access control system comprises an (1) access control provisioning system configured to program storage for a network traffic gateway with a traffic control policy and a traffic classification policy comprising a set of one or more traffic classification identifiers for traffic that is allowed when a service plan is in effect, the service plan being available for network access service by a device user identified by a device credential; (2) a network traffic gateway configured with a DPI capability comprising a traffic classification system configured to inspect network traffic associated with the user device credential, determine when a traffic event meets the traffic classification policy, and enforce the traffic control policy; and (3) an adaptive classification policy system comprising (a) a network destination search system configured to identify changes in a network destination associated with the traffic classification policy, and (b) a classification policy update system configured to cause the access control provisioning system to update the traffic classification policy stored in the gateway.

In some embodiments, the network destination search system is configured to identify changes in a network destination associated with the traffic classification policy by accessing a website to catalog a traffic inspection characteristic of the objects available on the website. In some such embodiments, accessing a website includes accessing website objects that spawn additional traffic objects sourced from domains or URLs other than the domains or URLs contained in the original traffic classification list.

In some embodiments, the network destination search system is configured to identify changes in a network destination associated with the traffic classification policy by performing a Domain Object Model analysis of a website to catalog a traffic inspection characteristic of the objects available on the website.

In some embodiments, the network destination search system is configured to identify changes in a network destination associated with the traffic classification policy by identifying an association of traffic properties between an unknown traffic object and a traffic object that satisfies the classification policy. In some such embodiments, the association is based on the amount of service usage that has transpired since one or more known traffic events that fall under the classification policy. In other such embodiments, the association is based on an analysis of the traffic that determines the application is associated with the classification policy. In some such embodiments, the analysis of the traffic identifies an application header that satisfies the classification policy.

In some embodiments, a management system is provided facilitating order and subscriber management of services for end-user devices. In some embodiments, the management system is capable of receiving high-level user inputs on classification, traffic policy, and adaptive classification search parameters. In some embodiments, the management system is configured to determine provisioning instructions to facilitate programming of network elements responsible for identifying notification triggers, implementing notification policy, implementing control policy, or implementing charging policy.

In some embodiments, the network-based access control system is further configured to detect traffic that meets a classification, determine if a user service plan is in effect that allows the traffic that meets the classification, and, if not, inform the user that a service plan must be purchased. In some such embodiments, the notification is dependent on the service classification.

The above description is provided to enable any person skilled in the art to make and use the invention. Various modifications to the embodiments are possible, and the principles described herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014);

application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543; application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); and application Ser. No. 14/292,282, filed May 30, 2014, entitled SYSTEM AND METHOD FOR PROVIDING USER NOTIFICATIONS.

This application incorporates by reference for all purposes the following provisional patent applications: U.S. Provisional Application No. 61/206,354, filed Jan. 28, 2009, entitled SERVICES POLICY COMMUNICATION SYSTEM AND METHOD; U.S. Provisional Application No. 61/206,944, filed Feb. 4, 2009, entitled SERVICES POLICY COMMUNICATION SYSTEM AND METHOD; U.S. Provisional Application No. 61/207,393, filed Feb. 10, 2009, entitled SERVICES POLICY COMMUNICATION SYSTEM AND METHOD; U.S. Provisional Application No. 61/207,739, entitled SERVICES POLICY COMMUNICATION SYSTEM AND METHOD, filed Feb. 13, 2009; U.S. Provisional Application No. 61/270,353, filed on Jul. 6, 2009, entitled DEVICE ASSISTED CDR CREATION, AGGREGATION, MEDIATION AND BILLING; U.S. Provisional Application No. 61/275,208, filed Aug. 25, 2009, entitled ADAPTIVE AMBIENT SERVICES; U.S. Provisional Application No. 61/237,753, filed Aug. 28, 2009, entitled ADAPTIVE AMBIENT SERVICES; U.S. Provisional Application No. 61/252,151, filed Oct. 15, 2009, entitled SECURITY TECHNIQUES FOR DEVICE ASSISTED SERVICES; and U.S. Provisional Application No. 61/252,153, filed Oct. 15, 2009, entitled DEVICE GROUP PARTITIONS AND SETTLEMENT PLATFORM; U.S. Provisional Application No. 61/264,120, filed Nov. 24, 2009, entitled DEVICE ASSISTED SERVICES INSTALL; U.S. Provisional Application No. 61/264,126, filed Nov. 24, 2009, entitled DEVICE ASSISTED SERVICES ACTIVITY MAP; U.S. Provisional Application No. 61/348,022, filed May 25, 2010, entitled DEVICE ASSISTED SERVICES FOR PROTECTING NETWORK CAPACITY; U.S. Provisional Application No. 61/381,159, filed Sep. 9, 2010, entitled DEVICE ASSISTED SERVICES FOR PROTECTING NETWORK CAPACITY; U.S. Provisional Application No. 61/381,162, filed Sep. 9, 2010, entitled SERVICE CONTROLLER INTERFACES AND WORKFLOWS; U.S. Provisional Application No. 61/384,456, filed Sep. 20, 2010, entitled SECURING SERVICE PROCESSOR WITH SPONSORED SIMS; U.S. Provisional Application No. 61/389,547, filed Oct. 4, 2010, entitled USER NOTIFICATIONS FOR DEVICE ASSISTED SERVICES; U.S. Provisional Application No. 61/385,020, filed Sep. 21, 2010, entitled SERVICE USAGE RECONCILIATION SYSTEM OVERVIEW; U.S. Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; U.S. Provisional Application No. 61/387,247, filed Sep. 28, 2010 entitled SECURED DEVICE DATA RECORDS; U.S. Provisional Application No. 61/407,358, filed Oct. 27, 2010, entitled SERVICE CONTROLLER AND SERVICE PROCESSOR ARCHITECTURE; U.S. Provisional Application No. 61/418,507, filed Dec. 1, 2010, entitled APPLICATION SERVICE PROVIDER INTERFACE SYSTEM; U.S. Provisional Application No. 61/418,509, filed Dec. 1, 2010, entitled SERVICE USAGE REPORTING RECONCILIATION AND FRAUD DETECTION FOR DEVICE ASSISTED SERVICES; U.S. Provisional Application No. 61/420,727, filed Dec. 7, 2010, entitled SECURE DEVICE DATA RECORDS; U.S. Provisional Application No. 61/422,565, filed Dec. 13, 2010, entitled SERVICE DESIGN CENTER FOR DEVICE ASSISTED SERVICES; U.S. Provisional Application No. 61/422,572, filed Dec. 13, 2010, entitled SYSTEM INTERFACES AND WORKFLOWS FOR DEVICE ASSISTED SERVICES; U.S. Provisional Application No. 61/422,574, filed Dec. 13, 2010, entitled SECURITY AND FRAUD DETECTION FOR DEVICE ASSISTED SERVICES; U.S. Provisional Application No. 61/435,564, filed Jan. 24, 2011, entitled FRAMEWORK FOR DEVICE ASSISTED SERVICES; and U.S. Provisional Application No. 61/472,606, filed Apr. 6, 2011, entitled MANAGING SERVICE USER DISCOVERY AND SERVICE LAUNCH OBJECT PLACEMENT ON A DEVICE.

The invention claimed is:

1. A method of operating a wireless end user device comprising:

storing on the wireless end user device one or more notification actions corresponding to one or more notification requests, the wireless end user device associated with a service plan having a limit on data usage of one or more wireless network services for one or more device applications;

detecting a device action that reflects a past or intended use of the one or more wireless network services by a given application of the one or more device applications;

enforcing a first traffic control policy applicable to the one or more wireless network services and the given application;

as a result of detecting the device action and the limit on data usage, triggering a notification request corresponding to one of the one or more notification actions, the one of the one or more notification actions causing the wireless end user device to present a notification message on a user interface of the wireless end user device, the notification message presenting information related to the limit on data usage to a device user.

2. The method of claim 1, further comprising classifying that the past or intended use of the one or more wireless network services is a background service use, and based on the classification, blocking the use.

3. The method of claim 2, further comprising, based on the classification, triggering via the notification request a notification action wherein the notification message comprises an icon, and, upon selection of the icon, presenting a second notification message on the user interface of the wireless end user device, the second notification message presenting additional information related to the limit on data usage to a device user.

4. The method of claim 1, wherein enforcing a traffic policy comprises blocking requested wireless data usage requested by the given application.

5. The method of claim 1, wherein enforcing a traffic policy comprises monitoring wireless network data usage by the given application, and capping the monitored wireless network data usage at a data limit associated with the given application.

6. The method of claim 1, wherein detecting a device action comprises detecting a launch or execution start event for the given application.

7. The method of claim 6, further comprising, upon detecting a launch or execution start event for the given application, determining whether one or more traffic control policies apply to the given application, the one or more traffic control policies comprising the first traffic control policy.

8. The method of claim 1, further comprising selecting the traffic control policy based on the given application and a wireless connection type for the one or more wireless network services.

9. The method of claim 8, wherein the wireless connection type is determined based on an Access Point Name (APN).

10. The method of claim 1, further comprising generating an alert classification based on whether the given application is an application that the device user is currently interacting with or a hidden application that is running but not currently being interacted with by the user, wherein the notification request is selected based on the alert classification.

11. The method of claim 10, wherein when the alert classification is indicative of a hidden application that is running but not currently being interacted with by the user, the selected notification request corresponds to one of the one or more notification actions that is less intrusive to a device user than a corresponding notification action for the selected notification request when the alert classification is indicative of an application that the device user is currently interacting with.

12. The method of claim 11, wherein a less intrusive notification action comprises a notification action selected from the group of actions consisting of a status bar update, a status tray update, a dynamic icon, a glowing icon, a toast, and combinations thereof.

13. The method of claim 11, wherein a less intrusive notification action comprises a widget launcher, wherein the widget, when launched, provides additional usage information about data usage.

14. The method of claim 1, wherein the presented notification message comprises a user-selectable option to change or override the traffic control policy as applied to the given application.

* * * * *